(12) United States Patent
Tamura et al.

(10) Patent No.: US 6,377,638 B1
(45) Date of Patent: *Apr. 23, 2002

(54) SIGNAL TRANSMISSION SYSTEM FOR TRANSMITTING SIGNALS BETWEEN LSI CHIPS, RECEIVER CIRCUIT FOR USE IN THE SIGNAL TRANSMISSION SYSTEM, AND SEMICONDUCTOR MEMORY DEVICE APPLYING THE SIGNAL TRANSMISSION SYSTEM

(75) Inventors: Hirotaka Tamura; Miyoshi Saito; Kohtaroh Gotoh; Shigetoshi Wakayama; Junji Ogawa; Hisakatsu Araki; Tsz-shing Cheung, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/688,389

(22) Filed: Oct. 12, 2000

Related U.S. Application Data

(62) Division of application No. 08/944,516, filed on Oct. 6, 1997, now Pat. No. 6,157,688.

(30) Foreign Application Priority Data

| Oct. 9, 1996 | (JP) | ............................................. 8-268544 |
| Jan. 31, 1997 | (JP) | ............................................. 9-18907 |
| Sep. 26, 1997 | (JP) | ............................................. 9-262507 |

(51) Int. Cl.[7] .............................. H03D 1/06; H03D 1/00

(52) U.S. Cl. ........................................ 375/348; 327/50

(58) Field of Search ................................ 375/348, 295, 375/316, 346, 223, 257; 327/50, 51; 365/185.25, 189.12, 230.01, 231

(56) References Cited

U.S. PATENT DOCUMENTS

| 4,388,725 A | 6/1983 | Saito et al. .................. 375/257 |
| 4,811,342 A | 3/1989 | Huang ......................... 370/292 |
| 5,003,555 A | 3/1991 | Bergmans .................... 372/233 |
| 5,243,703 A | 9/1993 | Farmwald et al. .......... 713/400 |

(List continued on next page.)

OTHER PUBLICATIONS

"PLL Design of a 500MB/s Interface", Horowitz et al., IEEE International Solid–State Circuits Conference 1992, p.s. 160–161.

"A 2.5V Delay–Locked Loop for an 18Mb 500MB/s DRAM", Lee et al., IEEE International Solid–State Circuits Conference 1994, p.s. 300–301.

"Partial Response Detection Technique for Driver Power Reduction in High–Speed Memory–to–Processor Communications", Tamura et al. IEEE International Solid–State Circuit Conference 1997, p.s. 342–343.

"A 23–ns 1–Mb BiCMOS DRAM", Kitsukawa et al. IEEE Journal of Solid–State Circuits, vol. 25, No. 5, Oct. 1990, p.s. 1102–1111.

*Primary Examiner*—Chi Pham
*Assistant Examiner*—Khai Tran
(74) *Attorney, Agent, or Firm*—Arent Fox Kintner Plotkin & Kahn, PLLC

(57) ABSTRACT

A signal transmission system has a response time of a signal transmission line which is set approximately equal to or longer than the length of a transmitted symbol. More specifically, terminal resistance is set larger than the characteristic impedance of the signal transmission line, driver output resistance is set to a large value, or a damping resistor is provided in series with the signal transmission line. With this configuration, signal power can be reduced drastically.

19 Claims, 163 Drawing Sheets

U.S. PATENT DOCUMENTS

| | | | |
|---|---|---|---|
| 5,254,883 A | 10/1993 | Horowitz et al. | 326/30 |
| 5,268,639 A | 12/1993 | Gasbarro et al. | 714/736 |
| 5,436,559 A | 7/1995 | Takagi et al. | 324/158.1 |
| 5,537,443 A | 7/1996 | Yoshino et al. | 375/340 |
| 5,548,596 A | 8/1996 | Tobita | 371/21.2 |
| 5,995,561 A * | 11/1999 | Yamasaki et al. | 375/341 |
| 6,157,688 A * | 12/2000 | Tamura et al. | 375/348 |
| 6,166,971 A * | 12/2000 | Tamura et al. | 365/198 |
| 6,185,256 B1 * | 2/2001 | Saito et al. | 375/257 |

* cited by examiner $2L/v_0 \leqq T$

L ⋯ TOTAL LENGTH OF CLOCK LINE

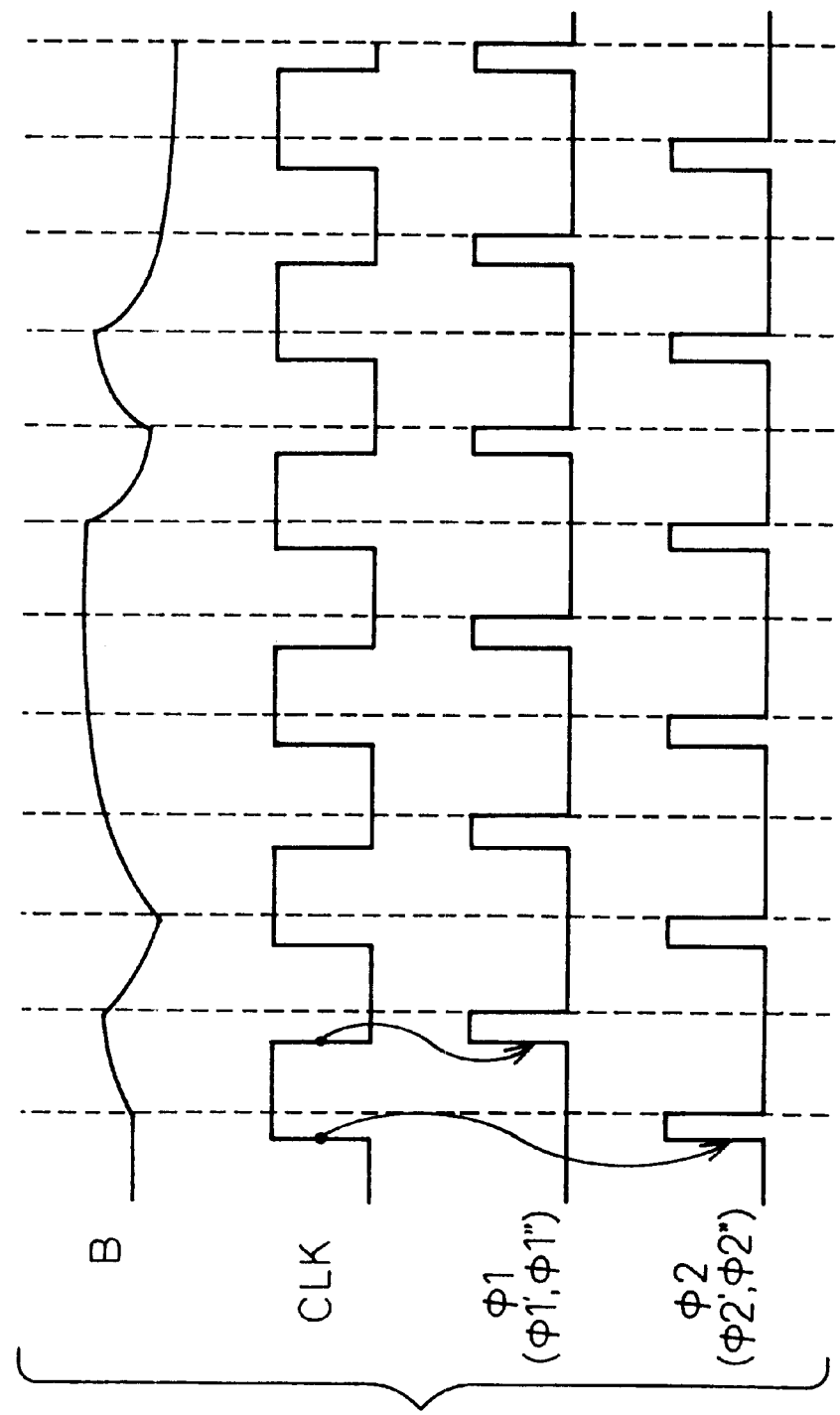

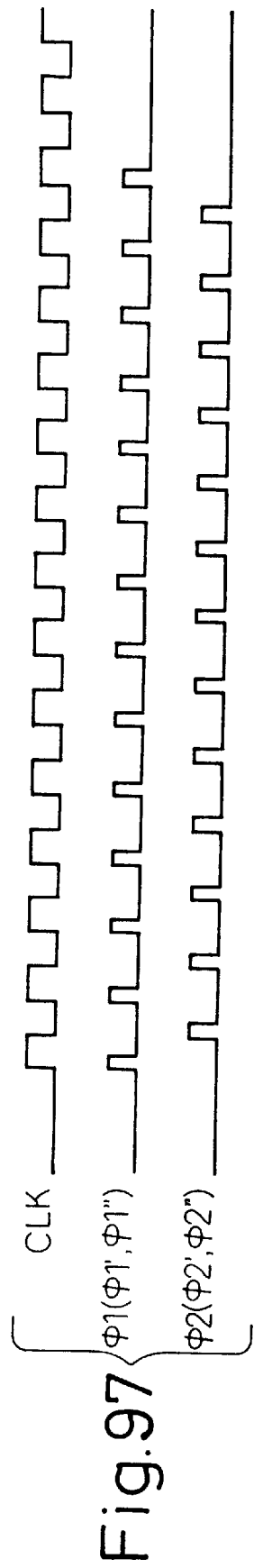

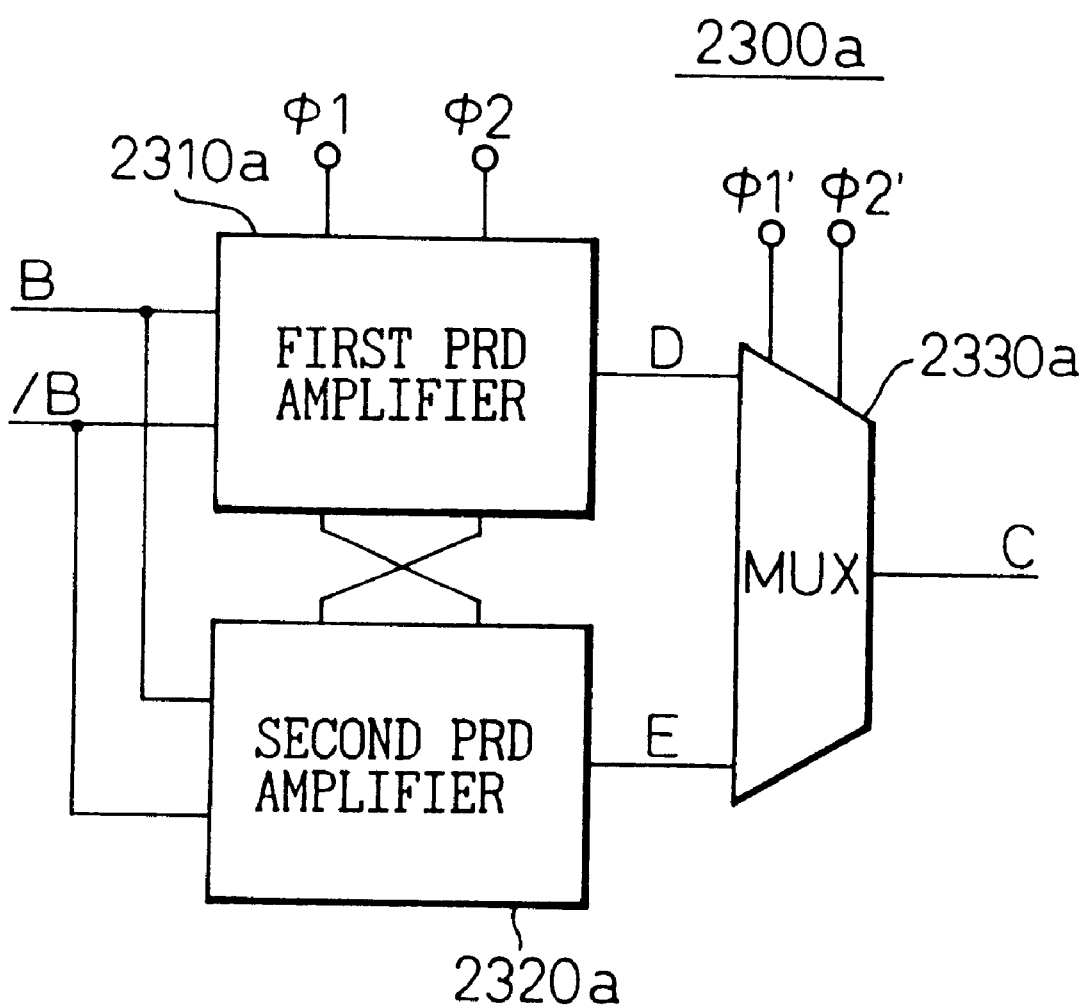

2413

2413

2413

2413

2413

2413

2413

2413

2413

SIGNAL TRANSMISSION SYSTEM FOR TRANSMITTING SIGNALS BETWEEN LSI CHIPS, RECEIVER CIRCUIT FOR USE IN THE SIGNAL TRANSMISSION SYSTEM, AND SEMICONDUCTOR MEMORY DEVICE APPLYING THE SIGNAL TRANSMISSION SYSTEM

This is a Division of application Ser. No. 08/944,516 filed Oct. 6, 1997now U.S. Pat. No. 6,157,688. The disclosure of the prior application is hereby incorporated by reference herein in its entirety.

BACKGROUND OF THE INVENTION

1. Field of the Invention

The present invention relates to a signal transmission system and a receiver circuit for use in the signal transmission system, and more particularly, to a signal transmission system for transmitting signals between LSI chips and a receiver circuit for use in the same.

2. Description of the Related Art

Recently, DRAM (Dynamic Random Access Memory) and processor performances have improved dramatically, and more specifically, processor performance has improved rapidly in terms of speed, while the improvement of DRAM performance has been dramatic primarily in terms of storage capacity. However, the improvement in operating speed of DRAM has not been so dramatic as the increase in storage capacity, as a result of which the speed gap between DRAM and processor has widened and this speed gap has become a bottleneck in boosting computer performance in recent years.

Among the signal transmission systems for signal transmission between processors and DRAMs (DRAM modules) known in the prior art and expected to find widespread use in the next few years are the SSTL (Series-Stub Terminated Logic) and other low-amplitude signaling standards. In the SSTL (or in a similar low-amplitude signaling system), a signal transmission line (hereinafter the transmission line) is terminated in a resistance close to the characteristic impedance of the transmission line, thereby suppressing reflections at its terminating ends and achieving high signal transmission speeds. Furthermore, by using low-amplitude signaling, the power required to charge and discharge the transmission line is reduced, making low-power transmission possible in high-speed operation.

In a bus system (signal transmission system) employing the SSTL, high-speed signal transmission is made possible because of matched termination (terminal resistance) and stub resistance, and power consumption also is reduced compared to traditional systems because of the use of low-amplitude signaling. However, in order to maintain the overall power consumption of the apparatus at the current level, or reduce it below the current level, while increasing the signal transmission bandwidth between DRAM and processor, a signal transmission system with lower power consumption is demanded.

Further, for example, in a Rambus channel, a DRAM controller and a plurality of DRAM chips are interconnected by a common signal transmission line (bus). For transmission and reception of high-speed signals, precise timing must be established between the signal sender and receiver. In the Rambus channel, correct timing can be established for both reception and transmission, provided that a clock line and a signal transmission line are identical both in routing and in electrical characteristics. That is, the Rambus channel requires that the clock line and the signal transmission line be formed along the same route and have the same electrical characteristics between them.

However, the characteristic of the load is inevitably different between the clock line and the signal transmission line. This is because, while the signal transmission line permits the use of a latch circuit operating in synchronism with receive timing to achieve high-sensitivity reception, the clock line requires the use of a differential amplifier, etc. since a latch cannot be used. Since the nature of the load is different between a latch circuit and a differential amplifier and the like, line electrical characteristics (for example, delay per unit distance), etc. are bound to become different between the clock line and the signal transmission line.

The prior and related arts, and their associated problems will be described in detailed later with reference to the accompanying drawings

SUMMARY OF THE INVENTION

It is an object of the present invention to provide a signal transmission system wherein the response time of a signal transmission line is set approximately equal to or longer than the length of a transmitted symbol. It is another object of the present invention to provide a signal transmission system that can generate timing signals without demanding symmetry between the clock line and the signal transmission line (bus), and that can minimize the gap when switching is made from one transmitting device to another.

According to the present invention, there is provided a signal transmission system wherein the response time of a signal transmission line is set approximately equal to or longer than the length of a transmitted symbol.

A terminal resistance provided at one or both ends of the signal transmission line may be set larger than a characteristic impedance of the signal transmission line. At least one resistor may be provided in series with the signal transmission line or the signal transmission line may be constructed to contain resistance in itself.

Signals may be transmitted between a plurality of circuit blocks. At least one of the plurality of circuit blocks may have a receiver circuit for receiving a signal transmitted out on the signal transmission line, and the receiver circuit may comprise a partial-response detection unit for detecting a partial response that the signal shows, and a signal logic decision unit for making a logic decision on the signal. The partial-response detection unit may comprise an intersymbol interference estimation unit for estimating intersymbol interference based on a previously received signal and a subtracting unit for subtracting the estimated intersymbol interference from a signal in effect currently received.

The intersymbol interference estimation unit may be constructed to obtain a sum of linear weights of previous decision values. The intersymbol interference estimation unit may comprise a shift register for holding previous bit information and a weighting unit for weighting data held in the shift register. The weighting unit may be constructed from a plurality of resistors. The weighting unit may be constructed from a plurality of capacitors and switches.

The intersymbol interference estimation unit may ba constructed to obtain nonlinear weights of previous decision values. The intersymbol interference estimation unit may comprise a shift register for holding previous bit information and a memory unit for storing estimates corresponding to data held in the shift register.

The intersymbol interference estimation unit may comprise an accumulating unit for accumulating an analog value of the previously received signal and an intersymbol interference generating unit for generating intersymbol interference from the analog value. The intersymbol interference estimation unit may be constructed to take a linear weighted sum of an analog value of a signal received one clock back and a fixed reference analog value. The intersymbol interference estimation unit may be provided with a plurality of switch units and capacitor units.

The plurality of circuit blocks may be semiconductor integrated circuit chips, and the signal transmission system may be configured as a bus system interconnecting the plurality of semiconductor integrated circuit chips. The signal transmission line may be configured as a bidirectional data bus or data signal line. The signal transmission line may be configured as a unidirectional address bus or address signal line. The plurality of semiconductor integrated circuit chips may be constructed with a processor or controller and a plurality of memory modules.

Further, according to the present invention, there is provided a signal transmission system for transmitting a signal between a plurality of circuit blocks via a signal transmission line, comprising a clock distribution unit for distributing a clock to each of the circuit blocks via a clock line; a common timing signal generating unit for providing common timing based on the clock to each of the circuit blocks with an accuracy of; time shorter than the time required for the signal to travel through wiring between the circuit blocks; and a unit for transmitting and receiving the signal in synchronism with the common timing.

Each of the circuit blocks may be an integrated circuit module, an integrated circuit chip, or a constituent circuit within a single chip. The maximum length of the signal transmission line may be not greater than the distance that the signal travels along the signal transmission line in one bit time. The maximum length of the signal transmission line may be not greater than half the distance that the signal travels along the signal transmission line in one bit time.

There may be inserted in the signal transmission line a buffer for giving the signal a delay equal to an integral multiple of one bit time of the signal and for retransmitting the delayed signal, the buffer thus enabling the signal to be transmitted over a distance exceeding the maximum length of the signal transmission line. The buffer may output to other circuit blocks connected via the buffer a clock necessary for the other circuit blocks to generate common timing.

The signal transmission line may be a bus of a common signal line type, and may be provided at one end or both ends of the bus with a terminal resistor having resistance approximately equal to or greater than the characteristic impedance of the bus. A driver circuit for driving the signal transmission line may have an output impedance greater than the characteristic impedance of the signal transmission line. The driver circuit may produce a constant-current driving output.

The common timing signal generating unit may capture clocks travelling along a clock line folded between a forward section and a backward section, and may generate the common timing by taking a timing intermediate between the rising timings of the forward and backward travelling clocks captured by each circuit block. The common timing signal generating unit may comprise a linear sum generating unit for generating a linear sum of sinusoidal clocks on the forward and backward sections of the folded clock line, and a waveform shaping unit for waveform-shaping the sine waves obtained by the linear sum generating unit. The common timing signal generating unit may comprise a phase interpolator for capturing the forward and backward travelling clocks on the folded clock line, and for generating a clock having a phase intermediate between the forward and backward travelling clocks.

The common timing signal generating unit may produce a standing wave along the clock line, and each of the circuit blocks may capture the clock from the standing wave produced along the clock line. A producing unit for producing the standing wave along the clock line may include a creating unit for actively creating a reflected signal of the clock in either a clock driving circuit or a clock terminating circuit or both, thereby adjusting an electrical length of the clock line.

The cycle of the clock used to generate the common timing may be longer than two times the length of one bit time of the signal transmitted along the signal transmission line. The clock line may have a transmission characteristic substantially different from the signal transmission line, and may be provided with increased electrical shielding against an external environment compared to the signal transmission line.

At least one of the circuit blocks may be provided at a receiving side thereof with a receiver- circuit for eliminating intersymbol interference from the signal, and may receive the signal transmitted via the signal transmission line.

In addition, according to the present invention, there is also provided a receiver circuit, for use in a signal transmission system, for receiving a signal transmitted on a signal transmission line, the receiver, circuit comprising a partial-response detection unit for detecting a partial response that the signal shows, and a signal logic decision unit for making a logic decision on the signal The partial-response detection unit may comprise an intersymbol interference estimation unit for estimating intersymbol interference based on a previously received signal and a subtracting unit for subtracting the estimated intersymbol interference from a signal in effect currently received. The intersymbol interference estimation unit may be constructed to obtain a sum of linear weights of previous decision values. The intersymbol interference estimation unit may comprise a shift register for holding previous bit information and a weighting unit for weighting data held in the shift register. The weighting unit may be constructed from a plurality of resistors. The weighting unit may be constructed from a plurality of capacitors and switches.

The intersymbol interference estimation unit may be constructed to obtain nonlinear weights of previous decision values. The intersymbol interference estimation unit may comprise a shift register for holding previous bit information and a memory unit for storing estimates corresponding to data held in the shift register.

The intersymbol interference estimation unit may comprise an accumulating unit for accumulating an analog value of the previously received signal and an intersymbol interference generating unit for generating intersymbol interference from the analog value. The intersymbol interference estimation unit may be constructed to take a linear weighted sum of an analog value of a signal received one clock back and a fixed reference analog value. The intersymbol interference estimation unit may be provided with a plurality of switch units and capacitor units.

The common timing signal generating unit may capture a forward clock and a backward clock travelling along a forward clock line and a backward clock line, and may; generate the common timing by taking a timing intermediate between the rise or fall timings of the forward and backward travelling clocks captured by each circuit block. At least one pair of clock generating circuits including a forward clock generating circuit and a backward clock generating circuit may be provided for each clock line pair including the forward clock line and the backward clock line, and the forward clock and backward clock generating circuits may adjust the phases of the rising or falling edges of the forward and backward clocks to set the phases at prescribed values. The forward clock generating circuit may comprise a unit for synchronizing the timing of an intermediate-phase signal, obtained by extracting an intermediate point between the rise or fall timings of the forward and backward clocks, to the rise or fall timing of a reference clock, a unit for detecting a phase difference between the intermediate-phase signal and the common timing signal, and a unit for adjusting the phase of the forward clock so that the detected phase difference becomes zero.

A plurality of clock generating circuits may be provided for the each forward/backward clock line pair, and wherein the clock generating circuit located at each end of the forward/backward clock line pair may comprise only a forward clock generating circuit or a backward clock generating circuit, and each of the clock generating circuits located at intermediate positions along the forward/backward may comprise a backward clock generating circuit, which generates a common timing signal and a backward clock on the basis of the forward clock received from the clock generating circuit at the preceding stage, and a forward clock generating circuit, which generates a new forward clock for the clock generating circuit at the next stage. Each of the clock generating circuits may further include a buffer for driving a signal supplied via a signal line. The signal line connecting between the circuit blocks may be connected point-to-point, and the clock generating circuits may be provided one for every one or multiples of the circuit blocks.

The backward clock generating circuit may be constructed from a feedback loop which performs a phase adjustment to maintain a constant phase difference between the received forward clock and the backward clock. The backward clock generating circuit may be constructed with a variable delay unit, a feedback loop for synchronizing a delay amount in the variable delay unit to a clock cycle, and a unit for giving the forward clock a delay amount proportional to the clock cycle by a delay stage controlled subordinately to the feedback loop. The variable delay unit may comprise a plurality of variable delay circuits in cascade, the feedback loop may control the delay amount in each of the variable delay circuits at the same value, and the backward clock may be taken from a designated node along the plurality of variable delay circuits.

The phase of the backward clock may be controlled so that the phase difference between the forward clock and an inverted version of the backward clock falls within ±180 or ±90 degrees at any of the circuit blocks receiving the forward and backward clocks.

The backward clock may be an inverted version of the forward clock. The forward and backward clocks each may have a waveform whose rise and fall times constitute a significant proportion of a clock cycle. The forward and backward clocks each may have a sinusoidal, triangular, or trapezoidal waveform. The common timing signal generating circuit may be a differential comparator to which the forward and backward clocks are applied as differential inputs.

Terminating ends of the forward and backward clock lines may be each terminated with an impedance greater than the characteristic impedance of the forward and L backward clock lines. At least either one of the forward and backward clocks may be transmitted using a differential signal transmission method. The forward clock may be transmitted as complementary signals, and the backward clock may be generated from a signal created by differentially amplifying the complementary forward clocks.

The forward and backward clocks may be generated by introducing a delay amount given by a feedback-controlled variable delay circuit into a reference clock in a free-running state. When capturing the forward and backward clocks, a signal once output outside a chip may be latched again into the chip as the forward clock, based on which the common timing signal is generated.

According to the present invention, there is provided a signal transmission system comprising a signal transmission line configured to transmit data without requiring precharging for every bit, by eliminating an intersymbol interference component introduced by preceding data; and a unit for eliminating an intersymbol interference component of a signal transmitted via the signal transmission line.

The signal transmission line may be constructed in a single-ended configuration. The signal transmission line may be configured as complementary buses, and the signal transmission system may include a complementary-type bus driver and a complementary-type bus amplifier.

The signal transmission system may further comprise a precharge circuit which does not precharge the signal transmission line for every bit during a data transmission period, and which precharges the signal transmission line to a prescribed potential level except during the data transmission period. The precharge circuit may precharge the signal transmission line only during a prescribed period before and after the data transmission period. The precharge circuit may precharge the signal transmission line during all periods other than the data transmission period. The precharge circuit may precharge the signal transmission line arbitrarily from outside.

The complementary-type bus amplifier may comprise an amplifier with an intersymbol interference elimination function for a single-ended line corresponding to each of the complementary buses, and a complementary-type differential amplifier provided on the downstream side of the amplifier with the intersymbol interference elimination. The complementary-type differential amplifier may be configured as a latch-type differential amplifier. The latch-type differential amplifier may be configured as a gate-receiving differential amplifier. The complementary-type differential amplifier may be configured as a current-mirror type differential amplifier.

The complementary-type bus amplifier may comprise a differential amplifier having first and second gate-receiving complementary inputs; an amplifier precharging circuit, provided at each of the first and second inputs of the differential amplifier, for precharging in a manner that enhances the sensitivity of the differential amplifier; and two sets of first and second capacitors provided at the first and second inputs of the differential amplifier, wherein the first and second inputs of the differential amplifier may be coupled to the complementary buses via the first and second capacitors, and in each set of capacitors the first capacitor may be coupled at all times to one of the complementary buses, whereas the second capacitor may be selectively coupled by switch means to one or the other of the complementary buses.

In each set of capacitors, the second capacitor may be coupled, during an intersymbol interference estimation operation, to the bus opposite to the bus coupled to the first capacitor connected to the same differential input, and may be coupled, during a data decision operation, to the same bus that is coupled to the first capacitor connected to the same differential input, thereby achieving elimination of complementary intersymbol interference components. The complementary-type bus amplifier may comprise first and second amplifier blocks each having an intersymbol interference elimination function, and may be configured so that the second amplifier block performs a data decision operation while the first amplifier block is performing an intersymbol estimation operation, and at the next timing, performs an intersymbol interference estimation operation while the first amplifier block is performing a data decision operation, and wherein the first and second amplifier blocks may each comprise a differential amplifier having first and second gate-receiving complementary inputs; an amplifier precharging circuit, provided at each of the first and second inputs of the differential amplifier, for precharging in a manner that enhances the sensitivity of the differential amplifier; and two sets of first and second capacitors provided at the first and second inputs of the differential amplifier, wherein the first and second inputs of the differential amplifier may be coupled to the complementary buses via the first and second capacitors, and in each set of capacitors the first capacitor may be coupled at all times to one of the complementary buses, whereas the second capacitor may be selectively coupled by a switch unit to one or the other of the complementary buses.

The complementary-type bus amplifier may comprise a differential amplifier having first and second gate-receiving complementary inputs; an amplifier precharging circuit, provided at the first input of the differential amplifier, for precharging in a manner that enhances the sensitivity of the differential amplifier; an auto-zero circuit for controlling electrical conduction between the second input of the differential amplifier and an output of the differential amplifier; and two sets of first and second capacitors provided at the first and second inputs of the differential amplifier, wherein the first and second inputs of the differential amplifier may be coupled to the complementary buses via the first and second capacitors, and in each set of capacitors the first capacitor may be coupled at all times to one of the complementary buses, whereas the second capacitor may be selectively coupled by switch means to one or the other of the complementary buses. In each set of capacitors, the second capacitor may be coupled, during an intersymbol interference estimation operation, to the bus opposite to the bus coupled to the first capacitor connected to the same differential input, and may be coupled, during a data decision operation, to the same bus that is coupled to the first capacitor connected to the same differential input, thereby achieving elimination of complementary intersymbol interference components.

The complementary-type bus amplifier may comprise first and second amplifier blocks each having an intersymbol interference elimination function, and may be configured so that the second amplifier block performs a data decision operation while the first amplifier block is performing an intersymbol estimation operation, and at the next timing, performs an intersymbol interference estimation operation while the first amplifier block is performing a data decision operation, and wherein the first and second amplifier blocks each may comprise a differential amplifier having first and second gate-receiving complementary inputs; an amplifier precharging circuit, provided at the first input of the differential amplifier, for precharging in a manner that enhances the sensitivity of the differential amplifier; an auto-zero circuit for controlling electrical conduction between the second input of the differential amplifier and an output of the differential amplifier; and two sets of first and second capacitors provided at the first and second inputs of the differential amplifier, wherein the first and second inputs of the differential amplifier may be coupled to the complementary buses via the first and second capacitors, and in each set of capacitors the first capacitor may be coupled at all times to one of the complementary buses, whereas the second capacitor may be selectively coupled by switch means to one or the other of the complementary buses.

In each set of capacitors, the second capacitor may be coupled, during the intersymbol interference estimation operation, to the bus opposite to the bus coupled to the first capacitor connected to the same differential input, and may be coupled, during the data decision operation, to the same bus that is coupled to the first capacitor connected to the same differential input, thereby achieving elimination of complementary intersymbol interference components. When the value of the first capacitor is denoted by C10, and the value of the second capacitor by C20, the values of the first and second capacitors may be chosen to substantially satisfy the equation $C10/(C10+C20)=(1+\exp(-T/\tau))/2$, where $\tau$ is the time constant of the bus, and T is the cycle of one bit or the time one-bit data appears on the bus.

The differential amplifier may be configured as a latch-type differential amplifier. Except during a data read period, the differential amplifier may set an output node thereof at a high level when a data receiving transistor is an N-channel type, or at a low level when the data receiving transistor is a P-channel type, thereby increasing the operating speed. During a differential amplifier input node precharge operation and an intersymbol interference component estimation operation within a data read period, and except during a data transfer period, the differential amplifier may set an output node thereof at a high level when a data receiving transistor is an N-channel type, or at a low level when the data receiving transistor is a P-channels type, thereby increasing operating speed. The differential amplifier may be configured as a current-mirror type differential amplifier. The differential amplifier may be configured so as not to operate except during a data transfer period.

The complementary-type bus amplifier may be a data bus amplifier, the complementary-type bus driver may be a sense amplifier, and the complementary buses may be data buses, respectively, wherein the data bus amplifier may remove an intersymbol interference component contained in data transmitted from the sense amplifier via the data buses and thereby may perform uninterrupted data read without precharging the data buses during data transmission.

The semiconductor memory device may be a dynamic random-access memory. The data buses may be organized in a hierarchical structure. The data buses may comprise a local data bus for transmitting data output from the sense amplifier via a selected column transfer gate, and a global data bus for transmitting data transferred from the local data bus via a selected local data bus switch.

The data bus amplifier may read out data by operating two amplifier blocks, provided in parallel and equipped with an intersymbol interference elimination function, in interleaving fashion in synchronism with the rise and fall timings of a clock or the rise timings of complementary clocks. The semiconductor memory device may further comprise a first column-selection signal generating unit, having a column decoder and a column-selection signal generating circuit, for generating a column-selection signal from the rise timing of the clock; and a second column-selection signal generating unit, having a column decoder and a column-selection signal generating circuit, for generating a column-selection signal from the fall timing of the clock or the rise timing of an inverted clock, and wherein the first: and the second column-selection signal generating units may be operated in interleaving fashion to perform switching between the column-selection signals at high speed. The first and the second column-selection signal generating units may generate the column-selection signals in overlapping fashion.

The data bus amplifier may read out data by using a single amplifier block equipped with an intersymbol interference elimination function. The amplifier block equipped with the intersymbol interference elimination function may perform an intersymbol interference component estimation operation in synchronism with the rise or fall timing of a clock, and a data decision operation in synchronism with the fall or rise timing of the clock.

The semiconductor device may include a load provided for the data buses. In cases where the data buses tend to shift gradually toward a low level side in the absence of the load, the load may be constructed with a P-channel MOS transistor of a size just sufficient to suppress the shift of the data buses, and the complementary buses may be respectively pulled to a high level through the P-channel MOS transistor, and wherein except during data transmission, the P-channel MOS transistor may be turned off to stop the action of the load. In cases where the data buses tend to shift gradually toward a low level side in the absence of the load, the load may be constructed with an N-channel MOS transistor of a size just sufficient to suppress the shift of the data buses, and the complementary buses may be respectively pulled to a high level through the N-channel MOS transistor, and wherein except during data transmission, the N-channel MOS transistor may be turned off to stop the action of the load.

In cases where the data buses tend to shift gradually toward a low level side in the absence of the load, the load may be constructed with a resistor, and the resistor may be connected to a high level via a transistor, and wherein except during data transmission, the transistor may be turned off to stop the action of the load. In cases where the data buses tend to shift gradually toward a low level side in the absence of the load, the load may be constructed with cross-coupled P-channel MOS transistors, and the cross-coupled P-channel MOS transistors may be connected to a high level via a control transistor so that one bus transmitting high-level data may be pulled to a higher level than the other bus transmitting low-level data, and wherein except during data transmission, the control transistor may be turned off to stop the action of the load. In cases where the data buses tend to shift gradually toward a high level side in the absence of the load, the load may be constructed with an N-channel MOS transistor of a size just sufficient to suppress the shift of the data buses, and the complementary buses may be respectively pulled to a low level through the N-channel MOS transistor, and wherein except during data transmission, the N-channel MOS transistor may be turned off to stop the action of the load.

In cases where the data buses tend to shift gradually toward a high level side in the absence of the load, the load may be constructed with a P-channel MOS transistor of a size just sufficient to suppress the shift of the data buses, and the complementary buses may be respectively pulled to a low level through the P-channel MOS transistor, and wherein except during data transmission, the P-channel MOS transistor may be turned off to stop the action of the load. In cases where the data buses tend to shift gradually toward a high level side in the absence of the load, the load may be constructed with a resistor, and the resistor may be connected to a low level via a transistor, and wherein except during data transmission, the transistor may be turned off to stop the action of the load. In cases where the data buses tend to shift gradually toward a high level side in the absence of the load, the load may be constructed with cross-coupled N-channel MOS transistors, and the cross-coupled N-channel MOS transistors may be connected to a low level via a control transistor so that one bus transmitting low-level data may be pulled to a lower level than the other bus transmitting high-level data, and wherein except during data transmission, the control transistor may be turned off to stop the action of the load.

The load may be provided only at one place on the global data bus. Multiples of the load may be provided spaced apart from one another at a plurality of places along the global data bus. The load may be provided only on the local data bus. Multiples of the load may be provided spaced apart from one another at a plurality of places along the global data bus and the local data bus. The sense amplifier may be configured as a CMOS transistor cross-coupled pair. The sense amplifier may receive a differential potential on a bit line by a gate, and may transfer data onto the data buses before the bit line is fully opened, thereby preventing the data in the sense amplifier from being inverted by the differential potential of the data buses.

The sense amplifier may be configured as a P-channel or N-channel MOS transistor gate-receiving amplifier. The sense amplifier may be configured as a CMOS transistor gate-receiving amplifier. The semiconductor memory device may compensate a skew, which is determined from a time of generating a column-selection signal for selecting a sense amplifier to a time of arriving data output from the selected sense amplifier at the bus amplifier, due to a position of the selected sense amplifier, and may determine control signals used in the data bus amplifier at an appropriate timing where the arrived data are effective, the skew being caused by a difference between a first length from a column-selection signal generating circuit to the selected sense amplifier and a second length from the selected sense amplifier to the data bus amplifier via the data bus.

The semiconductor memory device may generate the column-selection signal at later timing for sense amplifiers located nearer to the column-selection signal generating circuit and the data bus amplifier and at earlier timing for sense amplifiers located farther from the column-selection signal generating circuit and the data bus amplifier, thereby keeping the timing where data arrive at the bus amplifier substantially constant irrespective of the location of each of the sense amplifiers. The semiconductor memory device may be divided into a plurality of memory blocks crossing to a longitudinal direction of the data bus directly connected to the data bus amplifier, a block-selection address for selecting the memory block may be input to the column-selection signal generating circuit, a delay amount in the column-selection signal generating circuit may be controlled by the block-selection address, and thereby the timing where data arrive at the bus amplifier may be substantially constant irrespective of the location of each of the sense amplifiers.

The semiconductor memory device may supply a row block-selection address to a column-selection signal generating circuit, and a delay amount in the column-selection signal generating circuit may be controlled by the block-selection address in such a manner that the generating timing for the column-selection signal is advanced for blocks located farther from the bus amplifier and is delayed for blocks located nearer to the bus amplifier. The delay amount in the column-selection signal generating circuit may be formed by a transfer gate and added capacitance, the value of the added capacitance being made greater for blocks located nearer to the bus amplifier. The delay amount in the column-selection signal generating circuit may be formed by a delay line consisting of a plurality of cascaded delay stages, the delay line providing a larger number of delay stages to be passed through for block nearer to the bus amplifier. Each of the delay stages may comprise first and second NAND gates and an inverter.

The semiconductor memory device may generate control signals used in the data bus amplifier at earlier timing for sense amplifiers located nearer to the column-selection signal generating circuit and the data bus amplifier and at later timing for sense amplifiers located farther from the column-selection signal generating circuit and the data bus amplifier, and may determine the control signals used in the data bus amplifier at an appropriate timing where the arrived data are effective.

Further, according to the present invention, there is provided a receiver circuit for use in a signal transmission system that transmits data via complementary buses, and that detects the data by eliminating an intersymbol interference component introduced by preceding data, comprising a differential amplifier having first and second gate-receiving complementary inputs; an amplifier precharging circuit, provided at each of the first and second inputs of the differential amplifier, for precharging in a manner that enhances the sensitivity of the differential amplifier; and two sets of first and second capacitors provided at the first and second inputs of the differential amplifier, wherein the first and second inputs of the differential amplifier are coupled to the complementary buses via the first and second capacitors, and in each set of capacitors the first capacitor is coupled at all times to one of the complementary buses, whereas the second capacitor is selectively coupled by a switch unit to one or the other of the complementary buses.

BRIEF DESCRIPTION OF THE DRAWINGS

The present invention will be more clearly understood from the description of the preferred embodiments as set forth below with reference to the accompanying drawings, wherein:

FIG. 88 is a diagram showing an example of a signal waveform for operating the bus amplifier of FIG. 87C;

FIG. 97 is a diagram showing an example of a signal waveform for operating the bus amplifier of FIG. 95C;

FIG. 108 is a diagram showing another example of the bus amplifier in the signal transmission system of FIG. 104;

FIG. 113 is a diagram showing one example of a bus amplifier in the signal transmission system as a sixth embodiment of the signal transmission system according to the fifth mode of the present invention;

FIG. 114 is a circuit diagram showing one example of a PRD amplifier configuration in the bus amplifier of FIG. 113;

FIG. 115 is a circuit diagram showing another example of the PRD amplifier configuration in the bus amplifier of FIG. 113;

FIG. 116 is a circuit diagram showing one example of a multiplexer in the bus amplifier of FIG. 113;

FIG. 117 is a diagram showing an example of the operating waveform of the bus and the bus amplifier in the sixth embodiment of the signal transmission system according to the fifth mode of the present invention;

FIG. 118 is a diagram showing one example of a bus amplifier in the signal transmission system as a seventh embodiment of the signal transmission system according to the fifth mode of the present invention;

FIG. 119 is a circuit diagram showing one example of a PRD amplifier configuration in the bus amplifier of FIG. 118;

FIG. 120 is a circuit diagram showing one example of a multiplexer in the bus amplifier of FIG. 118;

FIG. 121 is a diagram showing an example of a signal waveform for operating the bus amplifier of FIG. 118;

FIG. 122 is a diagram showing an example of the operating waveform of the bus and the bus amplifier in the seventh embodiment of the signal transmission system according to the fifth mode of the present invention;

FIG. 123 is a diagram showing one example of a bus amplifier in the signal transmission system as an eighth embodiment of the signal transmission system according to the fifth mode of the present invention;

FIG. 124 is a circuit diagram showing one example of a PRD amplifier configuration in the bus amplifier of FIG. 123;

Figure 123:
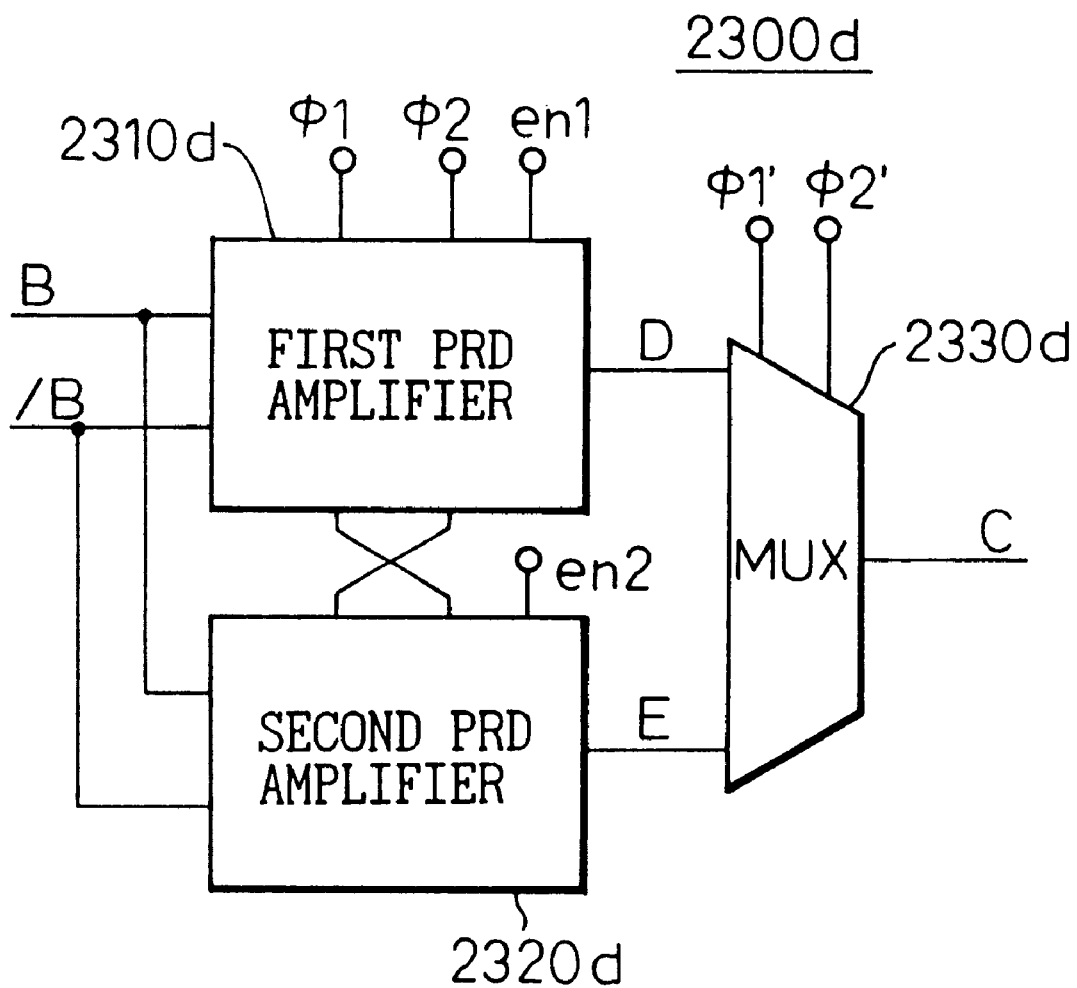
Figure 124:
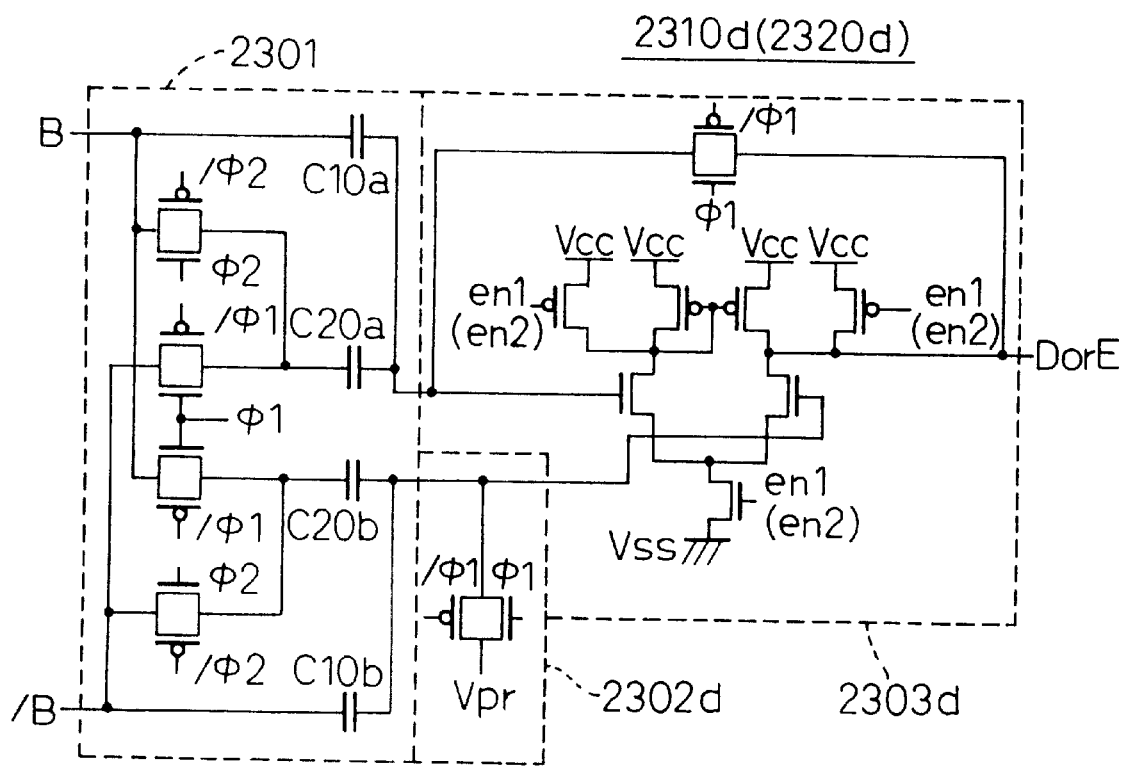
Figure 125A:
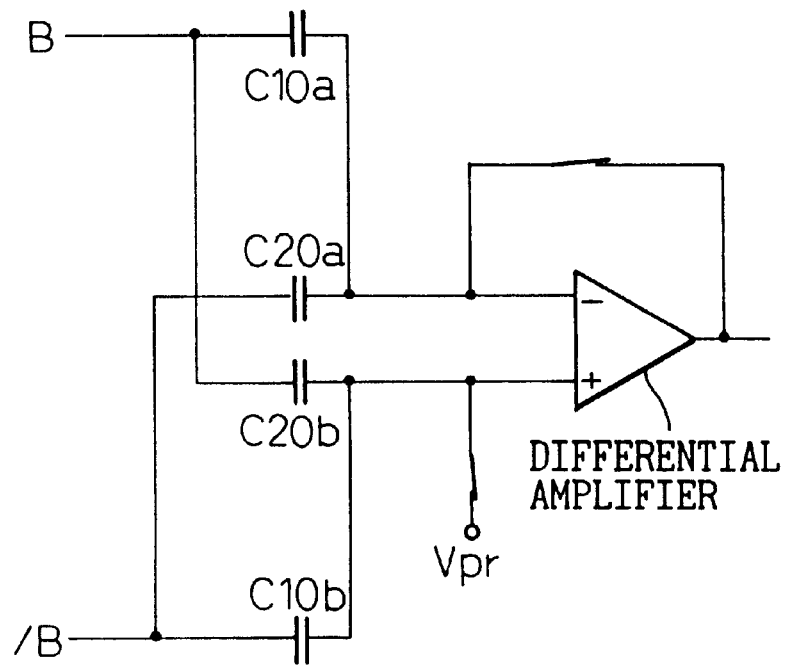
Figure 125B:
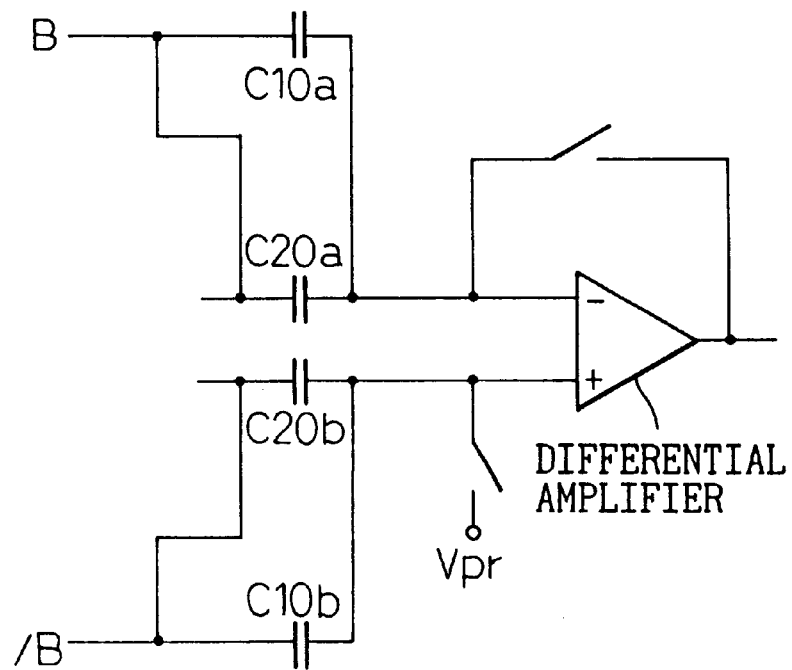
Figure 126:
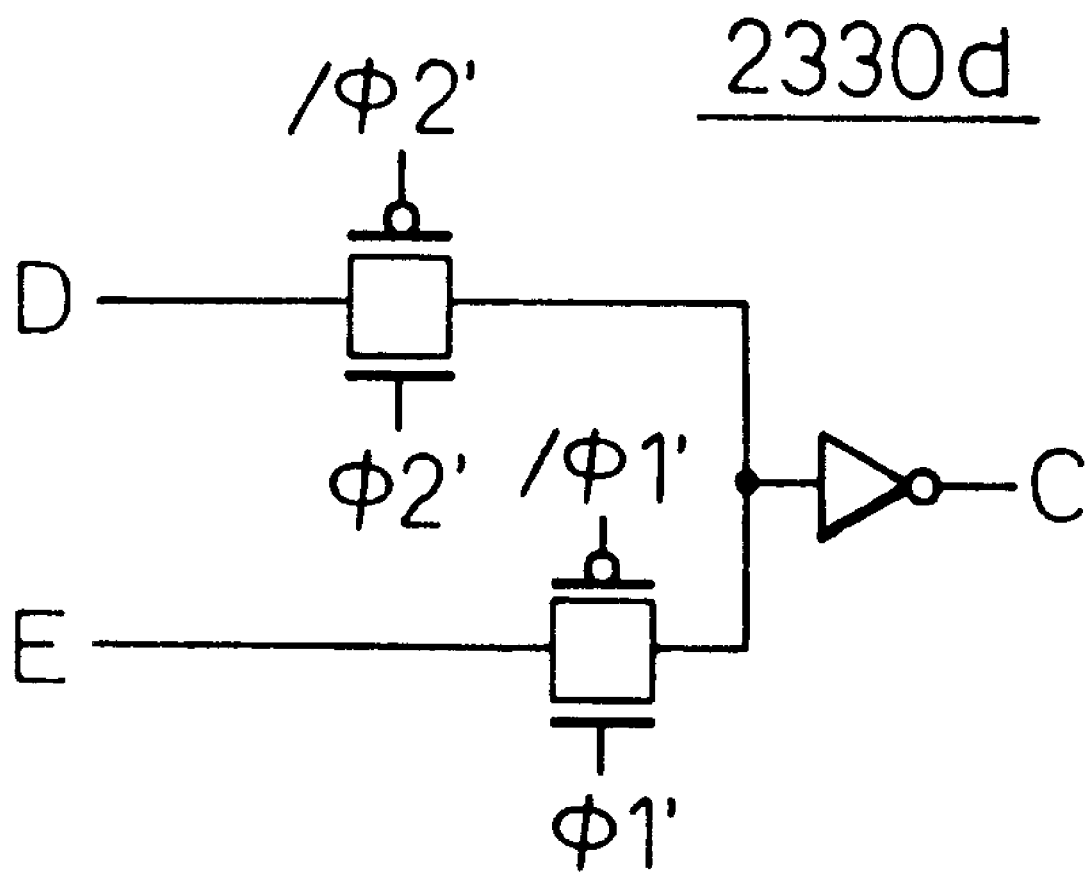
Figure 127:
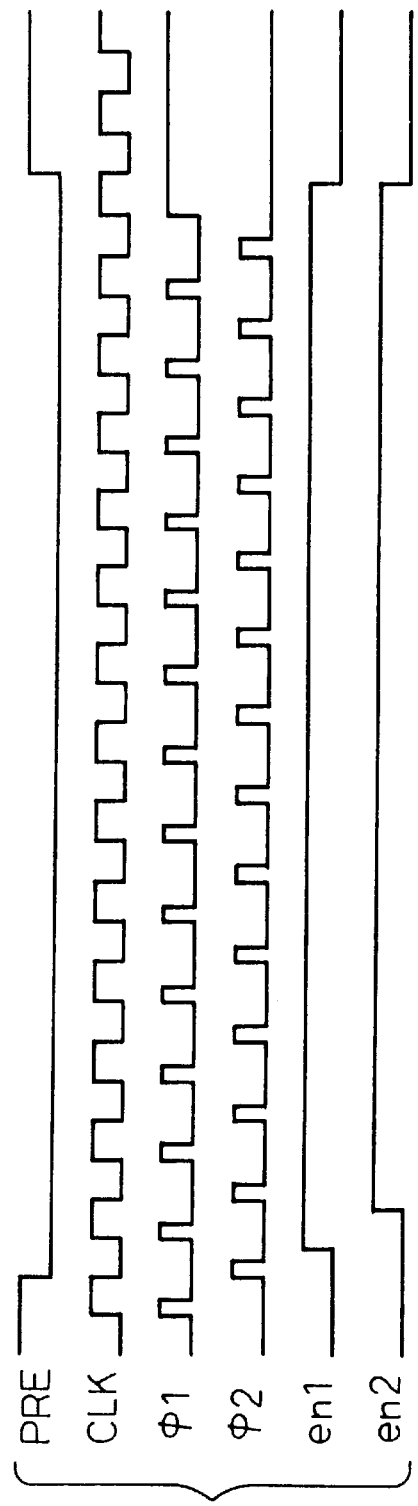
Figure 128:
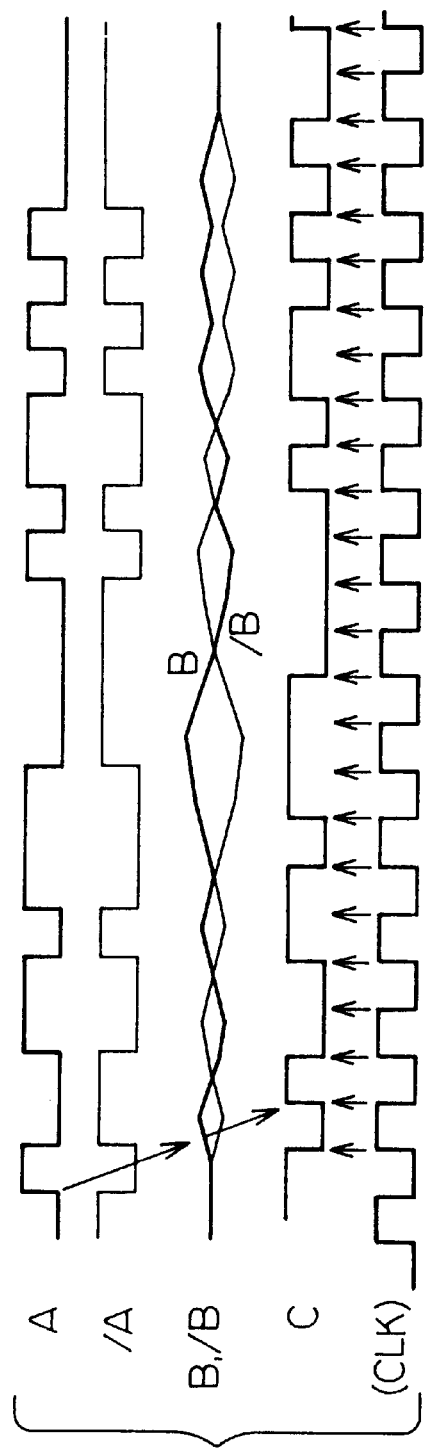
Figure 129:
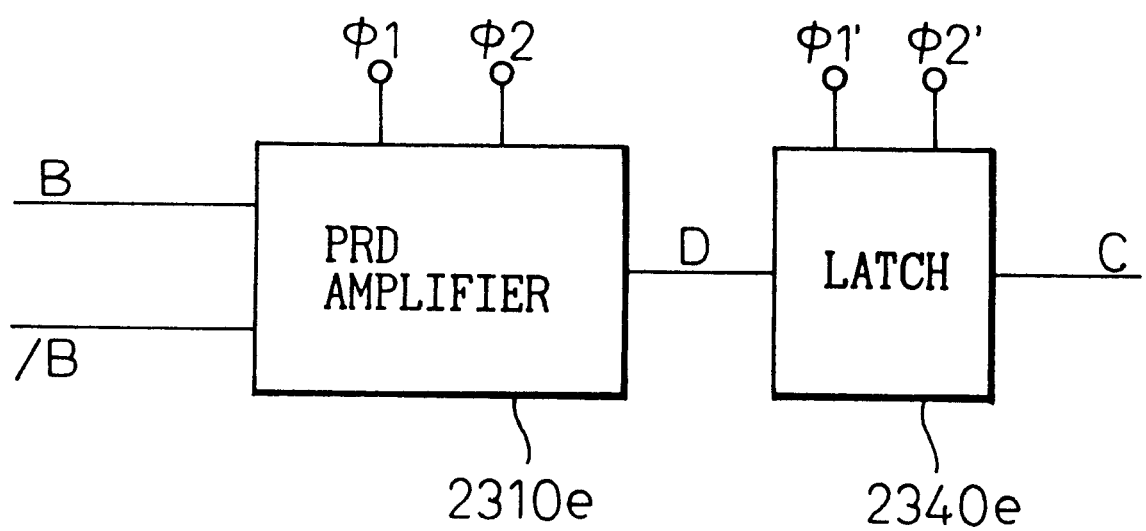
Figure 130:
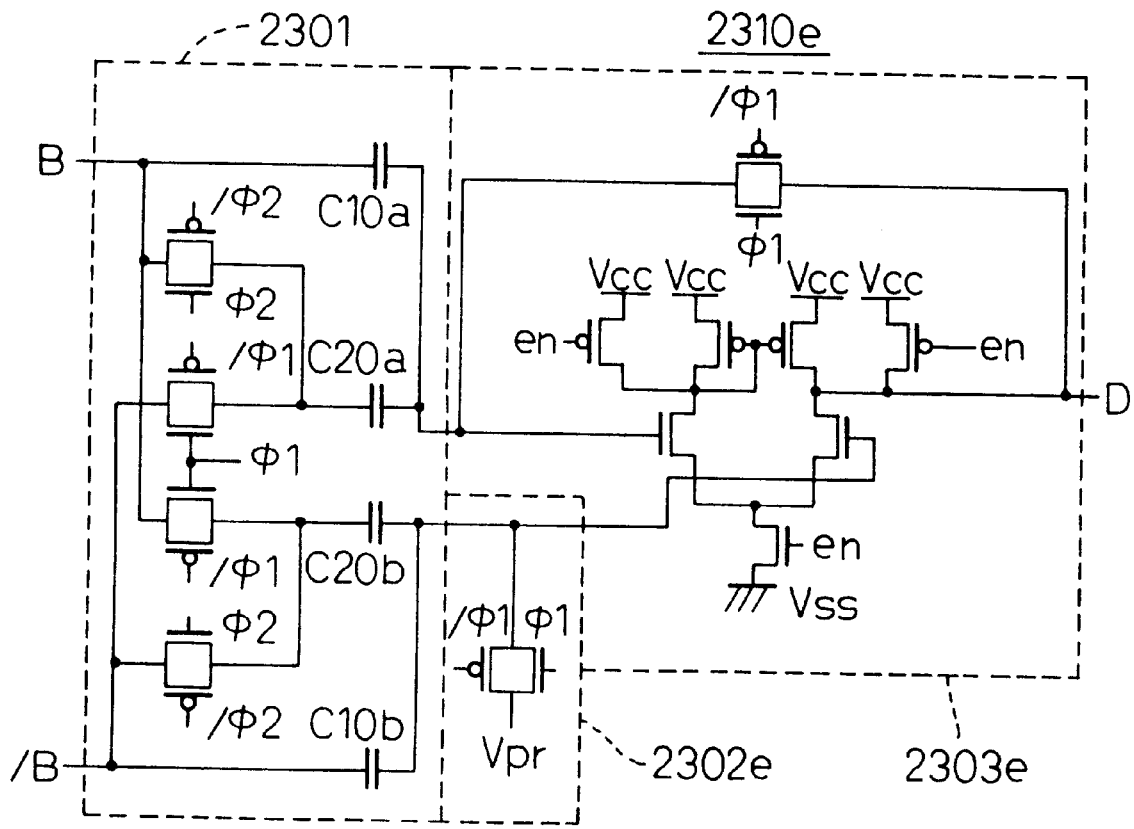
Figure 131:
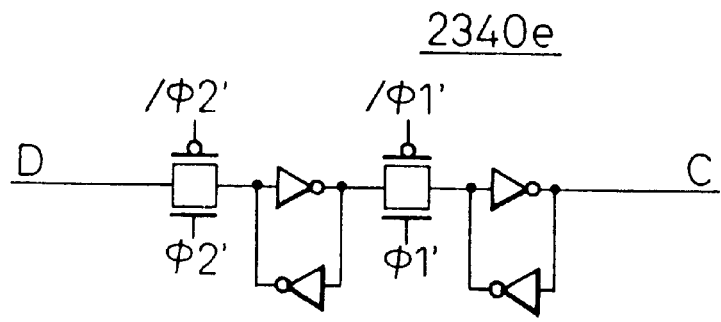
Figure 132:
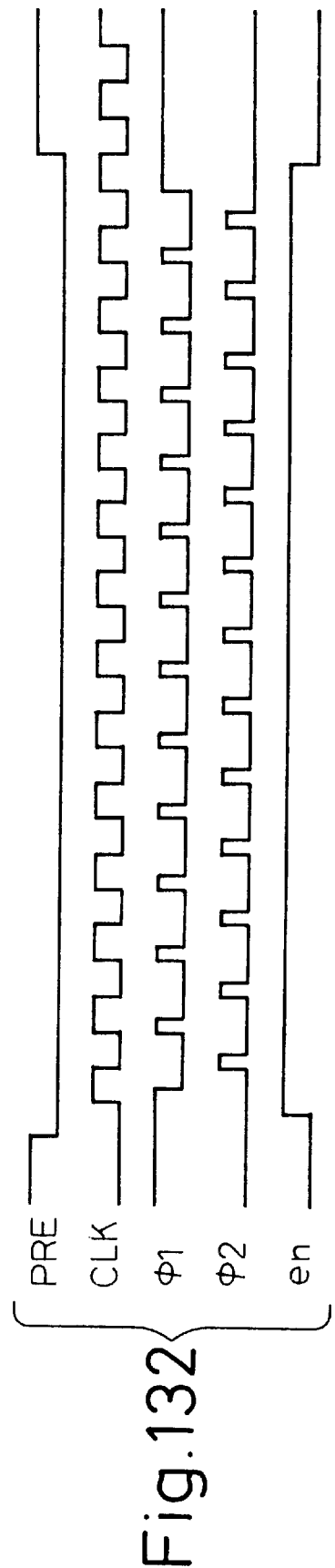
Figure 133:
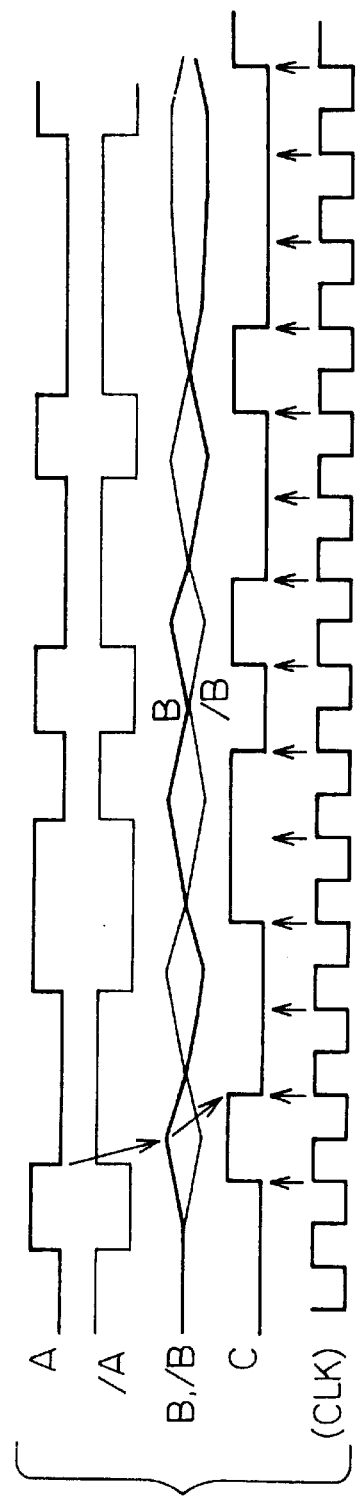
Figure 134:
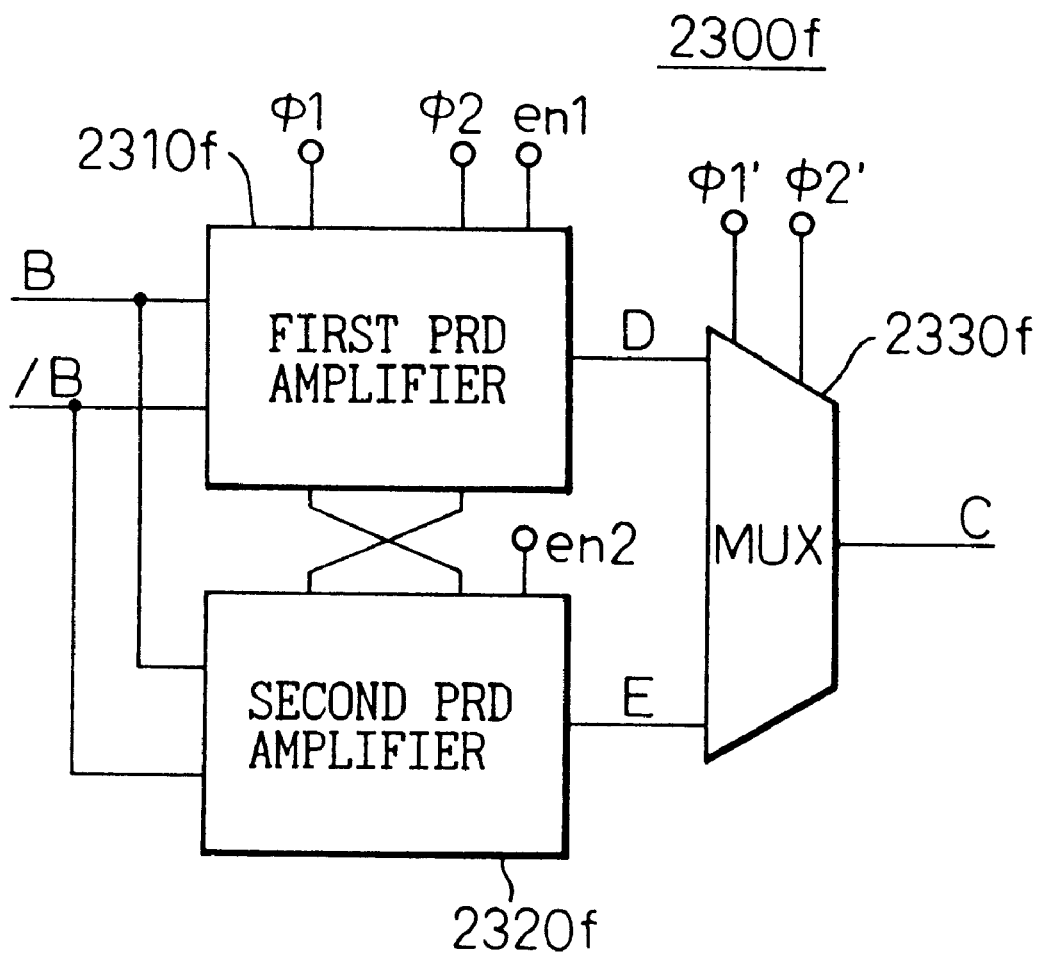
Figure 135A:
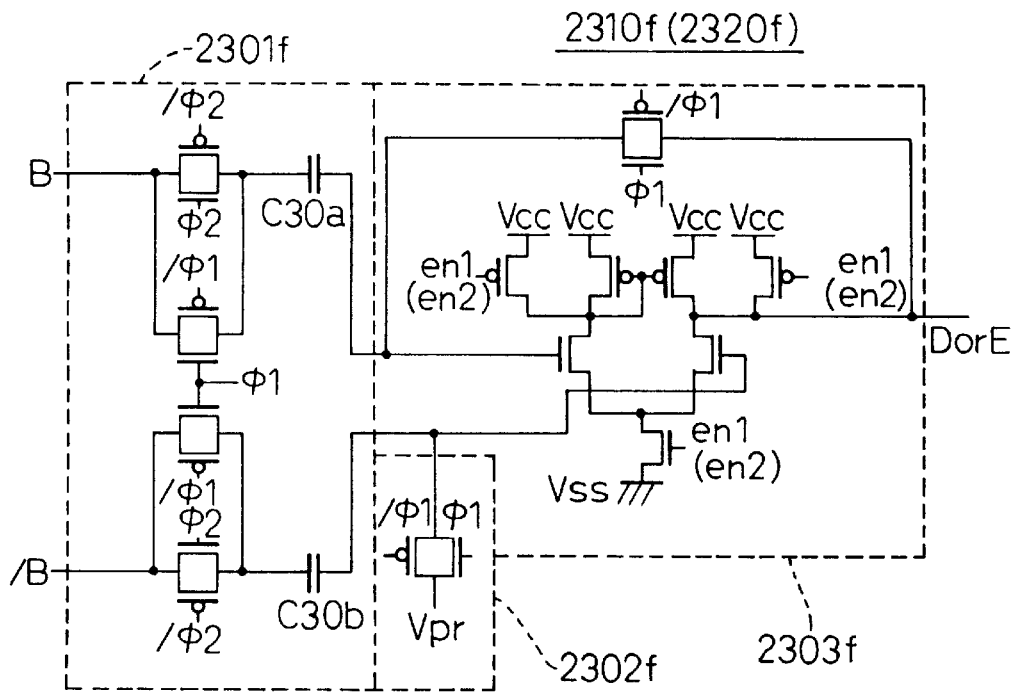
Figure 135B:
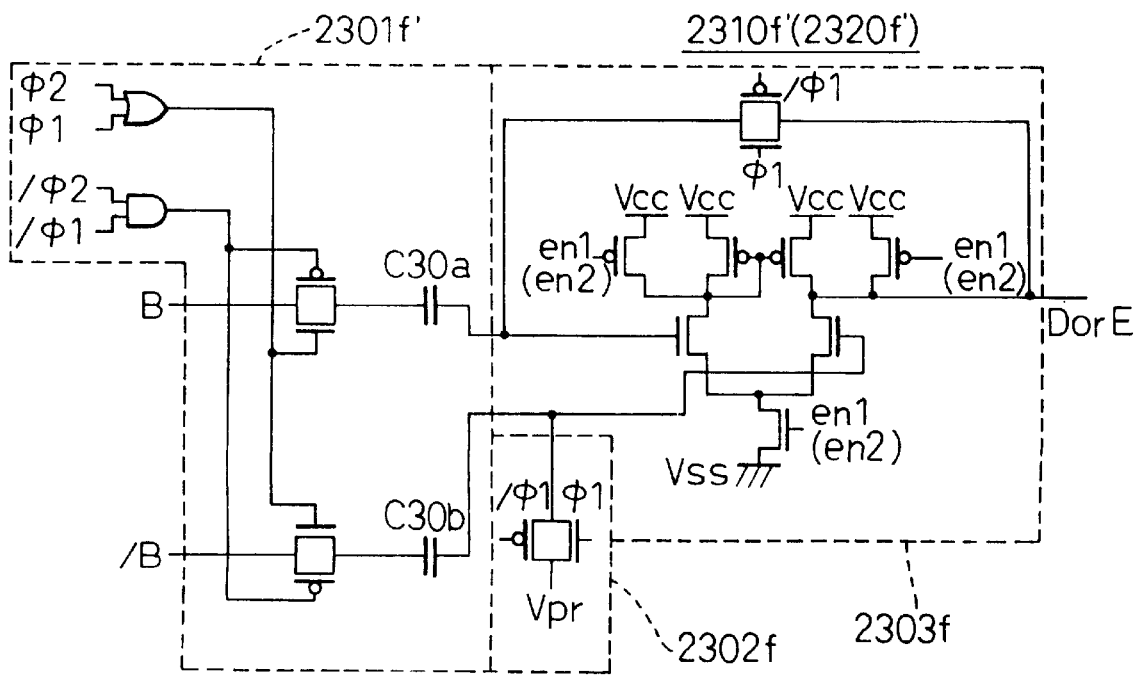
Figure 136:
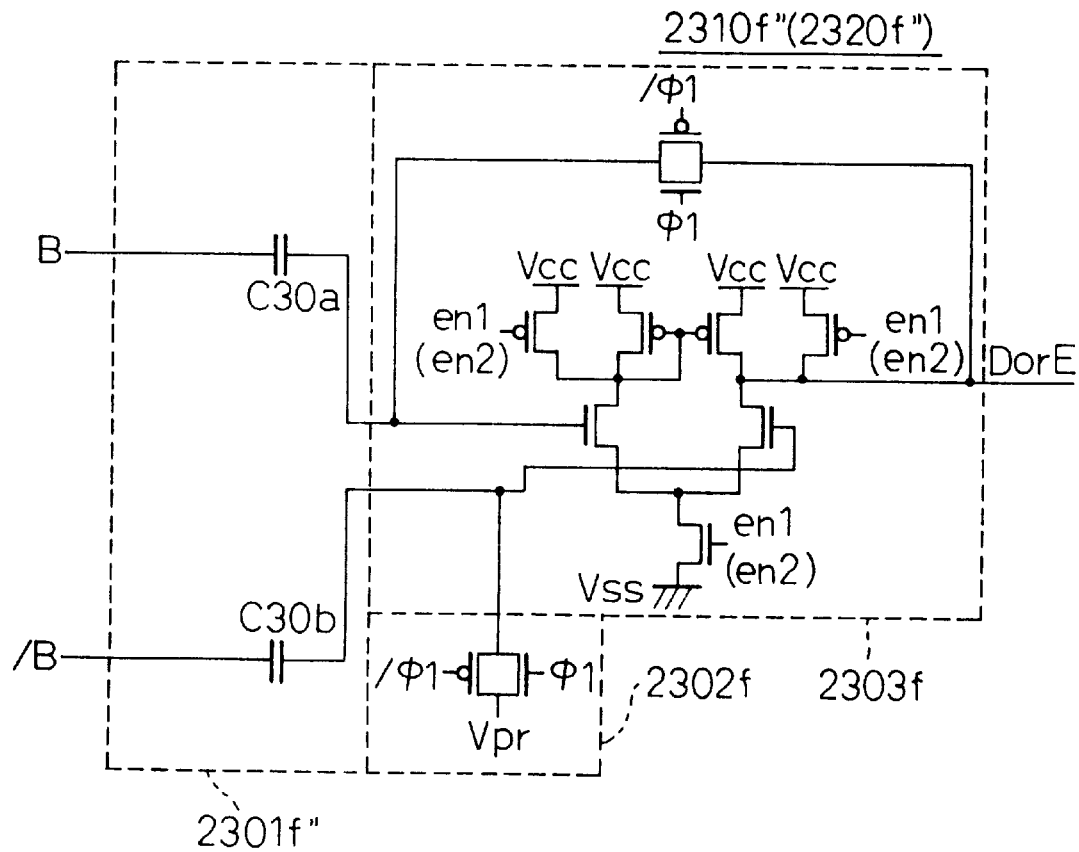
Figure 137:
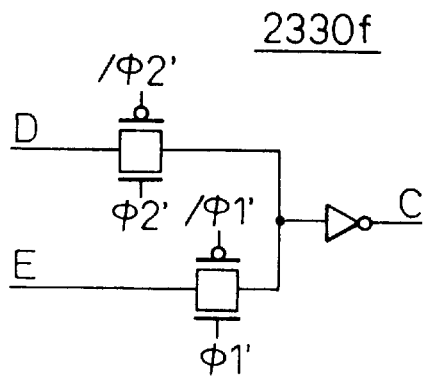
Figure 138:
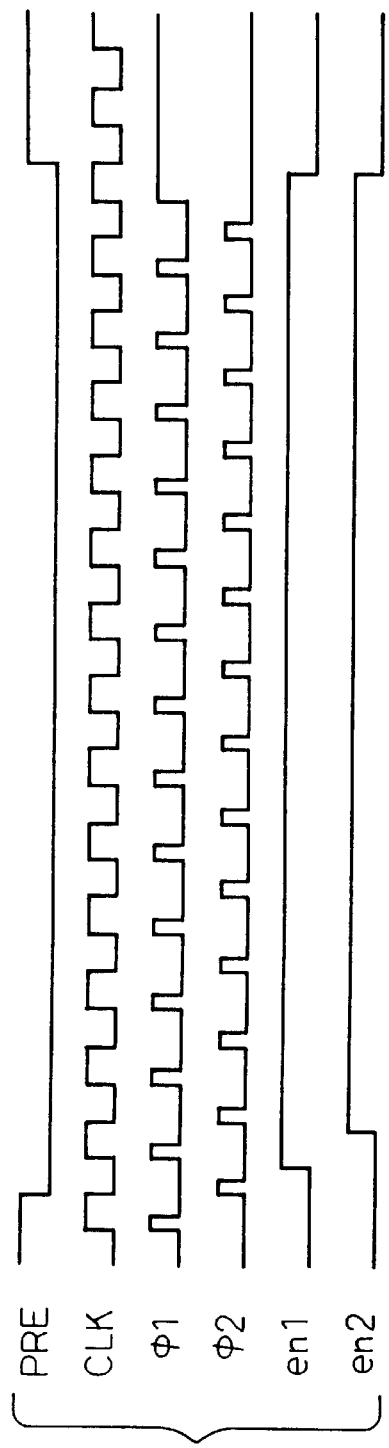
Figure 139:
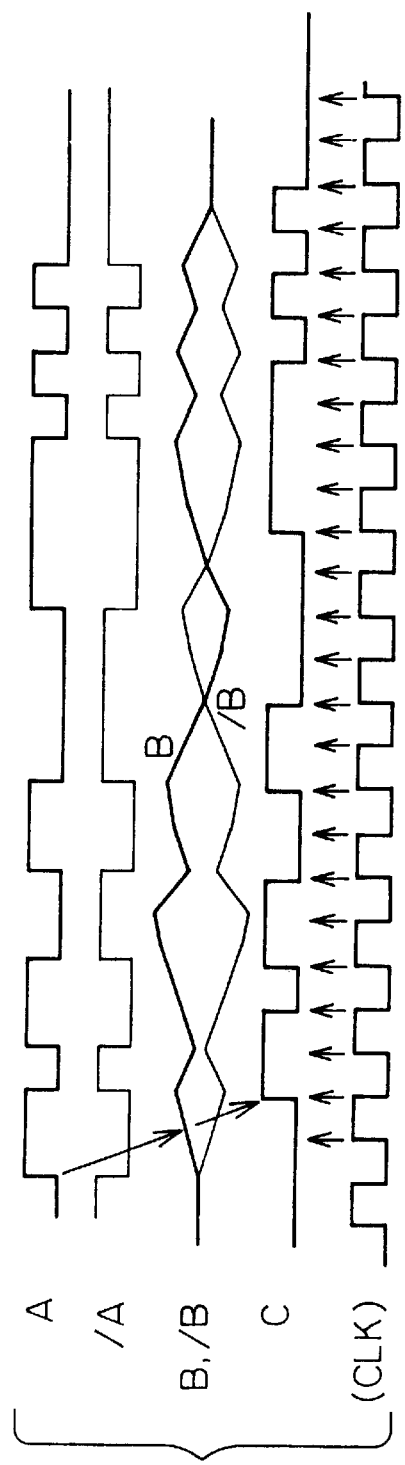
Figure 140:
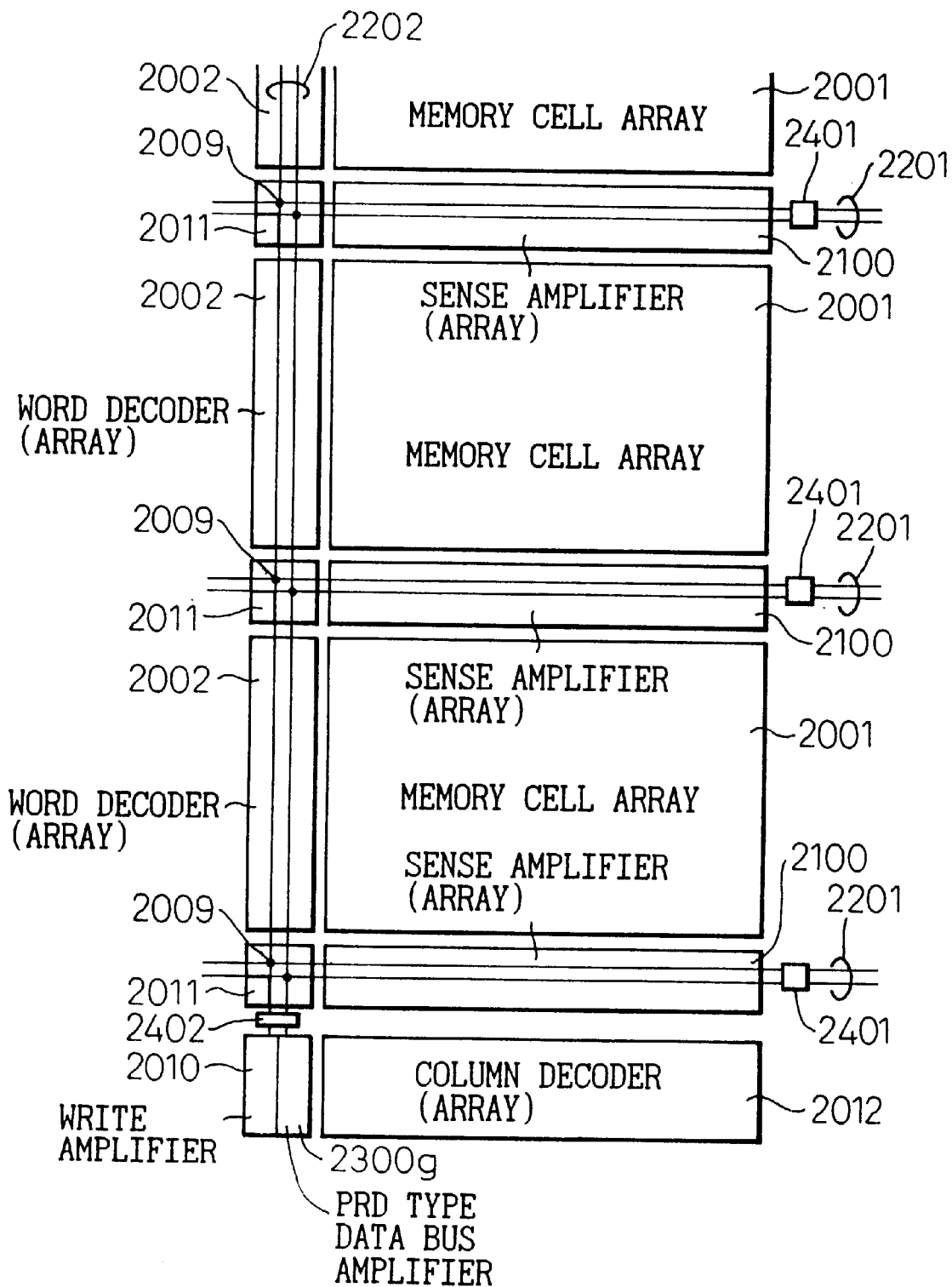
Figure 141:
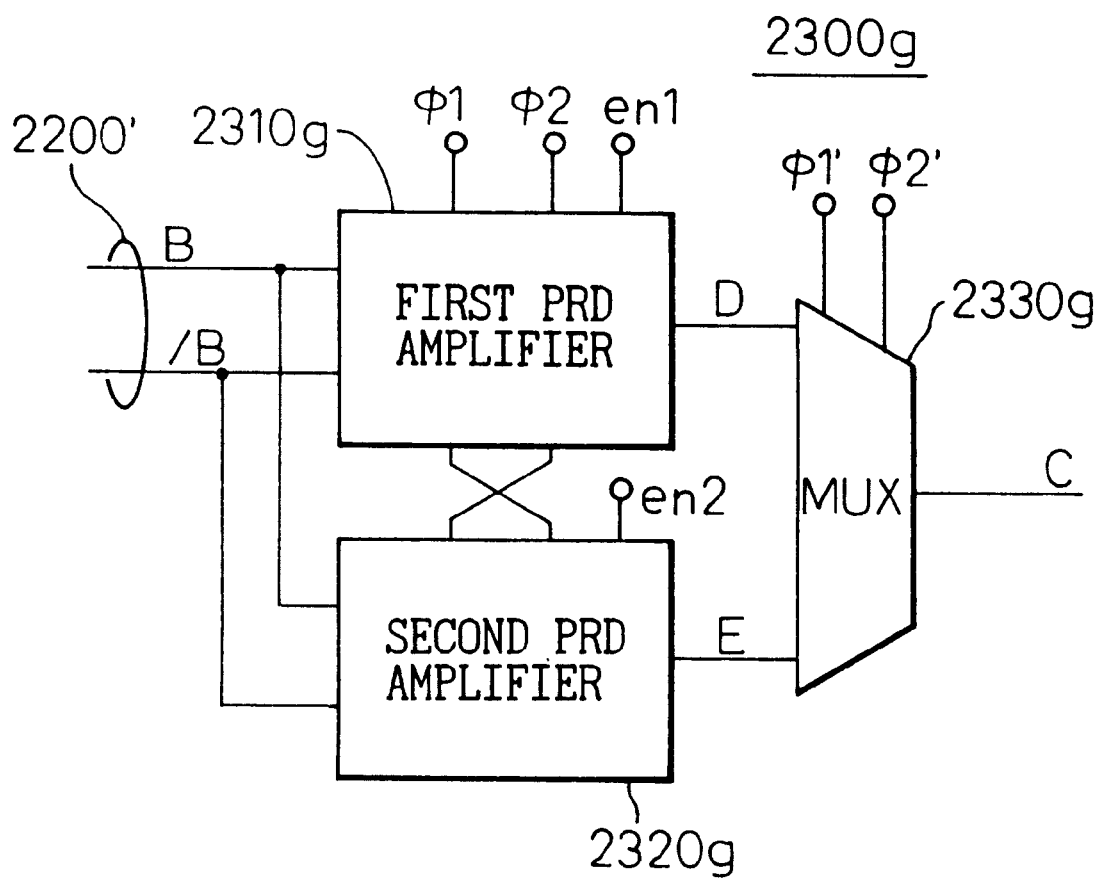
Figure 142:
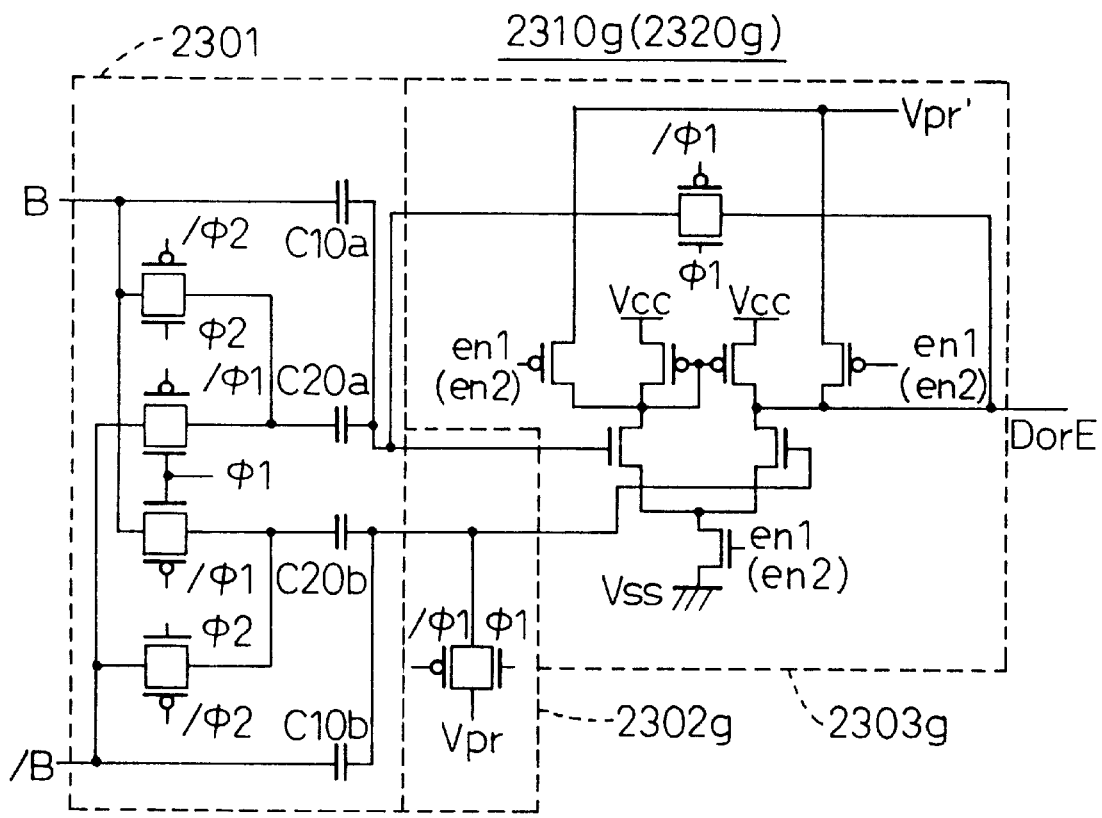
Figure 143:
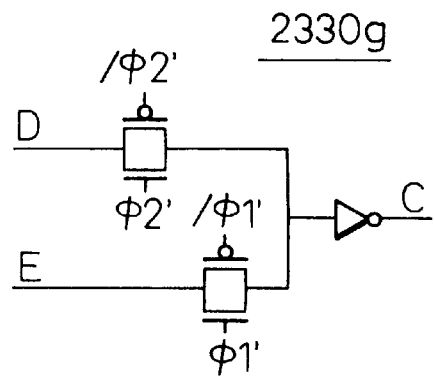
Figure 144:
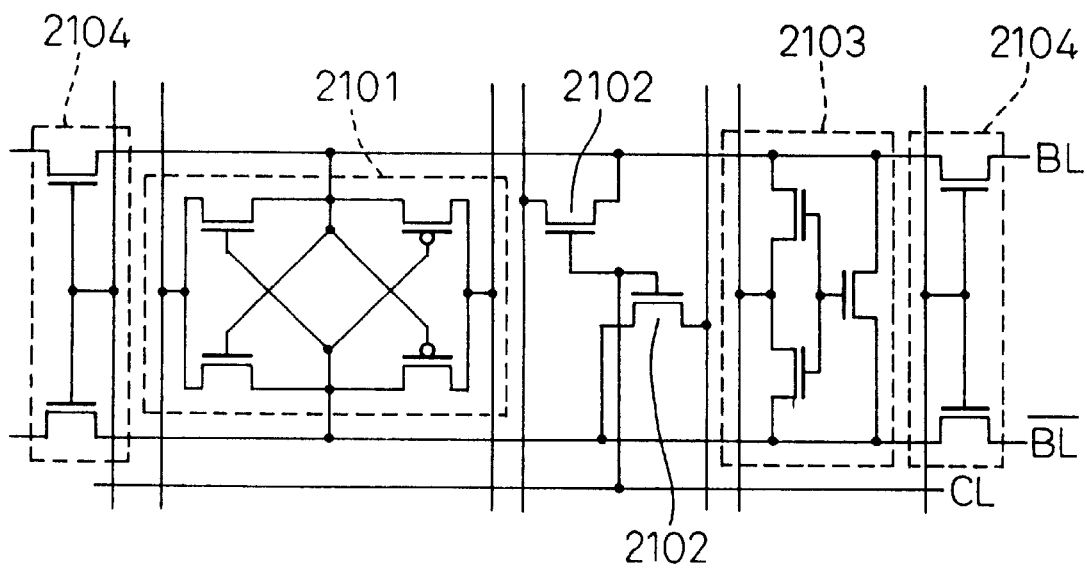
Figure 145:
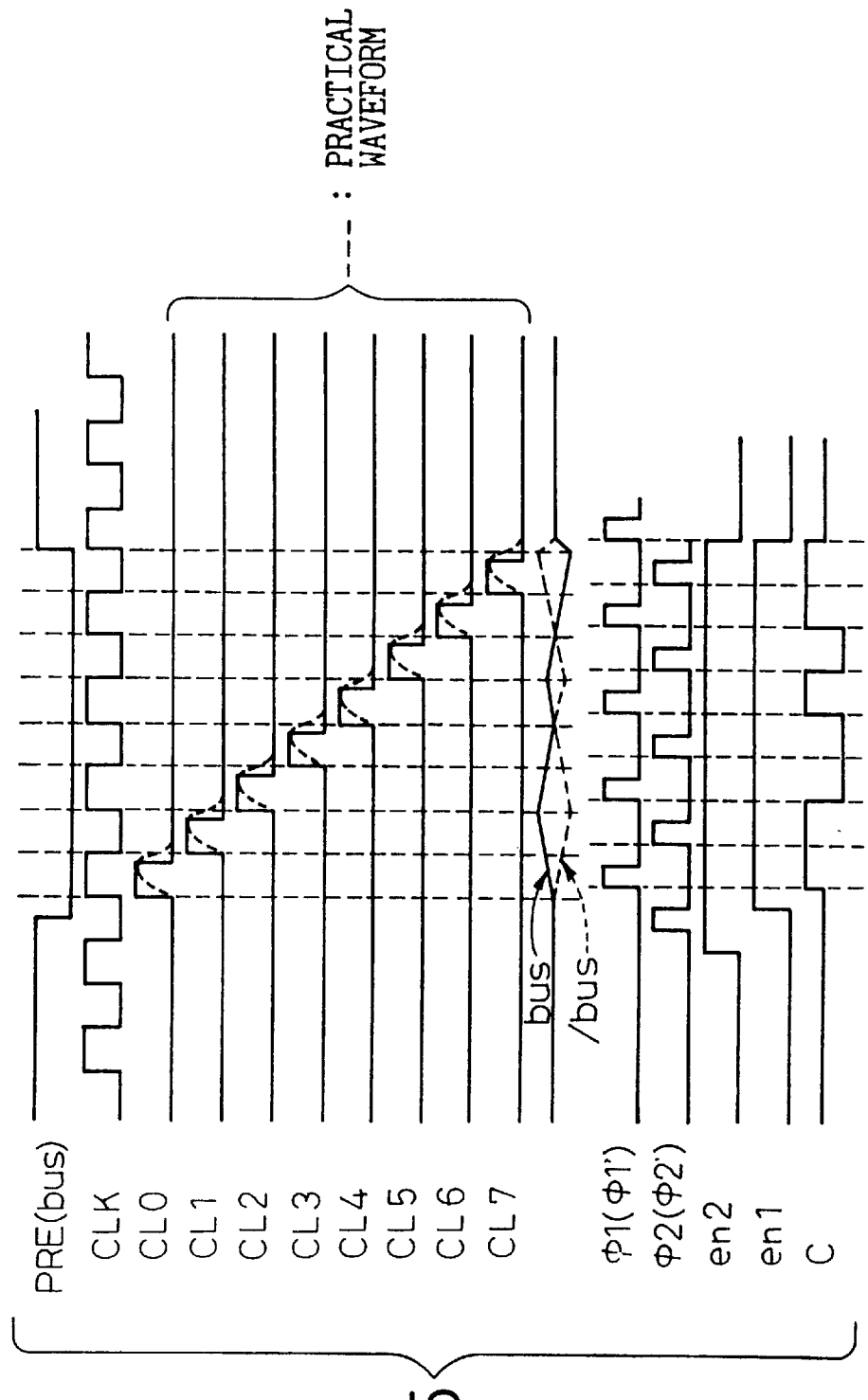
Figure 146:
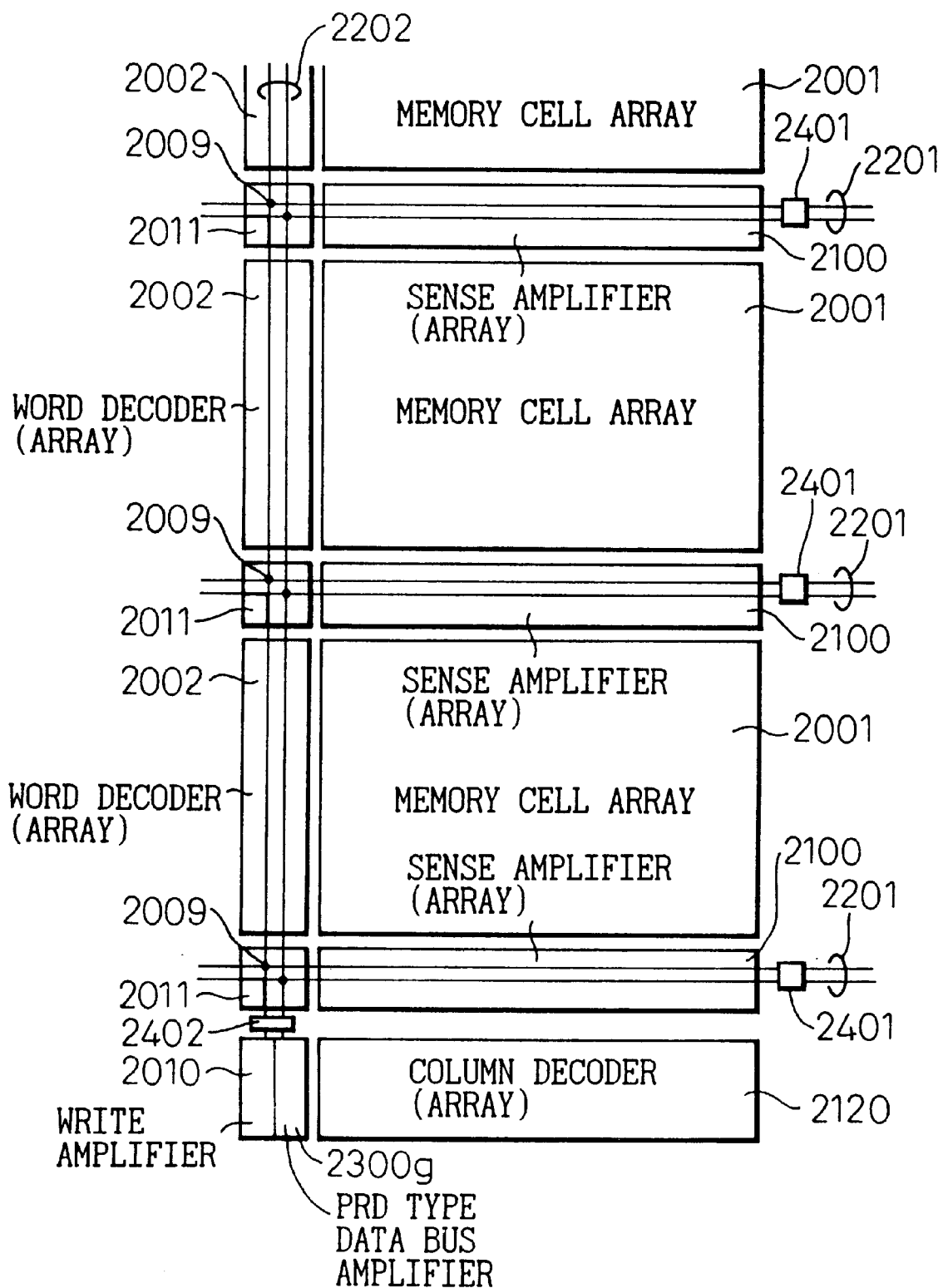
Figure 147:
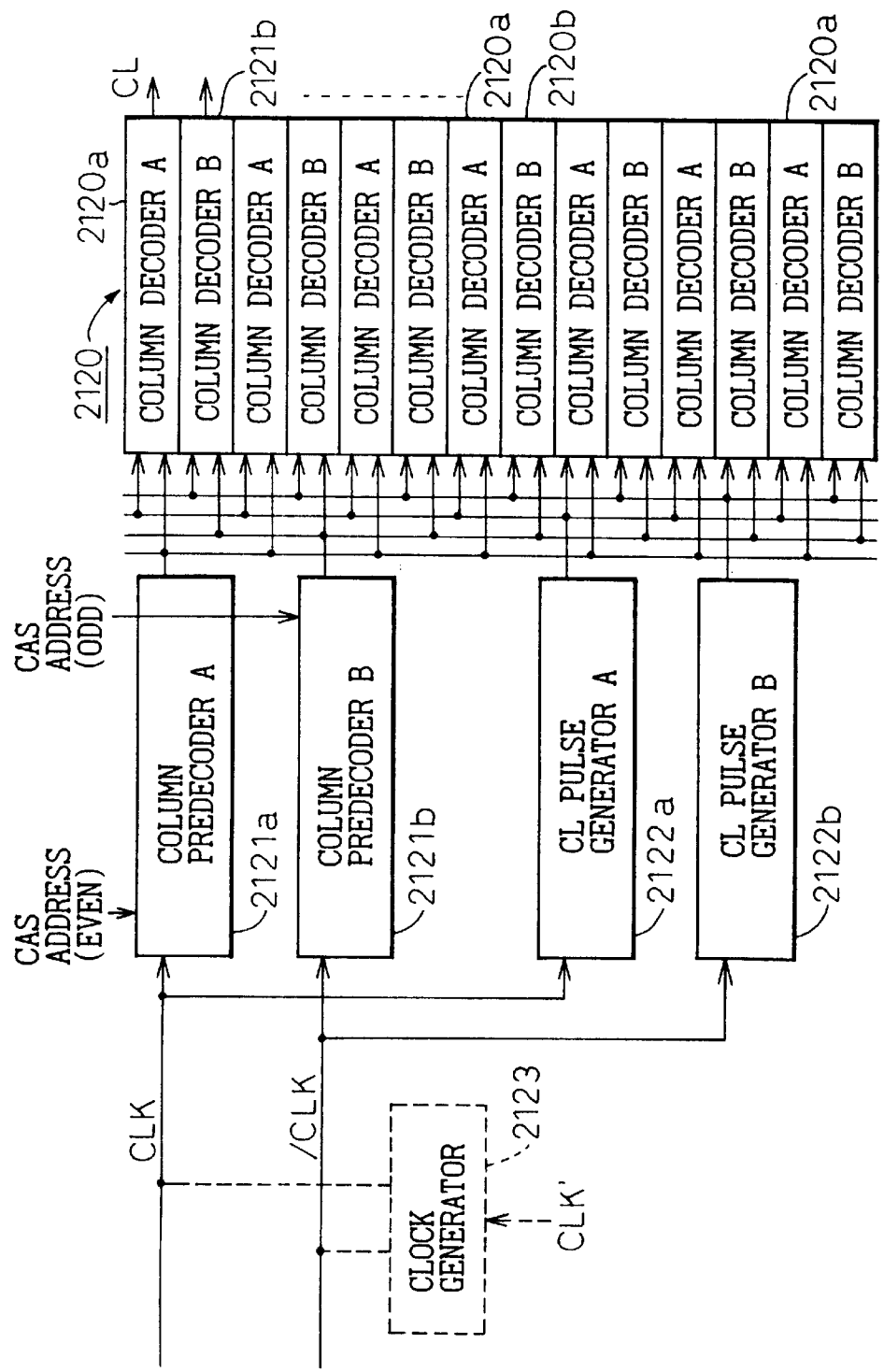
Figure 148:
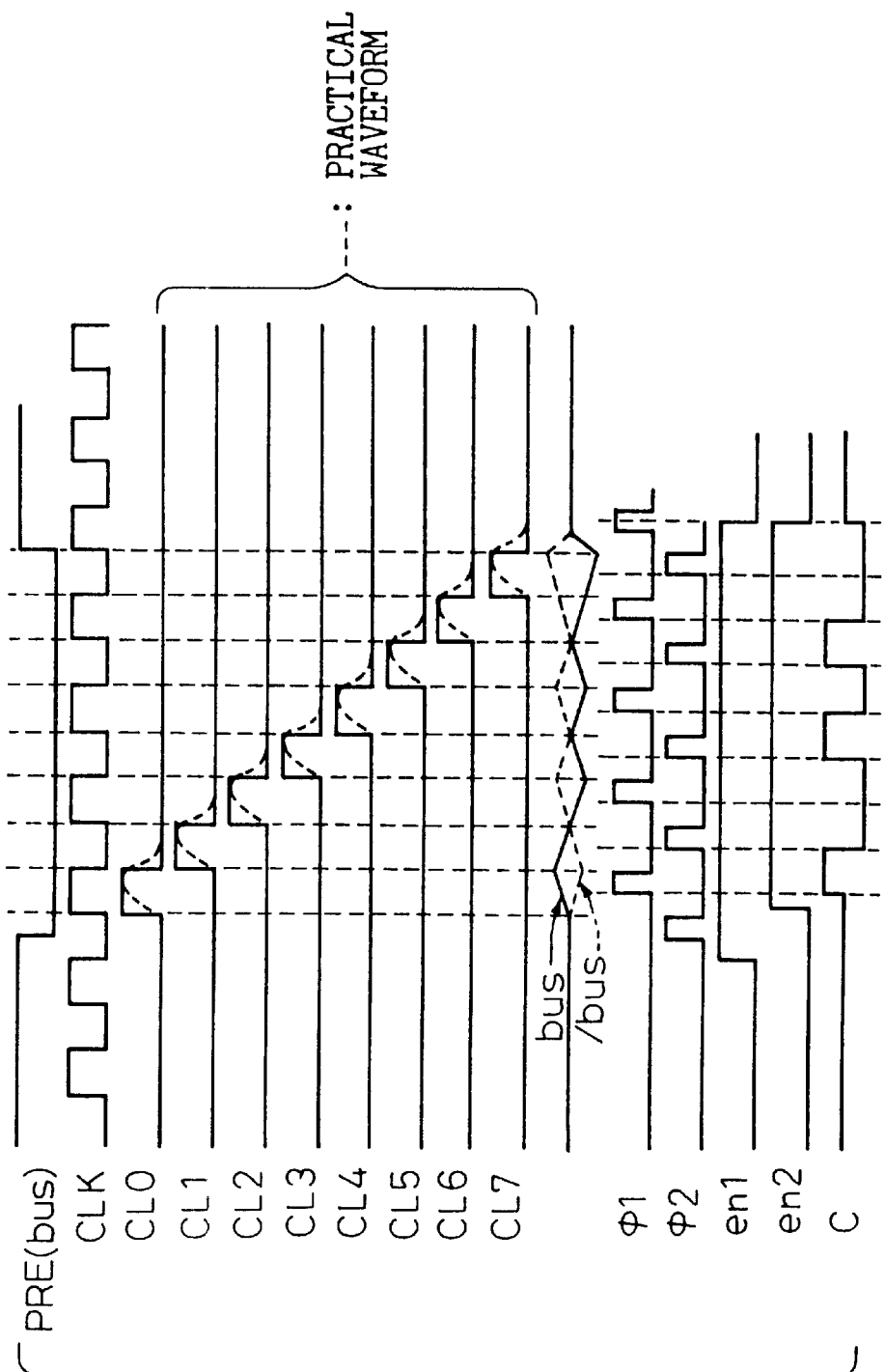
Figure 149:
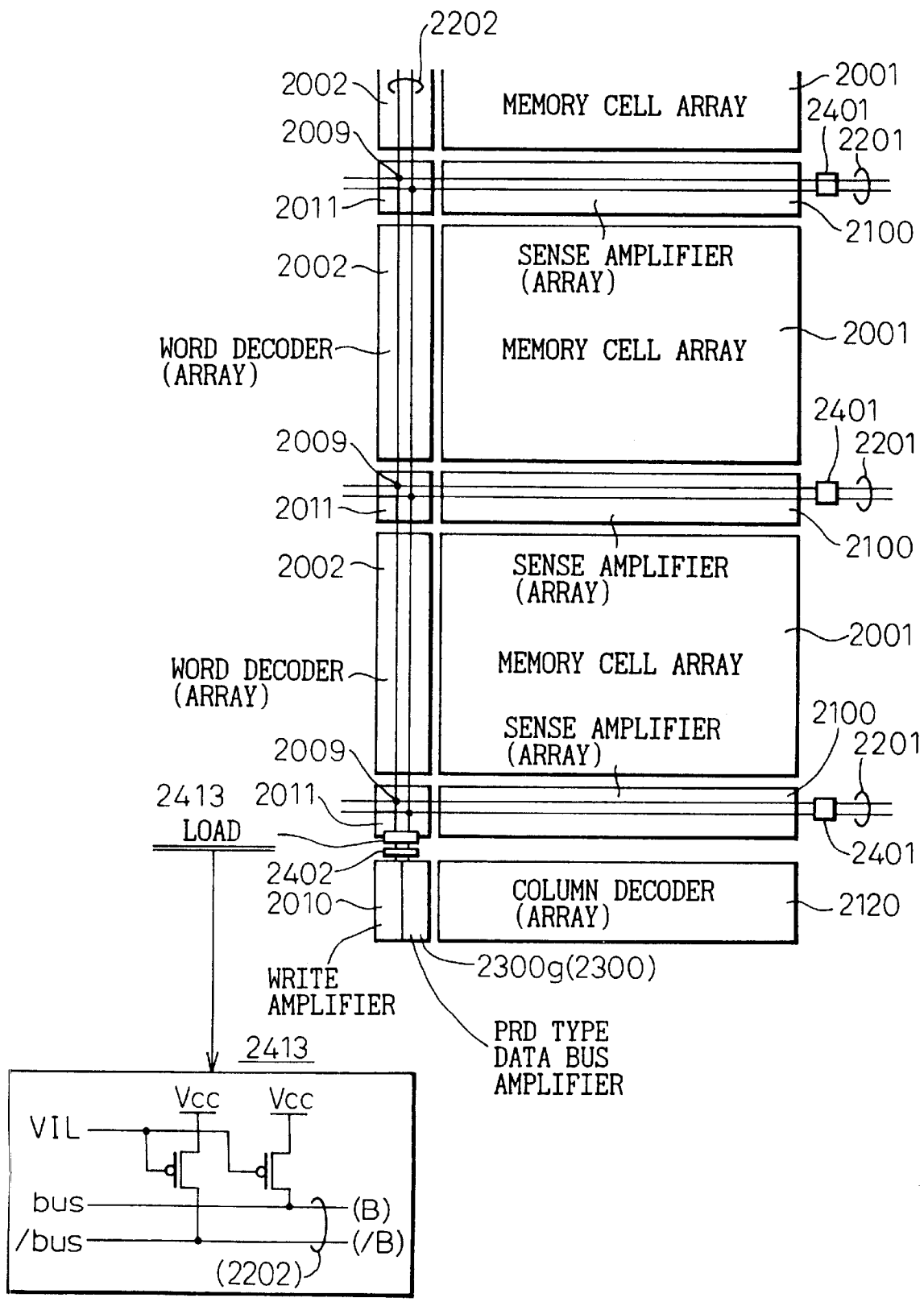
Figure 150:
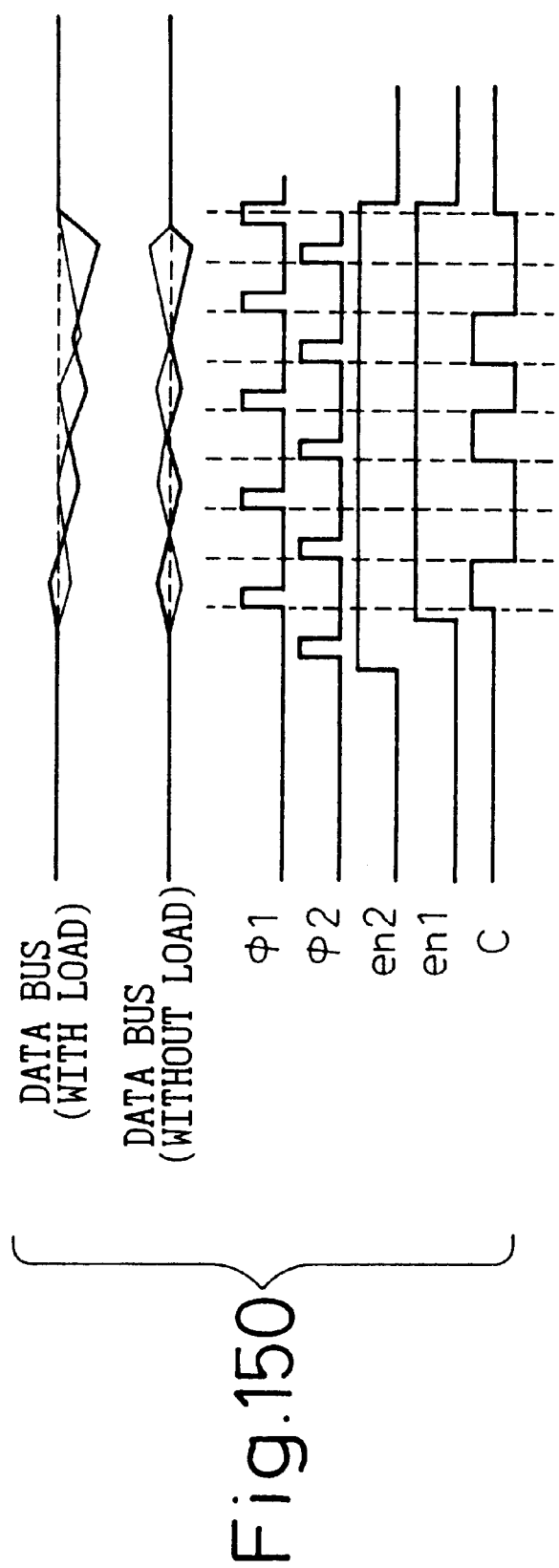
Figure 152:
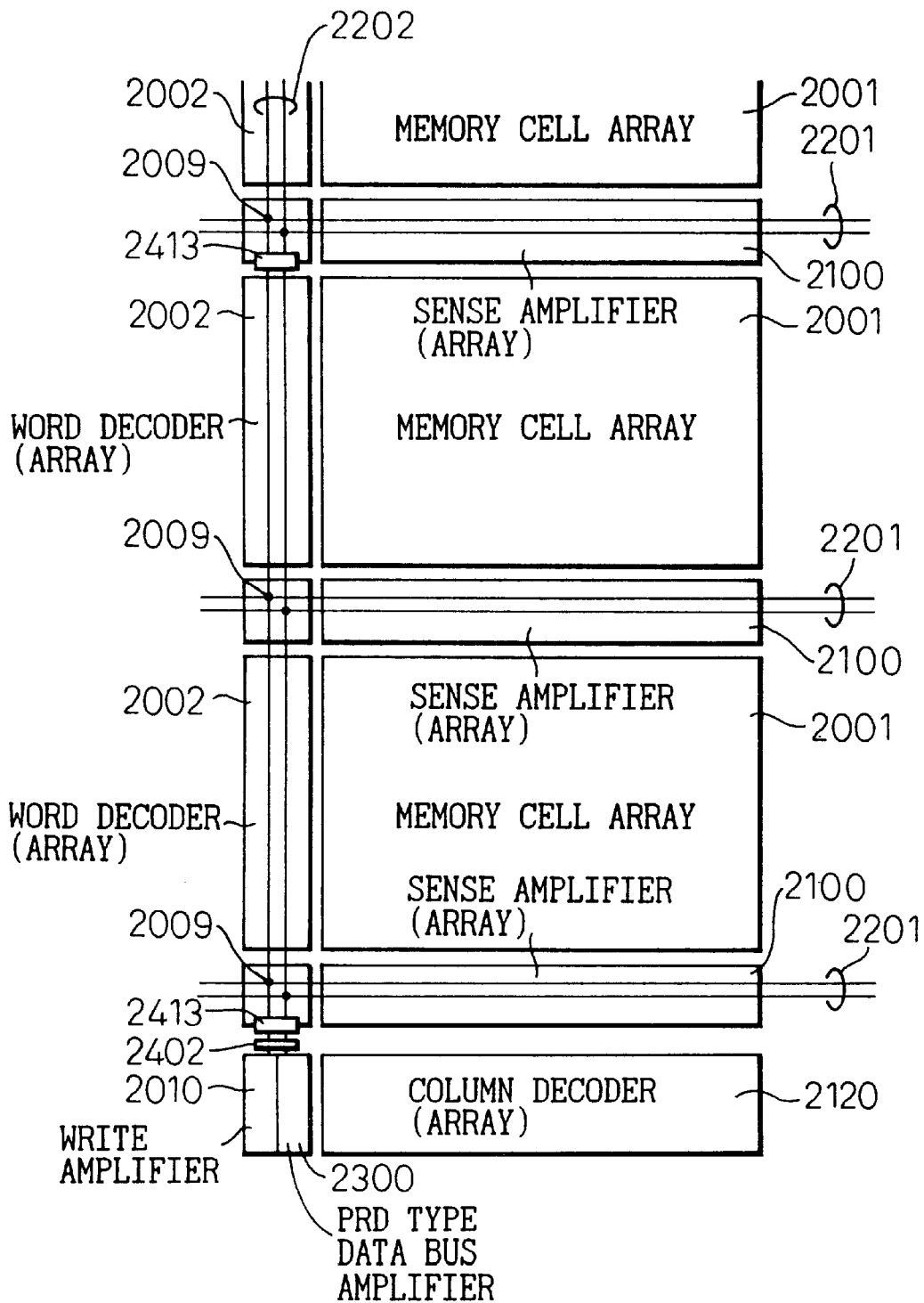
Figure 153:
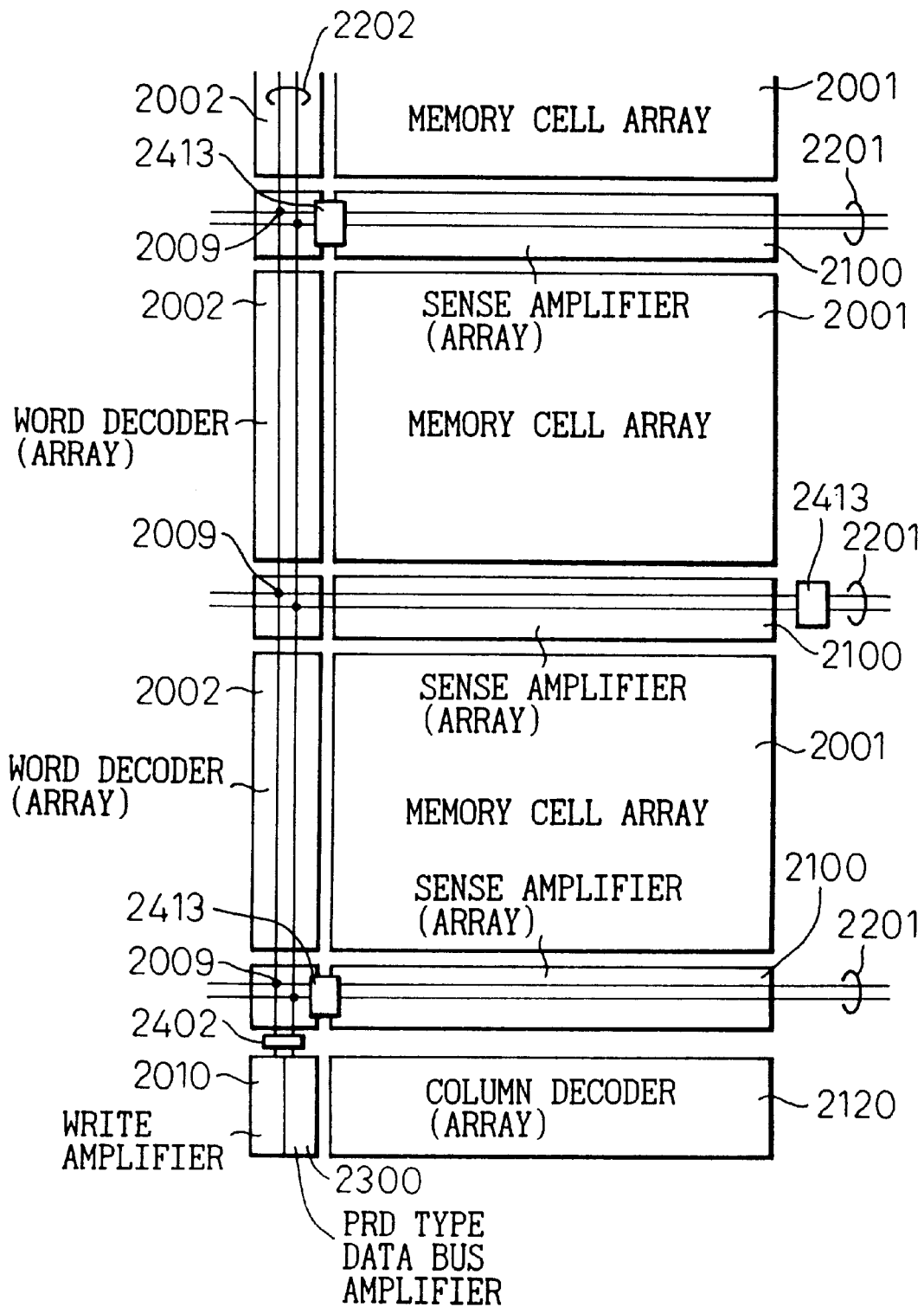
Figure 154:
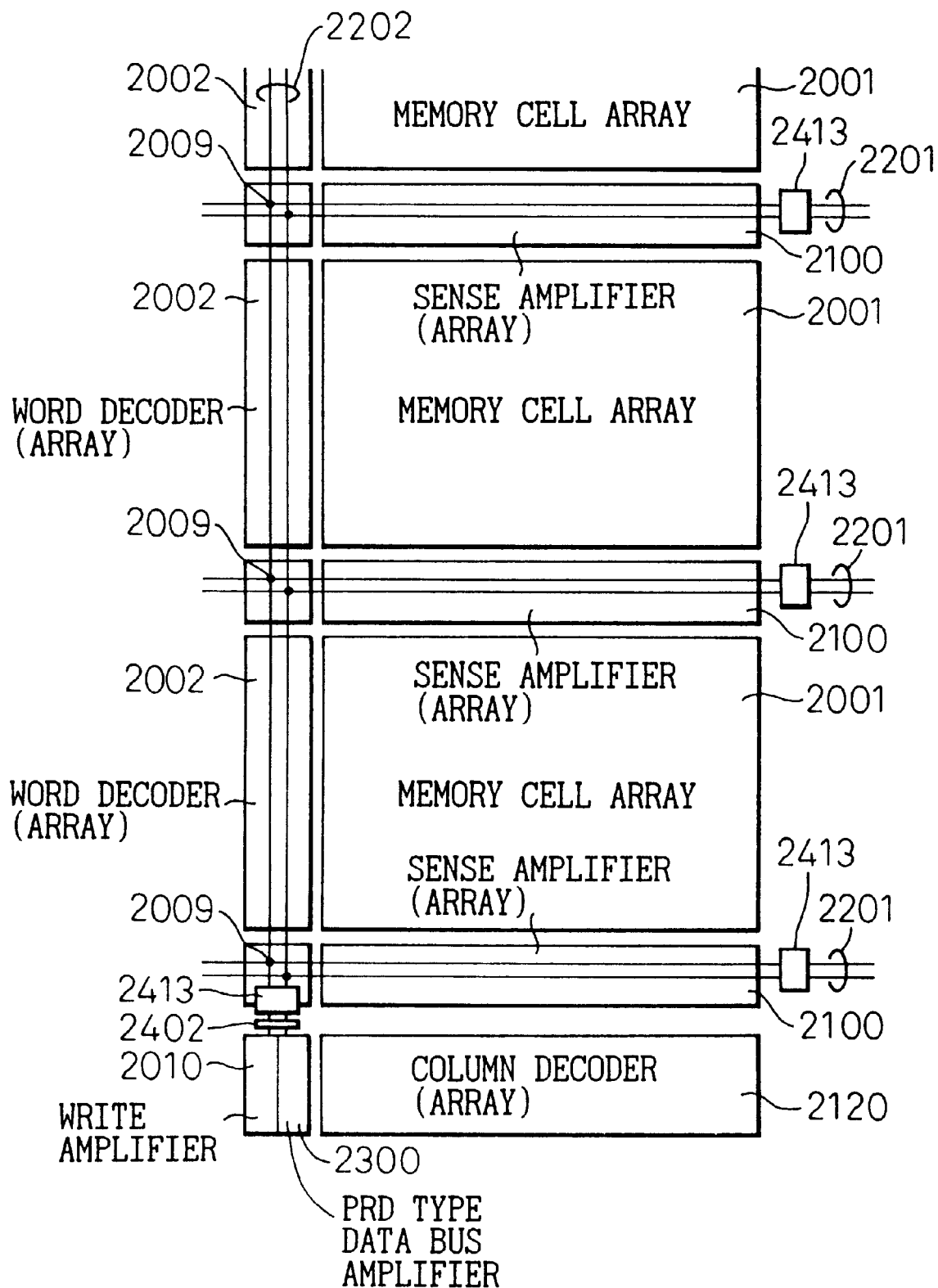
Figure 155:
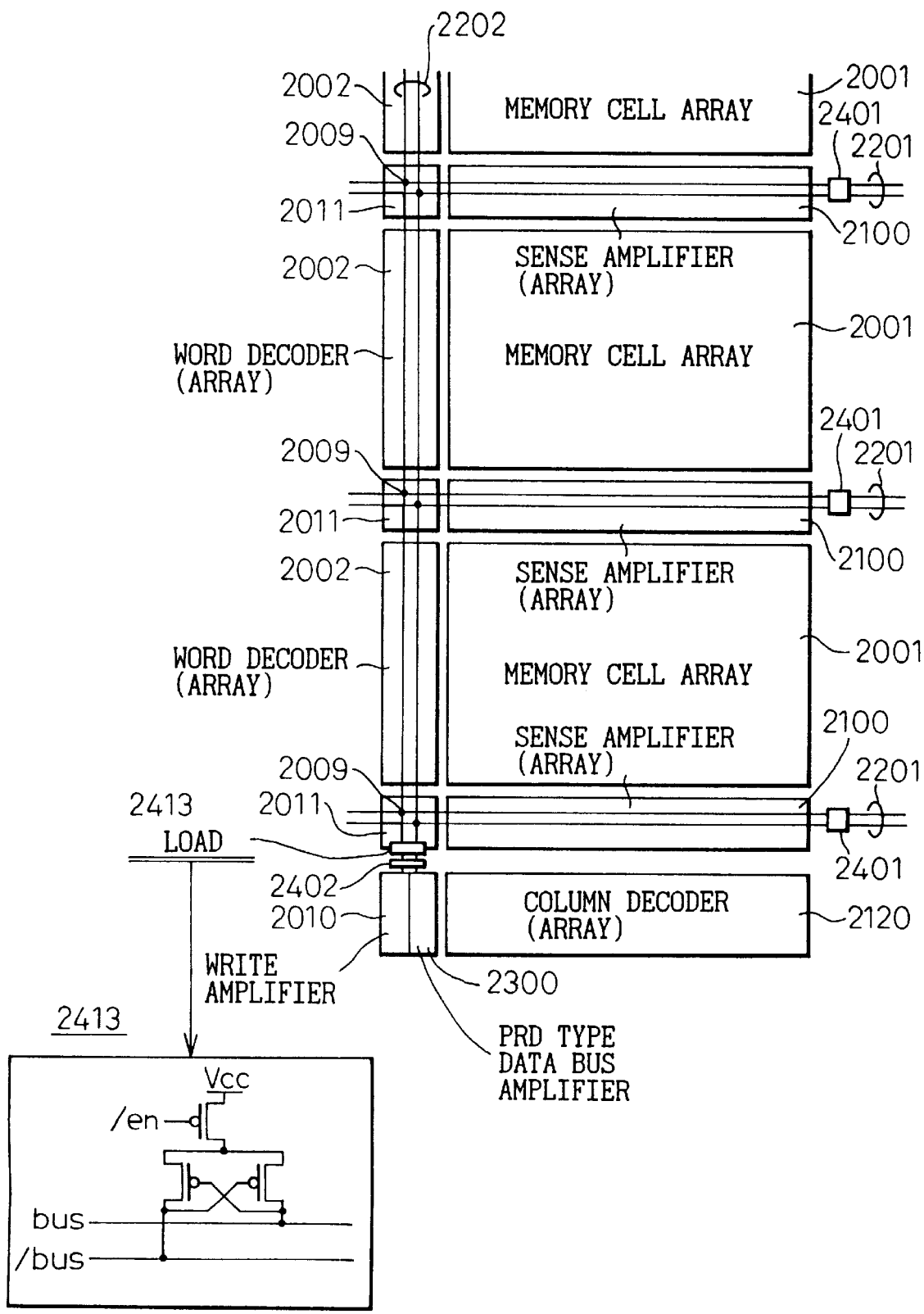
Figure 156:
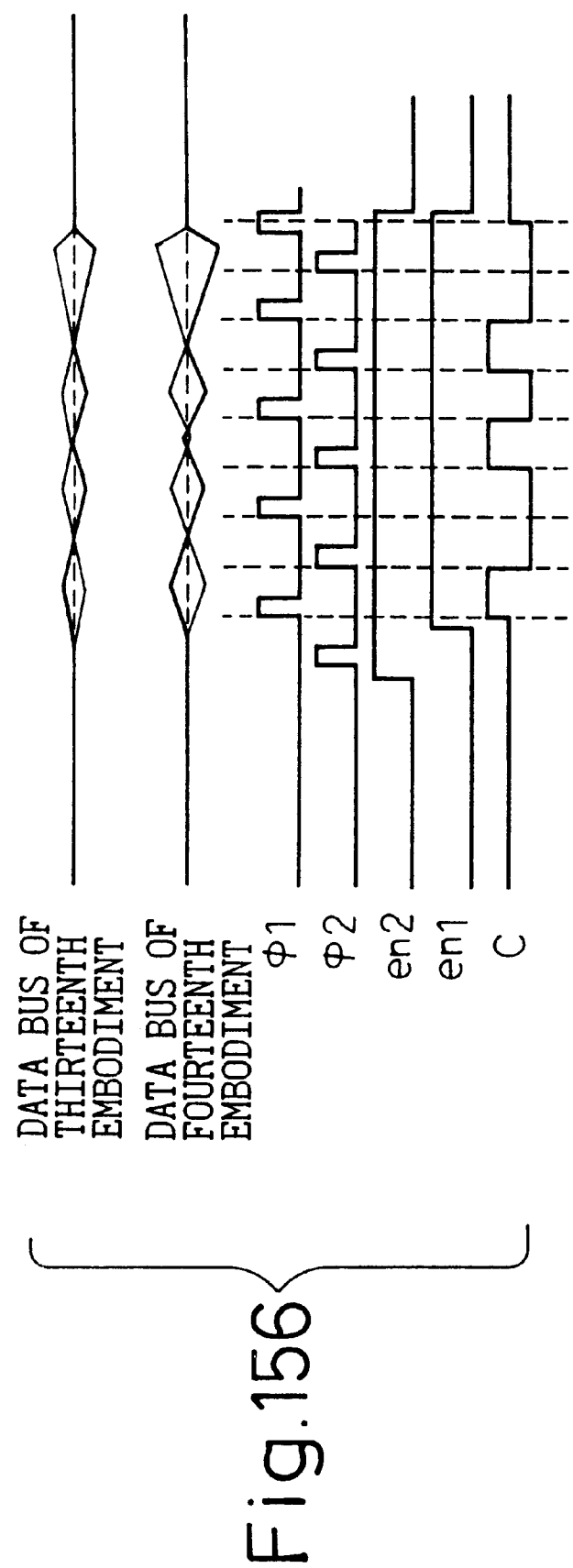
Figure 157:
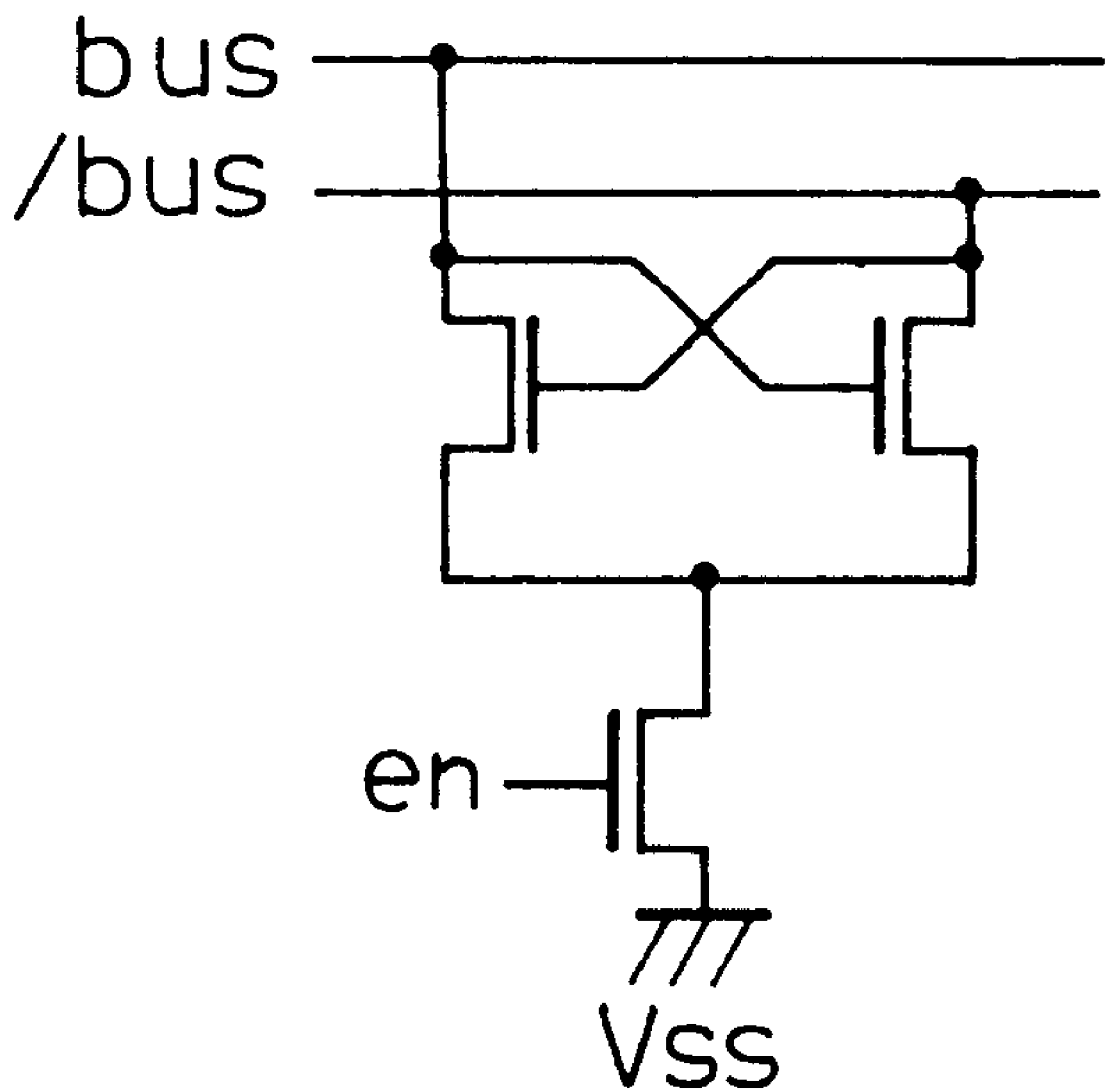
Figure 158:
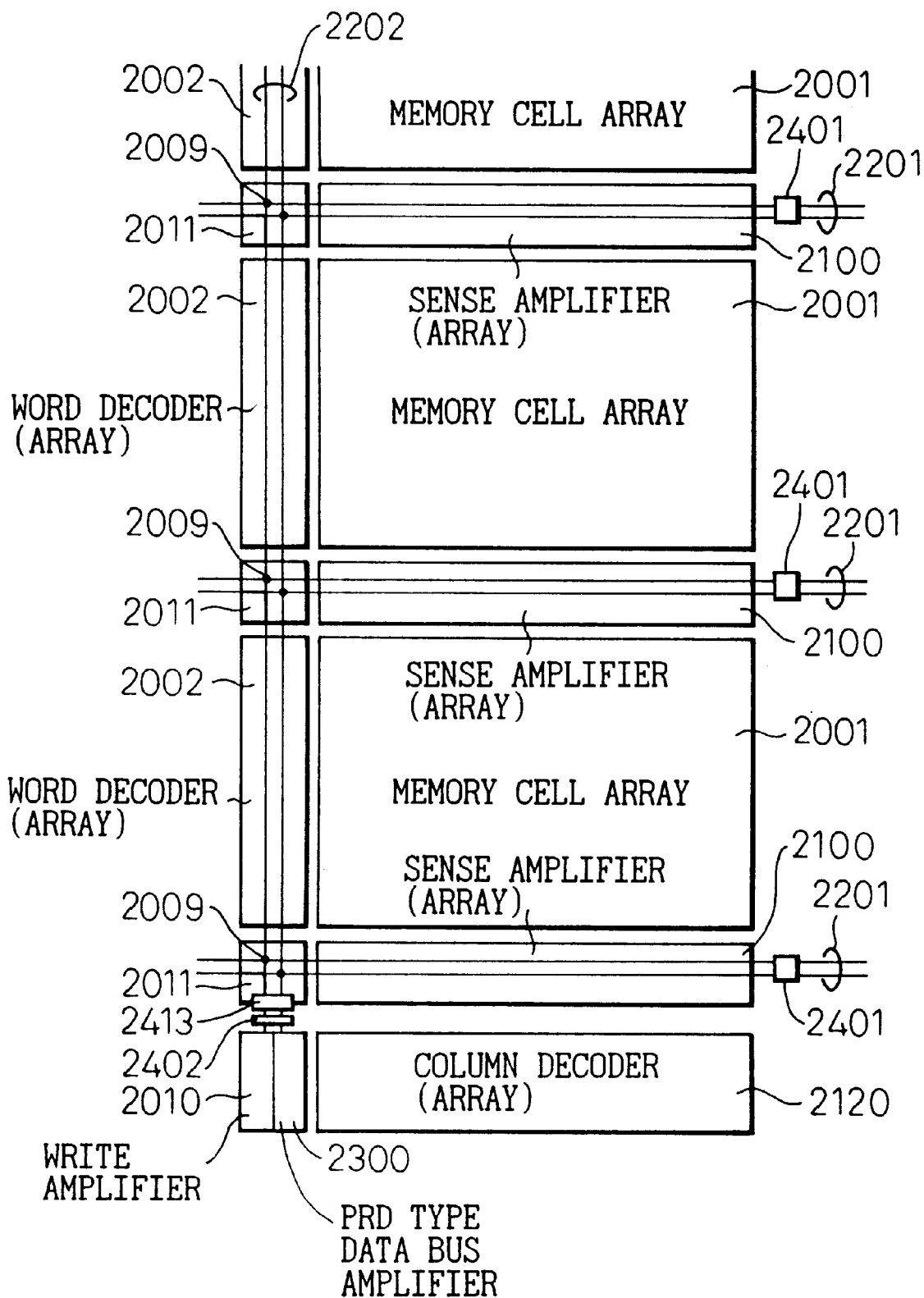
Figure 159:
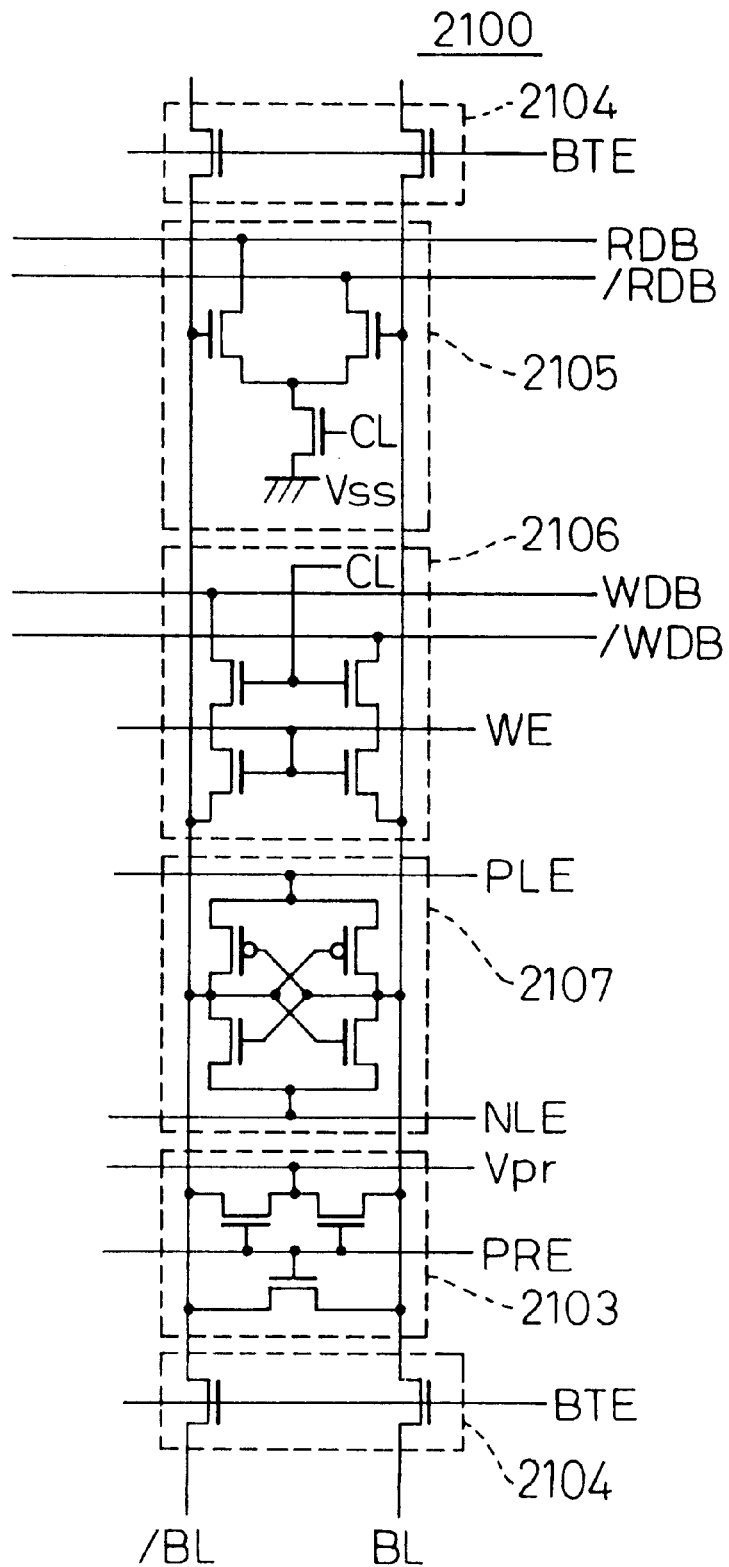
Figure 160:
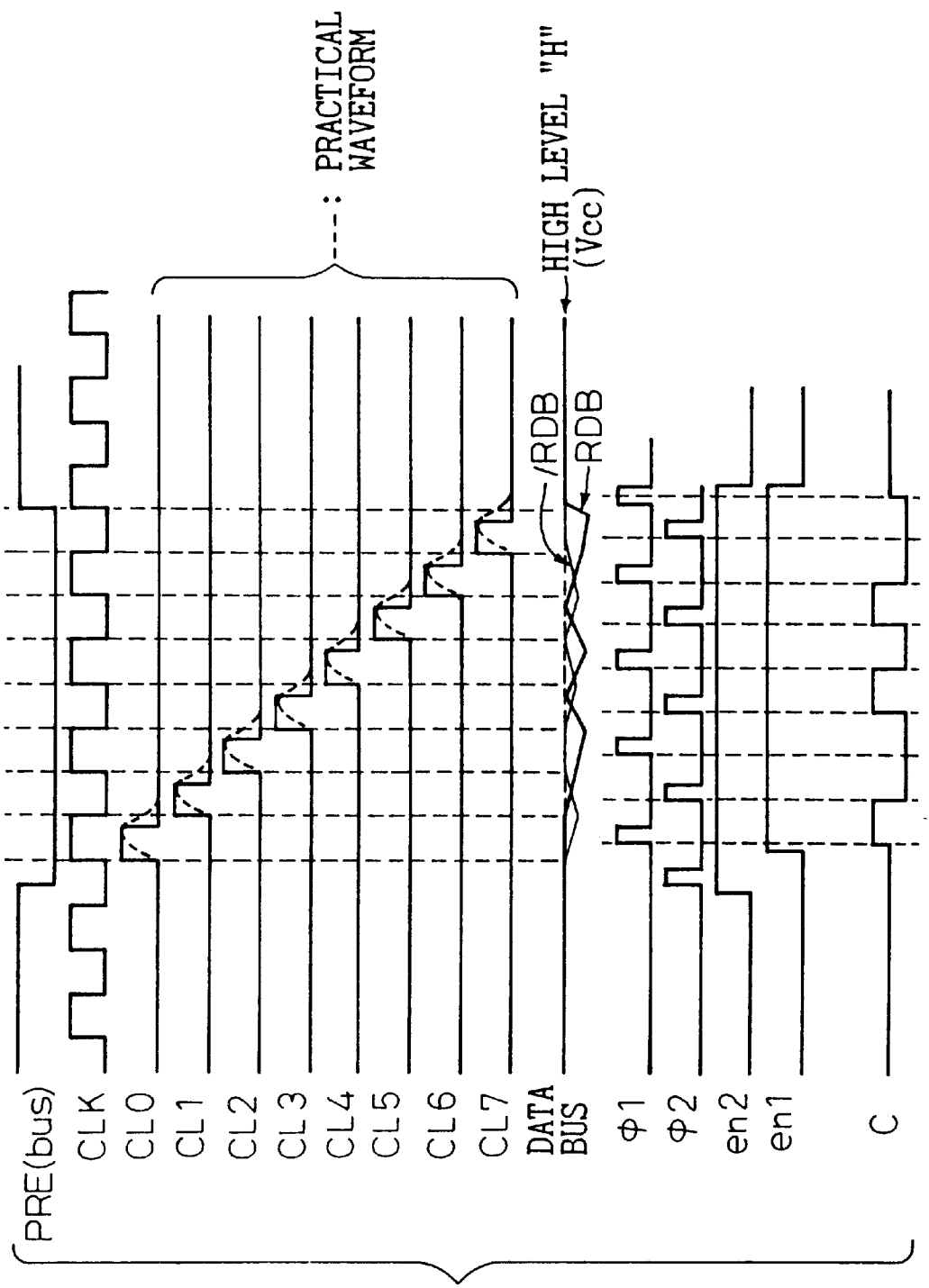
Figure 161:
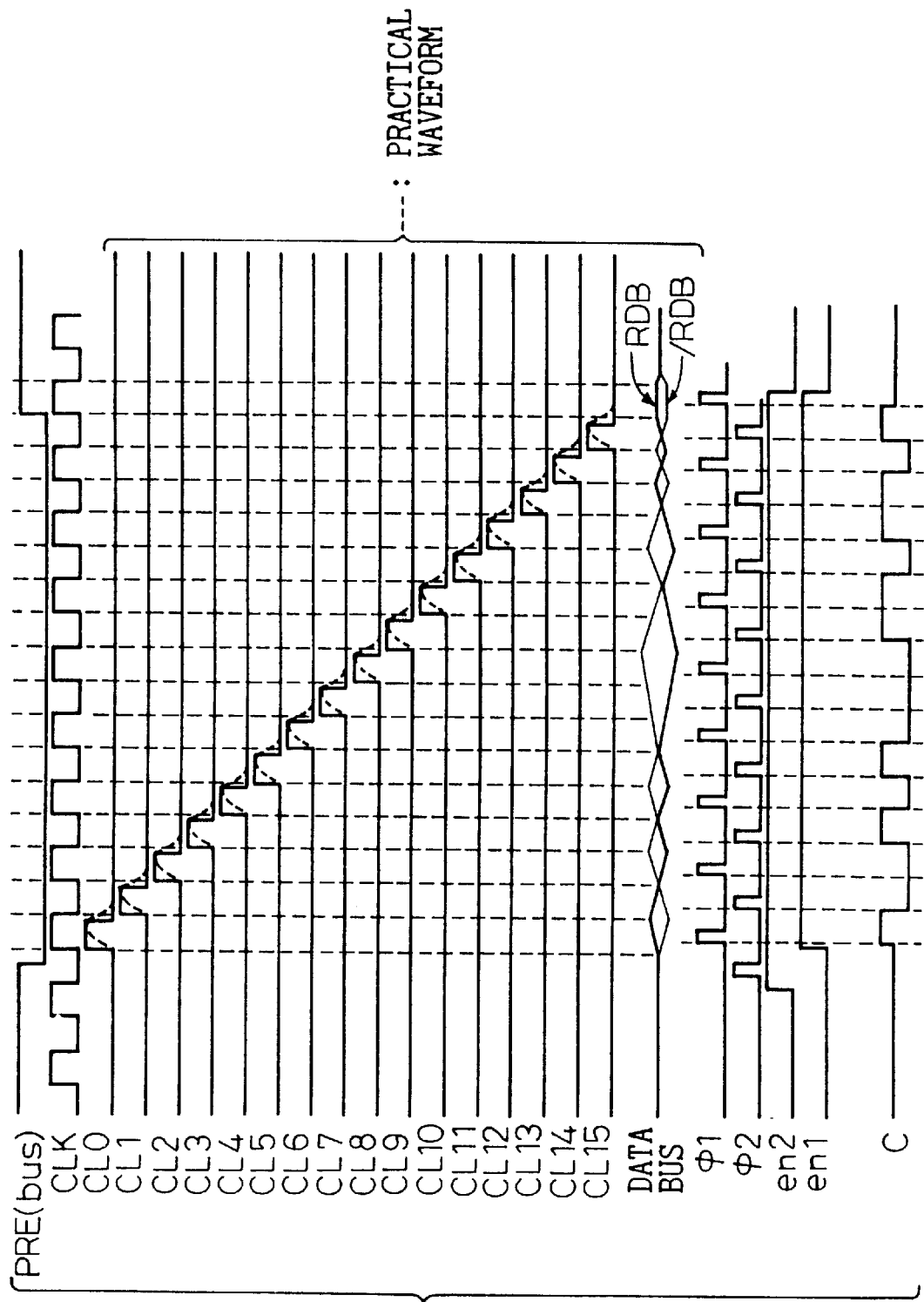
Figure 162:
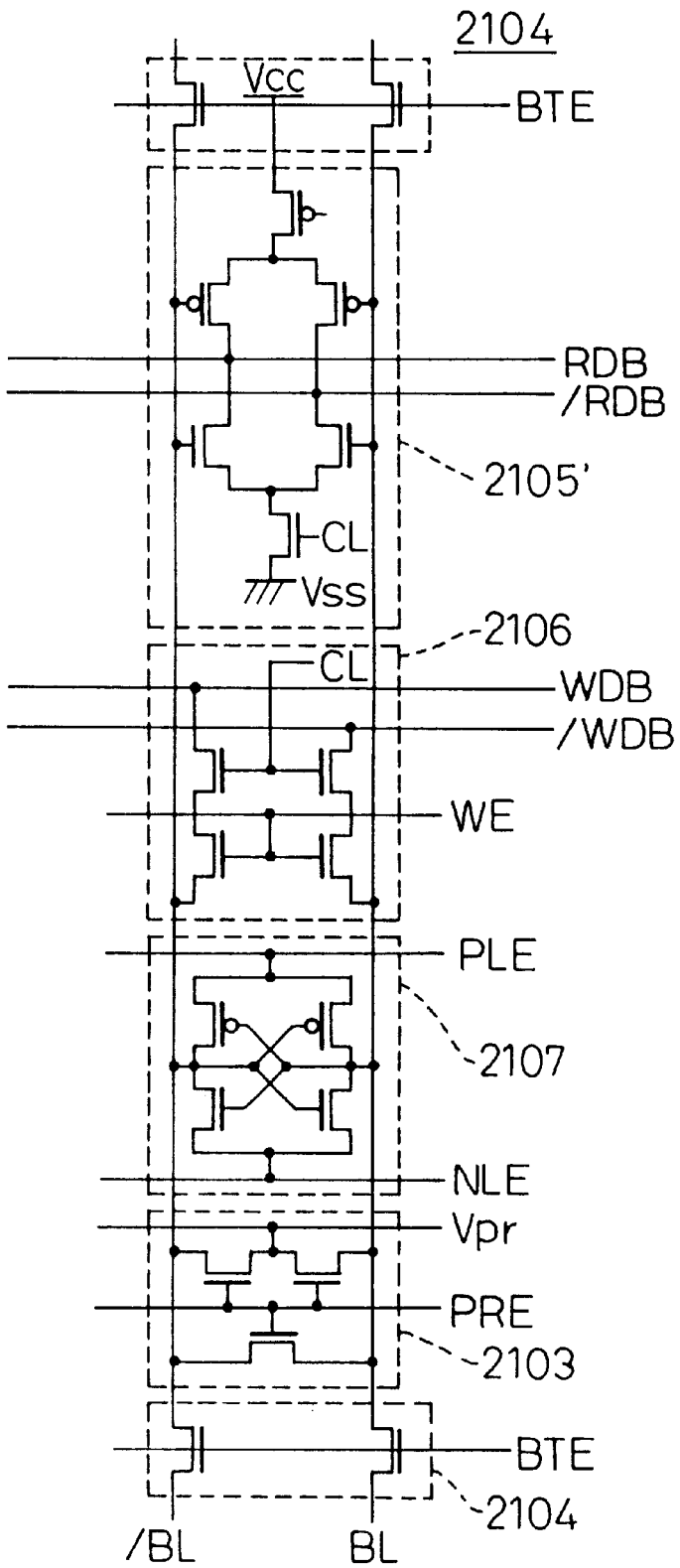
Figure 163:
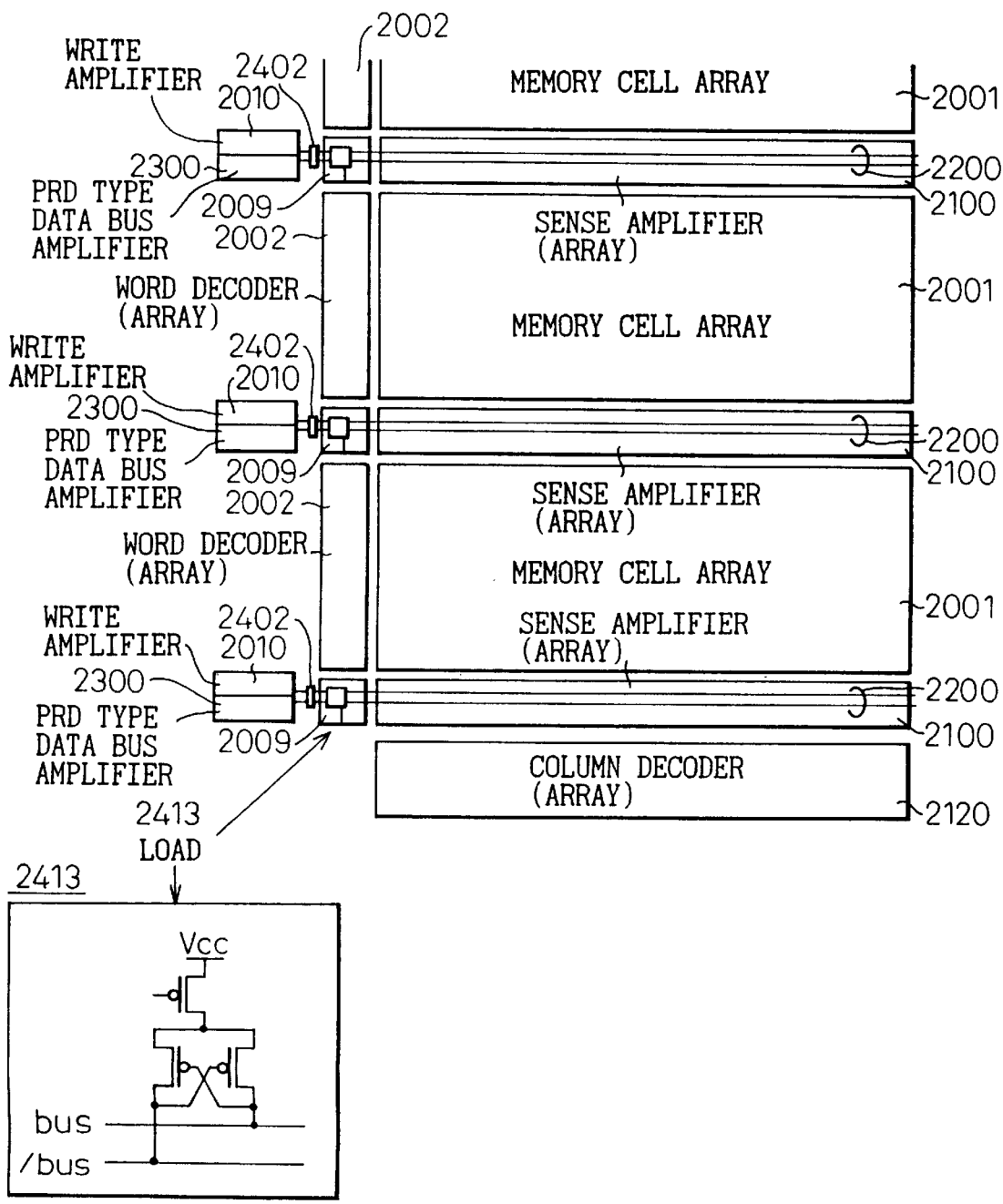
Figure 164:
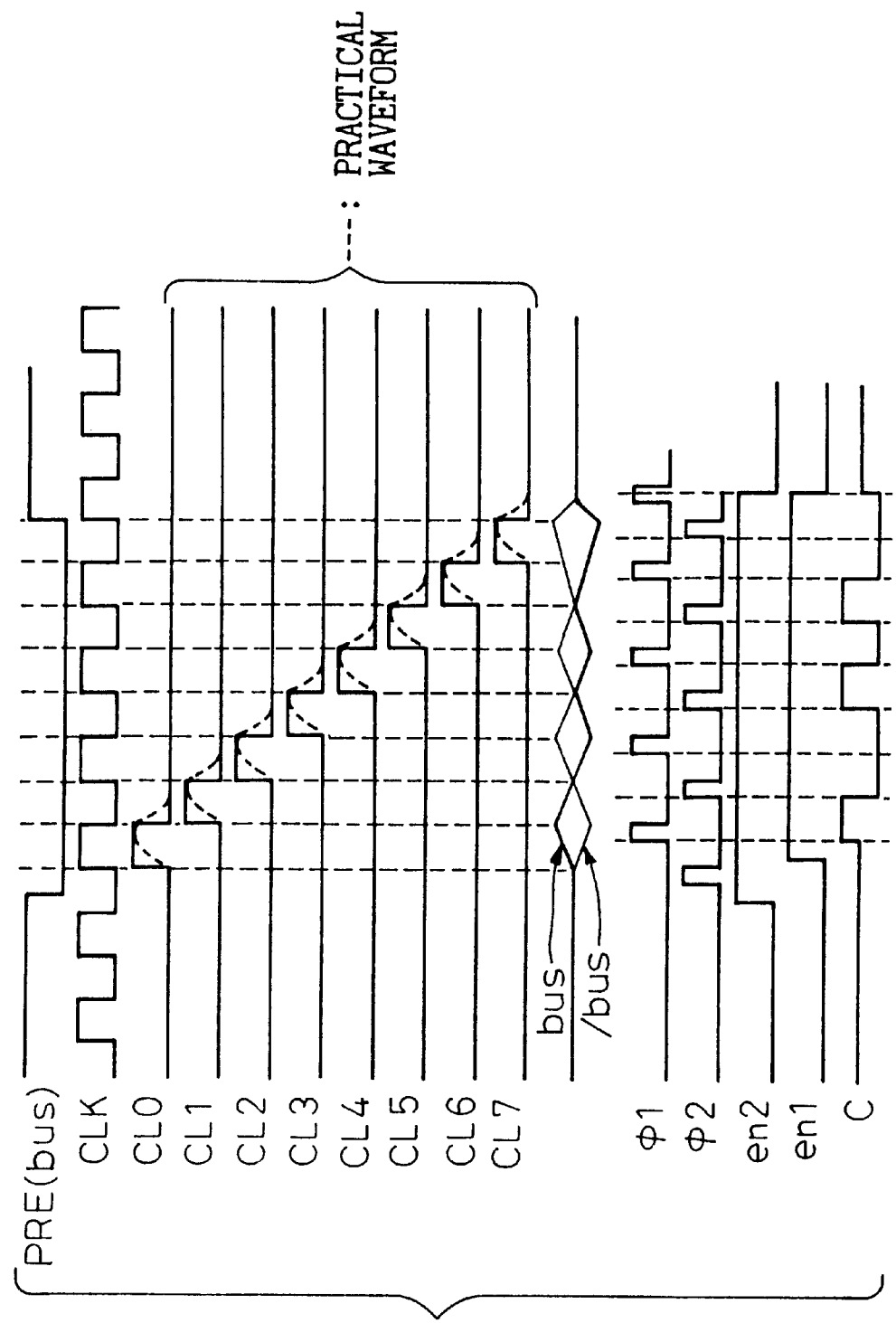
Figure 165:
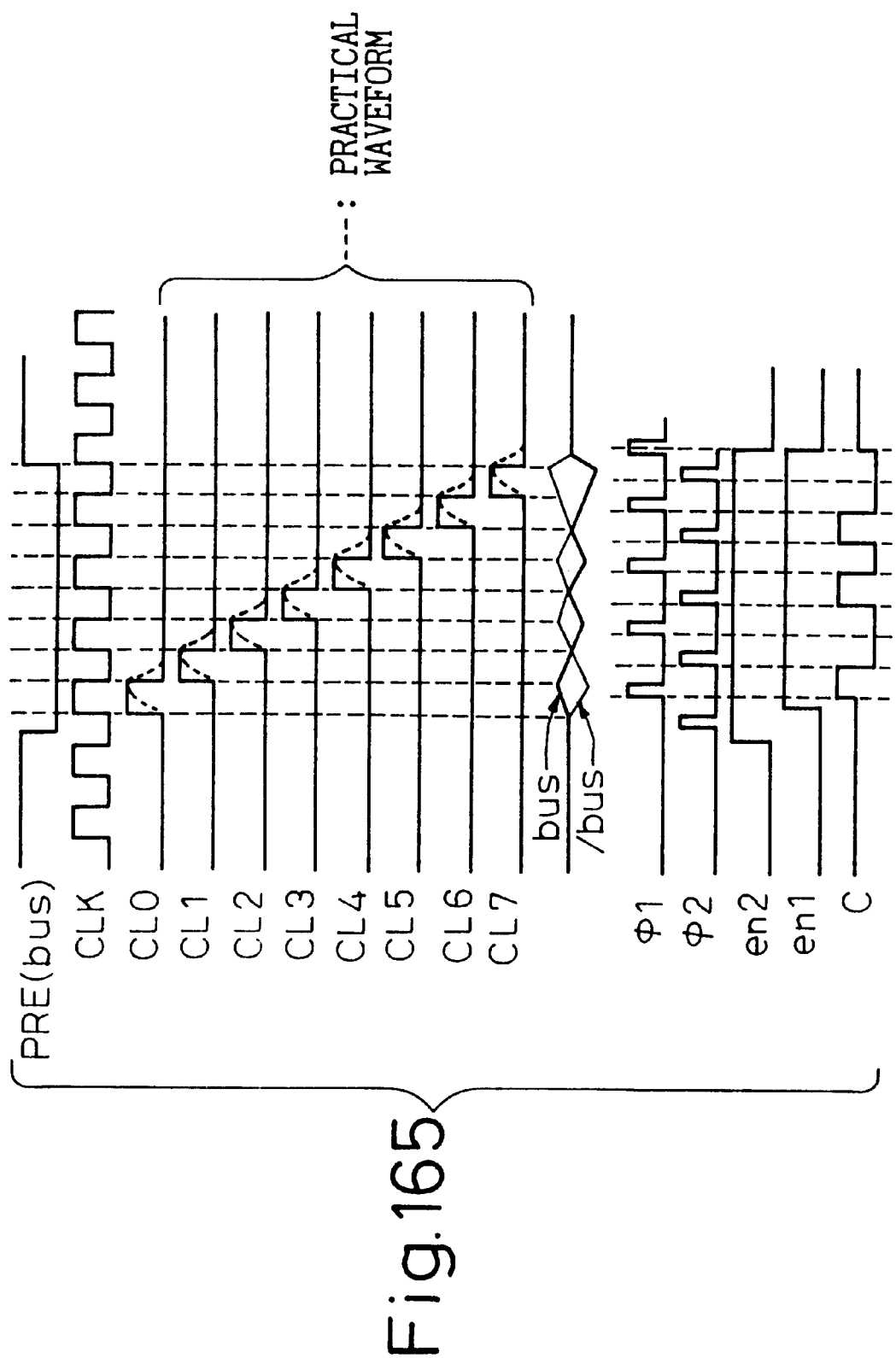
Figure 166:
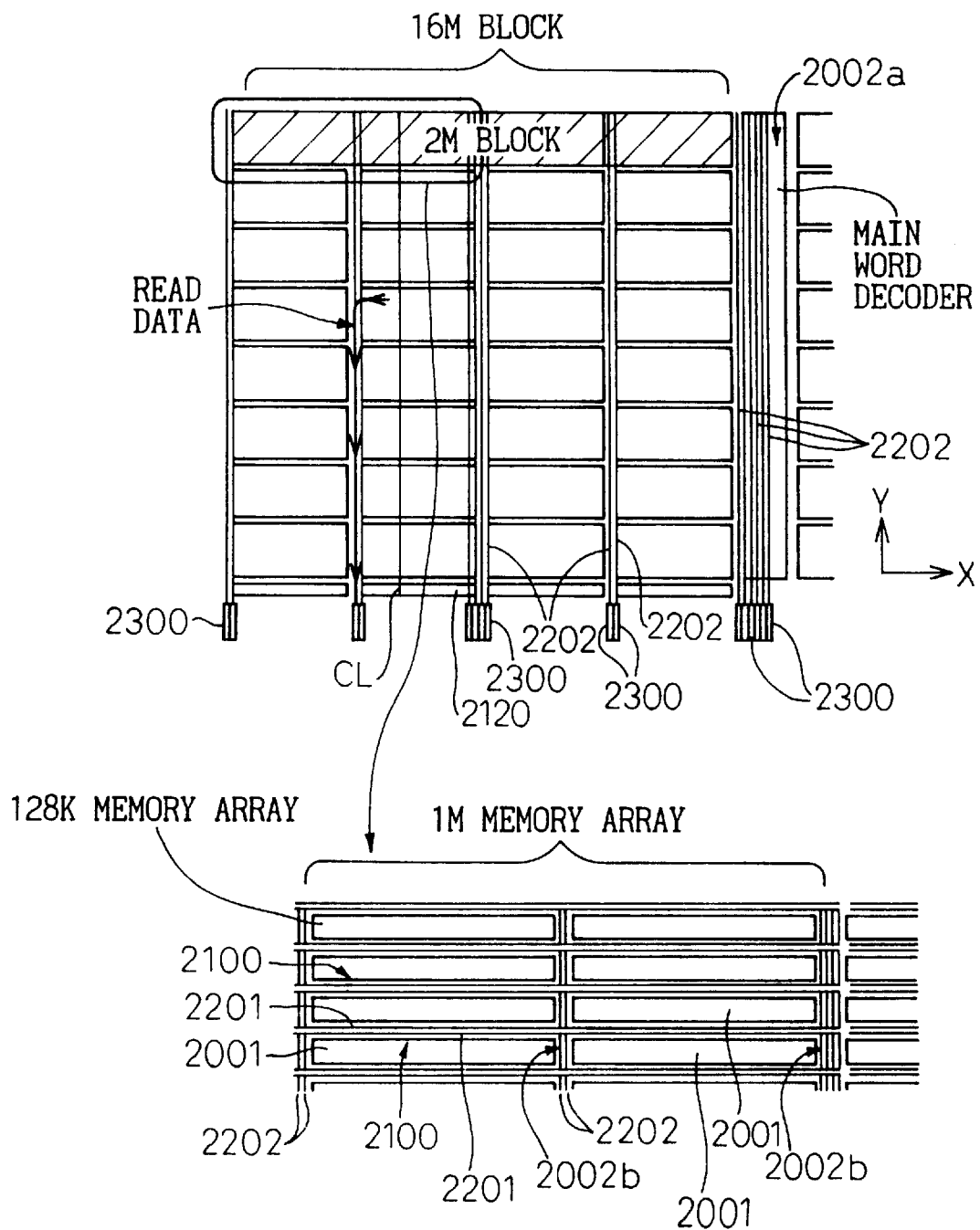
Figure 167:
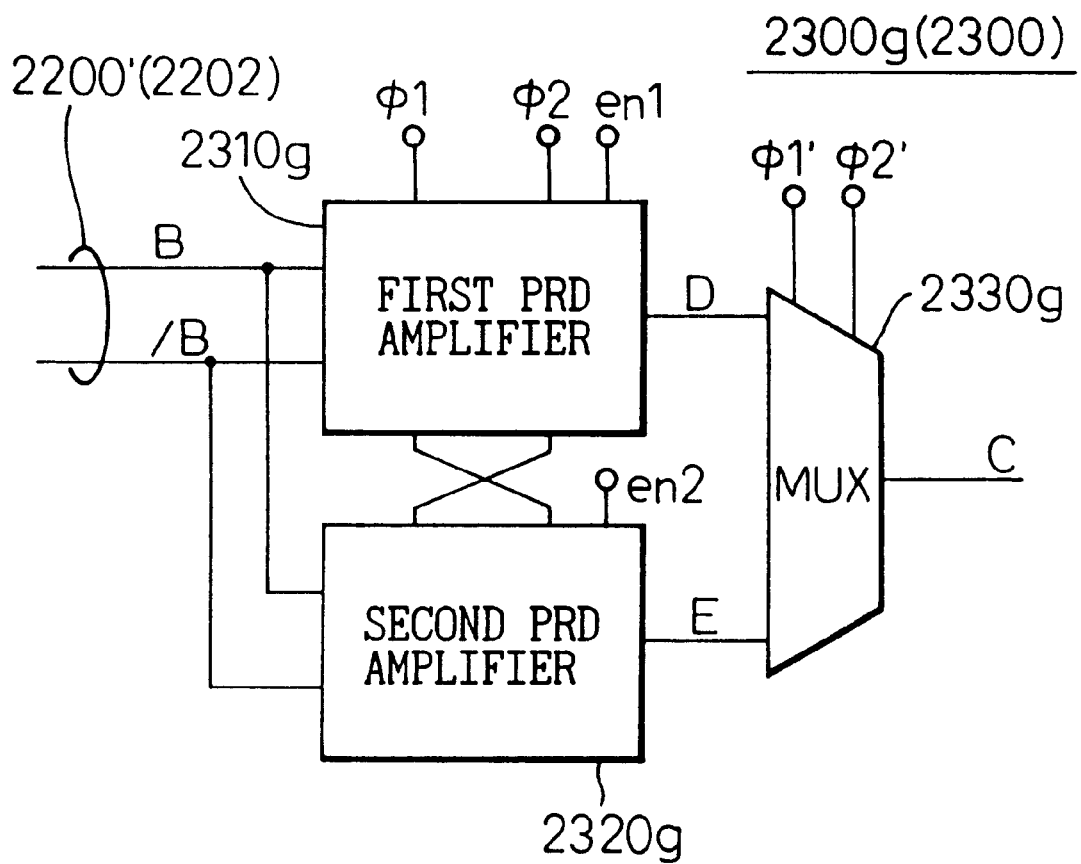
Figure 168:
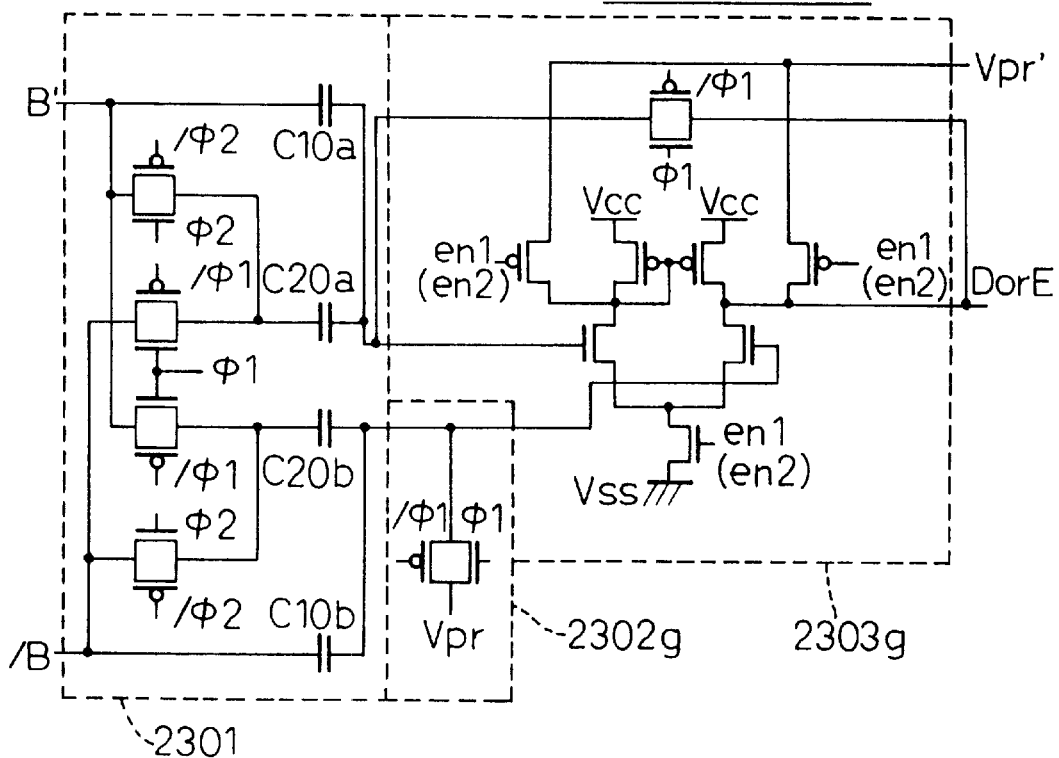
Figure 169:
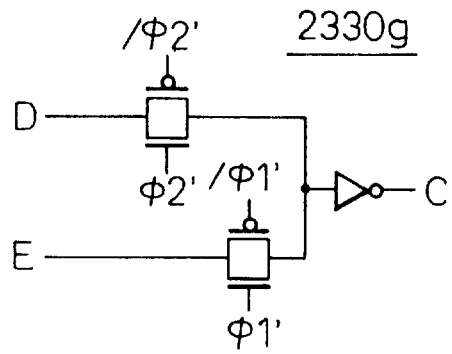
Figure 170:
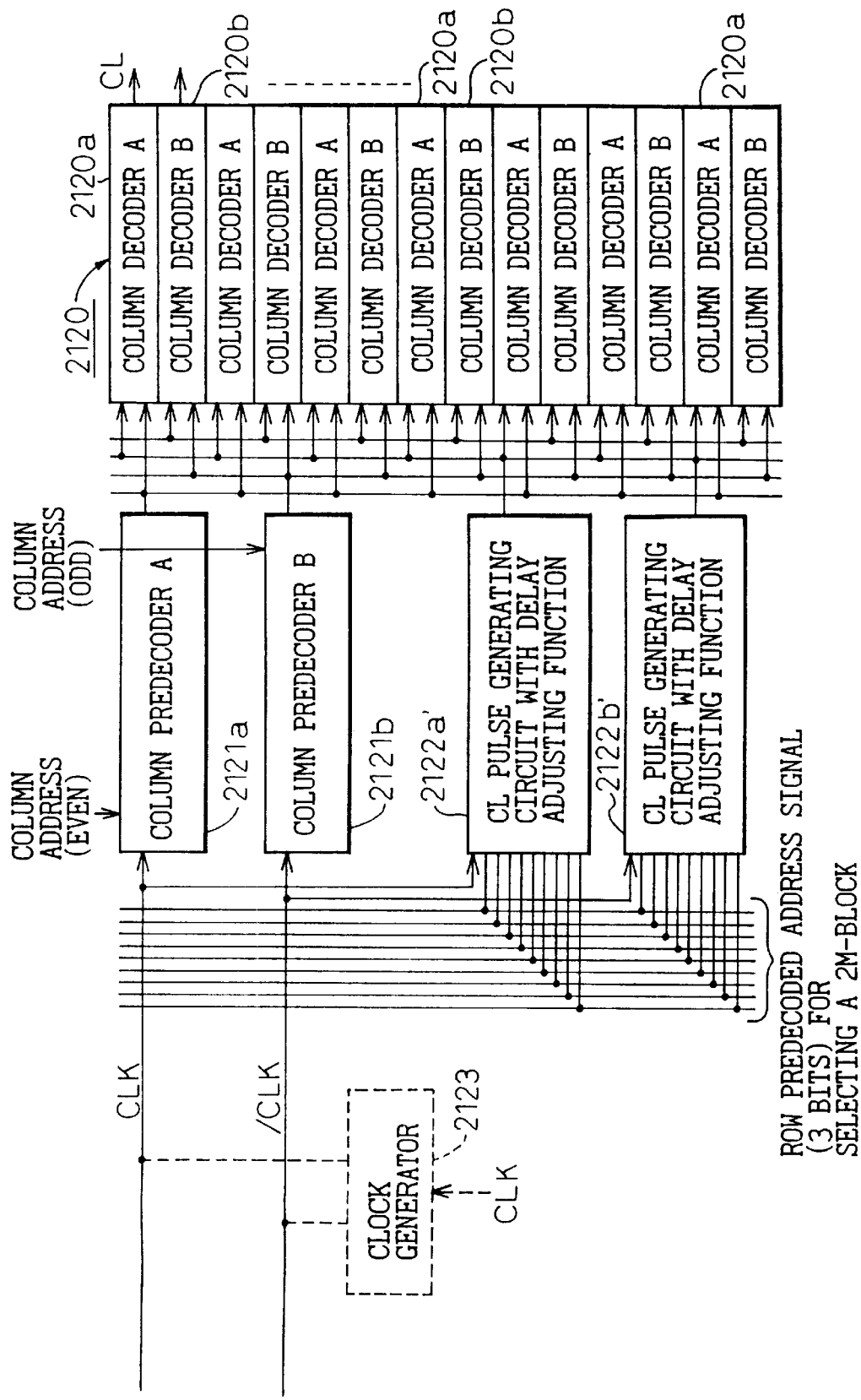
Figure 171:
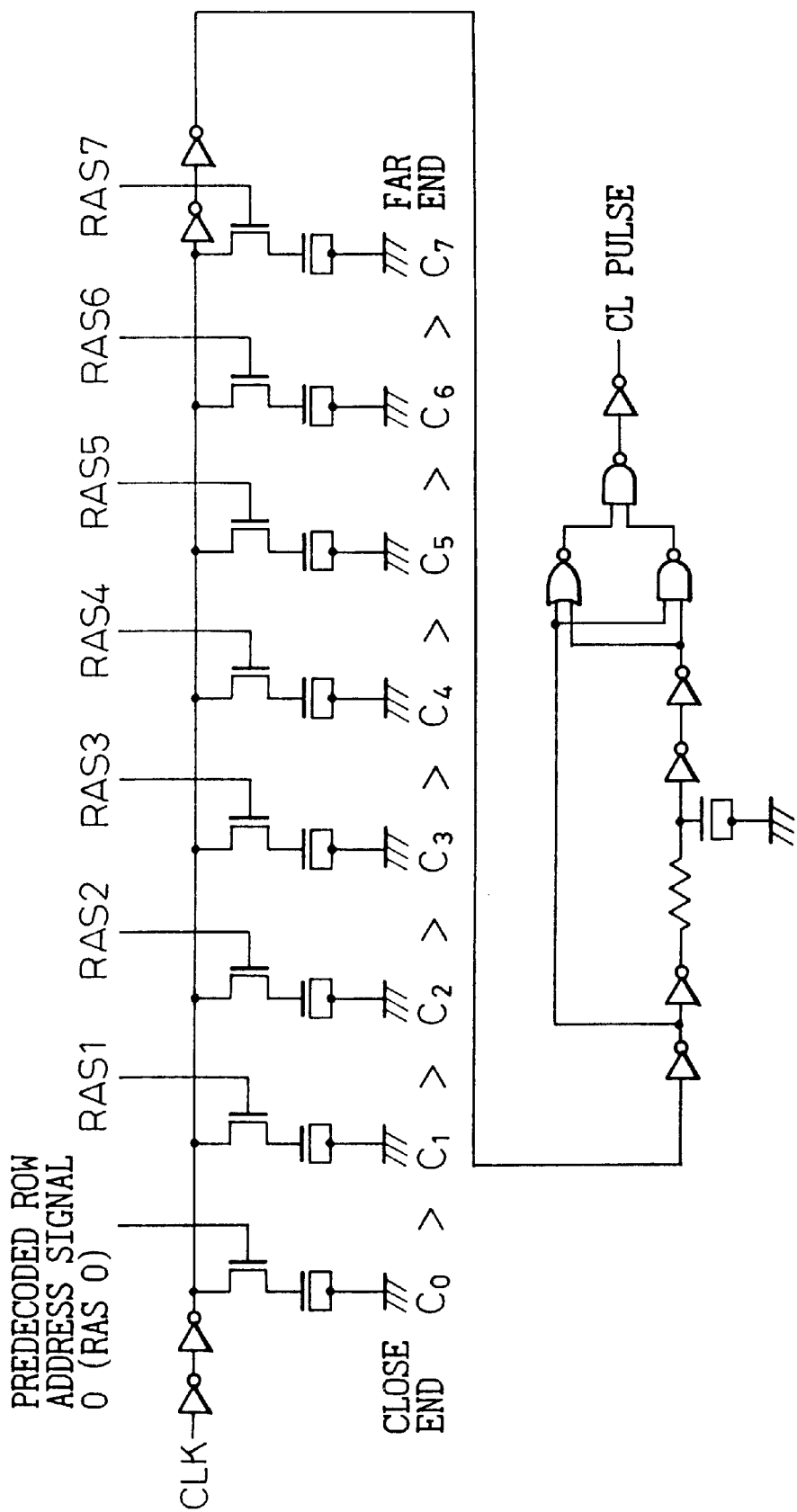
Figure 172:
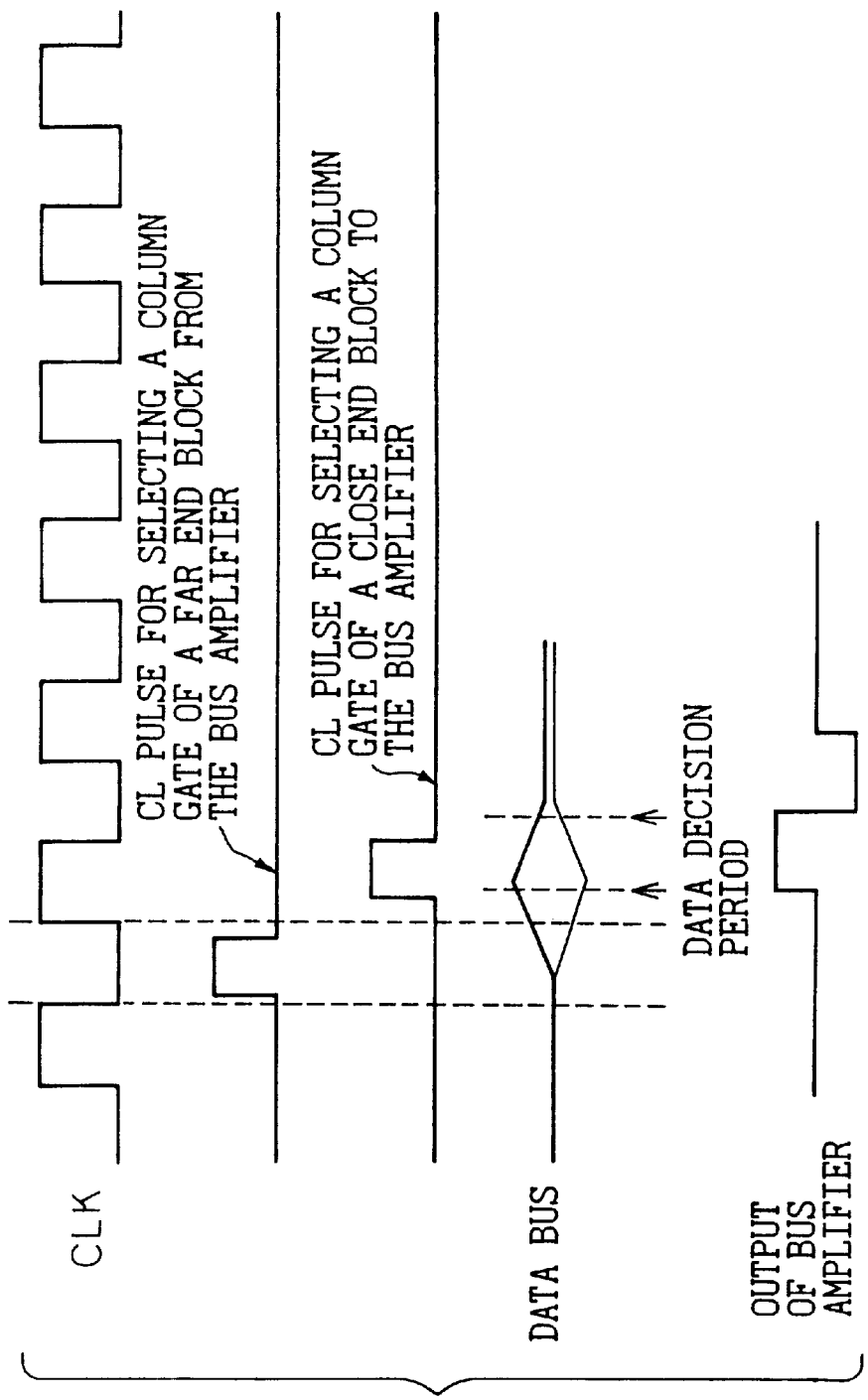
Figure 173:
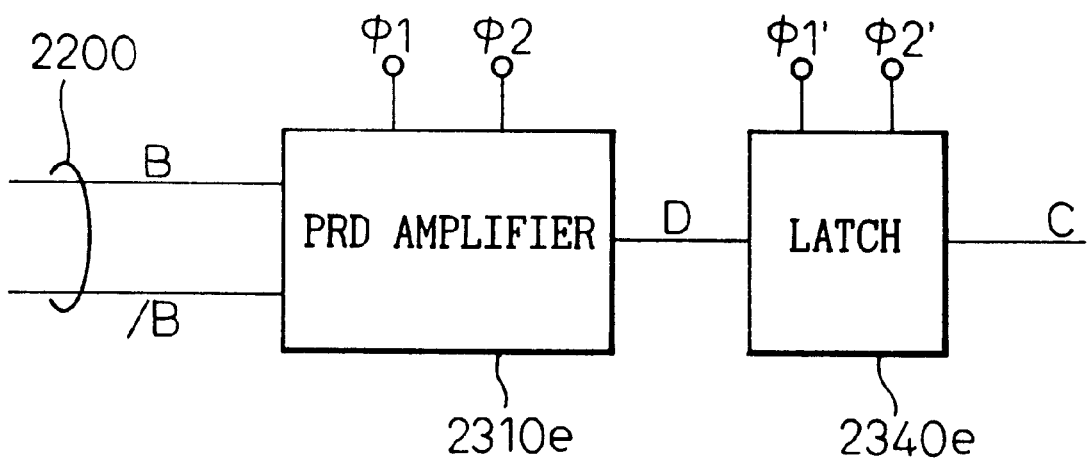
Figure 174:
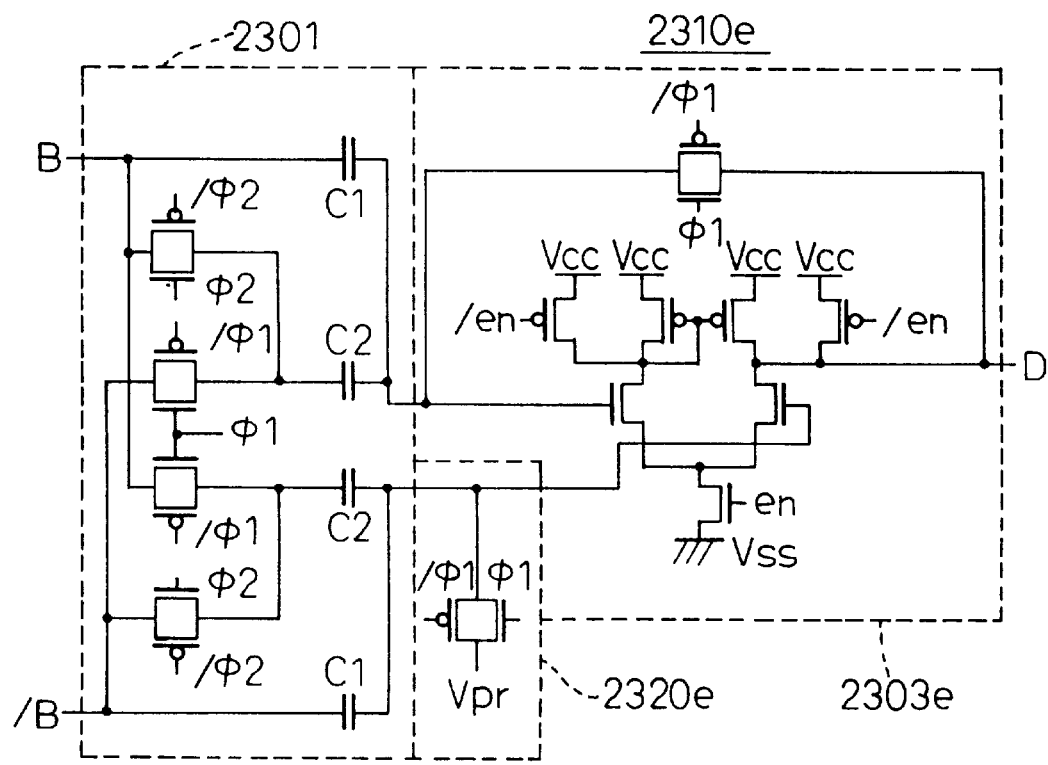
Figure 175:
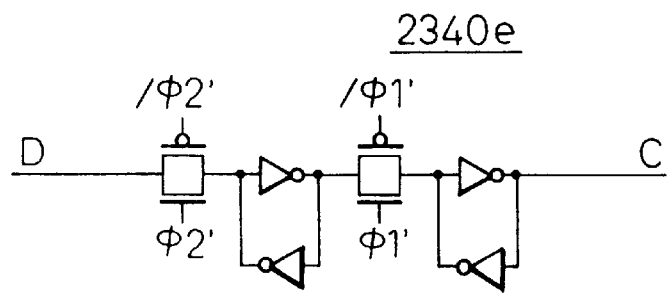
Figure 176:
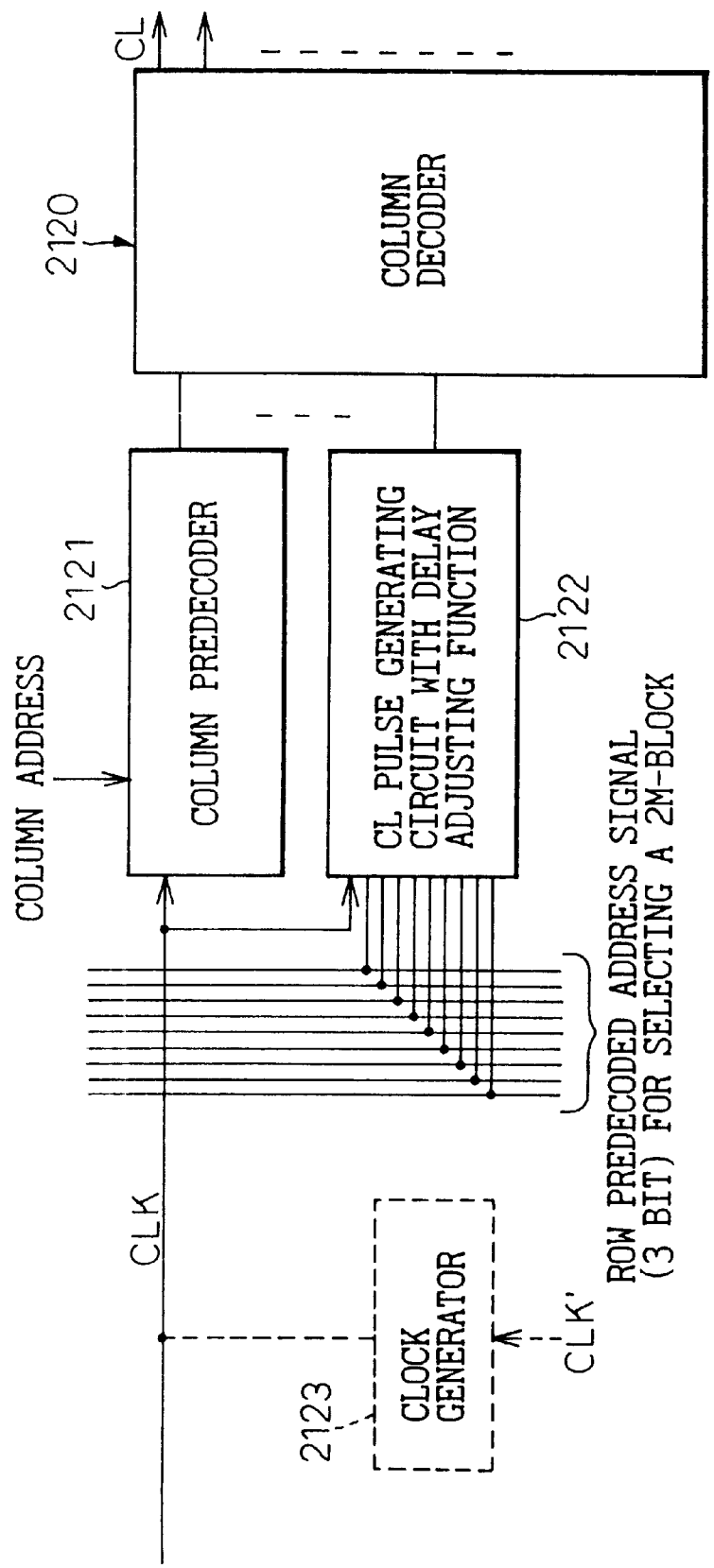
Figure 177:
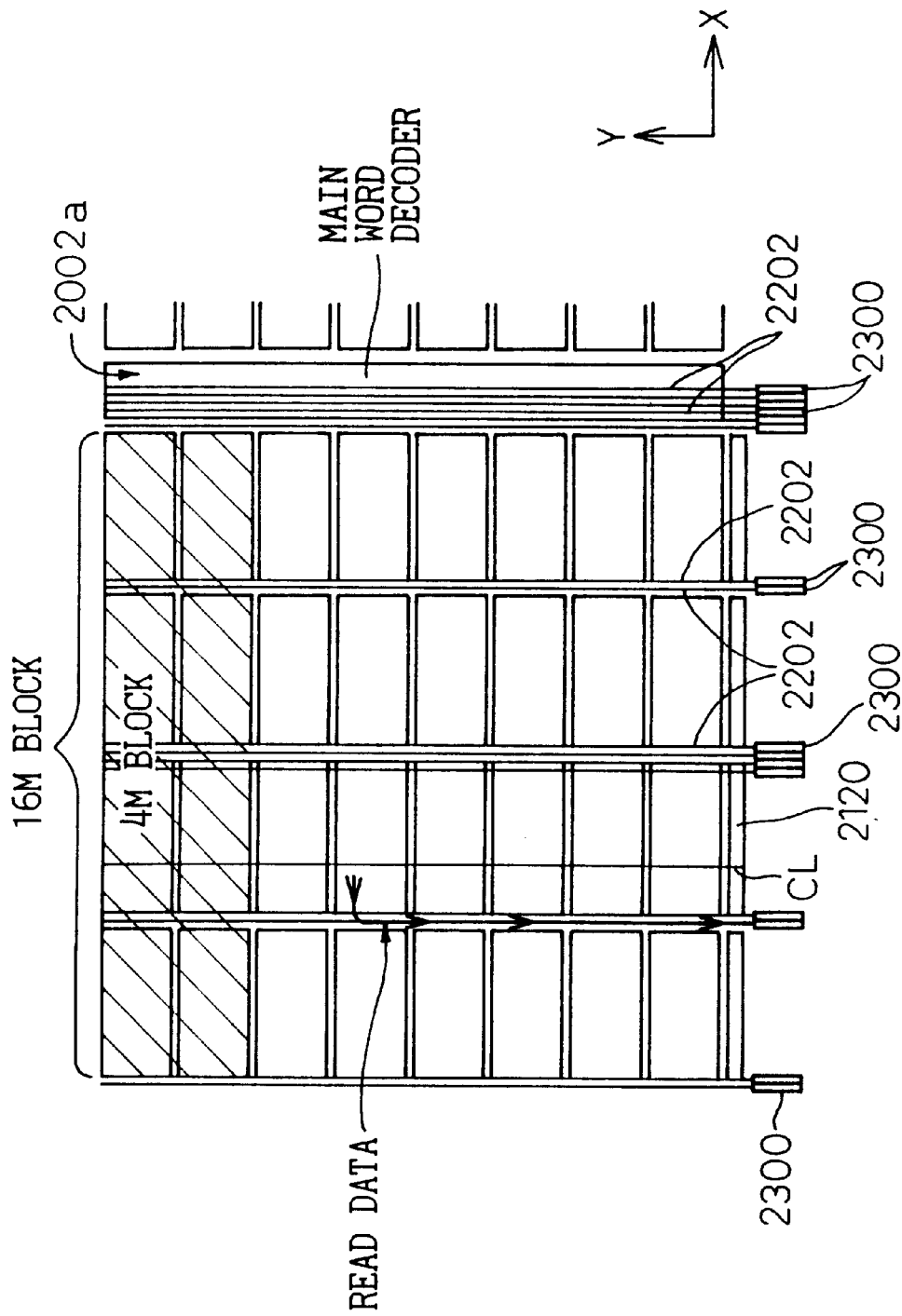
Figure 178:
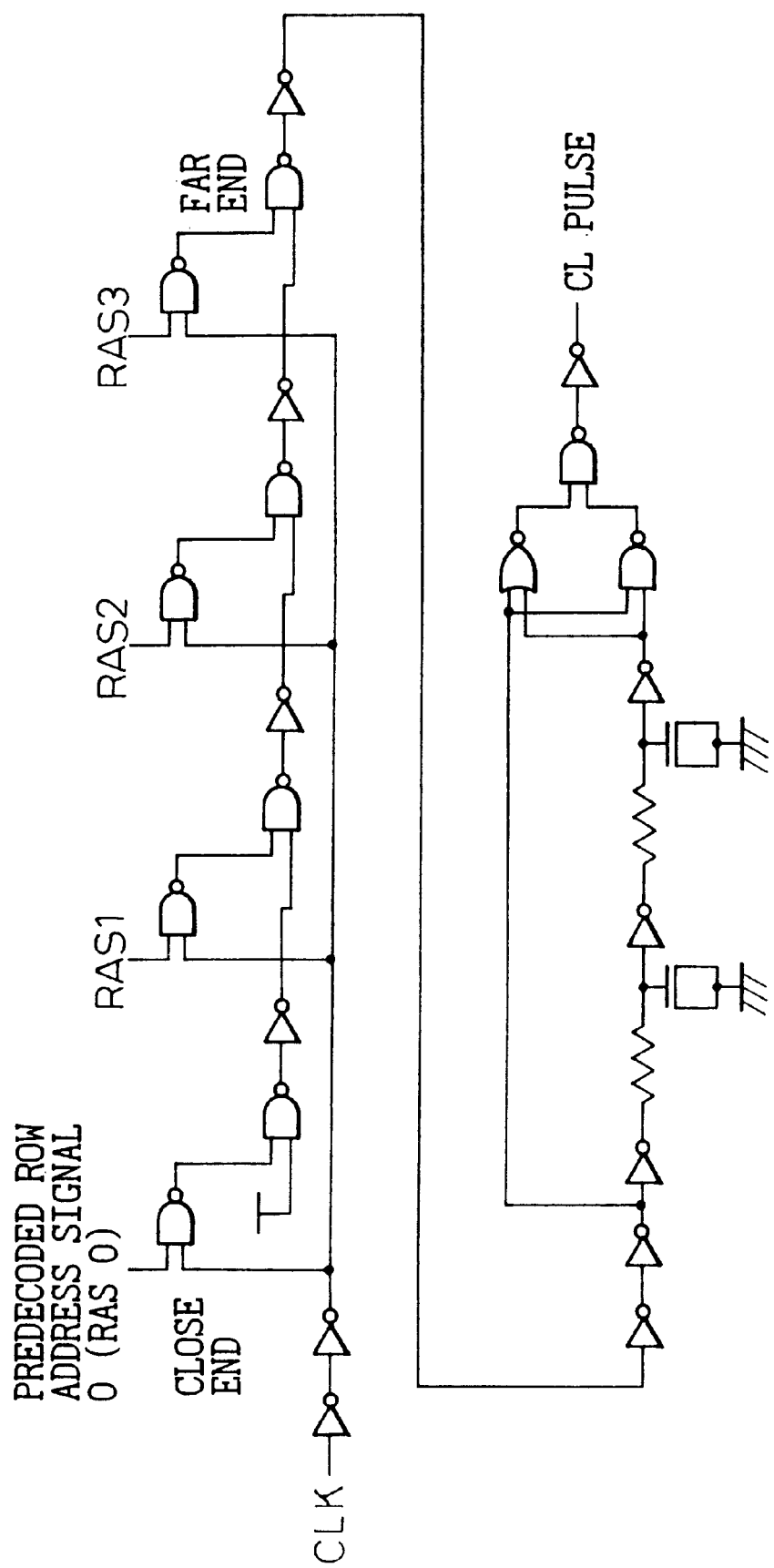

FIGS. 125A and 125B are diagrams for explaining the operation of the bus amplifier of FIG. 124;

FIG. 126 is a circuit diagram showing one example of a multiplexer in the bus amplifier of FIG. 123;

FIG. 127 is a diagram showing an example of a signal waveform for operating the bus amplifier of FIG. 123;

FIG. 128 is a diagram showing an example of the operating waveform of the bus and the bus amplifier in the eighth embodiment of the signal transmission system according to the fifth mode of the present invention;

FIG. 129 is a diagram showing one example of a bus amplifier in the signal transmission system as a ninth embodiment of the signal transmission system according to the fifth mode of the present invention;

FIG. 130 is a circuit diagram showing one example of a PRD amplifier configuration in the bus amplifier of FIG. 129;

FIG. 131 is a circuit diagram showing one example of a latch in the bus amplifier of FIG. 129;

FIG. 132 is a diagram showing an example of a signal waveform for operating the bus amplifier of.: FIG. 129;

FIG. 133 is a diagram showing an example of the operating waveform of the bus and the bus amplifier in the ninth embodiment of the signal transmission system according to the fifth mode of the present invention;

FIG. 134 is a diagram showing one example of a bus amplifier in the signal transmission system as a 10th embodiment of the signal transmission system according to the fifth mode of the present invention;

FIG. 135A is a circuit diagram showing one example of a PRD amplifier configuration in the bus amplifier of FIG. 134;

FIG. 135B is a circuit diagram showing another example of a PRD amplifier configuration in the bus amplifier of FIG. 134;

FIG. 136 is a circuit diagram showing still another example of the PRD amplifier configuration in the bus amplifier of FIG. 134;

FIG. 137 is a circuit diagram showing one example of a multiplexer in the bus amplifier of FIG. 134;

FIG. 138 is a diagram showing an example of a signal waveform for operating the bus amplifier of FIG. 134;

FIG. 139 is a diagram showing an example of the operating waveform of the bus and the bus amplifier in the 10th embodiment of the signal transmission system according to the fifth mode of the present invention;

FIG. 140 is a block diagram showing in schematic form one example of a semiconductor memory device as an 11th embodiment where the signal transmission system according to the fifth mode of the present invention is applied;

FIG. 141 is a diagram showing one example of a bus amplifier in the semiconductor memory device of FIG. 140;

FIG. 142 is a circuit diagram showing one example of a PRD amplifier configuration in the bus amplifier of FIG. 141;

FIG. 143 is a circuit diagram showing one example of a multiplexer in the bus amplifier of FIG. 141;

FIG. 144 is a circuit diagram showing one example of a sense amplifier in the semiconductor memory device of FIG. 140;

FIG. 145 is a diagram showing an example of the operating waveform of the bus and the bus amplifier in the semiconductor memory device of FIG. 140;

FIG. 146 is a block diagram showing in schematic form one example of a semiconductor memory device as a 12th embodiment where the signal transmission system according to the fifth mode of the present invention is applied;

FIG. 147 is a block diagram showing a configurational example of a column decoder system in the semiconductor memory device of FIG. 146;

FIG. 148 is a diagram showing an example of the operating waveform of a bus and a bus amplifier in the semiconductor memory device of FIG. 146;

FIG. 149 is a block diagram showing in schematic form one example of a semiconductor memory device as a 13th embodiment where the signal transmission system according to the fifth mode of the present invention is applied;

FIG. 150 is a diagram for explaining how the data bus waveform changes depending on the presence or absence of a load in the semiconductor memory device of FIG. 149;

FIGS. 151A to 151I are diagrams showing examples of the load in the semiconductor memory device of FIG. 149;

FIG. 152 is a diagram showing an example of the mounting positions of the load in the semiconductor memory device of the 13th embodiment where the signal transmission system according to the fifth mode of the present invention is applied;

FIG. 153 is a diagram showing another example of the mounting positions of the load in the semiconductor memory device of the 13th embodiment where the signal transmission system according to the fifth mode of the present invention is applied;

FIG. 154 is a diagram showing still another example of the mounting positions of the load in the semiconductor memory device of the 13th embodiment where the signal transmission system according to the fifth mode of the present invention is applied;

FIG. 155 is a block diagram showing in schematic form one example of a semiconductor memory device as a 14th embodiment where the signal transmission system according to the fifth mode of the present invention is applied;

FIG. 156 is a diagram showing a comparison of the data bus waveforms when the load is provided according to the 13th and 14th embodiments where the signal transmission system according to the fifth mode of the present invention is applied;

FIG. 157 is a diagram showing a modified example of the load applicable for use in the semiconductor memory device of FIG. 155;

FIG. 158 is a block diagram showing in schematic form one example of a semiconductor memory device as a 15th embodiment where the signal transmission system according to the fifth mode of the present invention is applied;

FIG. 159 is a circuit diagram showing one example of a sense amplifier applicable for use in the semiconductor memory device of FIG. 158;

FIG. 160 is a waveform diagram for explaining one example of the operation of the semiconductor memory device of FIG. 158;

FIG. 161 is a waveform diagram for explaining another example of the operation of the semiconductor memory device of FIG. 158;

FIG. 162 is a circuit diagram showing the configuration of an essential portion of a semiconductor memory device as a 16th embodiment where the signal transmission system according to the fifth mode of the present invention is applied;

FIG. 163 is a block diagram showing in schematic form one example of a semiconductor memory device as a 17th embodiment where the signal transmission system according to the fifth mode of the present invention is applied;

FIG. 164 is a diagram showing an example of the operating waveform of a bus and a bus amplifier in the semiconductor memory device of FIG. 163;

FIG. 165 is a diagram showing another example of the operating waveform of the bus and the bus amplifier in the semiconductor memory device of FIG. 163;

FIG. 166 is a block diagram showing in schematic form the configuration of an essential portion of a semiconductor memory device as an 18th embodiment where the signal transmission system according to the fifth mode of the present invention is applied;

FIG. 167 is a diagram showing one example of a bus amplifier in the semiconductor memory device of FIG. 166;

FIG. 168 is a circuit diagram showing one example of a PRD amplifier configuration in the bus amplifier of FIG. 167;

FIG. 169 is a circuit diagram showing one example of a multiplexer in the bus amplifier of FIG. 167;

FIG. 170 is a block diagram showing one configurational example of a column decoder system in the semiconductor memory device of the 18th embodiment where the signal transmission system according to the fifth mode of the present invention is applied;

FIG. 171 is a diagram showing one example of a CL pulse generating circuit in FIG. 170;

FIG. 172 is a waveform diagram for explaining the operation of the CL pulse generating circuit of FIG. 171;

FIG. 173 is a diagram showing another example of the bus amplifier in the semiconductor memory device of FIG. 166;

FIG. 174 is a circuit diagram showing one example of a PRD amplifier configuration in the bus amplifier of FIG. 173;

FIG. 175 is a circuit diagram showing one example of a latch in the bus amplifier of FIG. 173;

FIG. 176 is a block diagram showing another configurational example of the column decoder system in the semiconductor memory device of the 18th embodiment where the signal transmission system according to the fifth mode of the present invention is applied;

FIG. 177 is a block diagram showing in schematic form the configuration of an essential portion of a semiconductor memory device as a 19th embodiment where the signal transmission system according to the fifth mode of the present invention is applied; and FIG. 178 is a diagram showing one example of a CL pulse generating circuit applicable for use in the semiconductor memory device of FIG. 177.

DESCRIPTION OF THE PREFERRED EMBODIMENTS

Before proceeding to the description of the preferred embodiments of the signal transmission system and the receiver circuit in the signal transmission system according to the present invention, the problem associated with the prior art will be described first with reference to the relevant drawing.

Figure 1:
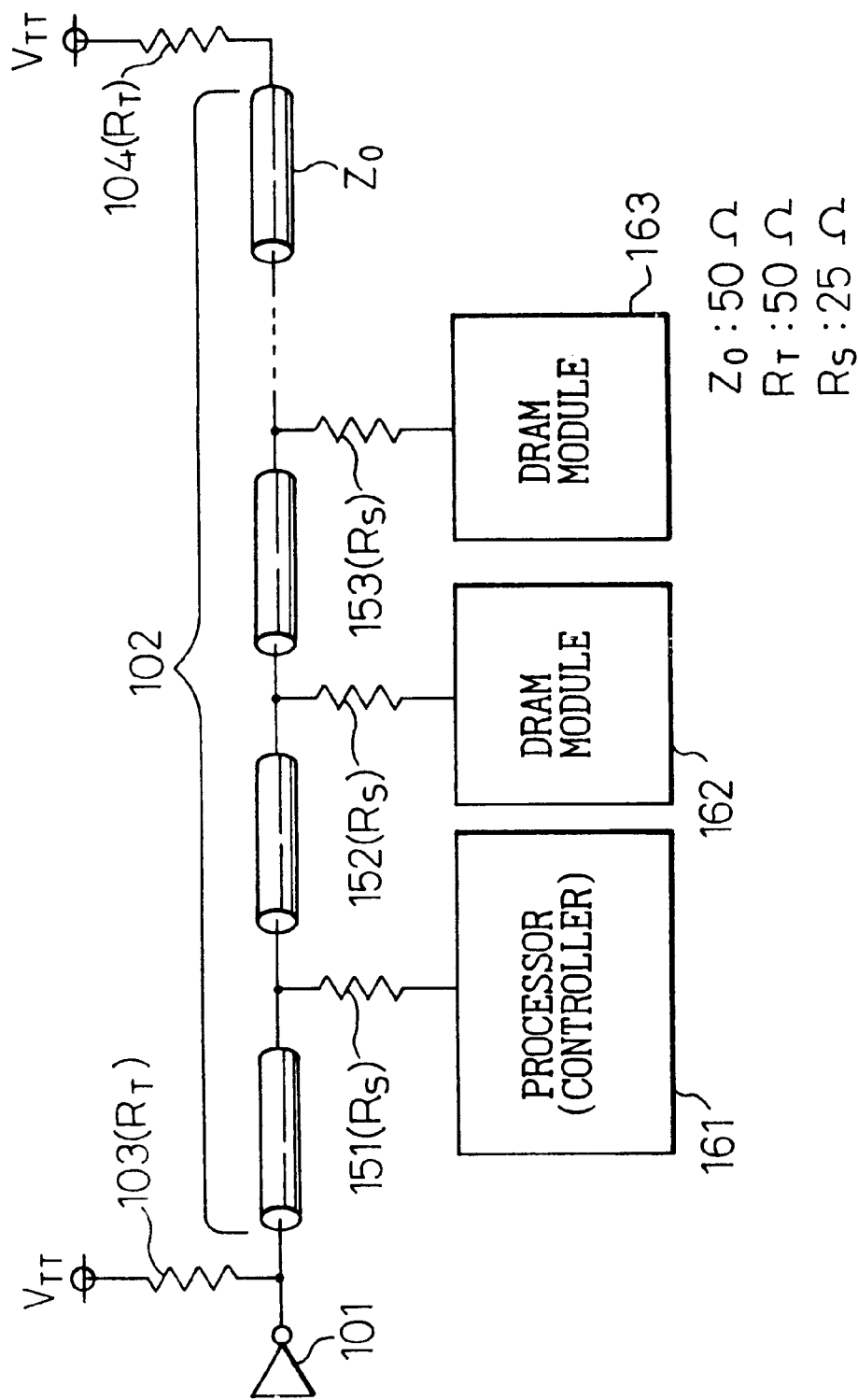
FIG. 1 is a block diagram showing in schematic form an example of a signal transmission system according to the prior art.

FIG. 1 is a block diagram showing in schematic form an example of a signal transmission system according to the prior art. An example of a bus system where the SSTL is applied is shown here. In FIG. 1, reference numeral 101 is a driver, 102 is a signal transmission line, 103 and 104 are terminal resistors ($R_T$), 151 to 153 are stub resistors ($R_S$), 161 is a processor (a controller), and 162 and 163 are DRAM modules. Further, reference sign $V_{TT}$ designates an intermediate potential (power supply line) between supply voltage $V_{CC}$ and ground voltage $V_{SS}$.

As shown in FIG. 1, in the bus system of the prior art, the terminal resistors 103 and 104 respectively are provided at both ends (terminating ends) of the transmission line and connected to the power supply line $V_{TT}$ of intermediate potential. On the other hand, the processor 161 and the DRAM modules 162, 163 are connected to the transmission line 102 via the stub resistors 151 and 152, 153, respectively, provided at intermediate points along the transmission line 102.

Here, the characteristic impedance of the transmission line 102 is approximately 50 Ohms, and the resistance values of the terminal resistors 103 and 104 are each set to approximately 50 Ohms equal to the characteristic impedance $Z_0$ of the line. That is, with the terminal resistors 103 and 104 thus set, this arrangement provides a parallel resistance of a total of 25 Ohms at both ends, and the driver drives this resistance to generate a signal voltage. Here, the output impedance of the driver 101 is chosen to be small in order to provide large drive capability; that is, the transistor constituting the driver 101 is constructed from a large-size transistor.

More specifically, when a bus system using the SSTL is considered, for example, since a minimum signal amplitude of 400 mV is required, the driver is required to feed a current of approximately 16 mA, and if the system is to be designed with a margin, the required current is doubled to approximately 32 mA.

As described above, in the bus system (signal transmission system) using the SSTL, for example, high-speed signal transmission is made possible because of the matched termination (terminal resistors $R_T$) and stub resistors ($R_S$), and power consumption also is reduced compared to traditional systems because of the use of low-amplitude signaling. However, it is demanded that the signal transmission bandwidth between DRAM and processor be further increased in the future, and yet the overall power consumption of the apparatus be maintained at the current level or reduced below the current level, and hence, there arises the need for a signal transmission system with lower power consumption. That is, consuming a current of 32 mA per bit, for example, will become intolerable when the bus width increases to 64 bits or 128 bits in the future.

The preferred embodiments of the signal transmission system and the receiver circuit for use in the signal transmission system will be described below with reference to the accompanying drawings.

Figure 2:
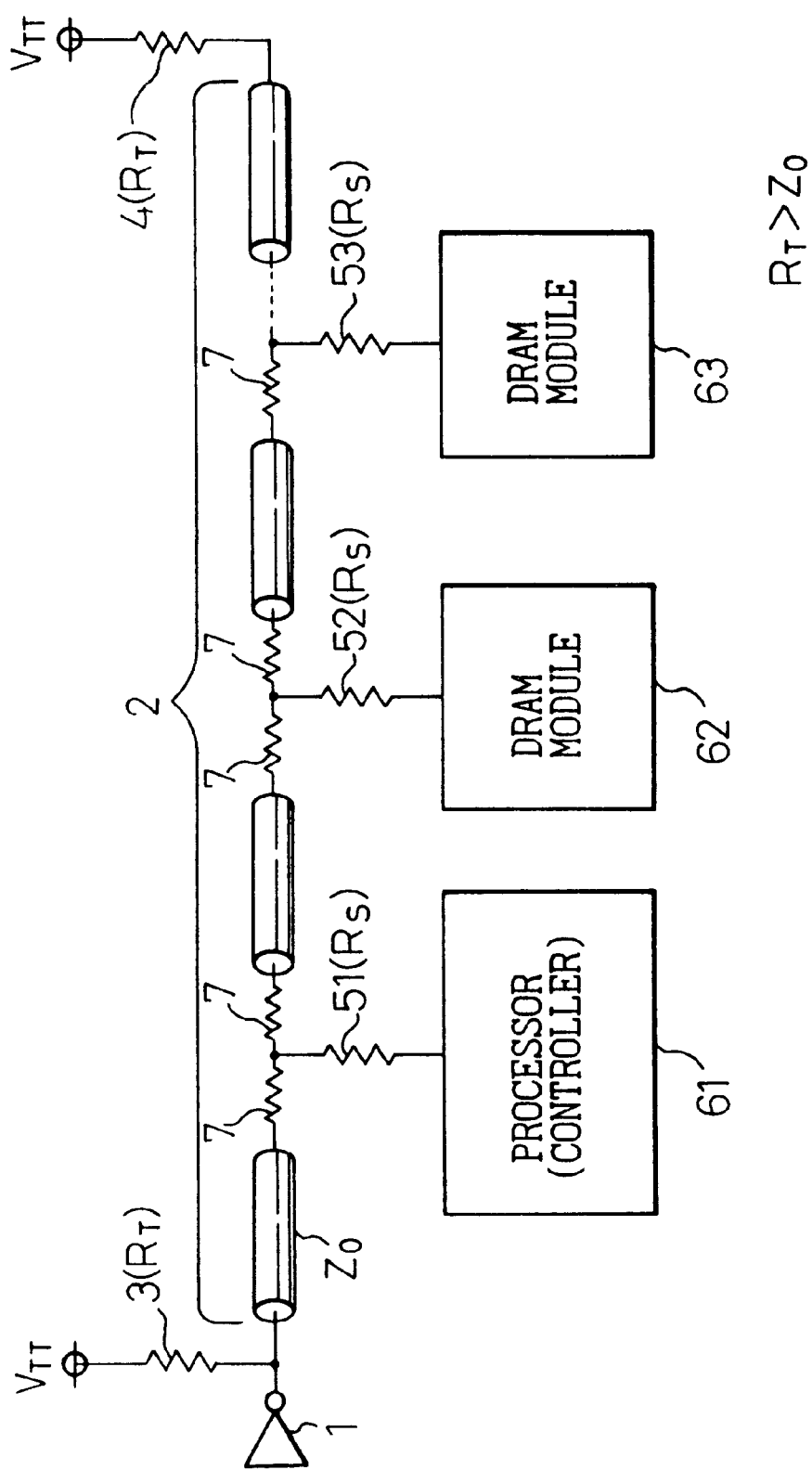
FIG. 2 is a block diagram showing the basic functional configuration of a signal transmission system to which the present invention is applied.

FIG. 2 is a block diagram showing the basic functional configuration of a signal transmission system (bus system) where a first mode of the present invention is applied. In FIG. 2, reference numeral 1 is a driver, 2 is a signal transmission line, 3 and 4 are terminal resistors ($R_T$), 51 to 53 are stub resistors ($R_S$), 61 is a processor (a controller), 62 and 63 are DRAM modules, and 7 is a damping resistor ($R_D$). Further, reference sign $V_{TT}$ designates an intermediate potential (power supply line) between supply voltage $V_{CC}$ and ground voltage $V_{SS}$.

As shown in FIG. 2, in the bus system of the first mode of the present invention, the terminal resistors 3 and 4 respectively are provided at both ends (terminating ends) of the transmission line and connected to the power supply line $V_{TT}$ of intermediate potential. Here, the resistance values $R_T$ Of the terminal resistors 3 and 4 are each set larger than the characteristic impedance $Z_0$ of the transmission line 2 ($R_T > Z_0$). Further, the output impedance of the driver 1 is chosen to be large; that is, the transistor constituting the driver 1 is constructed from a small-size transistor.

On the other hand, the processor 61 and the DRAM modules 62, 63 are connected to the transmission line 2 via the stub resistors 51 and 52, 53, respectively, provided at intermediate points along the transmission line 2. Further, the plurality of damping resistors 7 are inserted in the transmission line 2.

More specifically, the bus system (signal transmission system) according to the first mode of the present invention is configured to reduce the power consumption (low-power configuration) by (1) setting the terminal resistance $R_T$ to a value larger than the characteristic impedance $Z_0$ of the transmission line, (2) increasing the output impedance of the driver, and/or (3) inserting one or more damping resistors $R_D$ in series with the transmission line as necessary. Here, when the terminal resistance $R_T$ is made large, the power consumed at the terminating end decreases for the same signal amplitude, and when the output impedance of the driver is increased, signal current decreases, while achieving a reduction in the power required to drive the driver. Instead of inserting the damping resistors $R_D$ in series with the transmission line, the transmission line itself may be constructed from a material having resistance.

In the above-described low-power configuration, however, the frequency characteristic of the transmission line degrades, and the inherent response time with which a voltage signal on the transmission line responds becomes long. As a result, not only may the signal voltage not reach its expected full amplitude value during the period of symbol length T, but also large intersymbol interference terms may occur, making it impossible to detect the signal by a conventional method.

In a second mode of the present invention, to address this problem a means for predicting intersymbol interference from previous signals is used in the receiver (the receiver circuit in the signal transmission system), and the signal is constructed so that a partial response is detected by subtracting the predicted intersymbol interference from the currently received signal voltage.

Figure 3:
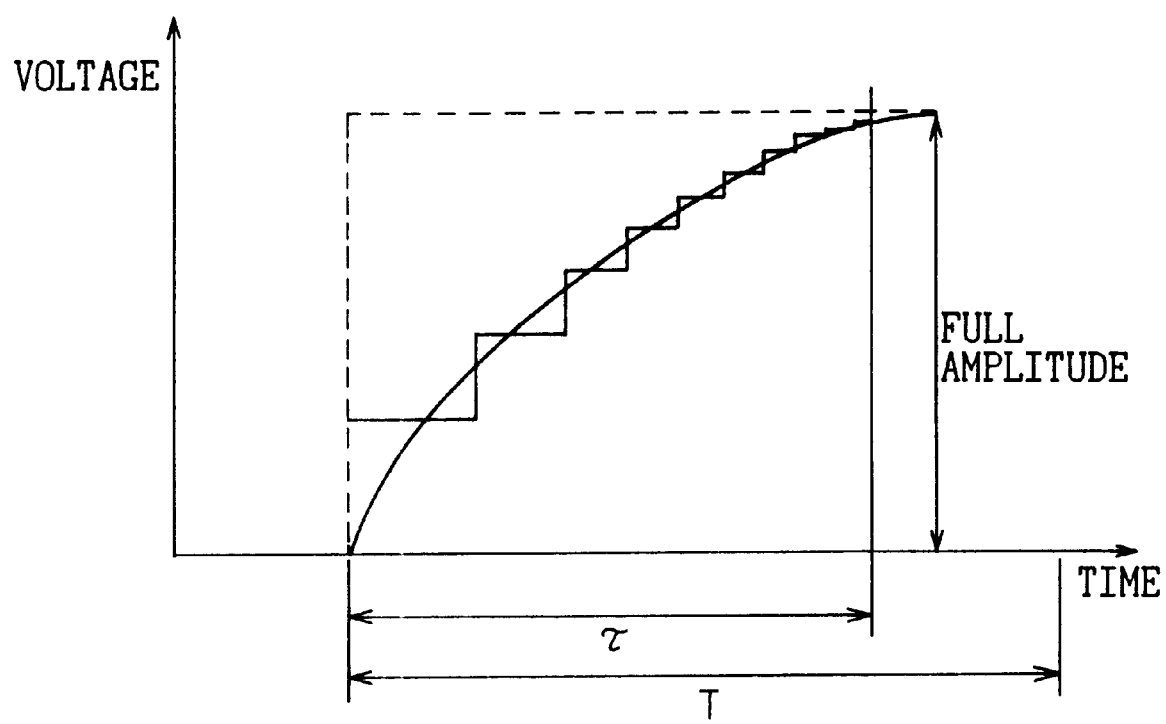
FIG. 3 is a diagram showing the relationship between symbol length and response time in a typical signal transmission system of the prior art.

FIG. 3 is a diagram showing the relationship between symbol length and response time in a typical signal transmission system of the prior art.

As shown in FIG. 3, in the typical bus system (signal transmission system) of the prior art, a prescribed time is required for the signal to reach its expected full amplitude value, for example, because of multiple reflections of the signal occurring in the transmission line (bus). Here, the response time τ is defined as the time required for a signal voltage to increase to 90% of its full amplitude value; in the typical bus system of the prior art, to ensure reliable signal transmission along the transmission line the response time τ is made sufficiently shorter than the length (one data cycle) T of the transmitted symbol, that is, the symbol length T is set sufficiently longer than the response time τ (T>τ). More specifically, in the typical bus system of the prior art, the symbol length T is set, for example, at two to three times the length of the response time τ (T≈2 to 3τ), and if the response time τ is long, high-speed signal transmission is not possible.

By contrast, in the second mode of the present invention, the response time τ is set approximately equal to or longer than the length (one data cycle) T of the transmitted symbol, that is, the symbol length T is set approximately equal to or shorter than the response time τ of the signal transmission line (T≦τ: for example, T≈0.3τ), and a partial response that the transmitted signal shows during the period of symbol length T is detected. In the second mode of the present invention, therefore, signal transmission can be performed at high speed.

Figures 4A, 4B:
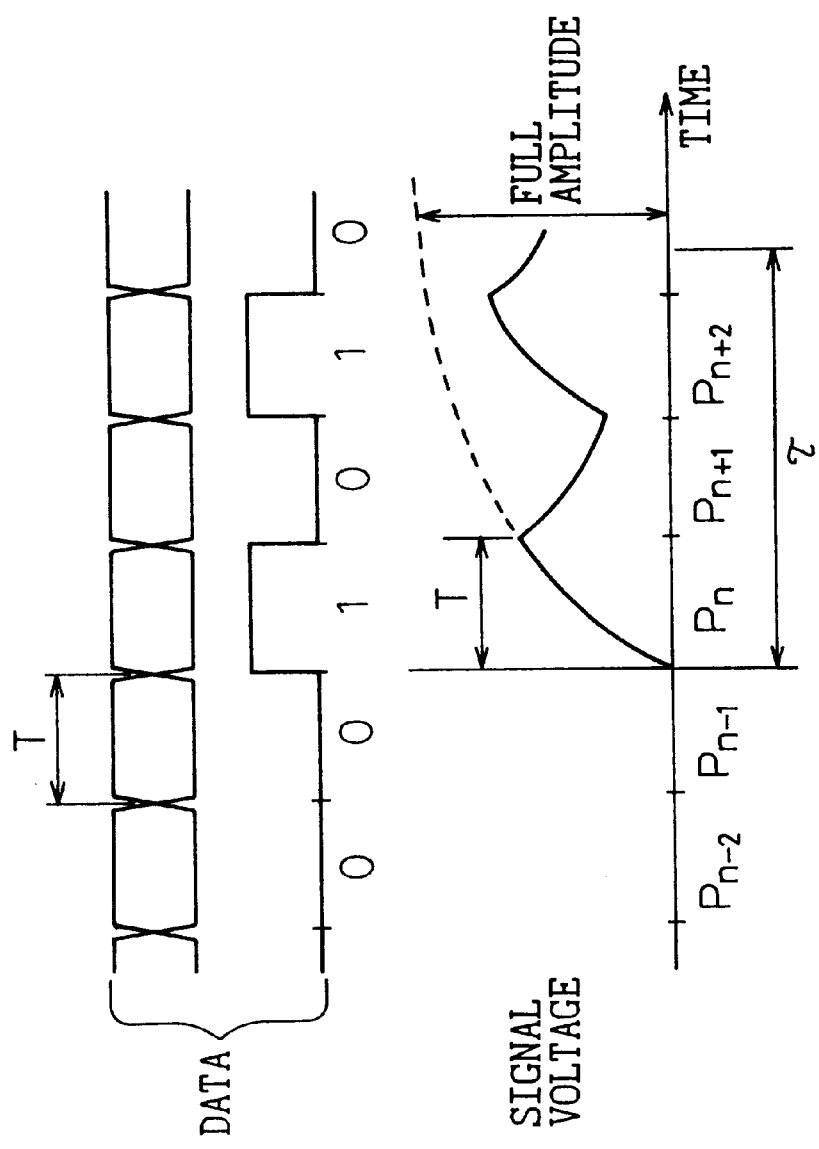
FIGS. 4A and 4B are diagrams showing the relationship between symbol length and response time in the signal transmission system of the present invention.

FIGS. 4A and 4B are diagrams showing the relationship between symbol length and response time in the signal transmission system of the present invention.

For example, when transmitted symbol data is "0" for periods $P_{n-2}$, $P_{n-1}$, and $P_{n+1}$ and the data changes to "1" for periods $P_n$ and $P_{n+2}$, as shown in FIGS. 4A and 4B, in the present invention the transmitted symbol length T is, for example, set shorter than the response time τ.

Accordingly, the signal of data "1" in period $P_n$ is not detected after the response time τ when the signal voltage has risen sufficiently, but is detected during the time T when the signal voltage is still changing (rising). Here, as can be seen from FIGS. 4A and 4B, the change of the signal voltage (in period $P_n$) when the data changes to "1" after a succession of 0s is different from the change of the signal voltage (in period $P_{n+2}$) when the data changes to "1" after changing from a 1 to a 0, but in the present invention, the actual change of the signal voltage (data signal) on the transmission line (bus) is detected by eliminating the effect of previous data changes whatever continuous change the data undergoes.

In this way, in the second mode of the present invention, signal transmission speed is increased by setting the transmitted symbol length T approximately equal to or shorter than the response time τ (T≦τ), and by detecting a partial response that the transmitted signal shows during the period of symbol length T.

When the circuit response is linear, as will be described later, intersymbol interference prediction (removal of the effect of previous data changes, using a partial response detector (PRD)) can be accomplished by weighted addition of "1" or "0" bit decision results of previously received signals (linear decision feedback, using a decision feedback equalizer (DFE)) (see FIGS. 12 and 13). On the other hand, when there is nonlinear symbol interference, prediction of interference terms can be accomplished by prerecording the magnitude of interference in memory and by reading the memory using the previously received signal sequence as an address (see FIGS. 14 and 15).

The above intersymbol interference prediction can also be performed using an analog value of the signal voltage received one clock back. This technique provides the best prediction when the signal voltage response is expressed by a first-order lag system.

That is, in the first-order lag system, when n=0, ±1, ±2, . . . , the signal voltage V (nT) is expressed as $$V(nT) = xV_{TT} + (1-x)V((n-1)T) + x(V_{inf} - V_{TT}) \quad (1)$$

Here, the relation x=1−exp(−T/τ) is used.

In the above equation, τ is the time constant (response time) of the circuit, $V_{inf}$ is the signal voltage (full amplitude) when data "1" or "0" is transmitted for a sufficient length of time, and $V_{TT}$ is the reference voltage. When a symmetrical CMOS driver is used, the reference voltage $V_{TT}$ is $V_{CC}/2$.

In the above equation (1), the first and second terms indicate intersymbol interference, and the third term represents the signal proper. That is, equation (1) shows that the intersymbol interference is obtained by storing the signal voltage one clock back and by taking a linear sum of the signal voltage one clock back and the fixed reference voltage. The linear sum of the stored analog voltage and the fixed voltage can be easily generated by a circuit using capacitors hereinafter described.

Figure 5A:
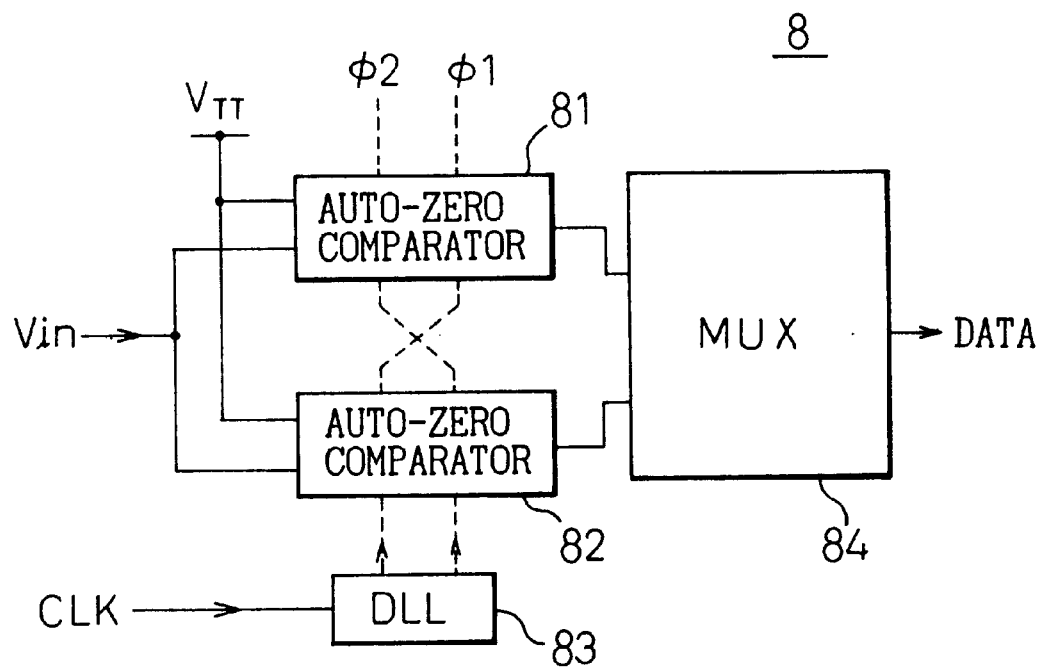
FIG. 5A is a block diagram showing a configurational example of a receiver circuit in the signal transmission system according to the present invention.

FIG. 5A is a block diagram showing a configurational example of the receiver circuit (partial-response detection circuit) in the signal transmission system according to the present invention, and FIG. 5 is a diagram showing in schematic form the configuration of an auto-zero comparator in the receiver circuit of FIG. 5A. Further, FIGS. 6A and 6B are diagrams for explaining the operation of the receiver circuit (partial-response detection circuit) of FIG. 5A: FIG. 6A is a diagram showing the timing of each signal used in the partial-response detection circuit, and FIG. 6B is a diagram showing an example of how a voltage (signal voltage) on the transmission line changes with changing data.

As shown in FIG. 5A, the partial-response detection circuit 8 comprises auto-zero comparators 81 and 82, a DLL (Delay Locked Loop) circuit 83, and a selection circuit (MUX) 84. The auto-zero comparators 81 and 82 are each supplied with the reference voltage $V_{TT}$ ($V_{CC}/2$), input voltage (signal voltage) Vin, and the control signals φ1 and φ2 output from the DLL circuit 83. The selection circuit 84 selects an output signal of the auto-zero comparator 81 or 82 at prescribed timing and outputs the selected signal (data output).

Figure 5B:
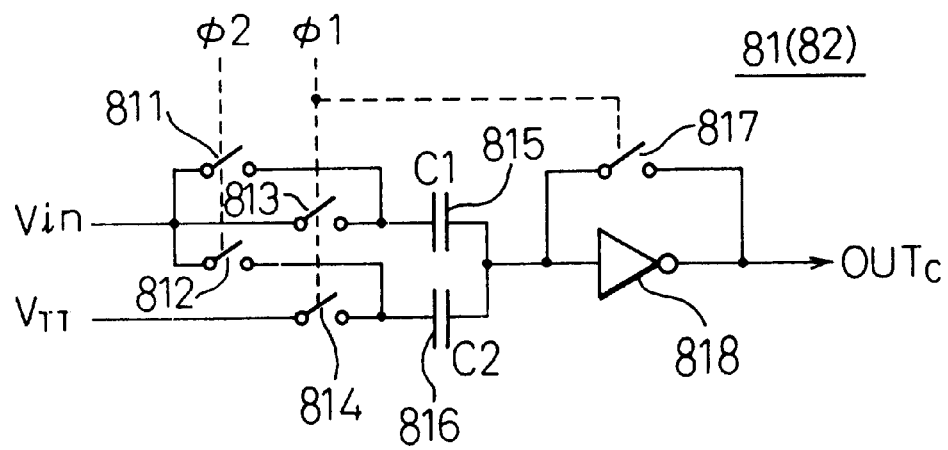
FIG. 5B is a diagram showing in schematic form the configuration of an auto-zero comparator in the receiver circuit of FIG. 5A.
Figure 6A:
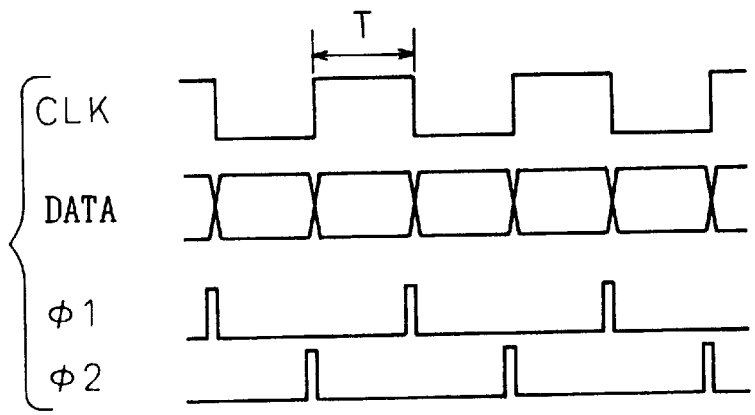
FIGS. 6A and 6B are diagrams for explaining the operation of the receiver circuit of FIG. 5A.
Figure 6B:
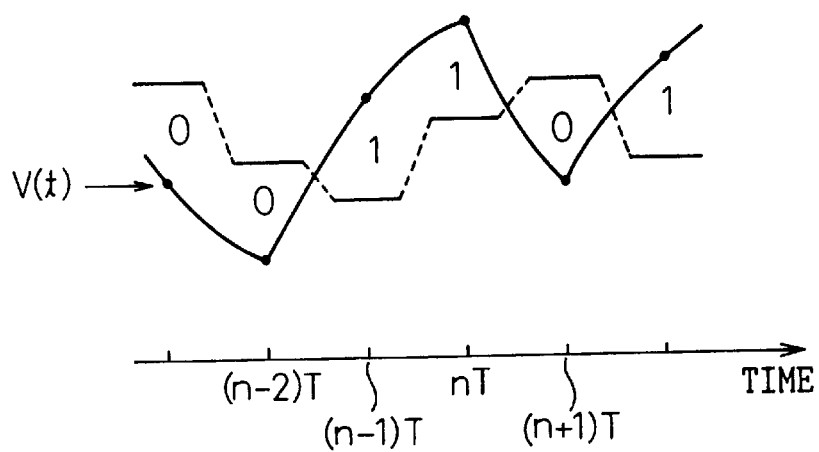

As shown in FIG. 5B, the auto-zero comparator 81 (82) comprises two capacitors 815 and 816, a CMOS inverter 818, and switches 811 to 814 and 817. Using the control signals φ1 and φ2, the switches 811 to 814 are controlled to control the applied voltage (reference voltage $V_{TT}$ or signal voltage Vin) to the capacitors 815 and 186 and the connection of the capacitors 815 and 186. The switch 817 is provided in parallel with the inverter 818 and is controlled on and off by the control signal φ1. As can be seen from FIG. 6A, the control signals φ1 and φ2 are signals that momentarily rise to a high level in synchronism with the fall and rise timing of clock CLK. The switches 811 to 814 and 817 can each be constructed from a transfer gate consisting of two transistors or from a single switching transistor, for example.

In operation, the auto-zero comparator 81 (82) performs an auto-zero operation by storing the signal voltage V((n−1)T) and $V_{TT}$ on the capacitors 815 and 186 by the control signal φ1 (at the timing that the signal φ1 goes high) while, at the same time, connecting together the input and output of the inverter 818. With this auto-zero operation, the input node of the inverter 818 is set to Von (the voltage obtained when the input and output of the inverter are short-circuited and representing the threshold voltage at which the inverter output changes from "0" to "1"). Hence, charges Q1 and Q2 stored on the capacitors 815 and 816 are given by $$Q1 = (V((n-1)T) - Von)C1$$

$$Q2 = (V_{TT} - Von)C2$$

where C1 and C2 are the capacitances of the capacitors 815 and 816, respectively.

Next, after the control signal φ1 goes low, the capacitors 815 and 816 are connected in parallel by the control signal φ2 (at the timing that the signal φ2 goes high) to couple the input V(nT) to the input node of the inverter 818. Voltage V at the input node of the inverter 818 at this time is, according to charge conservation law, given by $$\begin{aligned} V &= V(nT) - (Q1 + Q2)/(C1 + C2) \\ &= V(nT) - (1-x)V((n-1)T) - xV_{TT} + Von) \\ &= x(V_{inf} - V_{TT}) + Von \end{aligned} \quad (2)$$

The right-hand side of equation (2) is equal to the previously given equation (1) with the intersymbol interference terms subtracted from it (leaving only the signal proper) and with the voltage Von added to it. This means that the output of the inverter 818 is inverted depending on whether the signal proper is positive or negative, and therefore that only the signal proper can be examined to make a correct decision. More specifically, even when the data changes as shown in, FIG. 6B, the data signal can be detected correctly by using the analog value of the signal voltage received one clock back and eliminating (estimating) the effect of previous data changes.

In the partial-response detection circuit 8 of FIG. 5A, the outputs (OUTc) of the two auto-zero comparators 81 and 82 are alternately selected by the selection circuit 84; this is because the above decision processing of the input signal (Vin) is performed at intervals of 2T and, therefore, the two auto-zero comparators are operated in an interleaved fashion so that the decision processing can be performed for every 1T. The operation (processing) performed based on the control signal $\phi 1$ and that performed based on the control signal $\phi 2$ are interchanged between one auto-zero comparator 81 and the other auto-zero comparator 82.

Figure 7:
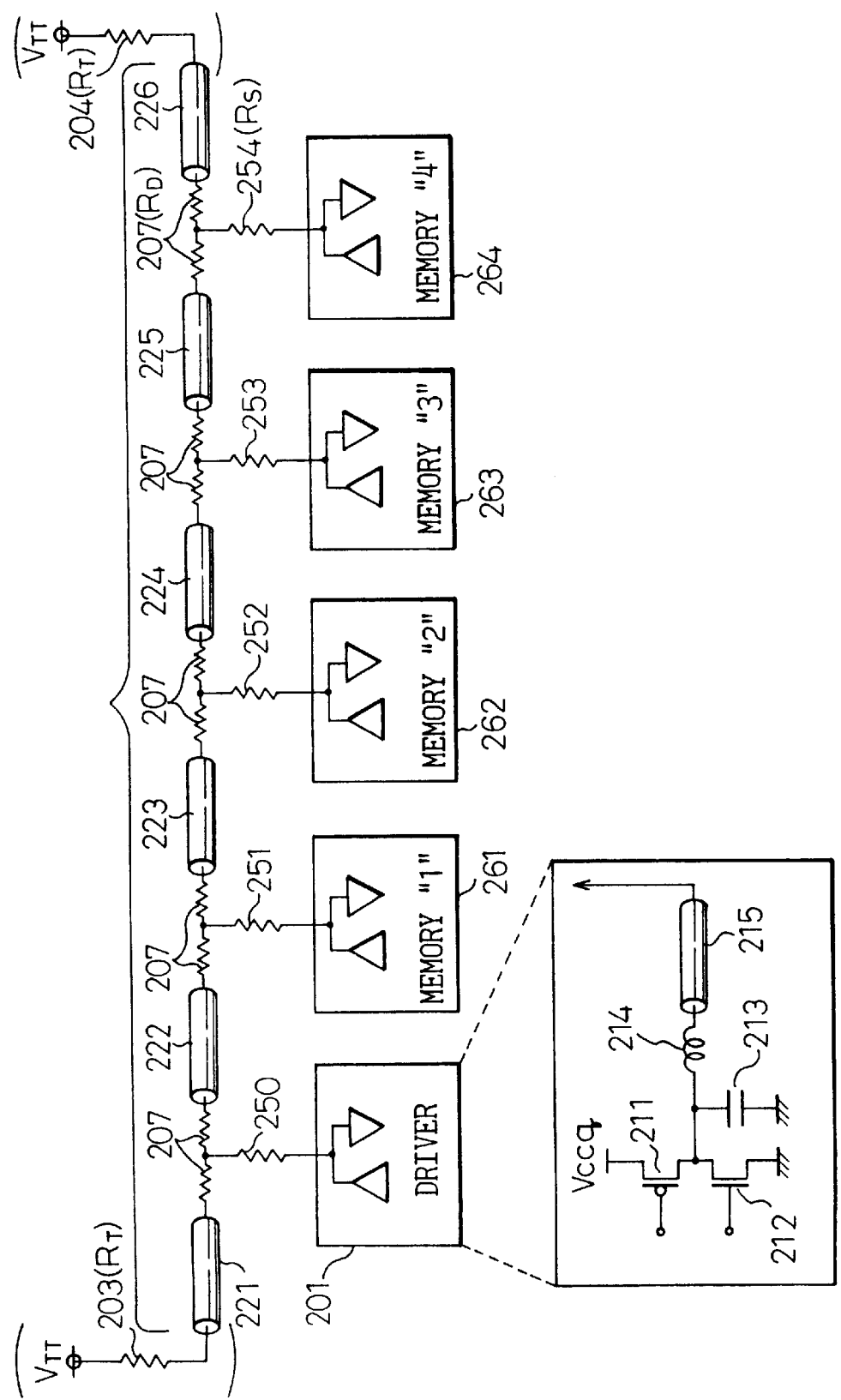
FIG. 7 is a block circuit diagram showing one embodiment of the signal transmission system where the present invention is applied.
Figure 8:
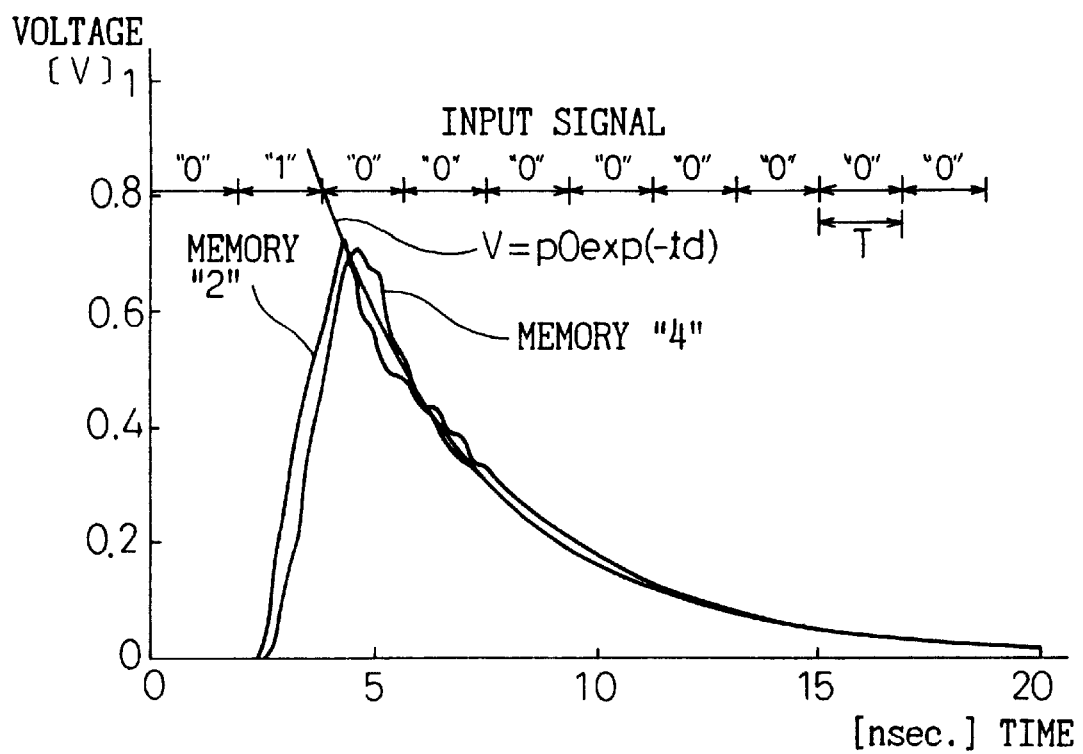
FIG. 8 is a diagram showing a signal waveform in each memory block in the signal transmission system of FIG. 7.

FIG. 7 is a block circuit diagram showing a configurational example of the signal transmission system where the present invention is applied, and FIG. 8 is a diagram showing the result of simulation of signal waveform in each of the memory blocks in the signal transmission system of FIG. 7.

In FIG. 7, reference numeral 201 is a driver, 202 (221 to 226) is a signal transmission line, 250 to 254 are stub resistors ($R_S$), 261 to 264 are memories (DRAM modules), and 207 is a damping resistor ($R_D$). The transmission lines 221 and 226 each have a characteristic impedance of 70 Ω and a length of 10 mm, and the transmission lines 222 to 225 each have a characteristic impedance of 70 Ω and a length of 12.5 mm. The stub resistors 250 to 254 each have a resistance value of 25 Ω, while each damping resistor 207 has a resistance value of 7 Ω. Here, the characteristic impedance of each of the transmission lines 222 to 225 (215) is set to 70 Ω because various circuits (memories 216 to 264, etc.) are connected to the transmission lines and the effective characteristic impedance becomes approximately 50 Ω due to the effects of parasitic capacitances on the transmission lines and other effects.

The driver 201 consists of a P-channel MOS transistor 211, an N-channel MOS transistor 212, a capacitor 213, an inductor 214, and a transmission line 215. Here, the capacitance of the capacitor 213 is 4 pF, the inductance of the inductor 214 is 2.5 nH, and the transmission line 215 has a characteristic impedance of 70 Ω and a length of 15 mm. By setting the gate width of each of the transistors 211 and 212 as small as tens of microns (for example, 60 µm for the transistor 211 and 30 µm for the transistor 212), it becomes possible to approximate the circuit response in effect by a first-order lag system, so that intersymbol interference can be eliminated by using the previously given equation (1). Further, by inserting a resistor (damping resistor 207) in parallel with the transmission line, oscillatory behavior of the signal voltage is suppressed and intersymbol interference can be eliminated (estimated) more accurately.

FIG. 8 shows the result of the simulation conducted using the above conditions; as can be seen from the result, the change of the signal voltage (data "1") in memory "2" (262) and memory "4" (264) can be approximated sufficiently by the equation V=p0exp(0−td).

Further, terminal resistors 203 and 204 ($R_T$) may be provided at both ends of the signal transmission line 202, as shown in parentheses in FIG. 7. Here, for example, it is preferable that the impedance of the transmission line be set to 70 Ω, the terminal resistance $R_T$ be set within a range of $\infty \geq R_T \geq 200$ Ω, the damping resistance $R_D$ be set within a range of 7 Ω $\geq R_D >$ 0 Ω, and the stub resistance $R_S$ be set to about 25 Ω.

As described above, in the signal transmission system according to the first mode of the present invention, by setting the terminal resistance to a value larger than the characteristic impedance of the signal transmission line, increasing the driver output resistance, or inserting a damping resistor in parallel with the signal transmission line, signal power can be reduced significantly. More specifically, according to circuit simulation, for example, power consumption can be reduced by a factor of about 4 compared to the SSTL. In the receiver circuit in the signal transmission system according to the second mode of the present invention, intersymbol interference occurring in the above-described signal transmission system is predicted from the previous signal and eliminated, thereby making accurate data reception (transmission) possible in high-speed operation.

Figure 9:
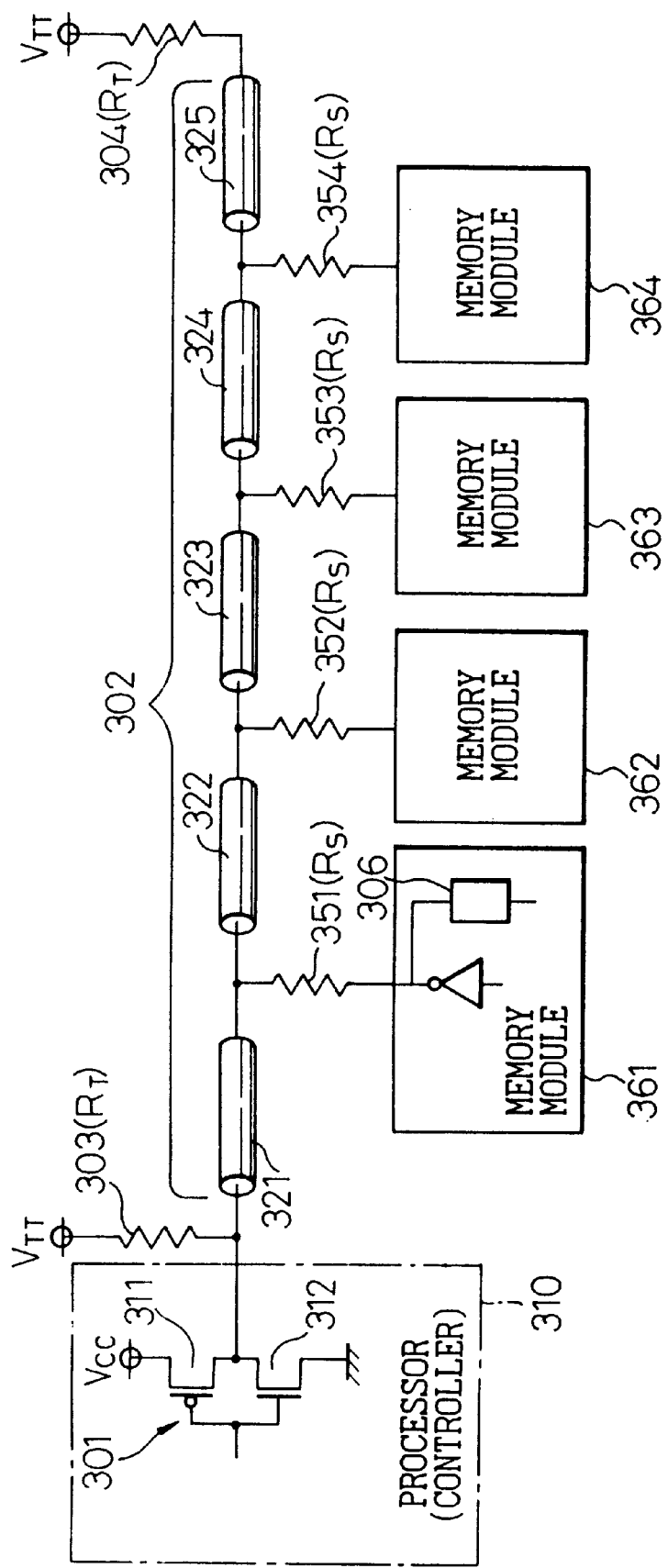
FIG. 9 is a block diagram showing a first embodiment of the signal transmission system according to a first mode of the present invention.

FIG. 9 is a block diagram showing a first embodiment of the signal transmission system according to the first mode of the present invention. In FIG. 9, reference numeral 301 is a driver, 302 (321 to 325) is a signal transmission line, 303 and 304 are terminal resistors ($R_T$), 351 to 354 are stub resistors ($R_S$), 361 to 364 are memory modules (DRAM modules), and 310 is a processor or controller (DRAM controller).

The terminal resistors 303 and 304 for connecting (terminating) the ends of the transmission line 302 with the power supply line $V_{TT}$ are each set, for example, to a resistance value of 200 Ω which is sufficiently larger than the characteristic impedance (approximately 50 Ω) of the transmission line 302. Further, the memory modules 361 to 364 are connected to the transmission line 302 via the stub resistors 351 to 354, respectively. Here, the potential of the power supply line $V_{TT}$ is, for example, set to an intermediate value ($V_{CC}/2$) between the power supply voltage $V_{CC}$ and the ground voltage $V_{SS}$.

The driver 301 is constructed as a CMOS inverter consisting of a P-channel MOS transistor 311 and an N-channel MOS transistor 312. Here, the gate width of the transistor 311 is set, for example, to 60 µm, and the gate width of the transistor 312 is set, for example, to 30 µm. That is, the gate width of each driver transistor in this embodiment is reduced by a factor of about 7 to 8 compared, for example, to the transistor used in the low-output impedance driver of the prior art. In this way, the output impedance of the driver circuit is increased.

According to the result of a specific simulation conducted for the first embodiment, power consumption per bit is approximately 12 mW even at a transfer rate as high as 533 MHz, achieving a reduction by a factor of 4 or more compared with the per bit power consumption of 50 mW or more in the SSTL.

Figure 10:
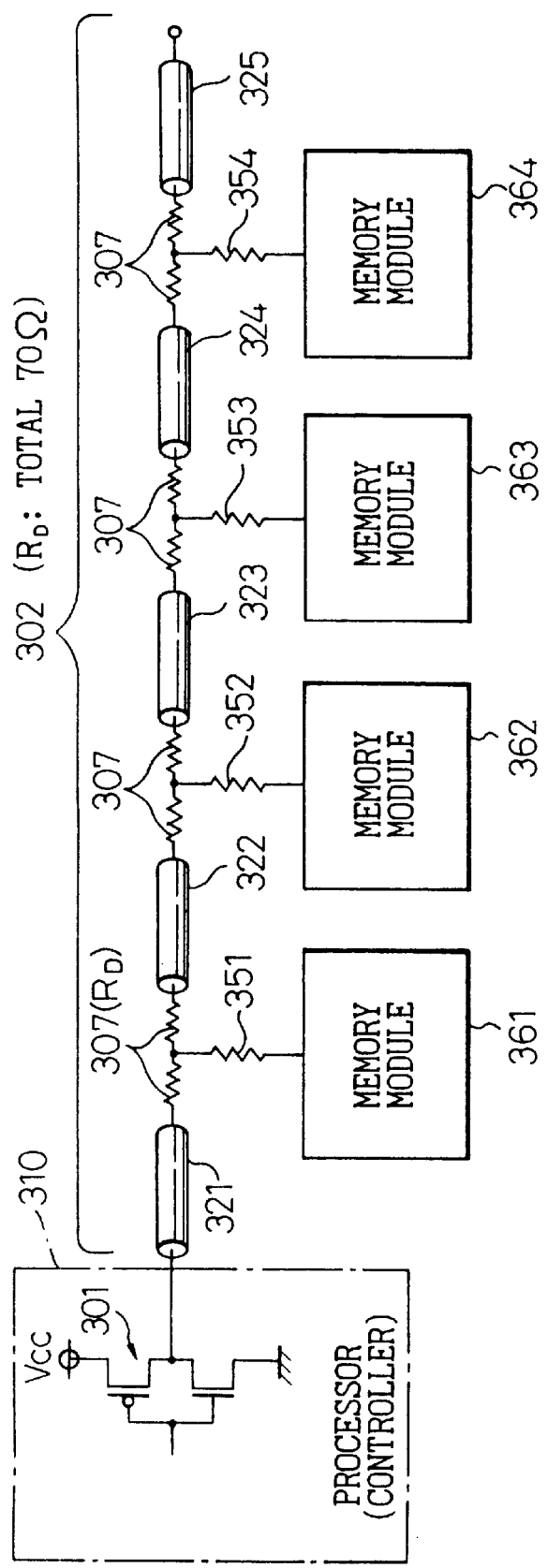
FIG. 10 is a block diagram showing a second embodiment of the signal transmission system according to the first mode of the present invention.

FIG. 10 is a block diagram showing a second embodiment of the signal transmission system according to the first mode of the present invention.

The second embodiment of the signal transmission system shown in FIG. 10 differs from the first embodiment of FIG. 9 in that the terminal resistors 303 and 304 are omitted and in that a damping resistor 307 ($R_D$) is inserted in series between each of the transmission lines 321 to 325 (302). Here, the damping resistors 307 inserted in series with the transmission line 302 are chosen to provide a total resistance of about 70 Ω. With the provision of the damping resistors 307, it becomes possible to approximate the response of the signal transmission system with good accuracy by a first-order lag system, and accurate signal reception is possible by eliminating intersymbol interference by a receiver circuit using capacitive coupling.

The unique effect of the second embodiment lies in the fact that since no terminal resistance is provided (open), dc power consumption is zero, so that power consumption for a signal that takes on only one data value "1" or "0" most of the time can be reduced in effect to zero.

Figure 11:
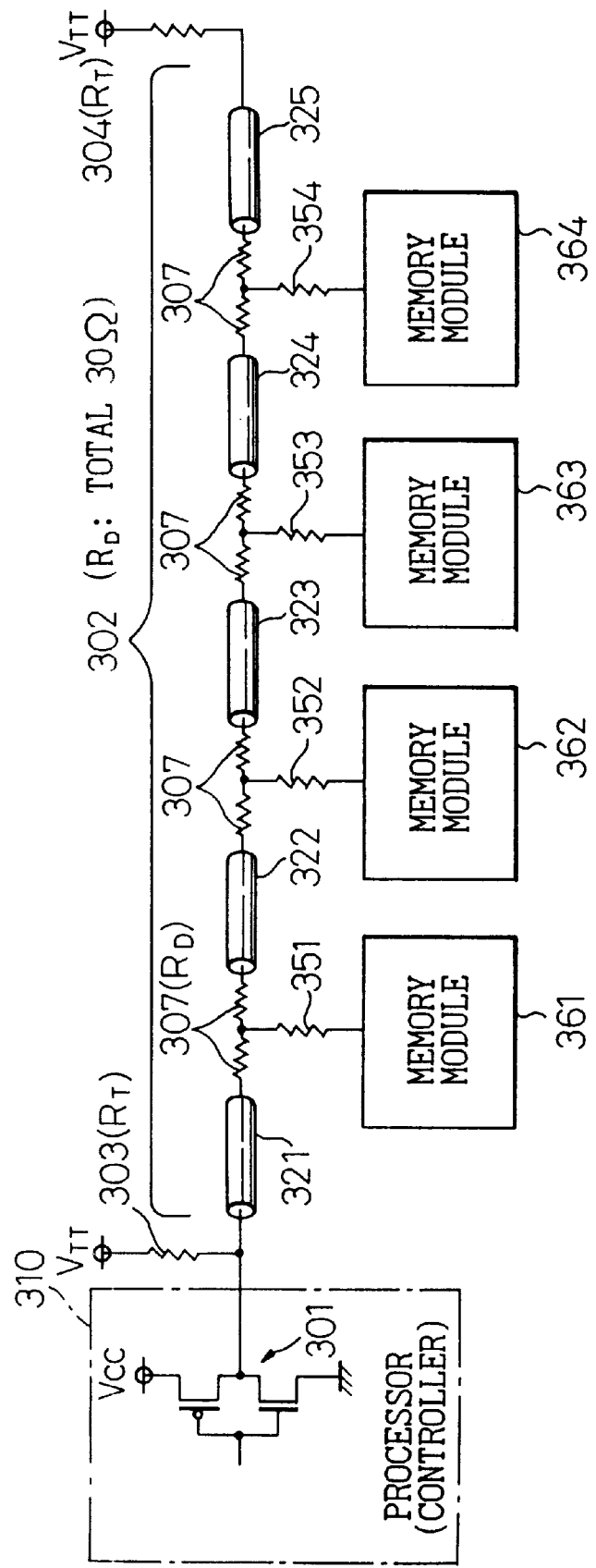
FIG. 11 is a block diagram showing a third embodiment of the signal transmission system according To the first mode of the present invention.

FIG. 11 is a block diagram showing a third embodiment of the signal transmission system according to the first mode of the present invention.

The third embodiment of the signal transmission system shown in FIG. 11 differs from the first embodiment shown in FIG. 9 in that a damping resistor 307 ($R_D$) is inserted in series between each of the transmission lines 321 to 325 (302). Here, the damping resistors 307 inserted in series with the transmission line 302 are chosen to provide a total resistance of about 30 Ω, and the terminal resistors 303 and 304 are each set to a resistance value of about 300 Ω.

That is, in the third embodiment, both the terminal resistors each of about 300 Ω and the damping resistors totalling about 30 Ω are provided. With this configuration, the oscillatory behavior of waveforms can be almost perfectly suppressed while preventing the attenuation of signals travelling through the transmission line, and thus the stability of signal transmission can be enhanced.

Figure 12:
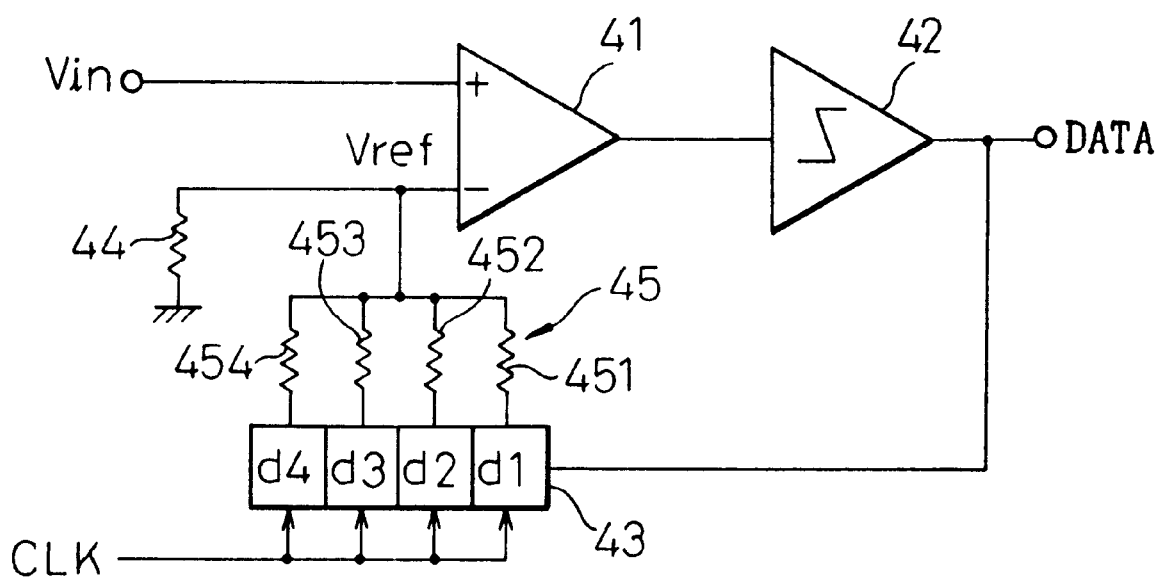
FIG. 12 is a block diagram showing a first embodiment of the receiver circuit in the signal transmission system according to a second mode of the present invention.

FIG. 12 is a block circuit diagram showing a first embodiment of the receiver circuit in the signal transmission system according to the second mode of the present invention. In FIG. 12, reference numeral 41 is a differential amplifier, 42 is a decision circuit, 43 is a shift register, 44 is a resistor, and 45 is a resistor ladder circuit.

The first embodiment of the receiver circuit shown in FIG. 12 is provided with a predictor for predicting intersymbol interference, and the predictor output (reference voltage Vref) is applied to the reference voltage side (−) of the differential amplifier 41 whose signal input side is coupled to the signal voltage,Vin. As the predictor, a so-called decision feedback type (decision feedback equalizer (DFE)) is used, in which the previous four bits of a digital signal (d4 to d1) are held in the shift register 43 and intersymbol interference terms are generated through the resistor ladder circuit 45 (nonlinear weighted AD converter).

More specifically, the shift register 43 holds data d4 four bits back, data d3 three bits back, data d2 two bits back, and the immediately previous data d1 (one bit back), and applies the data to the reference voltage side of the differential amplifier 41 via the resistors 454 to 451 having resistance values corresponding to the effects of the previous bits (the data four bits back to the immediately previous data). Here, the resistor 454 is chosen to have a large resistance value since the effect of the data four bits back is small, whereas the resistor 451 is chosen to have a small resistance value since the effect of the immediately previous data is large.

The differential amplifier 41 differentially amplifies the signal voltage Vin with the reference voltage Vref, and the output of the differential amplifier 41 is evaluated in the decision circuit 42 to make a decision on the transmitted data (signal voltage Vin).

According to the first embodiment of the receiver circuit shown in FIG. 12, by storing a sufficiently long sequence of previously received signals, correct intersymbol interference prediction can be done (with the effects of previous data changes eliminated) not only for a first-order lag system but for various responses, and correct data can be output.

Figure 13:
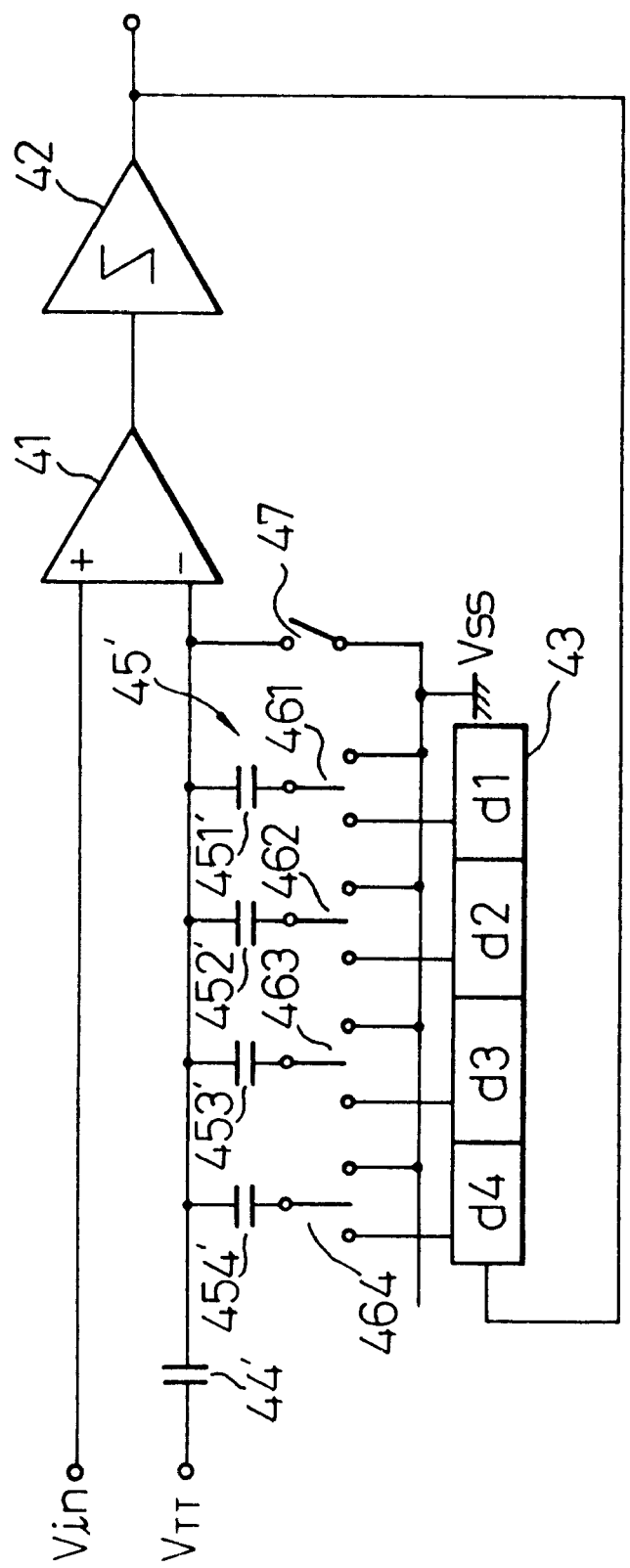
FIG. 13 is a block diagram showing a second embodiment of the receiver circuit in the signal transmission system according to the second mode of the present invention.

FIG. 13 is a block circuit diagram showing a second embodiment of the receiver circuit in the signal transmission system according to the second mode of the present invention.

The receiver circuit of the second embodiment shown in FIG. 13 differs from the foregoing first embodiment in that the resistor 44 and the resistor ladder circuit 45 are replaced by capacitive coupling implemented by capacitors 44' and 45'. That is, in the second embodiment, the nonlinear weighted A/D converter is implemented by capacitive coupling, which has the advantage of reducing the power consumption compared to the first embodiment that uses the resistor ladder. The capacitors 451' to 454' are connected to switches 461 to 464 for selection between the ground potential ($V_{SS}$) and the data four bits back to the immediately previous data held in the shift register 43. A switch 47 is connected to the reference voltage side (−) of the differential amplifier 41.

In the receiver circuit of FIG. 13, when initialized, the switches 461 to 464 are connected to ground potential, while the switch 47 is placed in the ON state. Next, after placing the switch 47 in the OFF state, the switches 461 to 464 are switched to the output side of the shift register 43 so that the immediately previous data to the data four bits back (d1 to d4) held in the shift register 43 are applied to the respective plates of the corresponding capacitors 451' to 454'. The other plates of the capacitors 451' to 454' are connected in common to the reference voltage side of the differential amplifier 41. The capacitor 454' corresponding to the data four bits back is chosen to have a small capacitance value since the effect of the data four bits back is small, whereas the capacitor 451' is chosen to have a large capacitance value since the effect of the immediately previous data is large.

Figure 14:
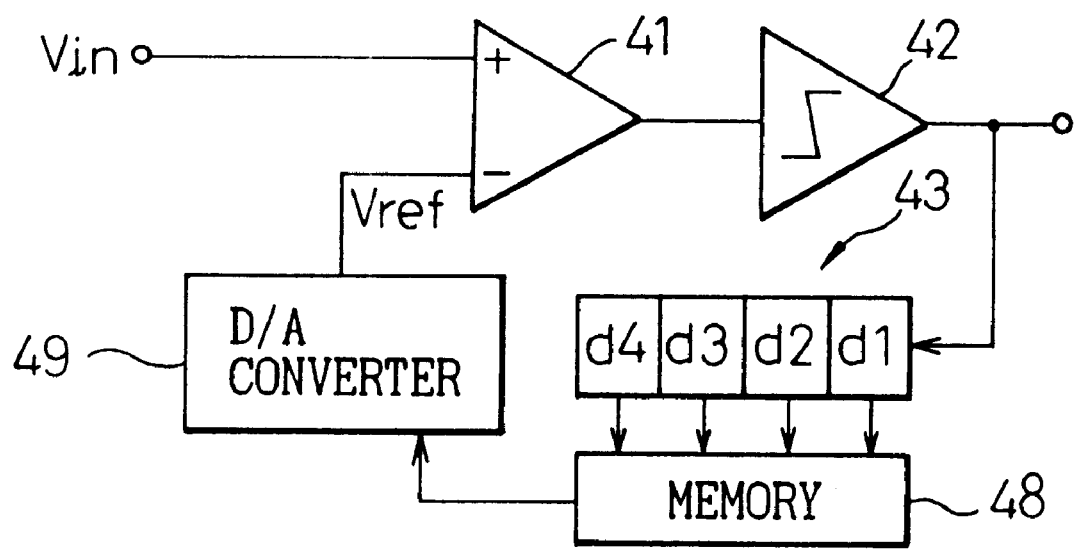
FIG. 14 is a block diagram showing a third embodiment of the receiver circuit in the signal transmission system according to the second mode of the present invention.

FIG. 14 is a block circuit diagram showing a third embodiment of the receiver circuit in the signal transmission system according to the second mode of the present invention. In FIG. 14, reference numeral 48 is a memory, and 49 is a D/A converter.

In the third embodiment of the receiver circuit shown in FIG. 14, as in the first embodiment, four, previous bits of a digital signal (d4 to d1) are held in the shift register 43 and the contents of the memory 48 are read out using the previously received digital signal sequence as an address. That is, an output corresponding to the signal held in the shift register 43 is read from the memory 48. The output from the memory 48 is applied as the reference voltage Vref to the reference voltage side of the differential amplifier 41 via the D/A converter 49, and differentially amplified with the signal voltage Vin applied to the signal input side (+) of the differential amplifier 41 ;then, the output of the differential amplifier 41 is evaluated in the decision circuit 42 to make a decision on the transmitted data (signal voltage Vin).

In this way, according to the third embodiment shown in FIG. 14, even when the intersymbol interference becomes nonlinear due to the effect of a transistor, diode, etc., for example, by storing a value containing the nonlinear component in the memory 48 a correct prediction value can be obtained (a correct decision of the transmitted data can be made), which is an advantage offered by the third embodiment.

Figure 15:
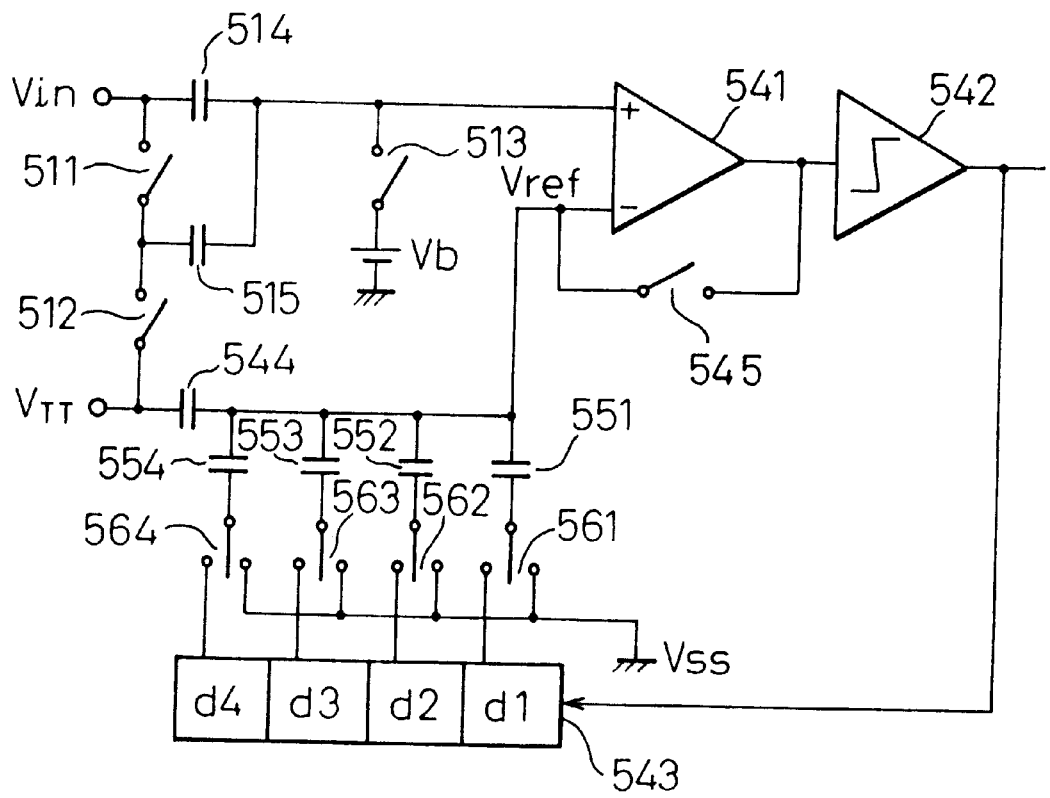
FIG. 15 is a block diagram showing a fourth embodiment of the receiver circuit in the signal transmission system according to the second mode of the present invention.

FIG. 15 is a block circuit diagram showing a fourth embodiment of the receiver circuit in the signal transmission system according to the second mode of the present invention.

The fourth embodiment of the receiver circuit shown in FIG. 15 consists essentially of the configuration of FIG. 5A which uses capacitor/switch combinations and eliminates the effect of previous data changes by using the analog value of the signal voltage received one clock back, and the configuration of the decision feedback predictor of FIG. 13 that uses capacitors. In the circuit comprising the capacitor/switch combinations, the intersymbol interference shown in the previously given equation (1) is subtracted from the input signal, and in the decision feedback predictor, the residual error is eliminated by using the input applied to the reference side of the differential amplifier. The fourth embodiment has the advantage of being able to eliminate intersymbol interference with high accuracy using fewer memory stages than conventional decision feedback predictors.

More specifically, in the receiver circuit of FIG. 15, first the switch 511 are placed in the OFF state, and the switches 512 and 513 placed in the ON state, to apply (store) a difference voltage between voltage Vb and signal voltage (Vin) across a capacitor 514 and a difference voltage between voltage Vb and voltage $V_{TT}$ across a capacitor 515. At this time, the switches 561 to 564 are connected to ground potential $V_{SS}$. Here, the voltage Vb is a bias voltage applied to ensure the reliable operation of the differential amplifier 541. Further, with the switch 545 placed in the ON state, an auto-zero operation for the differential amplifier 541 is performed.

Next, the switches 512 to 514 are placed in the OFF state, and the switch 511 placed in the ON state, thereby connecting the capacitors 514 and 515 in parallel for connection to a node on the signal input side (+) of the differential amplifier 541. At this time, the switches 561 to 564 are controlled so as to select the previous bit information (the data four bits back to the immediately previous data) held in the shift register 543. In this state, the potential (Vref) at the node on the reference voltage side (−) of the differential amplifier 541 changes in accordance with the previous bit information. A capacitor 544 is provided between the reference voltage side of the differential amplifier 541 and the voltage (power supply line) $V_{TT}$. In this configuration, as in the configuration previously described with reference to FIG. 13, the prediction value of intersymbol interference based on the previous four bits, for example, is applied as the reference voltage Vref to the differential amplifier 541 where the signal applied at the signal input side is differentially amplified using the reference voltage Vref. Then, the output of the differential amplifier 541 is evaluated in the decision circuit 542 to make a decision on the transmitted data (signal voltage Vin).

Here, the capacitor 554 corresponding to the data four bits back is chosen to have a small capacitance value, and the capacitor 551 corresponding to the immediately previous bit data is chosen to have a large capacitance value, for the same reasons as previously described. The predictor for predicting intersymbol interference is not limited to the above illustrated configuration comprising the capacitors and switches, but it will be appreciated that the predictor may be constructed using the resistor ladder of FIG. 12 or the memory of FIG. 14, for example.

Figure 16:
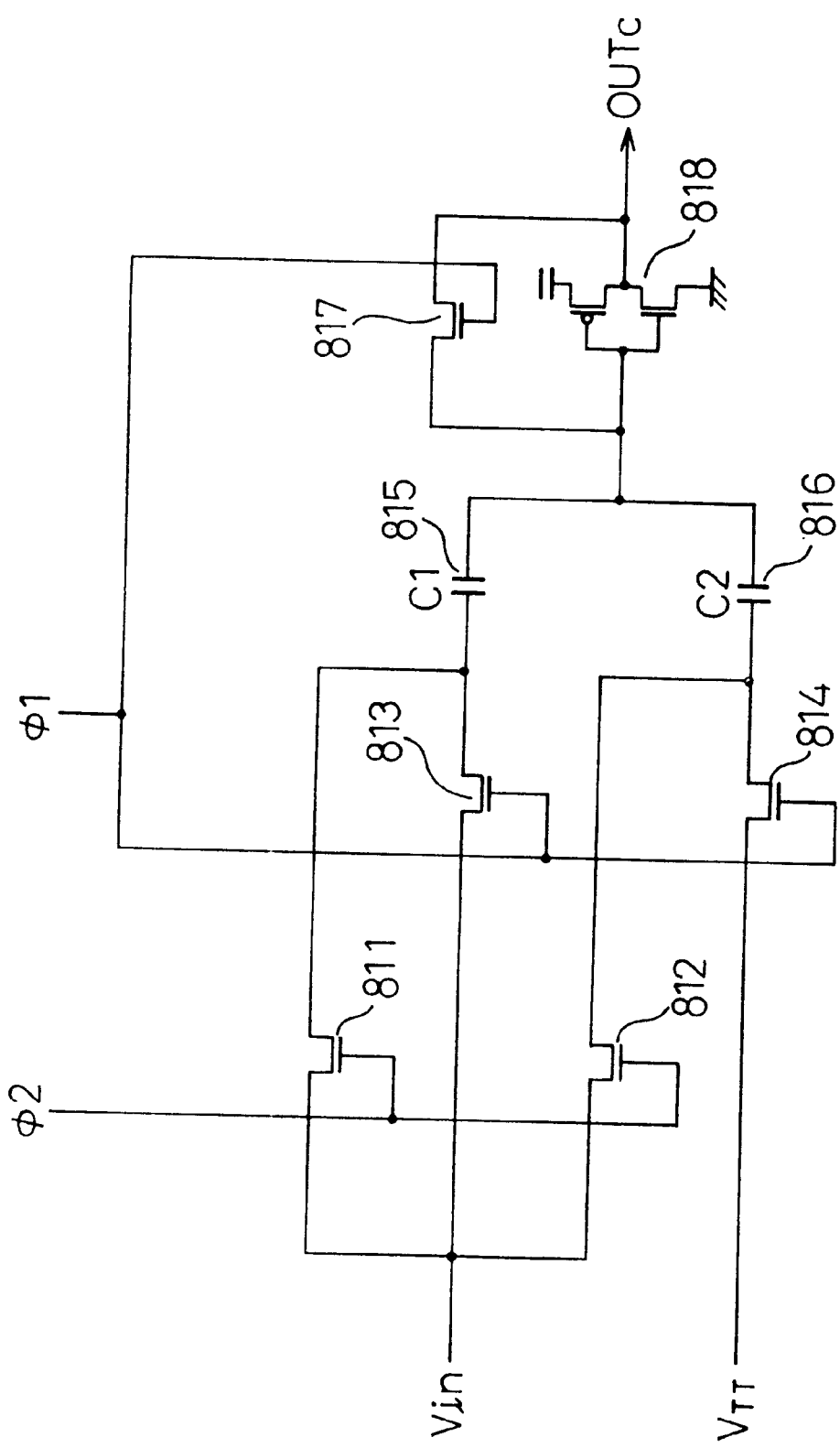
FIG. 16 is a circuit diagram showing one example of the auto-zero comparator in the receiver circuit of FIG. 5A.
Figure 17:
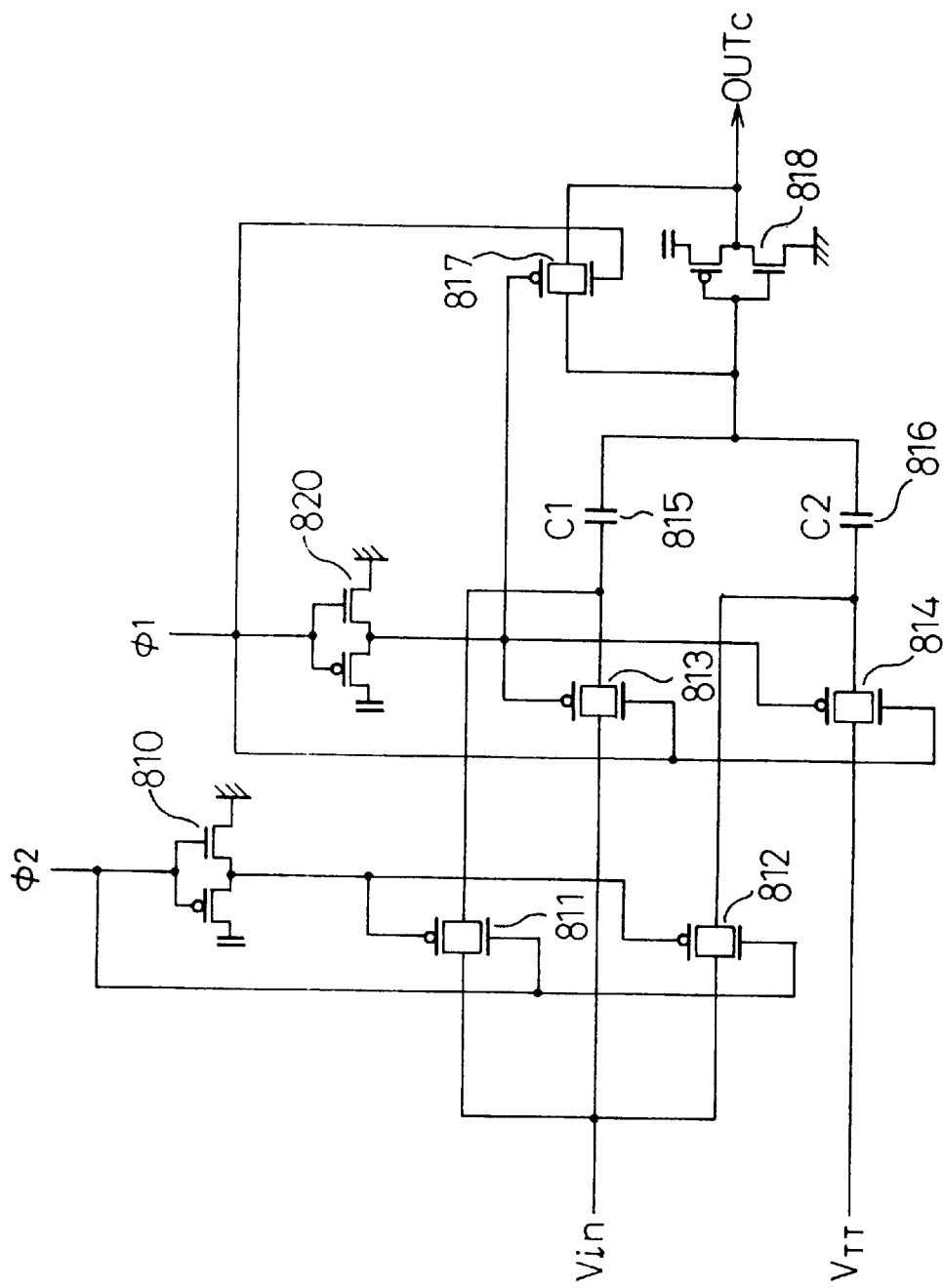
FIG. 17 is a circuit diagram showing another example of the auto-zero comparator in the receiver circuit of FIG. 5A.

FIG. 16 is a circuit diagram showing one example of the auto-zero comparator in the receiver circuit of FIG. 5A, and FIG. 17 is a circuit diagram showing another example of the auto-zero comparator in the receiver circuit of FIG. 5A.

More specifically, in the auto-zero comparator shown in FIG. 16, the switches 811 to 814 and 817 in the circuit of FIG. 5B are constructed from N-channel MOS transistors.

On the other hand, in the auto-zero comparator shown in FIG. 17, the switches 811 to 814 and 817 in the circuit of FIG. 5B are constructed from transfer gates each consisting of an N-channel and a P-channel MOS transistor. In FIG. 17, inverters 810 and 820 are provided to generate the control signals φ2 and φ1, respectively, and each transfer gate can thus be driven by complementary signals.

Figure 18:
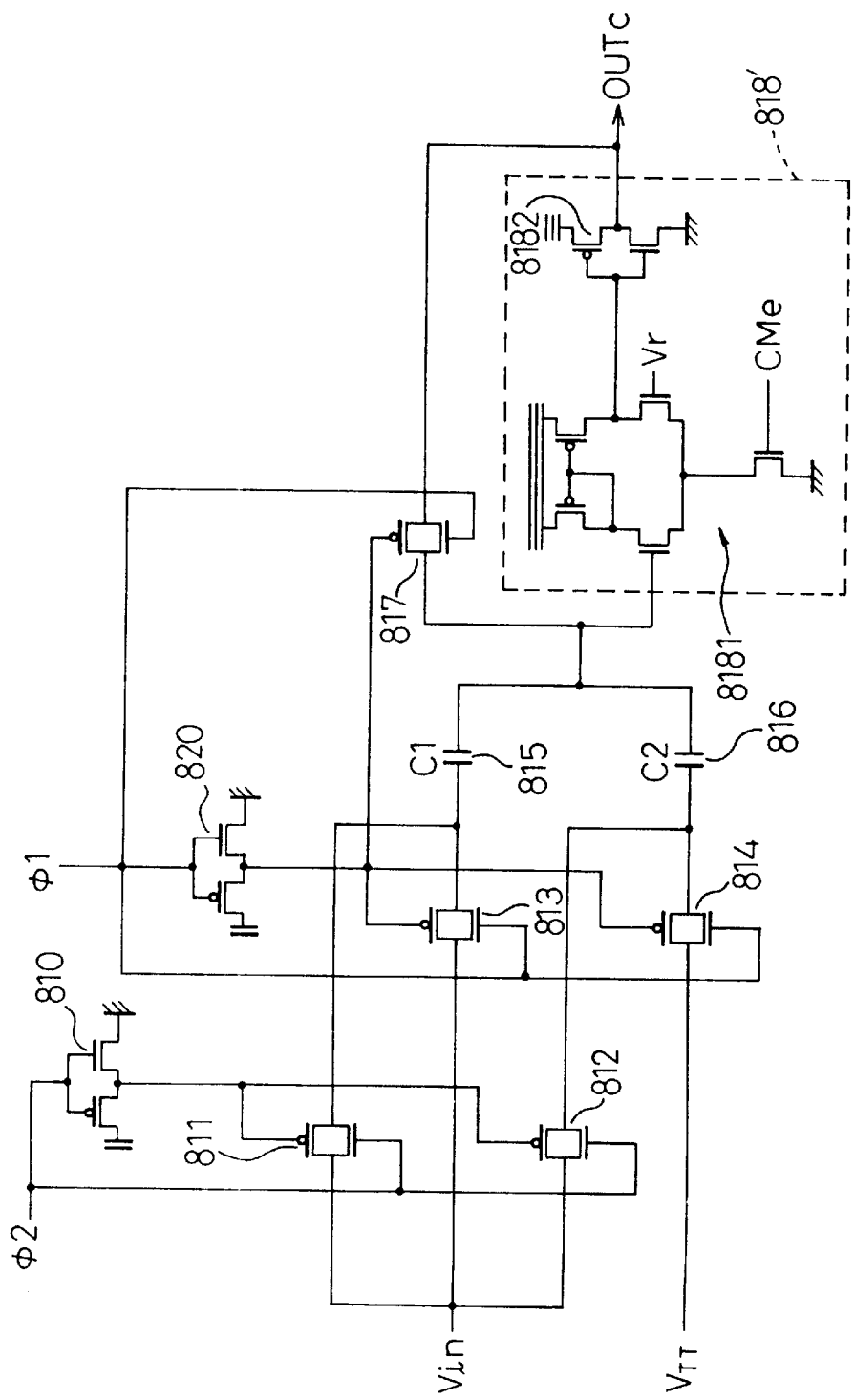
FIG. 18 is a circuit diagram showing still another example of the auto-zero comparator in the receiver circuit of FIG. 5A.

FIG. 18 is a circuit diagram showing still another example of the auto-zero comparator in the receiver circuit of FIG. 5A.

In the auto-zero comparator shown in FIG. 18, the inverter 818 in the circuit of FIG. 17 is replaced by a circuit (818′) consisting of a differential amplifier 8181 and an inverter 8182. As shown in FIG. 18, the switch (transfer gate) 817 is inserted between the signal input side of the differential amplifier 8181 and the output of the inverter 8182, and auto-zero processing is performed using this switch. The reference voltage side of the differential amplifier 8181 is supplied with reference voltage Vr. Further, the operating state of the differential amplifier 8181 is controlled by an enable signal CMe, the differential amplifier 8181 being activated for operation when the enable signal CMe is at a high level.

FIGS. 19 to 24 are block diagrams each showing an example where the signal transmission system of the present invention is applied.

Figure 19:
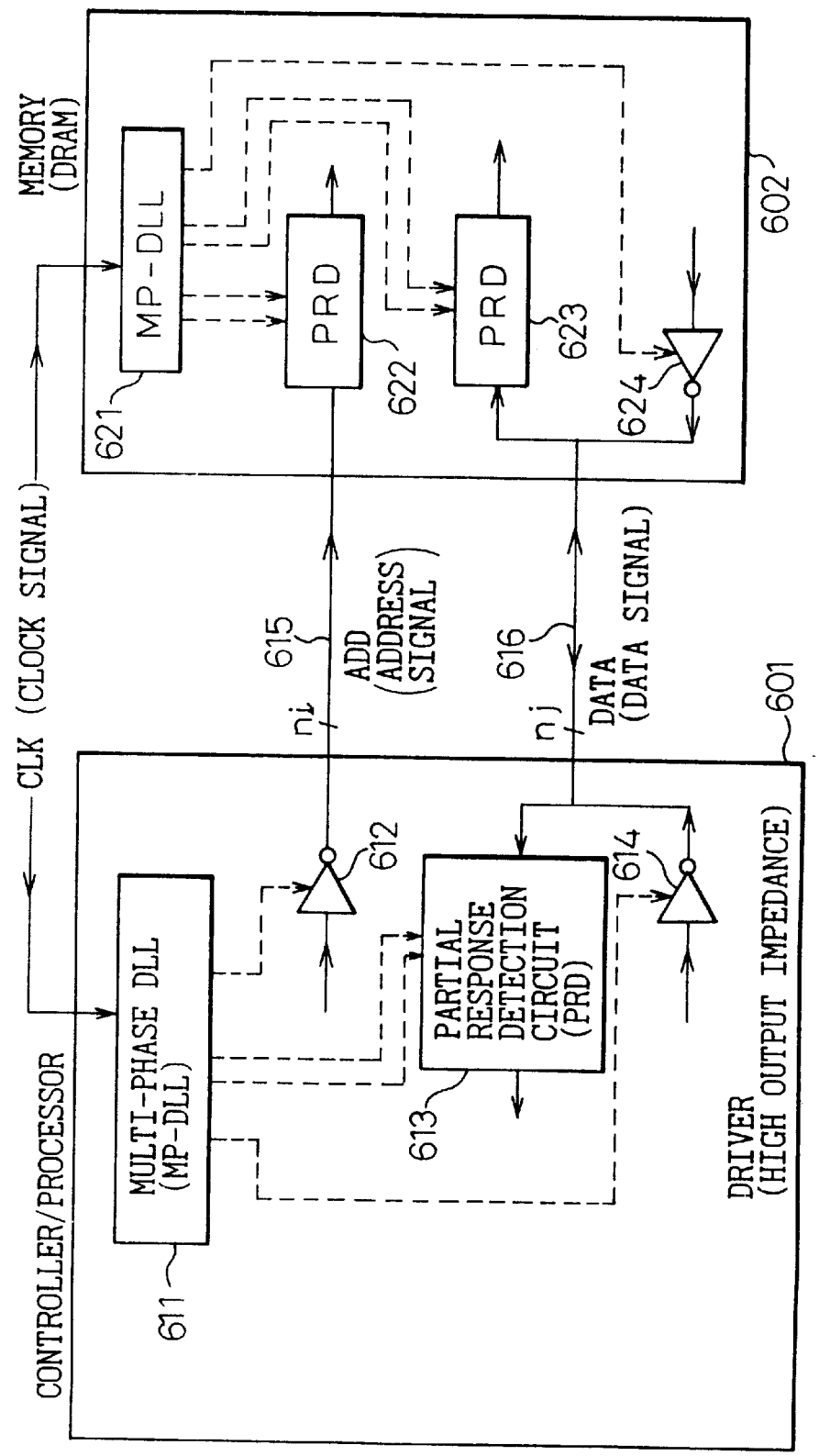
FIG. 19 is a block diagram showing a first example where the signal transmission system of the present invention is applied.

In FIG. 19, reference numeral 601 is a controller (memory controller or processor), and 602 is a memory (DRAM). The controller 601 comprises a multi-phase delay locked line (MP-DLL) 611 capable of outputting a plurality of control signals (clock signals) of different phases, a partial response detector (PRD) 613, and drivers 612 and 614. The memory 602 includes an MP-DLL 621, PRDs 622 and 623, and a driver 624.

The controller 601 and the memory 602 are interconnected by an ni-bit unidirectional address signal line (signal transmission line; address bus) directed from the controller to the memory and an nj-bit bidirectional data signal line (signal transmission line; data bus) 616. The drivers 612, 614, and 624 are of high output impedance type, as previously described, and the outputs of these drivers 612, 614, and 624 are coupled to the corresponding PRDs 622, 623, and 613, respectively, for partial response detection. Here, the configuration and operation of the PRDs 622, 623, and 613 are the same as those described with reference to FIGS. 5A, 5B, 6A, 6B, 12 to 15, etc., and the configuration of the signal transmission lines 615 and 616 is the same as that described with reference to FIGS. 2, 7 to 11, etc. In FIGS. 20 to 24 given below also, the configurations described with reference to the above-mentioned figures can be applied to the signal transmission lines (address bus and data bus), drivers, receiver circuits (PRDs), etc.

As can be seen from FIG. 19, in the controller 601, the control signals (clock signals) from the synchronously controlled MP-DLL 611 are supplied to the PRD 613 and the drivers 612 and 614, while in the memory 602, the control signals from the synchronously controlled MP-DLL 621 are supplied to the PRDs 622 and 623 and the driver 624. In the illustrated application example, the clock signal CLK is supplied to each circuit block (controller and memory) using a conventional transmission line (for example, SSTL: Series-Stub Terminal Logic).

Figure 20:
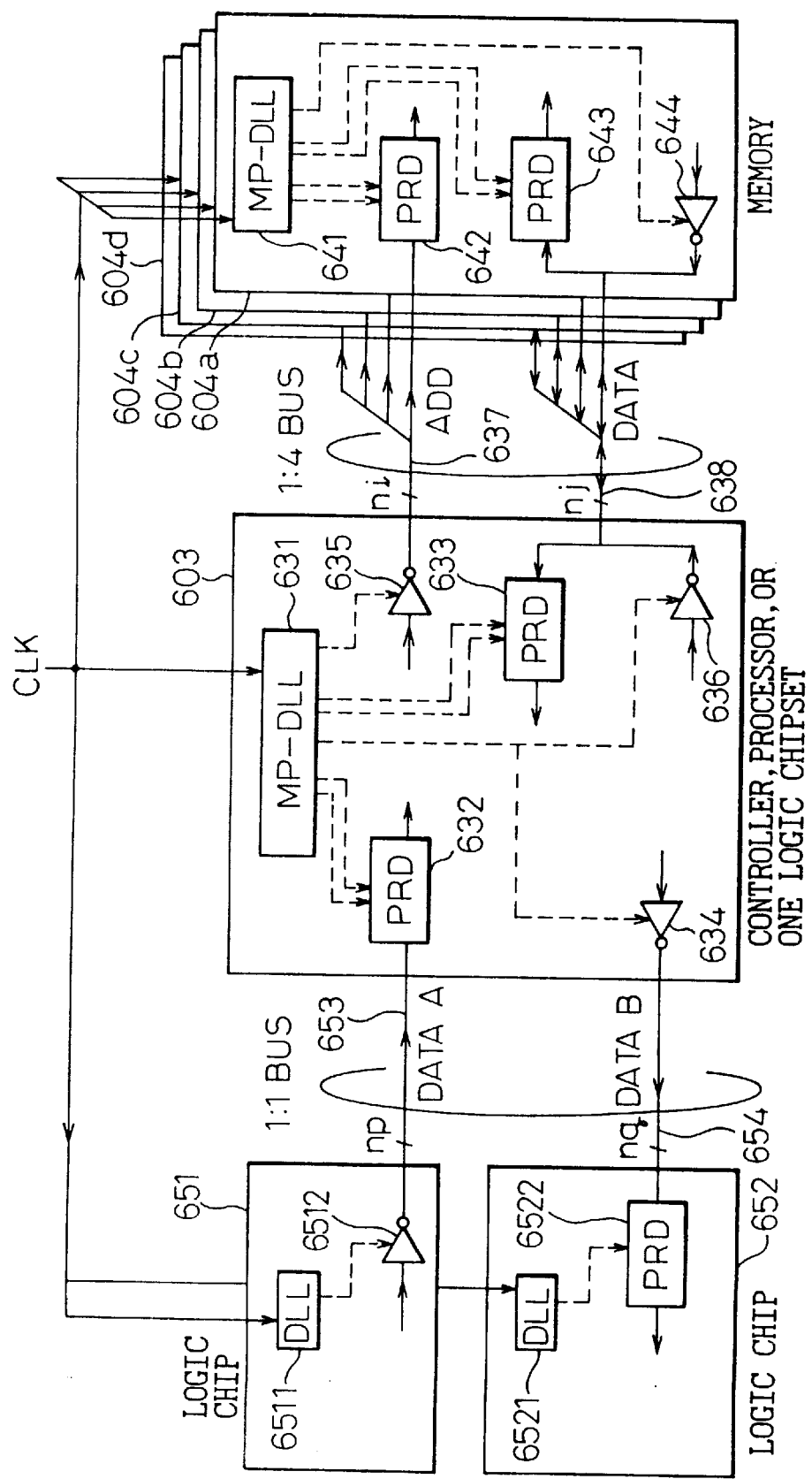
FIG. 20 is a block diagram showing a second example where the signal transmission system of the present invention is applied.

In FIG. 20, reference numeral 603 is a controller (or a processor or one chipset), 604a to 604d are memories, and 651 and 652 are logic chips. The controller 603 comprises an MP-DLL 631, PRDs 632 and 633, and drivers 634, 635, and 636. The memories 604a to 604d are of identical configuration; for example, the memory 604a comprises an MP-DLL 641, PRDs 642 and 643, and a driver 644. Further, the logic chip 651 comprises a DLL 6511 and a driver 6512, while the logic chip 652 comprises a DLL 6521 and a PRD 6522.

The controller 603 and the memories 604a to 604d are interconnected by an ni-bit unidirectional address bus 637 directed from the controller to the memories and an nj-bit bidirectional data bus 638. These buses 637 and 638 are each configured as a 1:4 bus, but it will be recognized that the number of memories is not limited to four but can be changed in various ways.

The controller 603 and the logic chip 651 are interconnected by an np-bit unidirectional data signal line (data bus A) 653 directed from the logic chip 651 to the controller 603 and an nq-bit unidirectional data signal line (data bus B) 654 directed from the controller 603 to the logic chip 652. That is, the configuration of the signal transmission line in the signal transmission system of the present invention (the signal-transmission line of the present invention) is applied to the unidirectional signal transmission lines 637, 653, and 654, and the bidirectional signal transmission line 638.

The drivers 634, 635, 636, 644, and 6512 are of a high output impedance type, and the outputs of these drivers 634, 635, 636, 644, and 6512 are coupled to the corresponding PRDs 6522, 642, 643, 633, and 632, respectively, for partial response detection. That is, the configuration of the receiver circuit in the signal transmission system of the present invention (the receiver circuit of the present invention) is applied to the PRDs 6522, 642, 643, 633, and 632. On the other hand, the configuration of the driver in the signal transmission system of the present invention (the driver of the present invention) is applied to the drivers 634, 635, 636, 644, and 6512.

As can be seen from FIG. 20, in the controller 603, the control signals from the synchronously controlled MP-DLL 631 are supplied to the PRDs 632 and 633 and the drivers 634 to 636, while in the memory 604*a* (604 a to 604 d), the control signals from the MP-DLL 641 are supplied to the PRDs 642 and 643 and the driver 644. Further, in the logic chip 651, the control signal from the DLL 6511 is supplied to the driver 6512, and in the logic chip 652, the control signal from the DLL 6521 is supplied to the PRD 6522.

Figure 21:
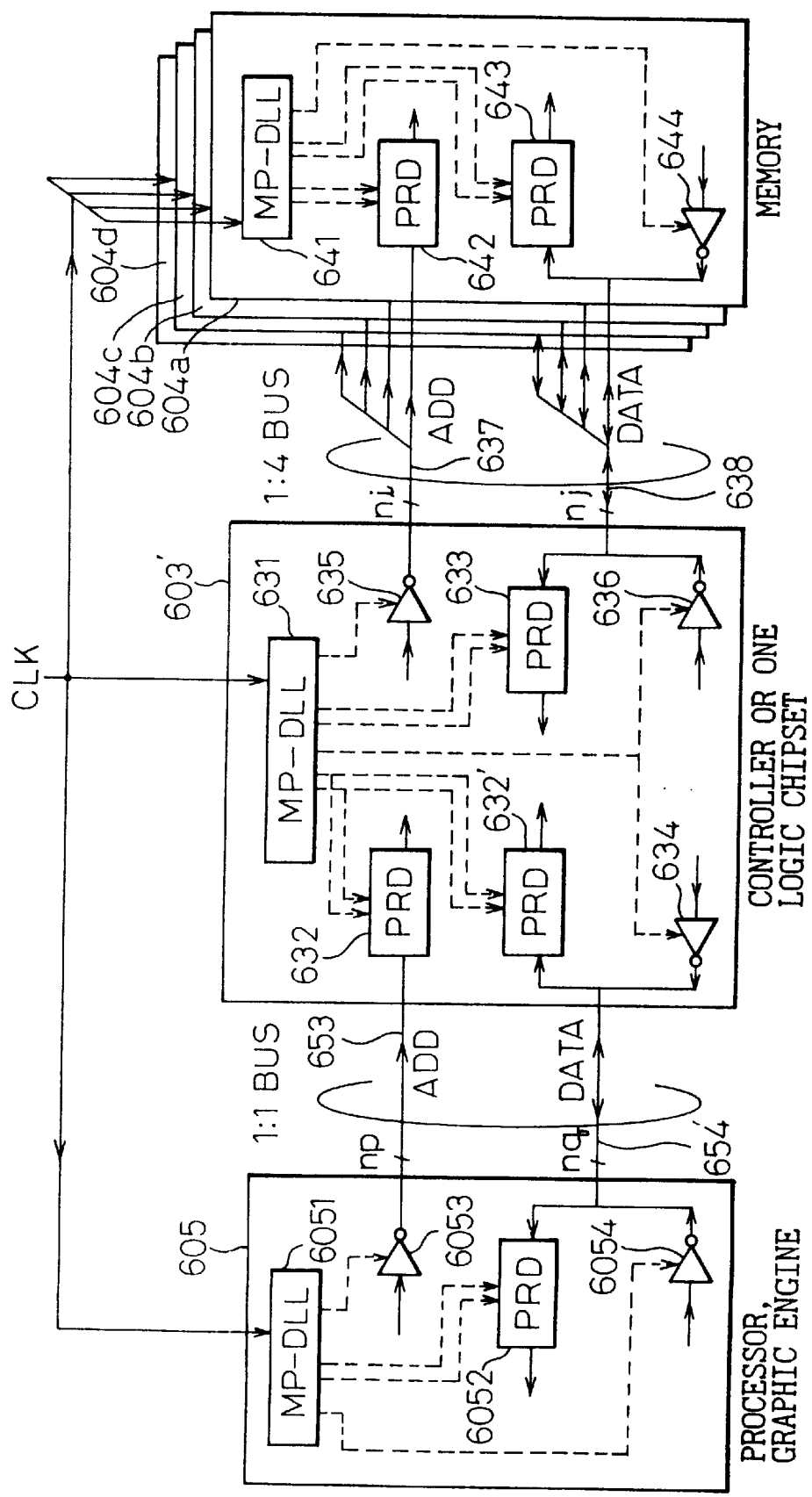
FIG. 21 is a block diagram showing a third example where the signal transmission system of the present invention is applied.

The signal transmission system shown in FIG. 21 is a modified example of the signal transmission system of FIG. 20, in which the logic chips 651 and 652 are replaced by a processor (or a graphic engine) 605. Reference numeral 603' designates a controller (or one of the logic chips).

The processor 605 comprises an MP-DLL 6051, a PRD 6052, and drivers 6053 and 6054. As is apparent from the comparison between FIGS. 20 and 21, in this application example, the unidirectional data signal line 654 in FIG. 20 is configured as a bidirectional data signal line 654', and correspondingly, a PRD 632' is provided in the controller 603'. That is, the configuration of the signal transmission line of the present invention is applied to the unidirectional signal transmission lines 637 and 653 and the bidirectional signal transmission lines 638 and 654', the configuration of the receiver circuit of the present invention is applied to the PRDs 6052, 642, 643, 633, 632, and 632', and the configuration of the driver of the present invention is applied to the drivers 634, 635, 636, 644, 6053, and 6054.

Figure 22:
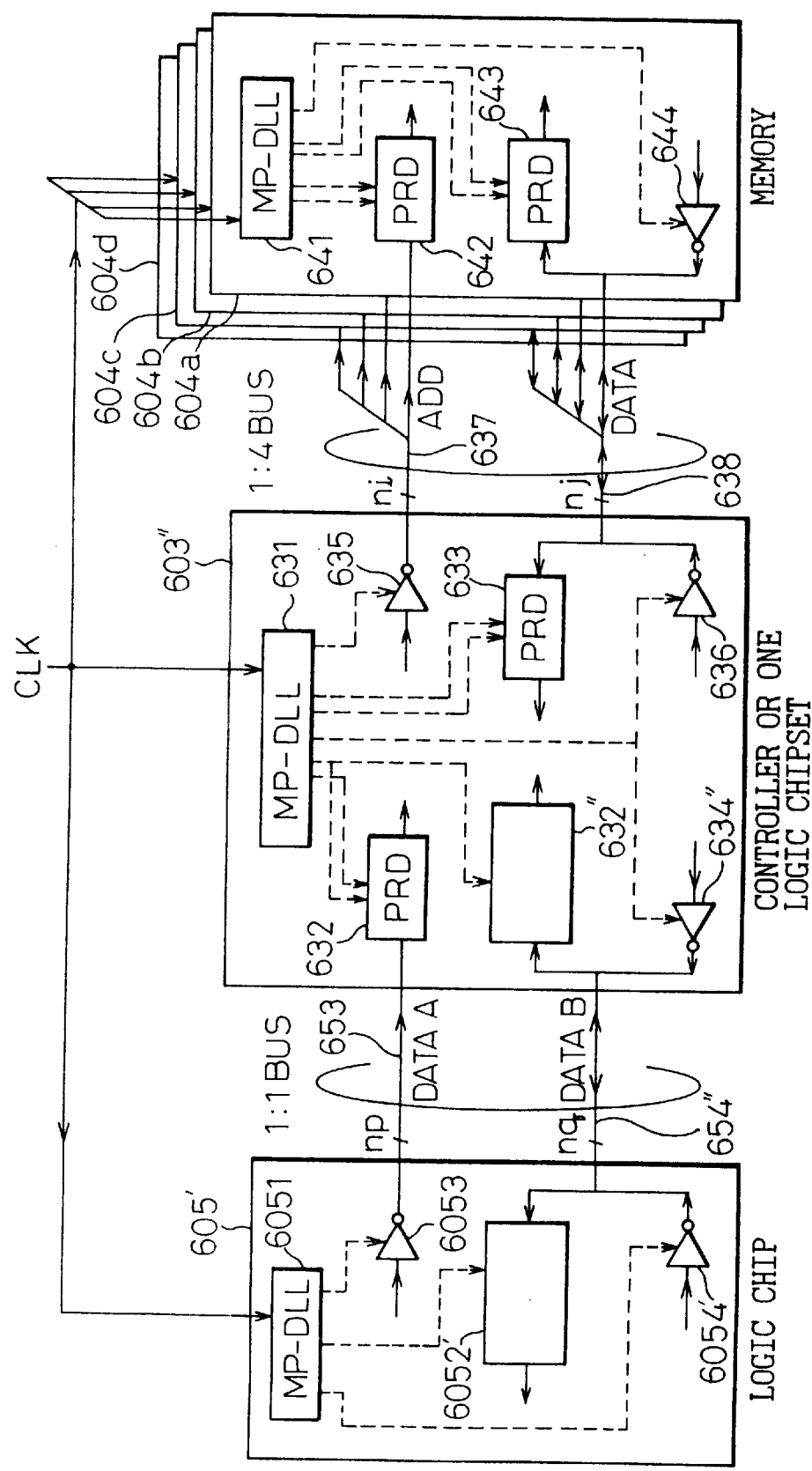
FIG. 22 is a block diagram showing a fourth example where the signal transmission system of the present invention is applied.

The signal transmission system shown in FIG. 22 is, in turn, a modified example of the signal transmission system of FIG. 21, in which the processor 605 is replaced by a logic chip 605' and the signal transmission line 654' where the present invention is applied in the signal transmission system of FIG. 21 is replaced by a conventional SSTL signal line.

More specifically, the nq-bit bidirectional signal line connecting between the logic chip 605' and controller 603" is constructed from an SSTL signal line, and drivers 6054' and 634" and receivers 6052' and 632" are configured for use with SSTL. In this way, the configuration of the signal transmission line of the present invention is applied to the unidirectional signal transmission lines 637 and 653 and the bidirectional signal transmission line 638, the configuration of the receiver circuit of the present invention is applied to the PRDs 642, 643, 633, and 632, and the configuration of the driver of the present invention is applied to the drivers 635, 636, 644, and 6053.

Figure 23:
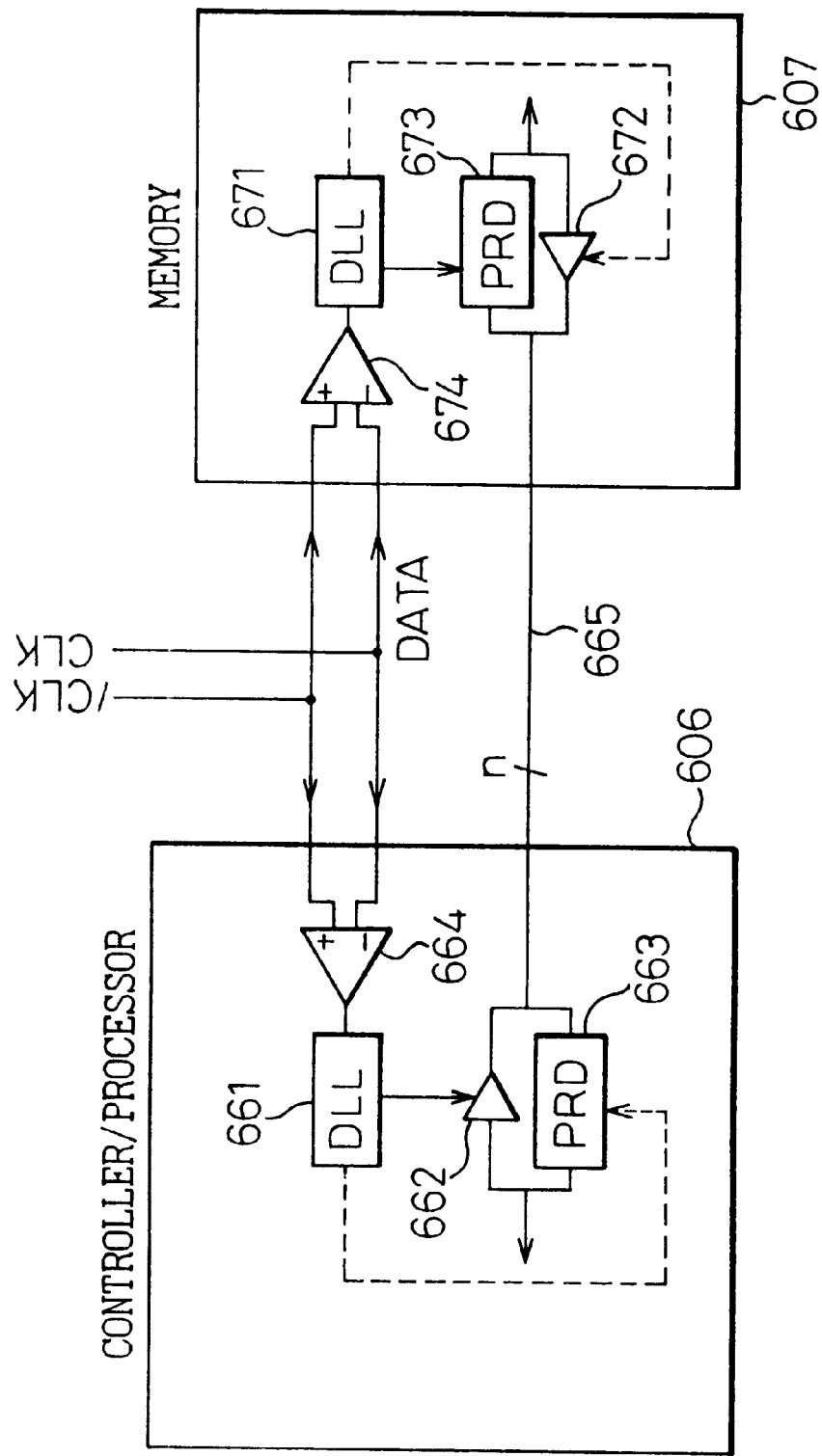
FIG. 23 is a block diagram showing a fifth example where the signal transmission system of the present invention is applied.

In FIG. 23, reference numeral 606 is a controller (or a processor), 607 is a memory, and 664 and 674 are differential amplifiers. The signal transmission system shown in FIG. 23 is constructed to supply the clock CLK as complementary signals CLK, /CLK to DLLs 661 and 671 through the differential amplifiers 664 and 674.

More specifically, the complementary clock signals CLK, /CLK are supplied to the controller 606 and memory 607, where they are differentially amplified by the respective differential amplifiers 664 and 674 before application to the respective DLLs 661 and 671. The output (control signal) of the DLL 661 is supplied to a driver 662 and PRD 663, while the output of the DLL 671 is supplied to a driver 672 and PRD 673. With this configuration, the illustrated application example achieves clock signal transmission at high speed and with low power. Here, the configuration of the signal transmission line of the present invention is applied to a bidirectional signal transmission line 665, the configuration of the receiver circuit of the present invention is applied to the PRDs 663 and 673, and the configuration of the driver of the present invention is applied to the drivers 662 and 672.

Figure 24:
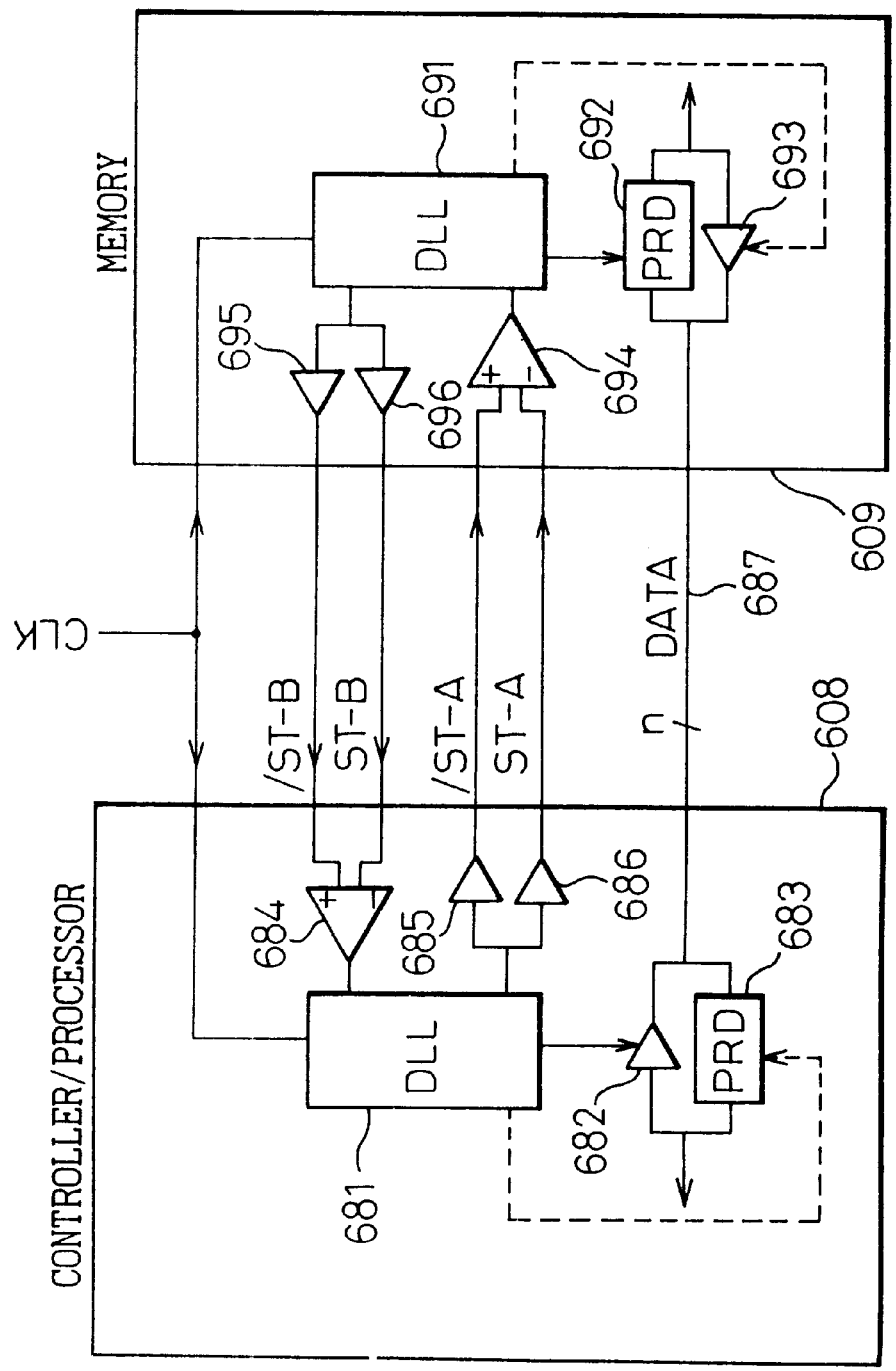
FIG. 24 is a block diagram showing a sixth example where the signal transmission system of the present invention is applied.

In FIG. 24, reference numeral 608 is a controller (or a processor), 609 is a memory, 684 and 694 are differential amplifiers, and 685, 686, 695, and 696 are drivers. In the signal transmission system shown in FIG. 24, the clock CLK is supplied using a conventional signal line, and instead, DLLs 681 and 691 are configured to output complementary strobe signals ST-B, /ST-B and ST-A, /ST-A in synchronism with data output timing. These strobe signals ST-B, /ST-B and ST-A, /ST-A are applied to the differential amplifiers 694 and 684 at the respective signal receiving sides, and PRDs 692 and 682 are controlled through the respective DLLs 691 and 681.

With this configuration, in the above application example, the same delay as the delay through the signal transmission line is offset by the delay of the strobe signals ST-B, /ST-B and ST-A, /ST-A, thereby making it possible to achieve precise synchronization of signals. Here, the configuration of the signal transmission line of the present invention is applied to a bidirectional signal transmission line 687, the configuration of the receiver circuit of the present invention is applied to PRDs 683 and 693, and the configuration of the driver of the present invention is applied to drivers 682 and 692.

As described above, the signal transmission line of the present invention is not limited in application to a bus system interconnecting a plurality of semiconductor chips (LSI chips) but can also be applied as a signal line connecting various circuit blocks.

As described in detail above, according to the signal transmission system of the second mode of the present invention, by setting the terminal resistance to a value larger than the characteristic impedance of the signal transmission line, increasing the driver output resistance, or inserting a damping resistor in parallel with the signal transmission line, signal power can be significantly reduced. Further, according to the receiver circuit in the signal transmission system of the present invention, intersymbol interference occurring in the signal transmission system is predicted from the previous signal and eliminated, thereby making accurate data reception (transmission) possible in high-speed operation.

Before describing a signal transmission system according to a third mode of the present invention, a prior art signal transmission system and problems associated with it will be described with reference to FIG. 25.

Figure 25:
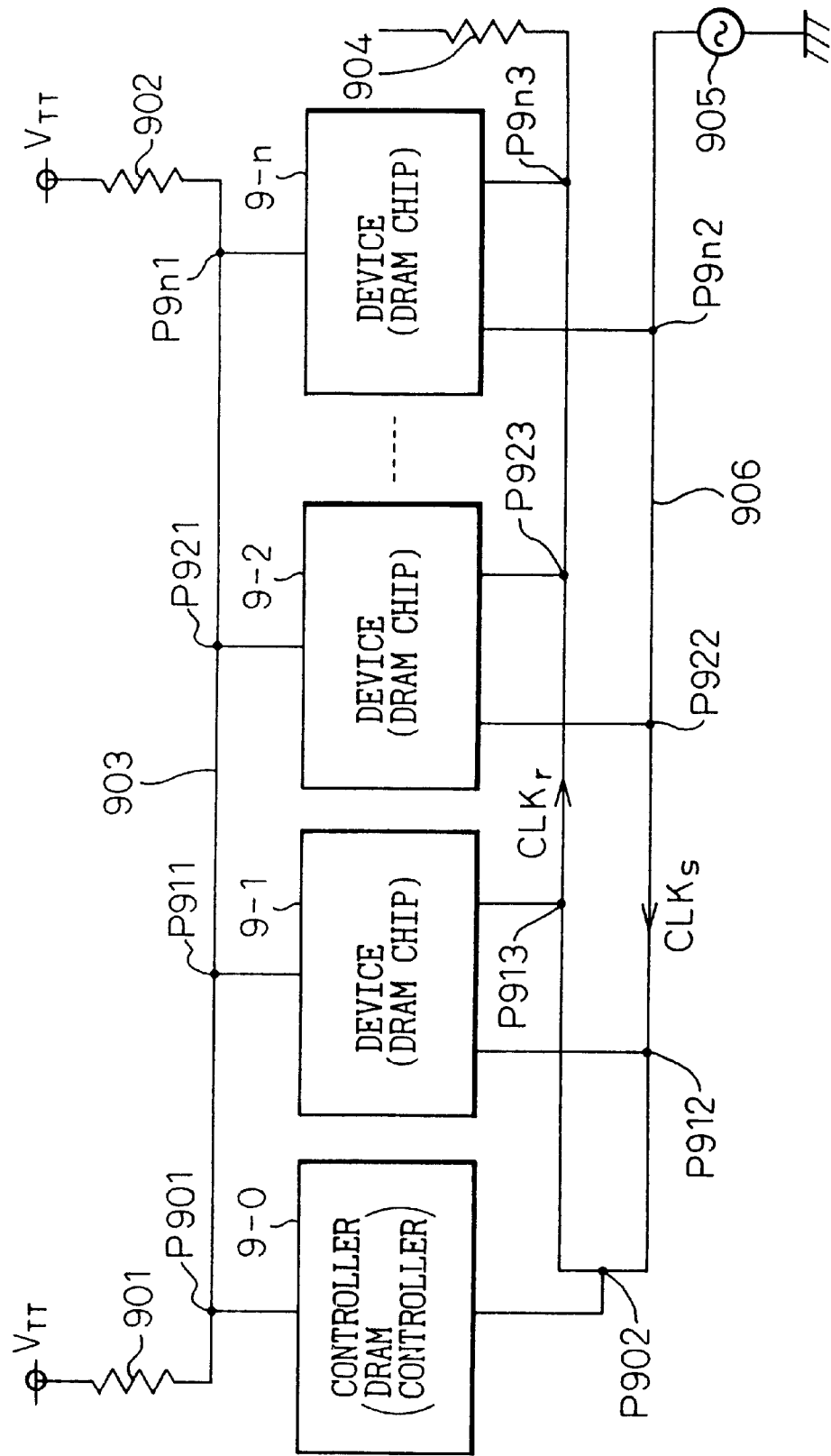
FIG. 25 is a block diagram showing in schematic form another example of a signal transmission system according to the prior art.

FIG. 25 is a block diagram showing in schematic form another example of a signal transmission system (Rambus channel) according to the prior art. In FIG. 25, reference numerals 901 and 902 are terminal resistors, 903 is a signal transmission line (bus), 904 is a clock line terminating resistor, 905 is a clock generator, and 906 is a clock line. Further, reference numeral 9-0 is a controller (DRAM controller), and 9-1 to 9-n are devices (DRAM chips). In certain configurations, the DRAM chips 9-1 to 9-n may be constructed as constituent circuits formed within a single chip or as DRAM modules such as DIMMs (dual inline memory modules) on which a plurality of DRAM chips are mounted.

As shown in FIG. 25, in the Rambus channel, the DRAM controller 9-0 and the plurality of DRAM chips 9-1, 9-2, ..., 9-n are interconnected by a common signal transmission line (bus).

For transmission and reception of high-speed signals, precise timing must be established between the signal sender and receiver. To achieve this, in the Rambus channel, a clock CLK (CLKs, CLKr) is sent on the folded clock line 906, and the DRAM controller 9-0 takes out the clock at a point (P902) near the fold-back point. Based on this clock, the DRAM controller 9-0 determines timing for receiving and sending signals.

On the other hand, each of the DRAM chips (DRAM modules) 9-1 to 9-n, when sending a signal to the DRAM controller 9-0, takes out the clock (CLKs) on the section of the folded clock line 906 going in the direction of the DRAM controller, and generates a signal transmit timing in synchronism with that clock. When receiving a signal from the DRAM controller 9-0, each of the DRAM modules (DRAMs) 9-1 to 9-n generates a receive timing by taking out the clock (CLKr) coming from the direction of the DRAM controller.

In a specific example, consider a case in which data is read out of a DRAM chip for transmission to the DRAM controller 9-0. In the case of the DRAM chip 9-1, the clock CLKs output from the clock generator 905 onto the, clock line 906 is captured at point P912 on the clock line 906, and the readout data is transmitted to the DRAM controller 9-0 via points P911 and P901 on the signal transmission line 903. In the case of the DRAM chip 9-2, the clock CLKs is captured at point P922 on the clock line 906, and the readout data is transmitted to the DRAM controller 9-0 via points P921 and P901 on the signal transmission line 903. Further, in the case of the DRAM chip 9-n, the clock CLKs is captured at point P9n2 on the clock line 906, and the readout data is transmitted to the DRAM controller 9-0 via points P9n1 and P901 on the signal transmission line 903.

Here, between the DRAM chip 9-1 and the DRAM controller 9-0, the CLKs experiences a time displacement (delay) corresponding to the distance between the point P912 and point P902 on the clock line 906, but since this displacement is offset by the time displacement (delay) corresponding to the distance between the point P911 and point P901 on the signal transmission line 903 which occurs when sending the signal (readout data) from the DRAM chip 9-1 to the DRAM controller 9-0, the DRAM controller 9-0 can receive the signal with precise (synchronized) timing.

Likewise, in the case of the DRAM chip 9-2, the time displacement corresponding to the distance between the point P922 and point P902 on the clock line 906 is offset by the time displacement corresponding to the distance between the point P921 and point P901 on the signal transmission line 903, and in the case of the DRAM chip 9-n, the time displacement corresponding to the distance between the point P9n2 and point P902 on the clock line 906 is offset by the time displacement corresponding to the distance between the point P9n1 and point P901 on the signal transmission line 903, thus enabling the DRAM controller 9-0 to receive the signal with precisely synchronized timing.

On the other hand, when transmitting a signal from the DRAM controller 9-0 to a DRAM chip, the DRAM controller 9-0 captures the clock CLKr (CLKS) at point P902 on the clock line 906, and sends out the signal via point P901 onto the signal transmission line 903. In a specific example, when transmitting a signal (write data) to the DRAM chip 9-1, the write data is displaced (delayed) by a time corresponding to the distance between the point P901 and point P911 on the signal transmission line 903. However, since the clock CLKr transmitted to the DRAM chip 9-1 is also displaced by a time corresponding to the distance between the point P902 and point P913 on the clock line 906, the displacement of the signal (write data) is offset so that the DRAM chip 9-1 can perform a write operation by receiving the write data with precise (synchronized) timing.

Likewise, in the case of the DRAM chip 9-2, the time displacement of the write data corresponding to the distance between the point P901 and point P921 on the signal transmission line 903 is offset by the time displacement of the clock signal CLKr corresponding to the distance between the point P902 and point P923 on the clock line 906, and in the case of the DRAM chip 9-n, the time displacement of the write data corresponding to the distance between the point P901 and point P9n1 on the signal transmission line 903 is offset by the time displacement of the clock signal CLKr corresponding to the distance between the point P902 and point P9n3 on the clock line 906, thus enabling each DRAM chip to accomplish a write operation with precise timing.

In this way, in the signal transmission system (Rambus channel) shown in FIG. 25, correct timing can be established for both reception and transmission, provided that the clock line 906 and the signal transmission line 903 are identical both in routing and in electrical characteristics. That is, the signal transmission system shown in FIG. 25 requires that the clock line 906 and the signal transmission line 903 be formed along the same route and have the same electrical characteristics between them.

However, the characteristic of the load is inevitably different between the clock line 906 and the signal transmission line (bus) 903. This is because, while the signal transmission line 903 permits the use of a latch circuit operating in synchronism with receive timing to achieve high-sensitivity reception, the clock line 906 requires the use of a differential amplifier, etc. since a latch cannot be used. Since the nature of the load is different between a latch circuit and a differential amplifier and the like, line electrical characteristics (for example, delay per unit distance), etc. are bound to become different between the clock line and the signal transmission line. Even if the load characteristic were made exactly the same between them, it would not be possible to arrange the clock line exactly along the same route as the signal transmission line when the actual routing of wiring on the board is considered. As a result, at higher frequencies, it becomes increasingly difficult to generate correct timing in the signal transmission system shown in FIG. 25.

Furthermore, in currently commercialized signal transmission systems, including the one shown in FIG. 25, in applications where signal transmitting source is constantly switched from one device to another on the bus (signal transmission line), it has been necessary to provide a gap (time allowance) between signals. This gap has been provided to prevent signal overlapping that could result in erroneous reception. To eliminate or minimize this gap, extremely precise control of transmit/receive timing becomes necessary, but this also becomes increasingly difficult with increasing frequency.

The need therefore arises for a signal transmission system that can generate timing signals without demanding symmetry between the clock line and the signal line (signal transmission line: bus), and that can minimize the gap when switching is made from one transmitting device to another.

Hereinafter, a brief description will be given of the features of the third mode of the present invention, followed by a detailed description of the signal transmission system according to the third mode of the invention.

In the third mode of the present invention, common timing is generated with an accuracy of time sufficiently shorter (for example, about 10 percent) than the maximum time required for a signal to travel through the signal transmission line, and all elements (devices, LSI chips, etc.) are configured to operate with this common timing. The common timing here is synthesized from clocks travelling in opposite directions on the clock line. Furthermore, the receiver side is provided with a function to eliminate intersymbol interference (using a PRD, etc. See FIGS. 4A, 4B, 12, 13, 14, and 15), and all elements are configured to operate with the common timing.

The time for a signal from an element to reach a receiving element (for example, the controller) varies according to the signal travelling time. When switching is made from one transmitting element to another transmitting element, intersymbol interference increases because the reception is performed using the common timing but with the above time difference. However, by using intersymbol interference eliminating means at the receiving end, signals from any transmitting element (device, LSI chip, etc.) can be received using the common timing; furthermore, for adjusting the receive/transmit timing for each element, a low-cost circuit can be used since strict timing adjustment is not necessary when the intersymbol interference eliminating (estimating) means (PRD) is used.

Figure 26:
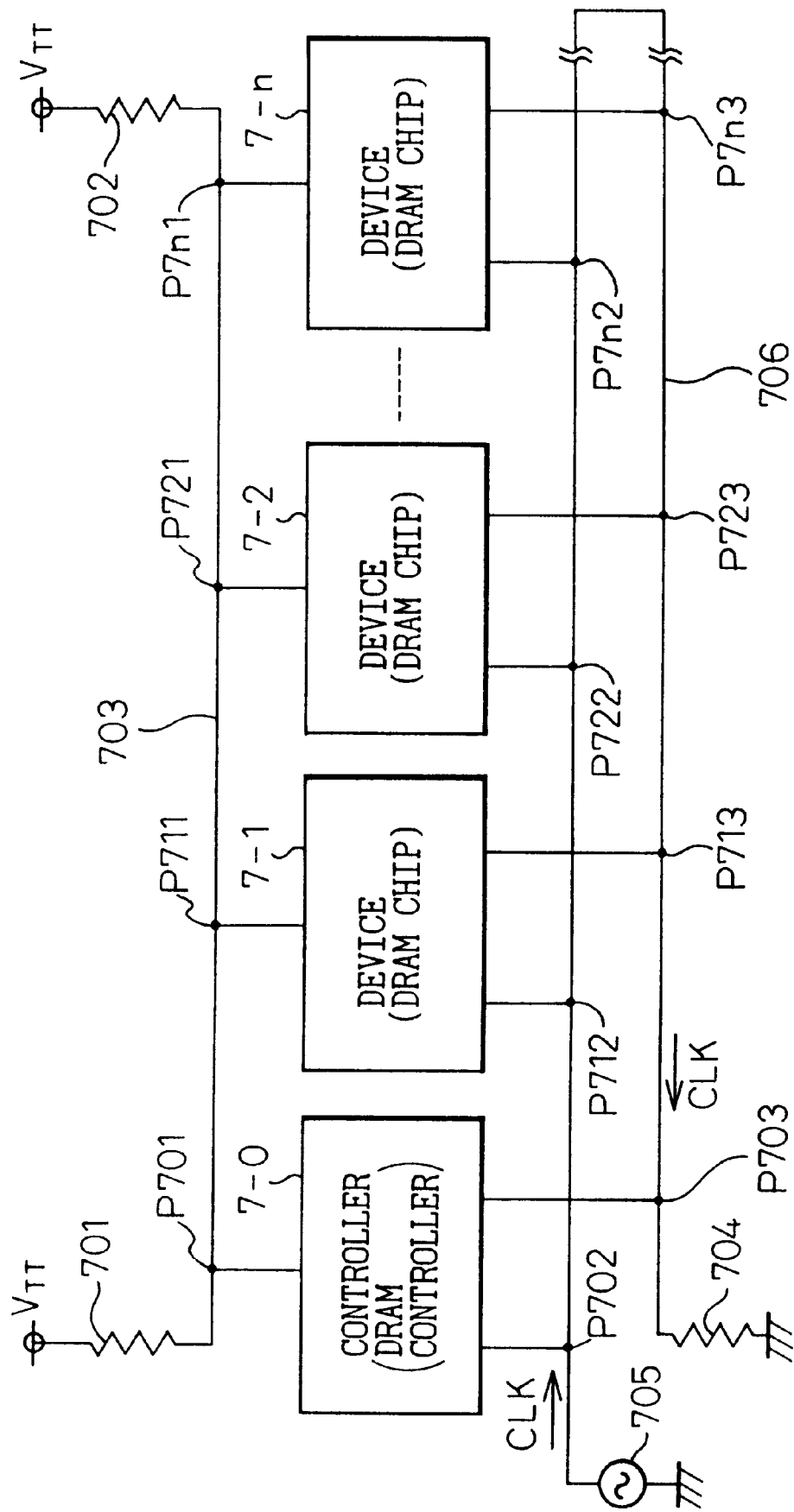
FIG. 26 is a block diagram showing the basic functional configuration of a signal transmission system according to a third mode of the present invention.

More specifically, the features of the third mode of the present invention are that all the devices (chip constituent circuits, DRAM chips, or DRAM modules, etc.) use a common reference time (hereinafter sometimes referred to as GMT: Global Mean Time) as the common time reference, that the previously described reception system (the receiver circuit in the signal transmission system according to the second mode of the present invention) configured to eliminate intersymbol interference is used for reception, and that a push-pull driver (a constant-current or a high output resistance push-pull driver) is used as the driver circuit. As a result, gapless transmission becomes possible when performing read/write operations on different devices; moreover, the transmission characteristic of the data clock line (clock line) extending along the previously described data line (transmission signal line) need not be made identical to that of the data line, and the need for the control (Rambus channel, vernier, etc.) of the transmit clock (CLKs) and receive clock (CLKr) can be eliminated FIG. 26 is a block diagram showing the basic functional configuration of the signal transmission system according to the third mode of the present invention. In FIG. 26, reference numerals 701 and 702 are terminal resistors, 703 is a signal transmission line (bus), 704 is a clock line terminating resistor, 705 is a clock generator, and 706 is a clock line. Further, reference numeral 7-0 is a controller (DRAM controller), and 7-1 to 7-n are devices (DRAM chips). Alternatively, the DRAM chips 7-1 to 7-n may be constructed as constituent circuits formed within a single chip or as DRAM modules such as DIMMs on which a plurality of DRAM chips are mounted, and the DRAMs may be replaced by EPROMs (erasable programmable read-only memories) or flash EEPROMs (electrically erasable programmable read-only memories). Further, the controller (7-0) may be constructed from an ASIC (application specific integrated circuit), a graphic controller, or a microprocessor or the like.

Figure 27:
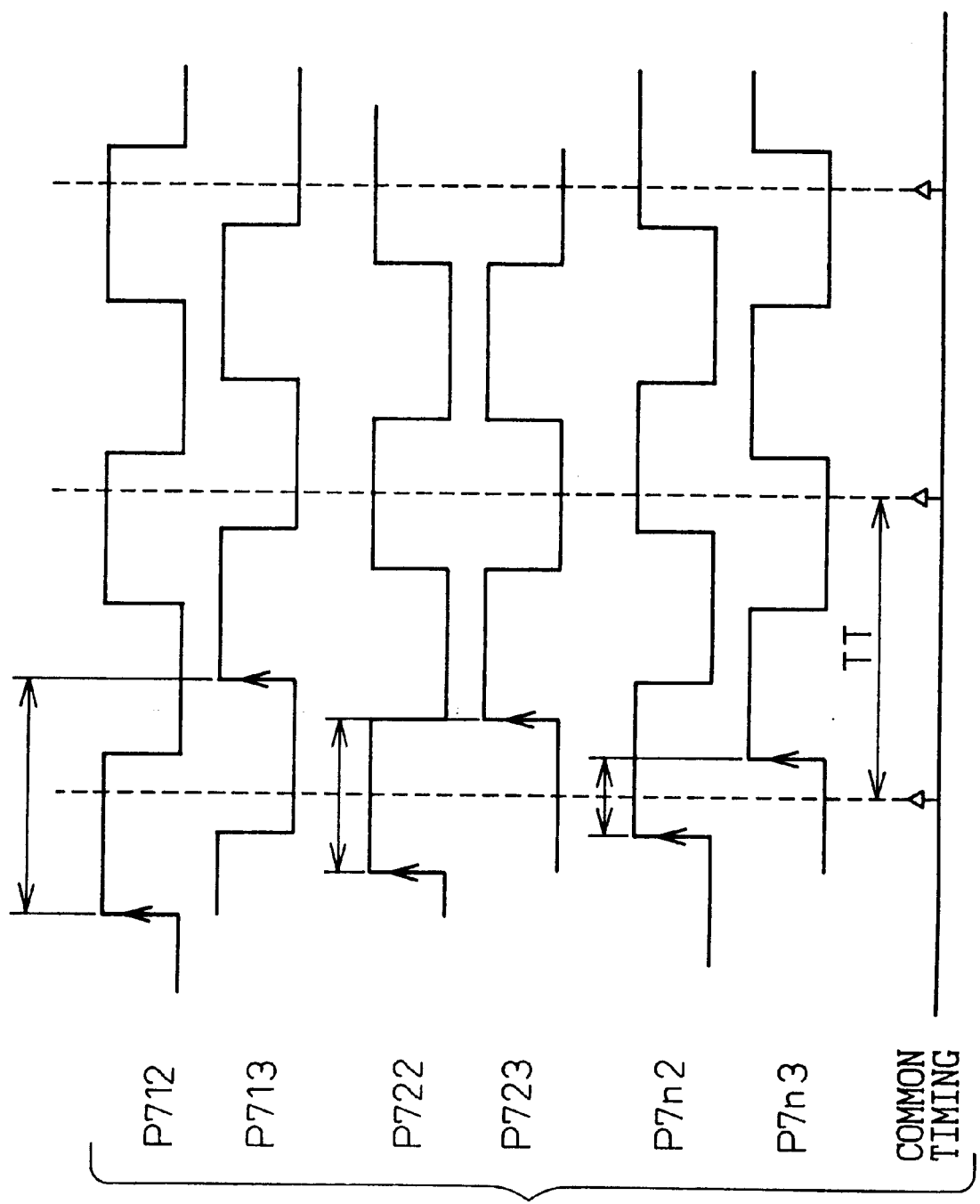
FIG. 27 is a diagram (part 1) for explaining the operation of the signal transmission system of FIG. 26.

FIG. 27 is a diagram (part 1) for explaining the operation of the signal transmission system of FIG. 26.

As shown in FIGS. 26 and 27, the common reference time (common timing) GMT for all of the DRAM controller 7-0 and DRAM chips 7-1 to 7-n connected to the signal transmission line 703 is created using the folded clock line 706. More specifically, in the third mode of the present invention, rather than using the transmit clock CLKs and receive clock CLKr, the common timing GMT is created by taking an intermediate timing between the forward and backward travelling clocks on the folded clock line 706.

More specifically, the DRAM chip 7-1 captures the forward travelling clock CLK at point P712 on the clock line 706 and the backward travelling clock CLK at point P713 on the clock line 706, and generates the common reference time GMT as the common timing by taking an intermediate timing (intermediate phase) between these two clocks. Similarly, the DRAM chip 7-2 captures the forward and backward travelling clocks CLKs at point P722 and point P723, respectively, on the clock line 706, and generates the common reference time GMT as the common timing by taking their intermediate timing, and the DRAM chip 7-n captures the forward and backward travelling clocks CLKs at point P7n2 and point P7n3, respectively, on the clock line 706, and generates the common reference time GMT as the common timing by taking their intermediate timing. In this way, the common timing (common reference time GMT) can be obtained accurately for each cycle TT regardless of the position of each DRAM chip on the clock line 706.

In this case, the forward and backward sections of the clock line 706 must be routed exactly along the same path (route), but there will be no problem if the transmission characteristic of the clock line 706 itself differs substantially from that of the signal transmission line (data line) 703. Furthermore, the, folded clock line 706 can be routed along a different path than the data line 703. That is, the common timing GMT can be created by just selecting the intermediate phase between the forward and backward travelling clocks. There is an upper limit on the length of the clock line 706 for the common reference time GMT to be determined uniquely, but in practice, since the limit to the length of the clock line 706 can be increased n times (for example, four times) by dividing the clock CLK by n (for example, 4) and using the resulting clock having four times the cycle (¼ the frequency), the common timing GMT can be distributed over a distance that does not present practical problems. In this case, the DRAM controller 7-0 and the DRAM chips 7-1 to 7-n are each provided with a PLL circuit or a DLL circuit that performs a multiply-by-n operation (for example, multiply-by-4 to multiply the frequency by 4) to recover the original clock whose cycle has been increased by a factor of n (for example, 4).

In this way, the common timing can be generated by using the folded clock line 706 and creating a signal having a phase intermediate between the forward and backward travelling clocks, but it should be noted here that what are needed are the signals that travel in opposite directions along the clock route and that the clock line need not necessarily be folded back. For example, as will be described later, the forward and backward travelling clocks can be placed simultaneously on a single clock line (this condition is equivalent to producing a standing wave along the clock line). A clock with the same phase can always be obtained at any given point on a standing wave when the length of the clock line is equal to a half wavelength. This shows that the common timing can also be distributed by using a standing wave.

Next, a receiver circuit exemplified by the previously described partial response detector (PRD) see FIGS. 4A, 4B, 12, 13, 14, and 15) is used as the circuit for receiving signals. Here, a limit is imposed on the length L of the data line (bus) 703 in order to use the PRD. In the illustrated example, the condition is imposed that the time required for a wave to make a round trip (the round trip time) should not exceed signal bit time T. In practice, this condition can be eased a bit.

Figure 28A:
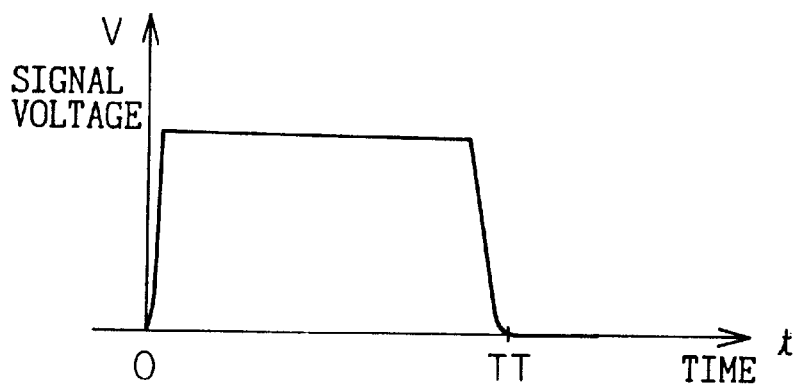
FIGS. 28A and 28B are diagrams (part 2) for explaining the operation of the signal transmission system of FIG. 26.
Figure 28B:
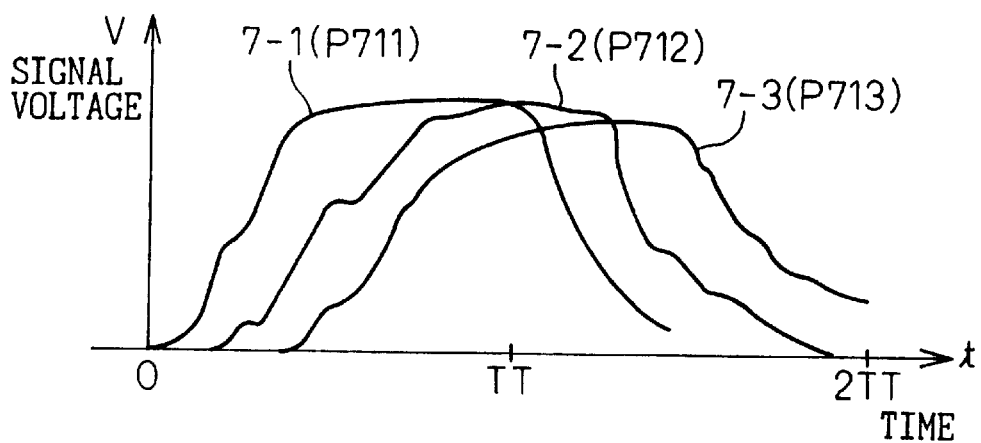

FIGS. 28A and 28B are diagrams (part 2) for explaining the operation of the signal transmission system of FIG. 26: FIG. 28A shows a unit pulse signal that the DRAM chips 7-1 to 7-n transmit, and FIG. 28B shows waveforms when the signals transmitted from the DRAM chips 7-1 to 7-n are received by the DRAM controller 7-0.

As shown in FIG. 28B, if the signals are received with the common timing (t=TT) at the receiving end (the DRAM controller 7-0) by eliminating intersymbol interference, and if an upper limit on the delay from each device (DRAM chip) is determined so that any device can produce a sufficient signal strength, then all the devices can perform transmission and reception using the common timing. Here, each device transmits a new signal in synchronism with the beginning of the bit time and receives a signal in synchronism with the end of the bit time. The transmit and receive timings may each be displaced slightly forward or backward to optimize signal strength, but the time reference is always the common timing TT.

Each driver circuit is constructed as a push-pull driver (a constant-current or a high output resistance push-pull driver). A high output resistance driver means a driver-that has an output impedance higher than the characteristic impedance of the signal line, though it may not be as high as that of a constant-current driver. Specifically, such a driver is constructed, for examples by appropriately reducing the size of an output transistor in a CMOS driver.

With this configuration, if any of the driver circuits (the DRAM controller 7-0 and the DRAM chips 7-1 to 7-n) drives the bus 703 (or if none of the driver circuits drive the bus), the time constant (more precisely, the response function) of the bus is constant, independently of time. That is, the system becomes a "linear time-invariant system", and therefore, the received signal is obtained as a superposition of unit pulse responses h (t).

If h(t) is obtained in the worst-case condition, that is, when the round trip time is just equal to the signal bit time T, h(nT) normalized by the final value of the step response is 0, 1−s2, (1−s2)S2, (1−s)S**4 . . . for n=0, 1, 2, . . .

Here, S is a coefficient for voltage reflection at a line end, assuming that both ends of the line are terminated in the same resistance. When Exp(−T/τ)=s**2, this is nothing but an exponential response.

It can be seen that if S**2 is set to about 0.5, the signal can be received without any problem by using the PRD. This reflection coefficient, when converted to the value of the terminal resistance $R_T$ (701, 702), is 5.8 times the characteristic impedance. This value is equivalent to a terminal resistance of 290 ohms in a 50-ohm system, which means that reception can be made easier if the terminal resistance is reduced slightly since intersymbol interference then decreases.

Next, if the value of the driver current is assumed to be io=3.5 mA, for example, the final value of the step response is io×$R_T$/2, which is approximately equal to 500 mV. By multiplying this by 1−s2, we obtain a net signal magnitude of 250 mV. This shows that reception by the PRD is possible even in the worst-case condition. Accordingly, even when the signal source switches from one chip to another (7-1 to 7-n), since the amplitude of the transient voltage wave on the bus decays by a factor of s2 for every T, intersymbol interference can be eliminated by the PRD and reception is possible without any problem. Gapless transmission can thus be achieved.

Now that reception is possible in the worst-case condition, all the devices (chips) need only send or receive signals with the timing of the common reference time GMT. This means that there is no need to use a vernier or a PLL (phase-locked loop) or DLL synchronized to the transmit and receive clocks as in the Rambus channel.

In this way, in the signal transmission system according to the third mode of the present invention, since the intersymbol interference is eliminated in the receiver circuit, all the devices can use the common timing signal with a given accuracy. The given accuracy mentioned here is based on the premise that a certain degree of timing error is allowed as long as the error is not large enough to render the elimination of intersymbol interference impossible; this means an accuracy of time sufficiently shorter (for example, about 10 percent) than the time required for a signal to propagate (travel) though the signal line. Furthermore, generation of the common timing signal only requires the provision of clocks travelling in opposite directions (forward and backward) along the clock route, and there is no need at all to make the electrical characteristic or the route of the clock line coincide with that of the signal line. This offers the advantage that no limitations exist on the arrangement or configuration of the clock line.

Various embodiments of the signal transmission system according to the third mode of the present invention will now be described below with reference to the accompanying drawings.

Figure 29:
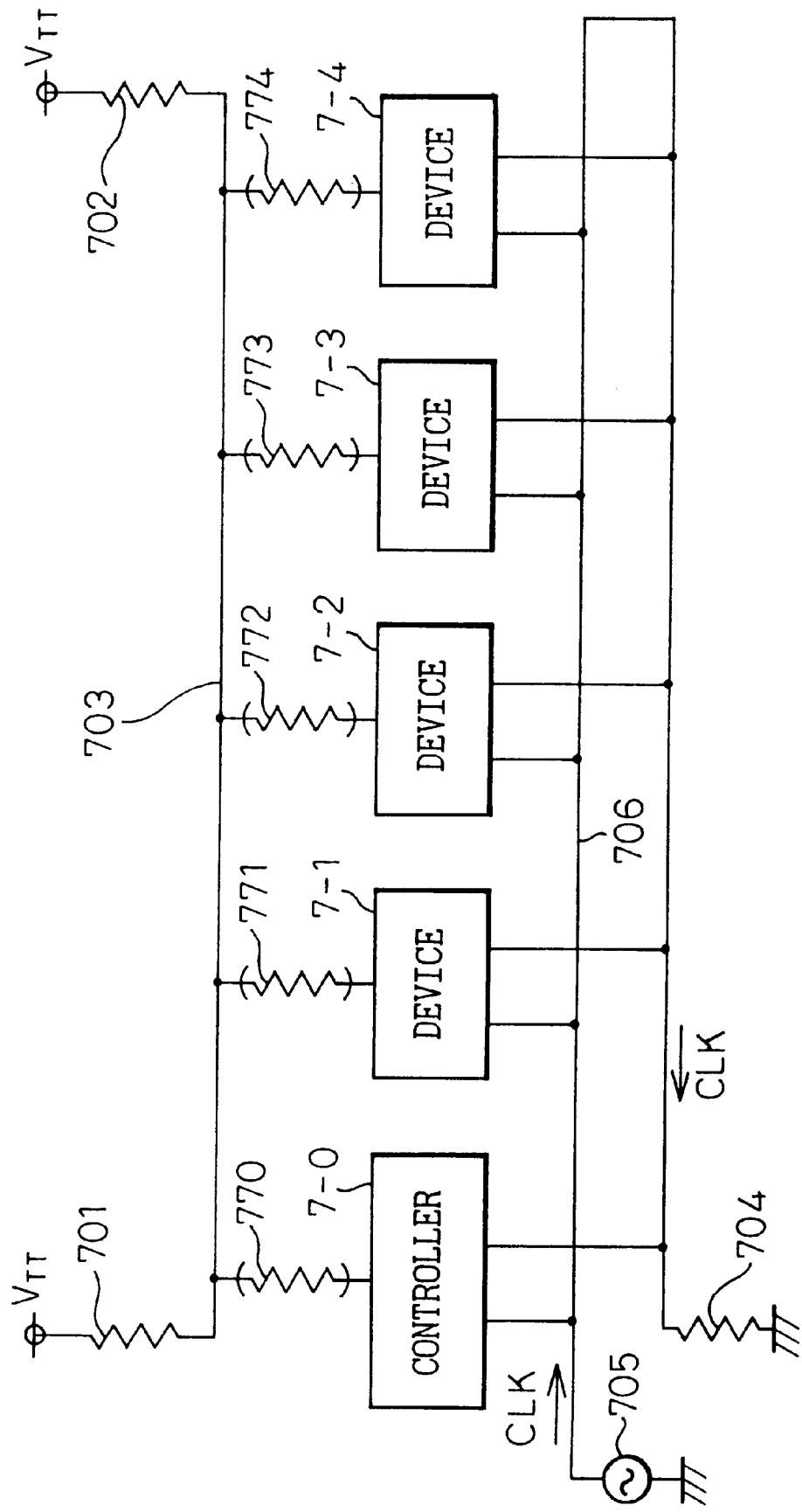
FIG. 29 is a block diagram showing a first embodiment of the signal transmission system according to the third mode of the present invention.

FIG. 29 is a block diagram showing a first embodiment of the signal transmission system according to the third mode of the present invention. In FIG. 29, reference numerals 701 and 702 are terminal resistors, 703 is a signal transmission line (bus), 704 is a clock line terminating resistor, 705 is a clock generator, 706 is a clock line, and 770 to 774 are stub resistors. Further, reference numeral 7-0 is a controller (DRAM controller), and 7-1 to 7-4 are devices (DRAM chips).

As explained with reference to FIGS. 26 and 27, the DRAM controller 7-0 and the DRAM chips 7-1 to 7-4 are each configured to capture the forward and backward travelling clocks on the folded clock line 706 and generate the intermediate-phase signal as the common timing signal (common reference time GMT). The DRAM controller 7-0 and the DRAM chips 7-1 to 7-4 perform signal transmission and reception in synchronism with the common timing signal (GMT). Here, the terminal resistors 701 and 702 are each formed, for example, from a 250-ohm resistor, and the stub resistors 770 to 774 are each formed, for example, from a 25-ohm resistor.

In this way, according to the first embodiment of the signal transmission system in the third mode of the present invention, the common timing signal (GMT) can be obtained as an intermediate timing between the forward and backward travelling clocks on the folded clock line 706. That is, a common timing signal providing an accurate common timing can be obtained regardless of the position of each DRAM chip on the clock line 706.

Figure 30:
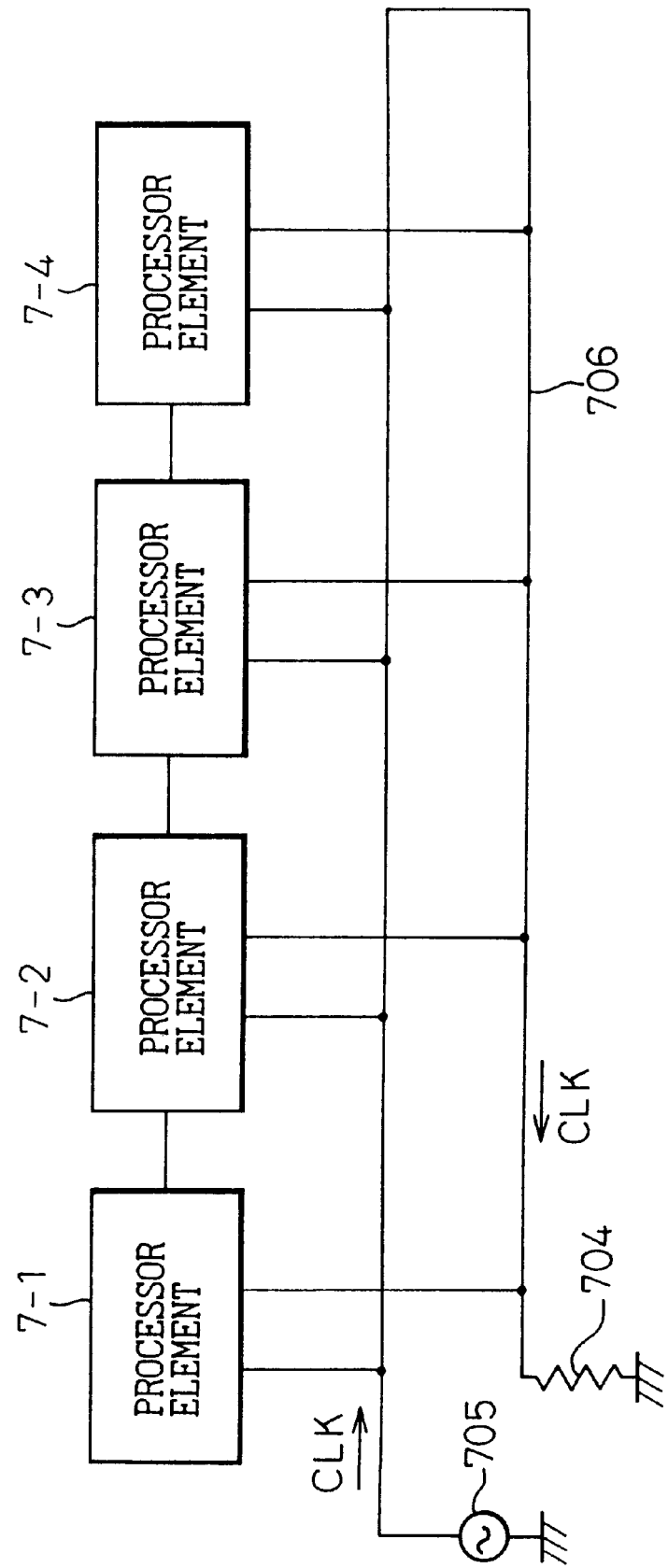
FIG. 30 is a block diagram showing a modified example of the signal transmission system of FIG. 29.

FIG. 30 is a block diagram showing a modified example of the signal transmission system of FIG. 29. This example shows a multi-processor system. In FIG. 30, reference numerals 7-1 to 7-4 indicate processor elements.

As shown in FIG. 30, the third mode of the present invention is not limited in application to a signal transmission system using a bus (signal transmission system) 703, such as the one shown in FIG. 29, but cart also be applied to a multi-processor system in which processors are connected on a one-to-one basis.

Figure 31:
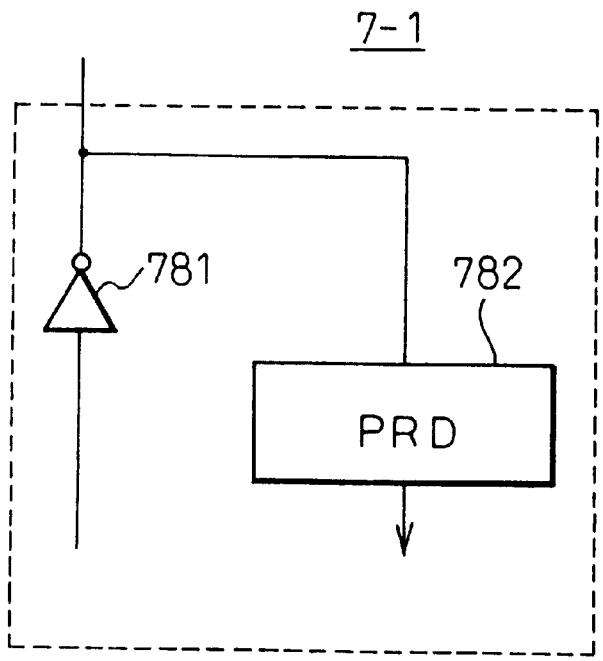
FIG. 31 is a block diagram showing one configurational example of an essential portion of each device in the signal transmission system according to the third mode of the present invention.

FIG. 31 is a block diagram showing one configurational example of an essential portion of each device in the signal transmission system according to the third mode of the present invention. In FIG. 31, reference numeral 781 is a driver circuit, and 782 is a PRD (partial response detector).

As shown in FIG. 31, the DRAM chip 7-1 (each of the DRAM chips 7-2 to 7-4 or the DRAM controller 7-0) is mounted with the PRD 782 to eliminate the effects of intersymbol interference, and is configured to perform data reception with the common timing TT by reducing the effects of intersymbol interference in the received waveforms such as those shown in FIG. 28B. In this way, when the PRD 782 including an auto-zero comparator (see FIGS. 5A and 16 to 18) is used as the receiver circuit, large intersymbol interference can be eliminated using simple circuitry.

Figure 32:
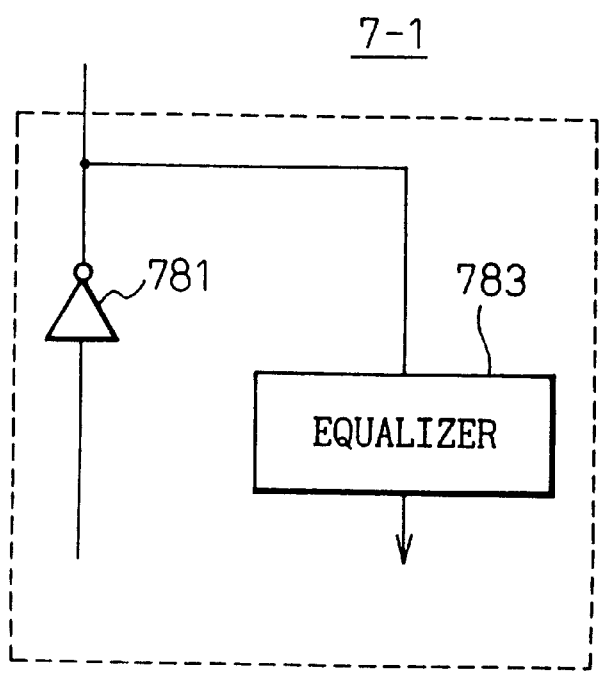
FIG. 32 is a block diagram showing another configurational example of an essential portion of each device in the signal transmission system according to the third mode of the present invention.

FIG. 32 is a block diagram showing another configurational example of an essential portion of each device in the signal transmission system according to the third mode of the present invention. In FIG. 32, reference numeral 781 is a driver circuit, and 783 is an equalizer.

As shown in FIG. 32, the DRAM chip 7-1 (each of the DRAM chips 7-2 to 7-4 or the DRAM controller 7-0) is mounted with the equalizer 783 to minimize the effects of intersymbol interference. That is, in the illustrated configuration, as the receiver circuit, the equalizer 783 is used instead of the PRD 782 of FIG. 31, and data reception is performed with the common timing TT by reducing the effects of intersymbol interference in the received waveforms such as those shown in FIG. 28B.

Figure 33:
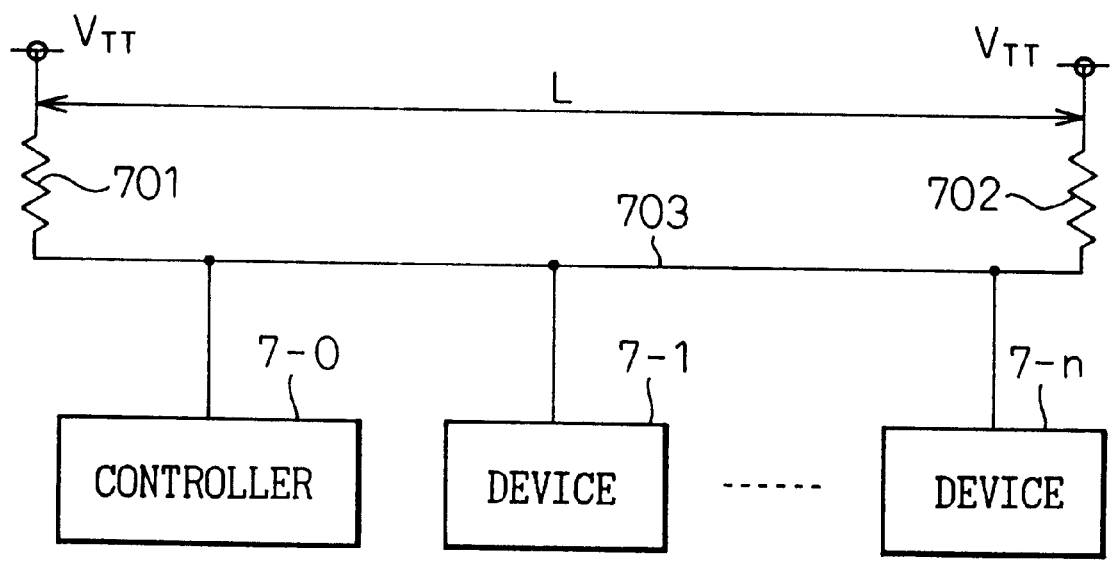
FIG. 33 is a block diagram showing a second embodiment of the signal transmission system according to the third mode of the present invention.

FIG. 33 is a block diagram showing a second embodiment of the signal transmission system according to the third mode of the present invention.

As shown in FIG. 33, in the second embodiment of the third mode, the length of the signal transmission line (signal line) 703 is limited to such a length that a signal can make one or more round trips down the signal line within the bit time T. More specifically, denoting the wave propagation speed on the signal line 703 by $v_0$, the length of the signal line 703 by L, and one bit time (one bit length) by T, a limit expressed by $2L/v_0 \leq T$ is imposed. This makes it easier to hold intersymbol interference to a minimum, and further, all the devices (the DRAM controller and the DRAM chips) can generate the common timing signal (GMT) by creating a signal having a phase intermediate between the phases of the forward and backward-travelling clocks.

Figure 34:
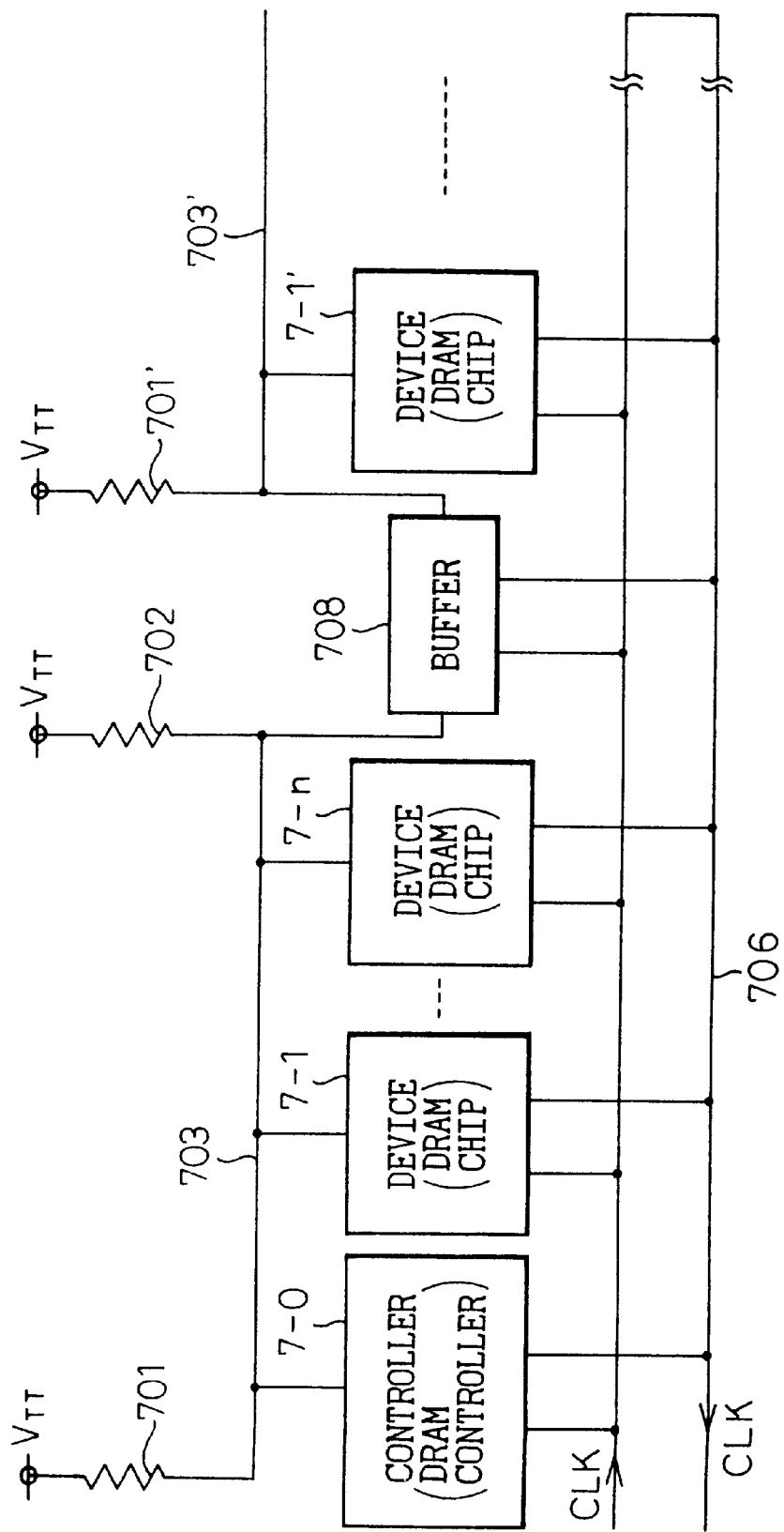
FIG. 34 is a block diagram showing a third embodiment of the signal transmission system according to the third mode of the present invention.

FIG. 34 is a block diagram showing a third embodiment of the signal transmission system according to the third mode of the present invention. In FIG. 34, reference numerals 701, 701', and 702 are terminal resistors, 703 and 703' are signal transmission lines (buses), 706 is a clock line, 7-0 is a controller (DRAM controller), 7-1 to 7-n and 7-1', . . . are devices (DRAM chips), and 708 is a buffer.

As shown in FIG. 34, in the third embodiment of the third mode, the buffer 708 is inserted between the signal transmission lines (signal lines) 703 and 703'. That is, when the length of the signal line exceeds the above-stated limit $2L/v_0 \leq T$, for example, the buffer 708 is inserted as necessary.

The buffer 708 here has the function of delaying a signal (signal transmitted through the signal line 703) by a time equal to an integral multiple of the bit time T and retransmitting the signal. Since the buffer delay time is an integral multiple of T, the buffer and the devices (DRAM chips, etc.) connected to it are allowed to operate with the present common timing signal. Signal reception and transmission in the buffer 708 is, of course, performed based on the common timing.

Figure 35:
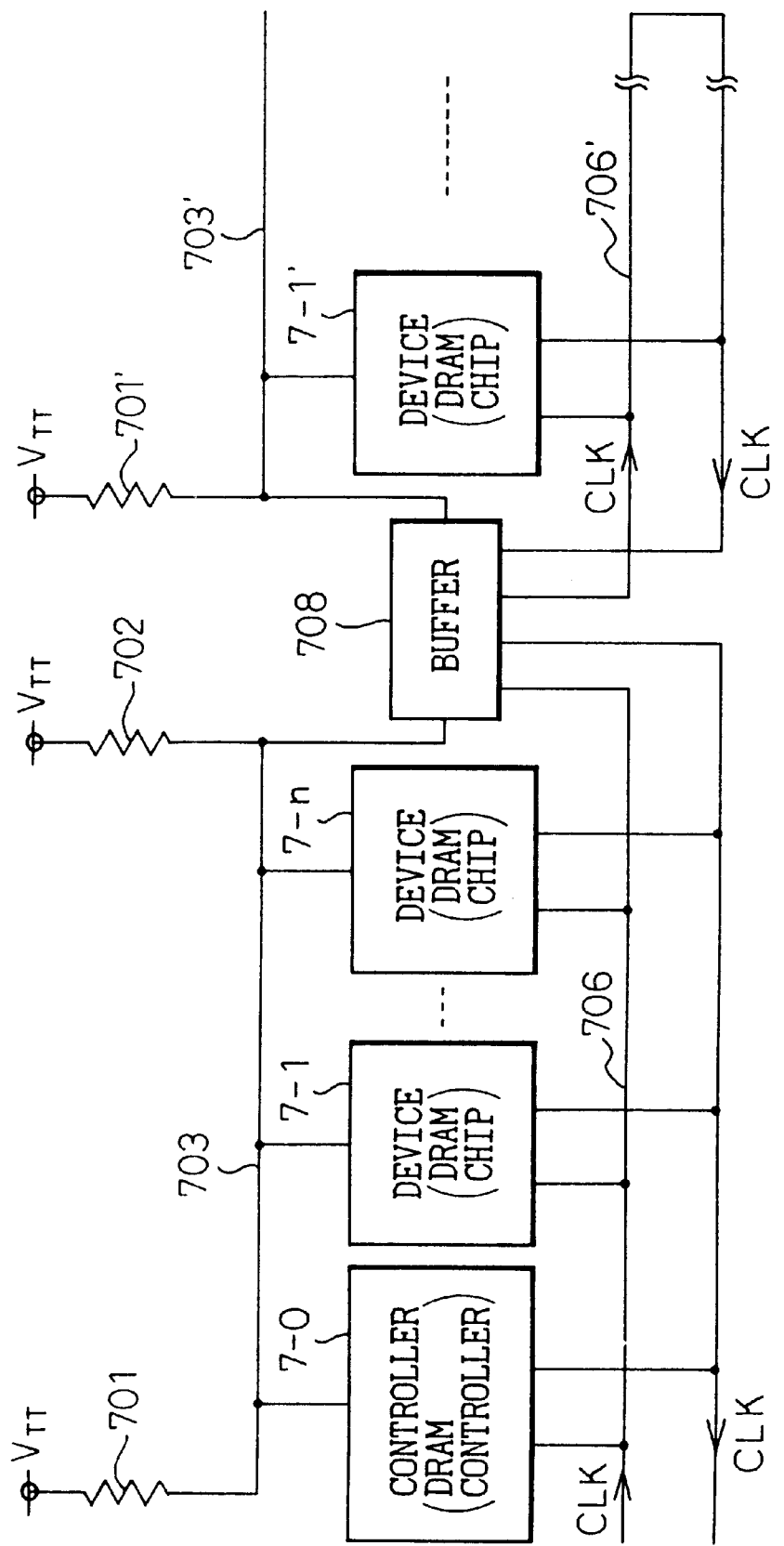
FIG. 35 is a block diagram showing a modified example of the signal transmission system of FIG. 34.

FIG. 35 is a block diagram showing a modified example of the signal transmission system of FIG. 34.

As shown in FIG. 35, this modified example differs from the third embodiment shown in FIG. 34 in that the buffer 708 is provided not only for signals transmitted along the signal line 703 but also for the clock transmitted along the clock line 706 (706'). More specifically, the buffer 708 includes means for supplying the clock to the other devices (DRAM chips 7-1', . . . ) connected to the buffer 708.

The provision of the buffer enables the signal transmission distance to be extended, but if the clock distribution line becomes long, the common clock may not be determined uniquely by simply generating a signal having an intermediate phase between the forward and backward travelling clocks. The modified example addresses this problem. That is, the buffer 708 creates a waveform advanced in phase by a certain angle with respect to the common clock and a waveform delayed in phase by the same angle by using a DLL or PLL, and outputs the resulting clocks; then, the devices (DRAM chips 7-1', . . . ) that received the clocks can have the same common timing as the buffer 708.

Figure 36:
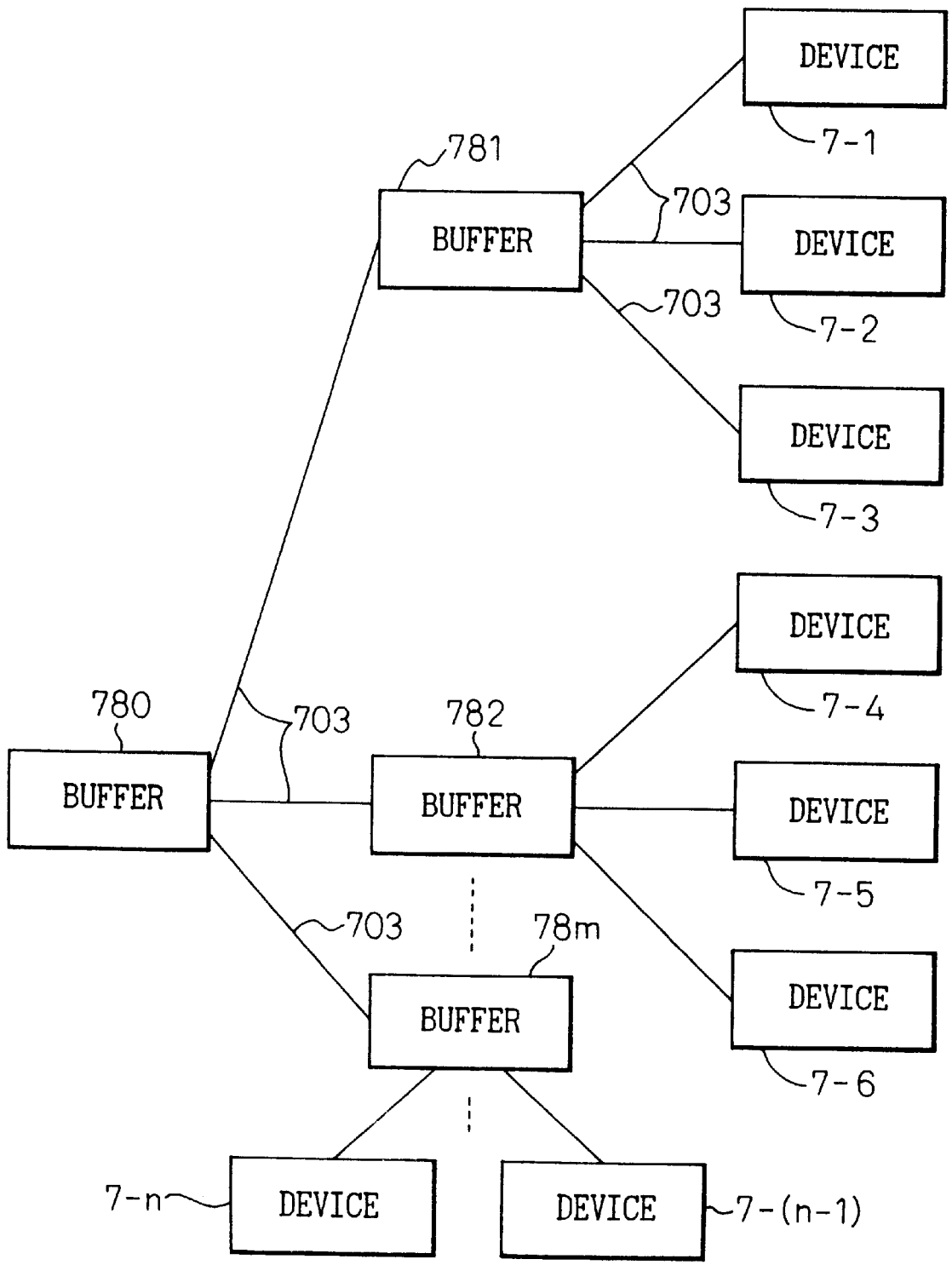
FIG. 36 is a block diagram showing a fourth embodiment of the signal transmission system according to the third mode of the present invention.

FIG. 36 is a block diagram showing a fourth embodiment of the signal transmission system according to the third mode of the present invention. In FIG. 36, reference numerals 780 to 78m are buffers, 703 is a bus (signal line), and 7-1 to 7-n are devices (DRAM chips).

As shown in FIG. 36, in the fourth embodiment of the third mode, each of the buffers 780 to 78m is connected to a plurality of bus line sets 703. This arrangement of the buffers 780 to 78m enables signals to be transferred to and from a large number of devices (DRAM chips) 7-1 to 7-n in a tree-like structure. It will be recognized that the topology of the signal lines 703 using the buffers 780 to 78m s not limited to the tree-like structure, but various other topologies, such as a star topology and a ring topology, are possible.

Figure 37:
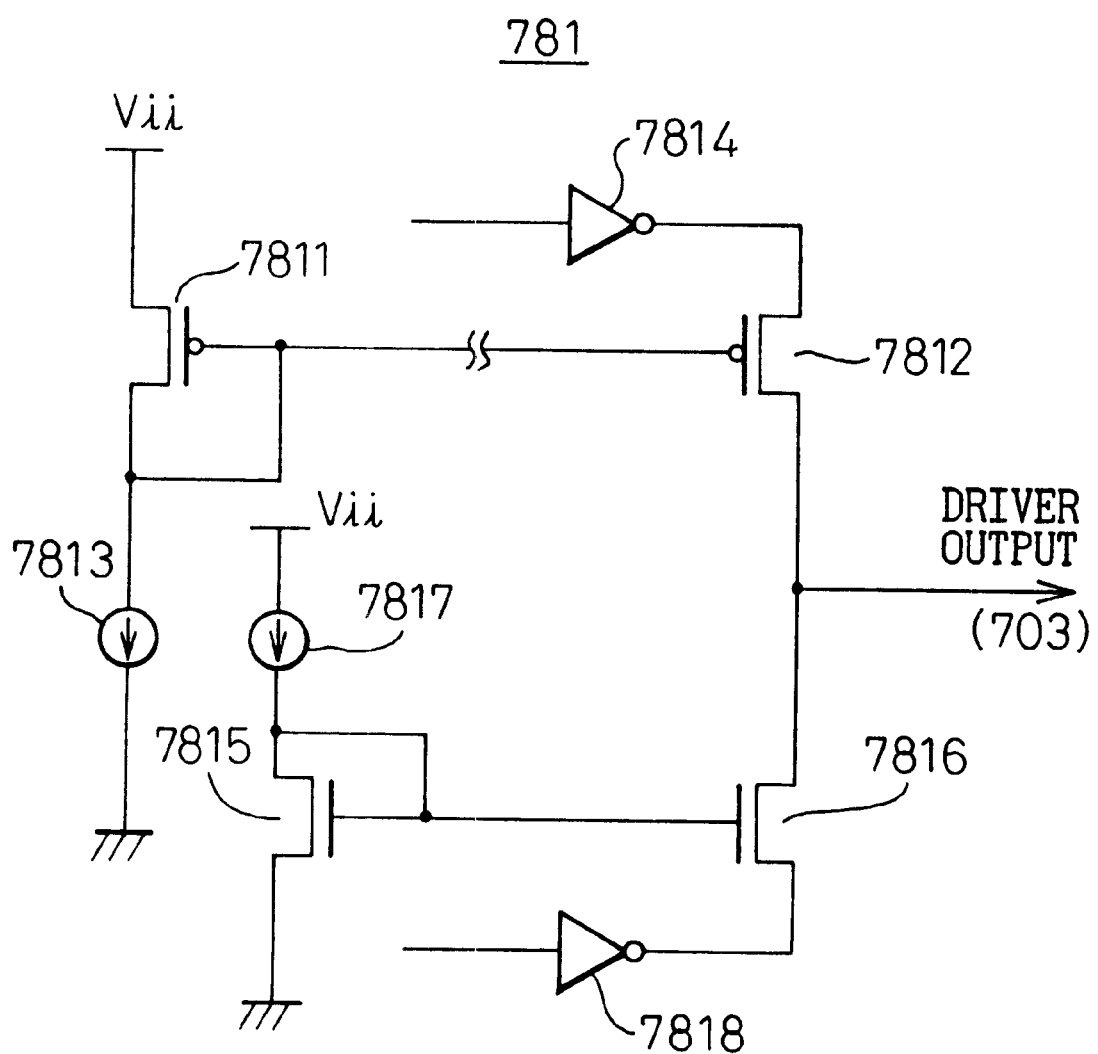
FIG. 37 is a circuit diagram showing one example of a driver circuit in the signal transmission system according to the third mode of the present invention.

FIG. 37 is a circuit diagram showing one example of the driver circuit in the signal transmission system according to the third mode of the present invention. This figure, for example, concerns the driver circuit 781 shown in FIGS. 31 and 32.

As shown in FIG. 37, the driver circuit which drives the signal line (signal transmission line 703) comprises P-channel MOS transistors 7811 and 7812, N-channel MOS transistors 7815 and 7816, current sources 7813 and 7817, and CMOS inverters 7814 and 7818. Here, the transistor 7812 is connected to the transistor 7811 in a current mirror arrangement, and also, the transistor 7816 is connected to the transistor 7815 in a current mirror arrangement. The driver circuit employs a configuration such that the sources of the transistors 7812 and 7816 in the symmetrical current-mirror constant-current drive circuit are driven by the CMOS inverters 7814 and 7818, respectively, thereby switching the constant current. That is, the driver circuit 781 shown in FIG. 37 is configured as a symmetrical constant-current driving push-pull driver.

With this configuration, the driver circuit provides a high output impedance so that the response function of the signal line system is constant regardless of the switching of any driver in any circuit block (DRAM chip, etc.), which enhances the efficiency of intersymbol interference elimination and thus achieves signal transmission with increased accuracy. An additional advantage is that even when an error occurs between the common timing signals generated by the respective block circuits, resulting in a situation where more than one driver circuit simultaneously drives the signal line,' the constant-current driving method can avoid the problem of punch-through current.

Figure 38:
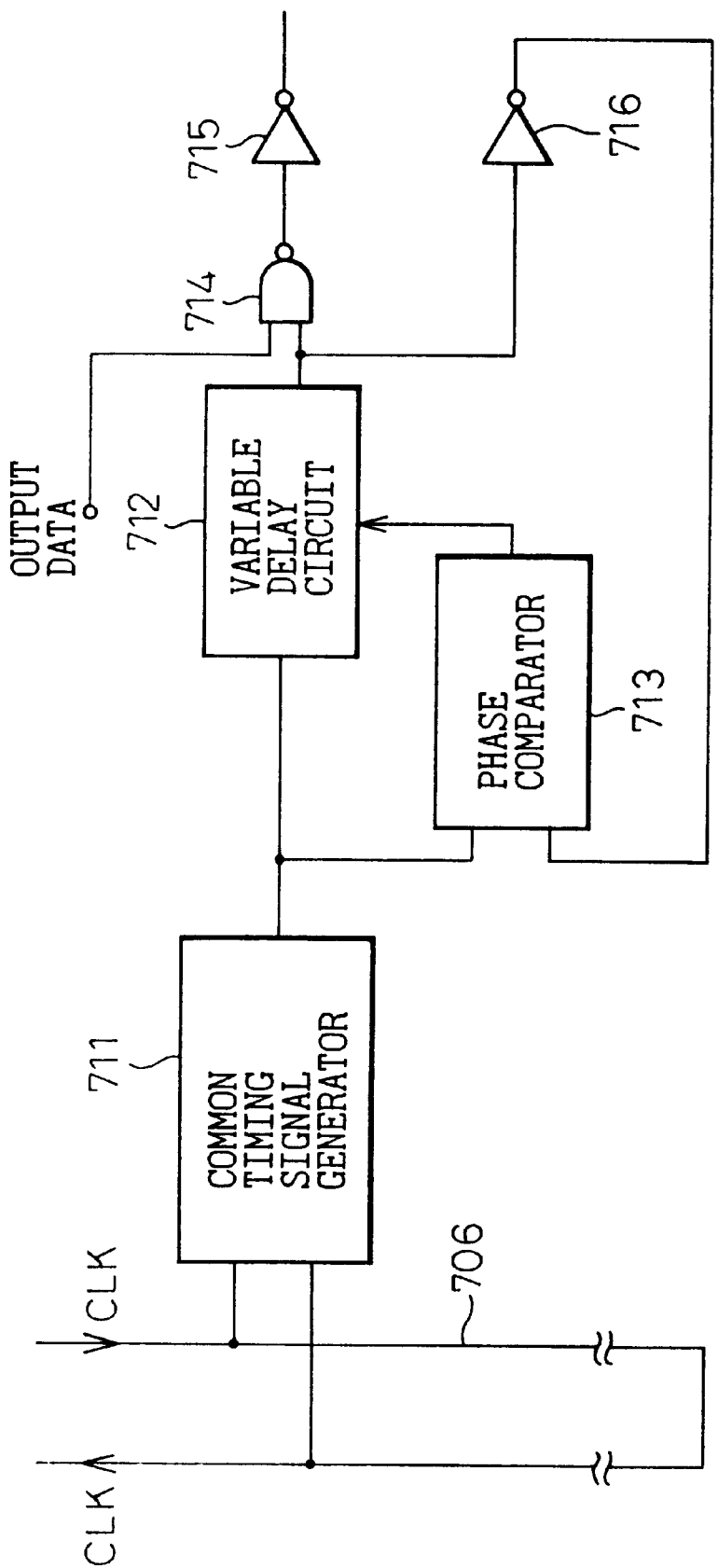
FIG. 38 is a block diagram showing a fifth embodiment of the signal transmission system according to the third mode of the present invention.

FIG. 38 is a block diagram showing a fifth embodiment of the signal transmission system according to the third mode of the present invention. In FIG. 38, reference numeral 711 is a common timing signal generating circuit, 712 is a variable delay circuit, 713 is a phase comparator, 714 is a NAND gate, 715 is a driver circuit (real driver), and 716 is a dummy driver circuit (dummy driver). Here, the variable delay circuit 712 and the phase comparator 713 together constitute a DLL (delay-locked loop) circuit. The dummy driver 716 is identical in configuration to the real driver 715 (both drivers have the same delay time), the configuration being such that the output of the dummy driver 716 is fed back to the phase comparator 713 in order to remove the delay in the real driver 715. One input of the NAND gate 714 is coupled to output data so that the output data is supplied to the real driver 715 in accordance with the output (timing signal) of the variable delay circuit 712.

That is, in the fifth embodiment of the third mode, the phase comparator 713, the variable delay circuit 712, and the dummy driver 716, which together work to remove the delay in the driver circuit (real driver) 715, are provided in addition to the common timing signal generating circuit 711 which captures the clocks travelling through the clock line folded between the forward and backward sections, as described with reference to FIG. 27, and generates a common timing by taking a timing at the intermediate point between the rising timings of the forward and backward travelling clocks. The amount of delay in the variable delay circuit 712 is controlled to compensate for the delay and variations in delay in the real driver 715 and thereby achieve signal transmission with increased accuracy. Similar control performed using the DLL, for example, can also be applied for the control of input timing.

Figure 39A:
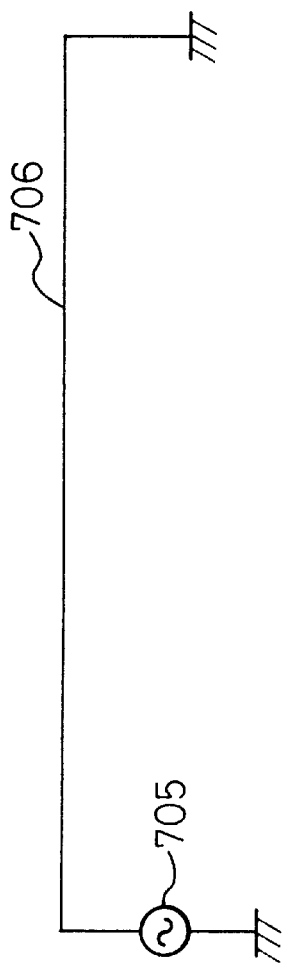
FIGS. 39A and 39B are block diagrams showing a sixth embodiment of the signal transmission system according to the third mode of the present invention.

FIGS. 39A and 39 B are block diagrams showing a sixth embodiment of the signal transmission system according to the third mode of the present invention.

As shown in FIG. 39A, in the sixth embodiment of the third mode, the clock line 706 is constructed as a single clock line, not a round-trip type clock line. By directly grounding one end of the single clock line 706, that is, by removing the clock line terminating resistor 704 shown in FIG. 26 and short-circuiting that end, a standing wave (see FIG. 39B) is produced along the clock line 706, and this standing wave is used as the common timing (GMT).

The sixth embodiment of the third mode thus utilizes the phenomenon that when a standing wave is produced along the clock line 706, a voltage amplitude of the same phase is obtained along a region of a length equal to a half wavelength. Advantages of this method are that the clock line requires only half the length of the round-trip type clock line, and that since the clock is made to travel forward and backward along a single line, the characteristic of the forward path completely coincides with that of the backward path and thus the accuracy of the common timing increases.

Figure 40A:
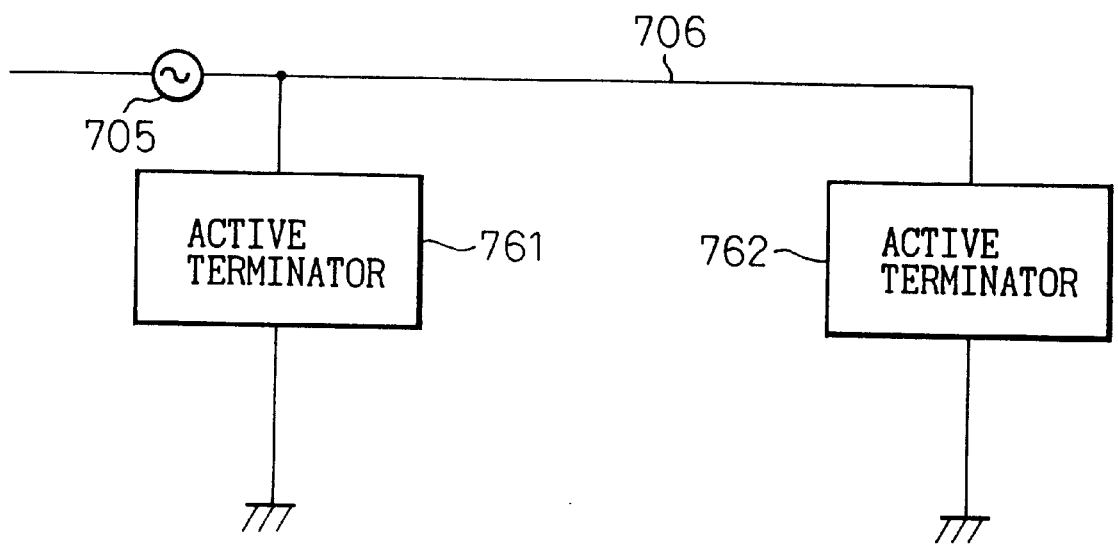
FIGS. 40A and 40B are block diagrams showing a seventh embodiment of the signal transmission system according to the third mode of the present invention.
Figure 40B:
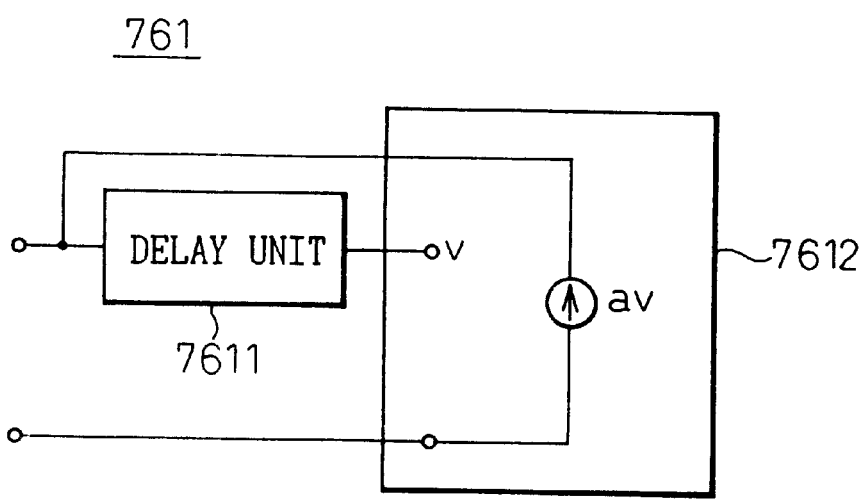

FIGS. 40A and 40B are block diagrams showing a seventh embodiment of the signal transmission system according to the third mode of the present invention. In FIG. 40A, reference numerals 761 and 762 are active terminators, and in FIG. 40B, reference numerals 7611 is a delay unit, and 7612 is a control power supply unit.

Figure 39B:
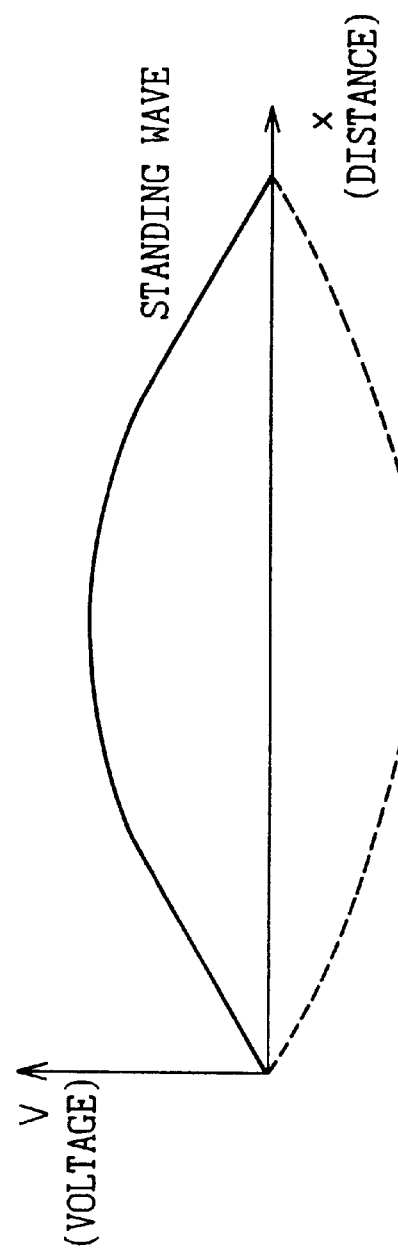

In the sixth embodiment shown in FIGS. 39A and 39B, one end of the clock line 706 is short-circuited; on the other hand, in the seventh embodiment of the third mode, both ends of the clock line 706 are terminated with the active terminators 761 and 762. The active terminators 761 and 762 are so controlled as to achieve a situation equivalent to short-circuiting the line at a point where a reflected wave produced at each terminal end has travelled a distance equal, for example, to ¹⁄₁₆ of the wavelength, from the terminal end. The active terminator 761 (762) comprises, for example, the delay unit 7611 and control power supply unit 7612, as shown in FIG. 40B, and is achieved by monitoring the voltage at the terminating end and by generating an electric current signal having a constant phase relationship with respect to that voltage and feeding it back to the terminating end (from the control power supply unit 7612). This active terminator can be easily implemented using a known PLL circuit or DLL circuit and a constant-current drive circuit, etc. The seventh embodiment of the third mode has the advantage that a standing wave can be produced along the clock line 706, and the amplitude of the clock is constant along the clock line 706, without having to exactly match the clock line length to the clock frequency.

Figure 41:
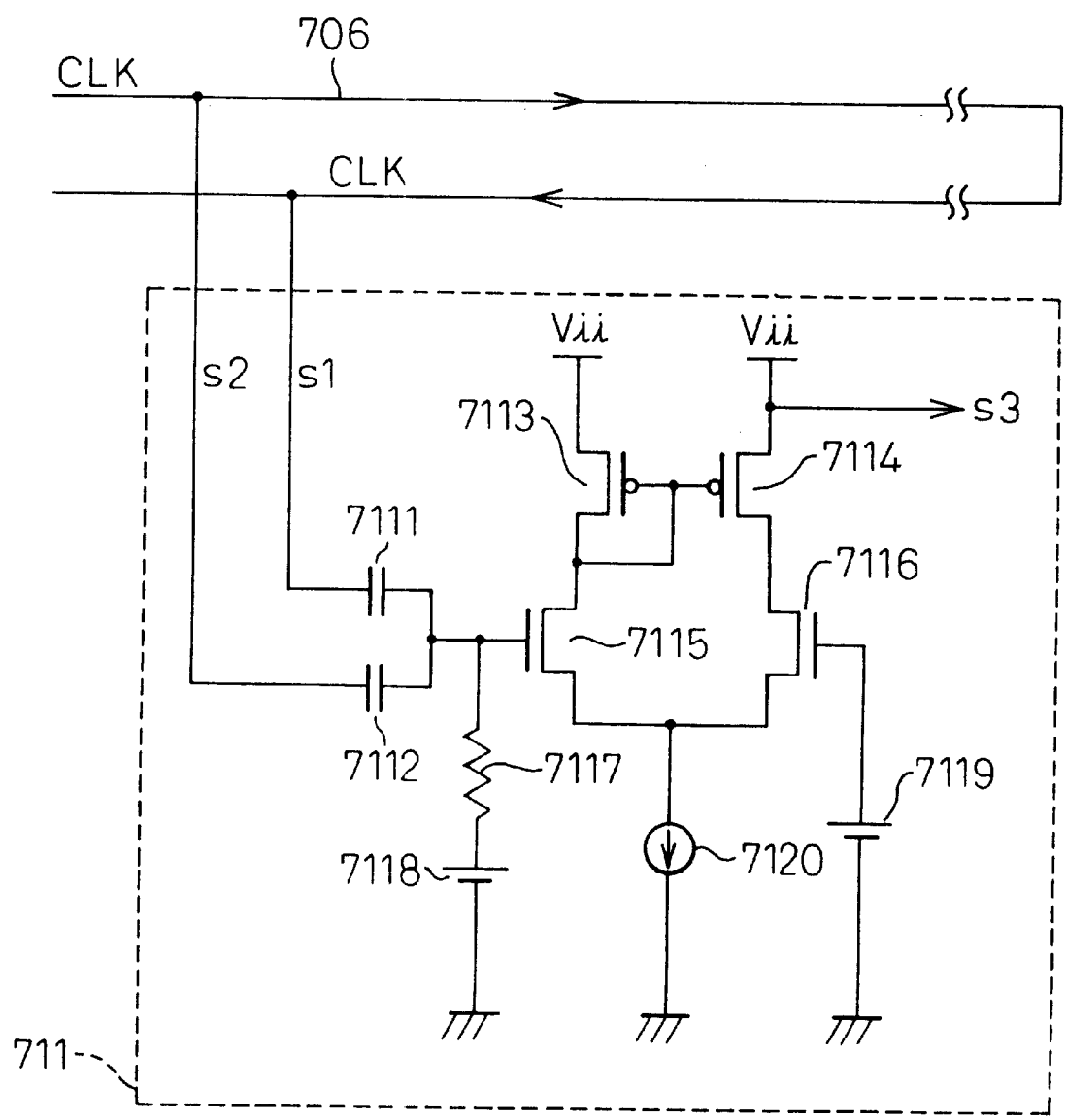
FIG. 41 is a circuit diagram showing one example of a common timing signal generating circuit in the signal transmission system according to the third mode of the present invention.

FIG. 41 is a circuit diagram showing one example of the common timing signal generator (711) used in the signal transmission system according to the third mode of the present invention. In FIG. 41, reference numerals 7111 and 7112 are capacitors, 7113 and 7114 are P-channel MOS transistors, 7115 and 7116 are N-channel MOS transistors, 7117 is a resistor, 7118 and 7119 are voltage sources, and 7120 is a current source. A sinusoidal clock is used as the clock CLK travelling through the clock line 706.

The common timing signal generating circuit 711 shown in FIG. 41 utilizes the property that when a sinusoidal clock is used as the clock CLK, the sum of a first sine wave (forward travelling clock) s1 and a second sine wave (backward travelling clock) s2 yields a sine wave (common timing signal) s3 with its phase precisely centered between them. By the capacitive coupling of the two capacitors 7111 and 7112, the two clocks (s1 and s2) are supplied to a differential amplifier-type comparator to generate the common timing signal (s3). This method has the advantage of reducing the circuitry for generating the common timing signal.

Figure 42:
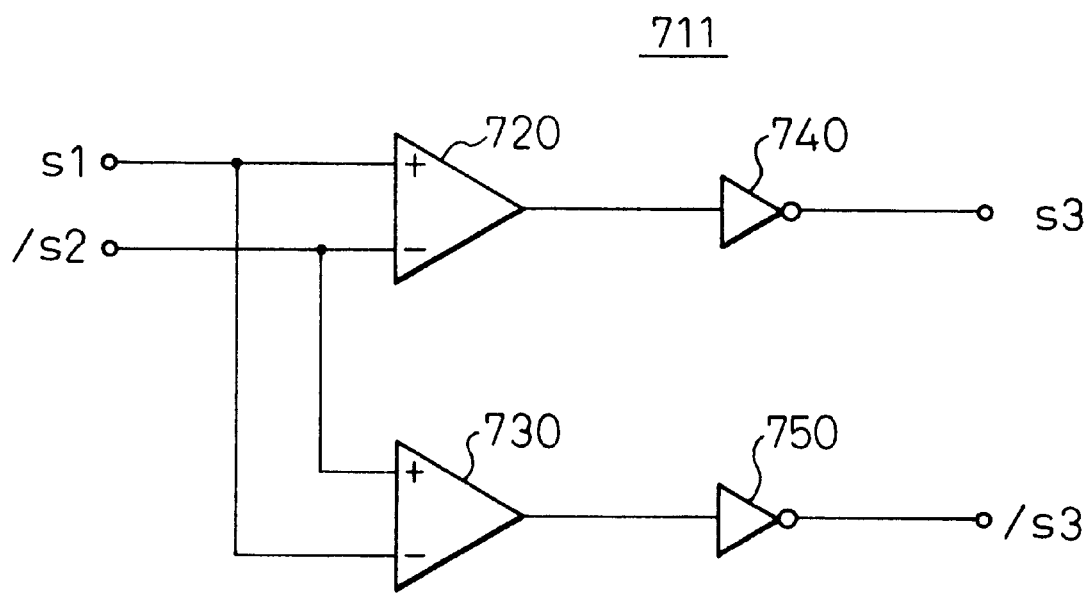
FIG. 42 is a circuit diagram showing another example of the common timing signal generating circuit in the signal transmission system according to the third mode of the present invention.

FIG. 42 is a circuit diagram showing another example of the common timing signal generating circuit used in the signal transmission system according to the third mode of the present invention. In this circuit also, a sinusoidal clock is used as the clock CLK travelling through the clock line 706.

The common timing signal generating circuit 711 shown in FIG. 42 comprises two comparators 720 and 730 and two inverters 740 and 750. Here, the forward travelling clock s1 and a clock /s2 produced by inverting the backward travelling clock s2, for example, are used as the clocks input to each comparator 720 (730), to produce the common timing signal s3 having a phase intermediate between the forward and backward travelling clocks.

Figure 43:
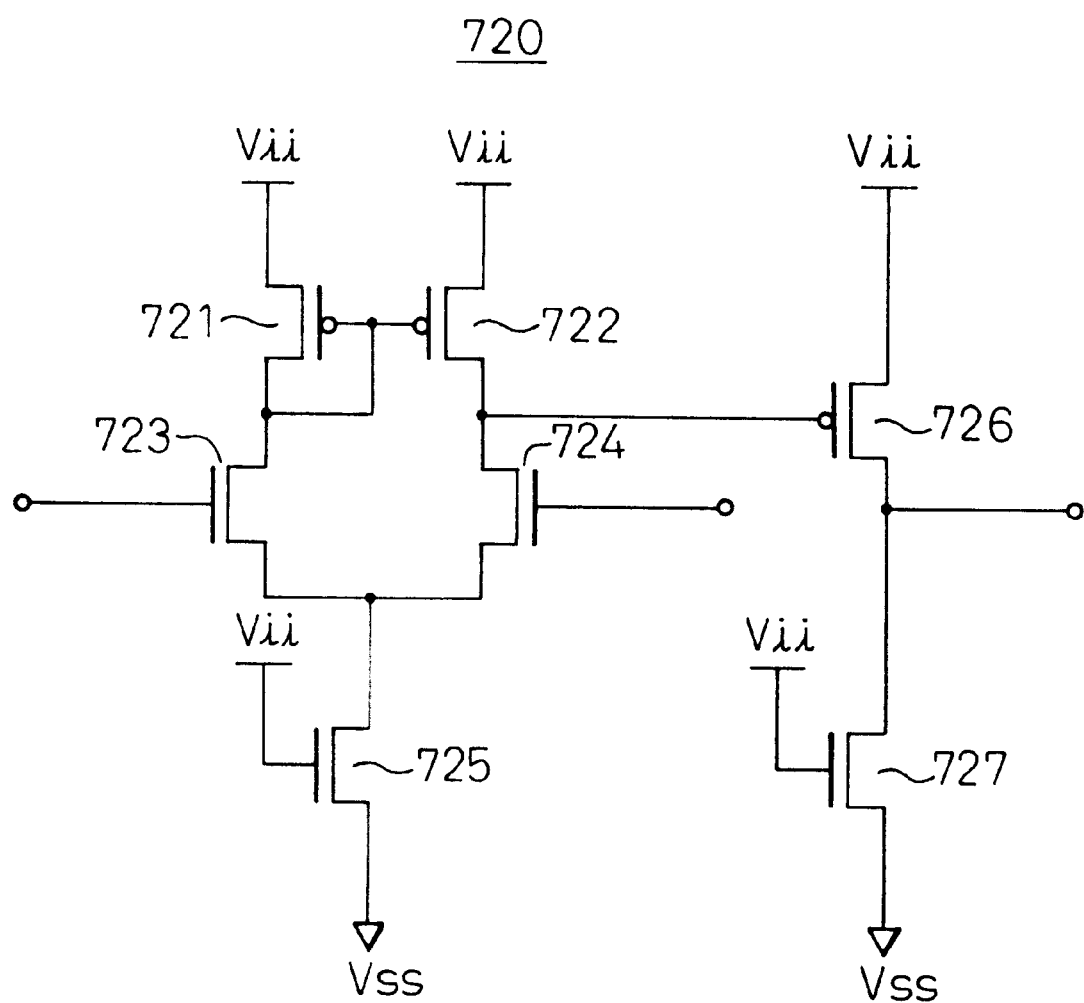
FIG. 43 is a circuit diagram showing one example of a comparator in the common timing signal generating circuit of FIG. 42.

FIG. 43 is a circuit diagram showing one example of the comparator used in the common timing signal generating circuit of FIG. 42. As shown in FIG. 43, the comparator 720 (730) comprises a plurality of P-channel MOS transistors, 721, 722, and 726, and a plurality of N-channel MOS transistors, 723, 724, 725, and 727.

Figure 44:
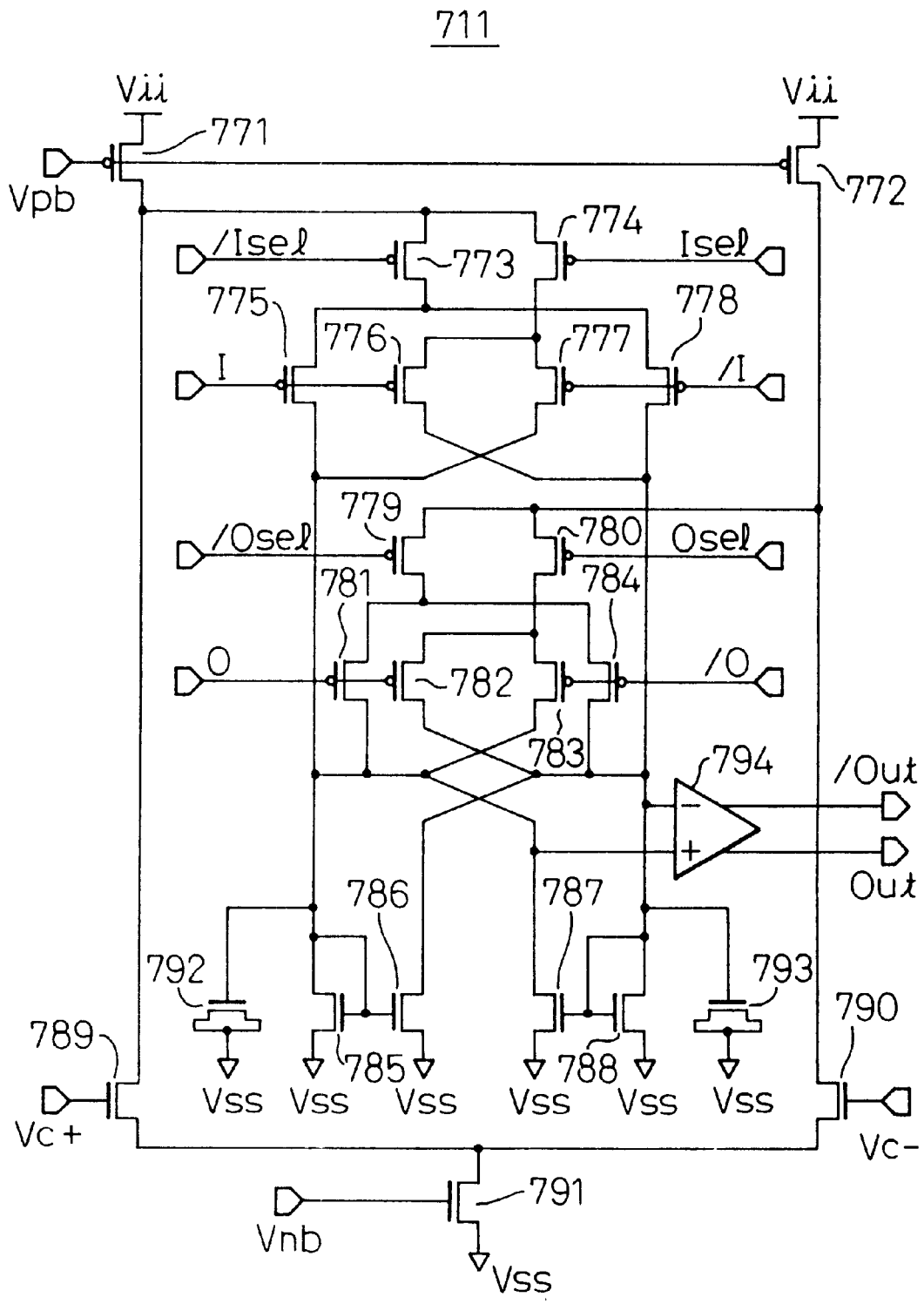
FIG. 44 is a circuit diagram showing still another example of the common timing signal generating circuit in the signal transmission system according to the third mode of the present invention.

FIG. 44 is a circuit diagram showing still another example of the common timing signal generating circuit used in the signal transmission system according to the third mode of the present invention.

The common timing signal generating circuit shown in FIG. 44 is constructed from a previously known phase interpolator. Using this phase interpolator, the common timing signal generating circuit 711 can be constructed that captures the forward and backward travelling clocks on the folded clock line and generates a clock having a phase intermediate between the forward and backward travelling clocks.

As shown in FIG. 44, the phase interpolator (common timing signal generating circuit) 711 comprises a plurality of P-channel MOS transistors 771 to 784, a plurality of N-channel MOS transistors 785 to 791, capacitors 792 and 793, and a comparator 794.

Constructing the common timing signal generating circuit 711 from a phase interpolator such as shown in FIG. 44 offers the advantage that square waves driven by a conventional CMOS driver can be used as the clock and the common timing signal generating circuit can be constructed with less circuitry than when a usual DLL or a PLL is used. Needless to say, various configurations other than that shown in FIG. 44 are possible for the construction of the phase interpolator.

Figure 45:
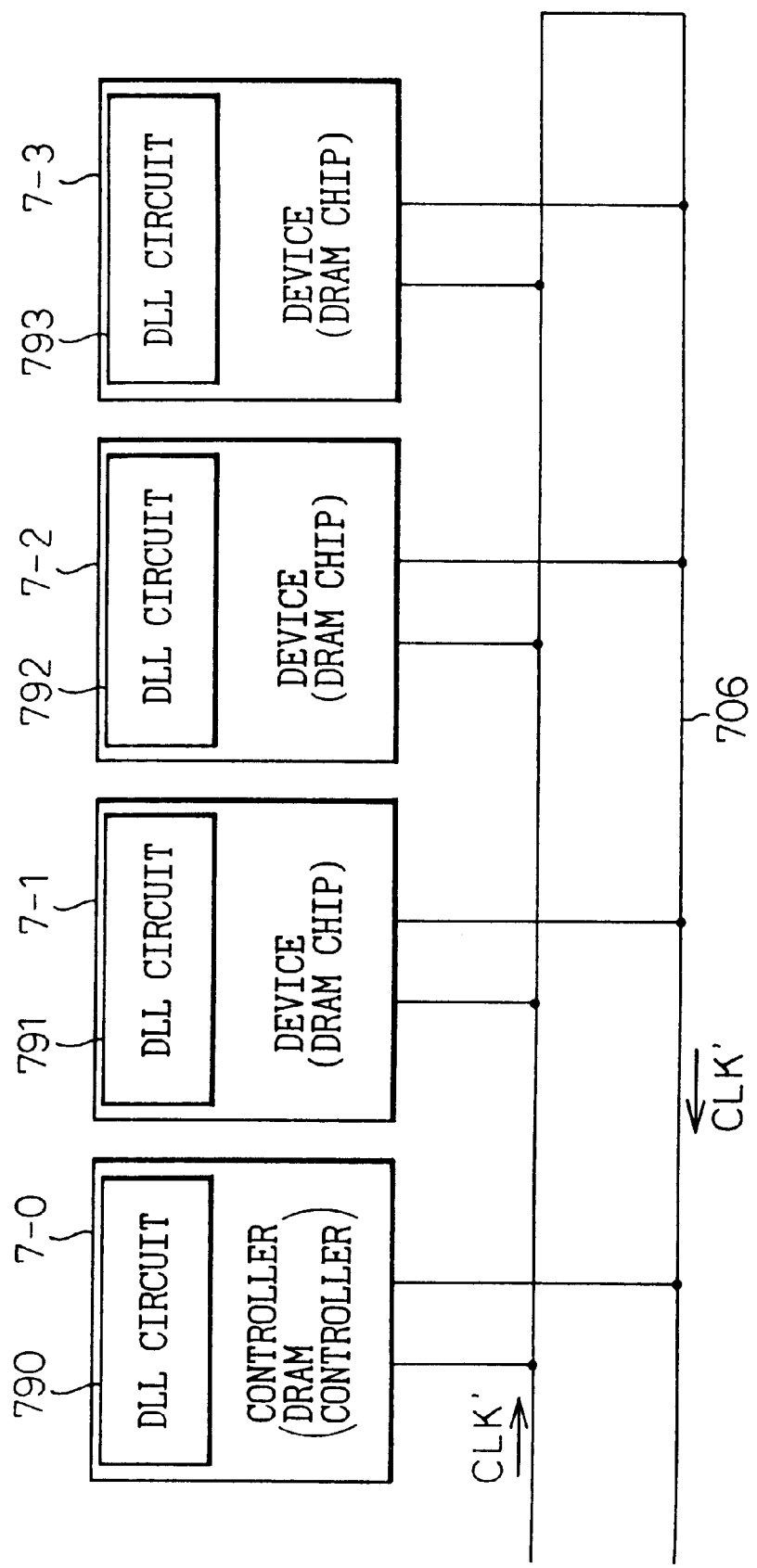
FIG. 45 is a block diagram showing an eighth embodiment of the signal transmission system according to the third mode of the present invention.

FIG. 45 is a block diagram showing an eighth embodiment of the signal transmission system according to the third mode of the present invention. In FIG. 45, reference numerals 790 to 793 are DLL circuits.

As shown in FIG. 45, in the eighth embodiment of the third mode, clock CLK' having n times (for example, four times) the cycle of the usual clock CLK is supplied on the clock line 706.

More specifically, in the eighth embodiment of the third mode, the clock cycle is increased (for example, by a factor of 4) to raise the upper limit on the length of the clock line 706 that can generate the common timing signal by creating a signal having an intermediate phase between the forward and backward travelling clocks. In the method using the round-trip type clock line (and also the method using the standing wave clock), when the round-trip delay becomes longer than the clock cycle, a phase ambiguity of 180 degrees arises in the common timing, but by increasing the clock cycle as in the eighth embodiment of the third mode, the length along which the ambiguity arises can be increased.

As shown in FIG. 45, in the DRAM controller 7-0 and the DRAM chips 7-1 to 7-3, the DLL circuits 790 to 793 are respectively provided that perform a multiply-by-n operation (to reduce the cycle or increase the frequency by a factor of n, for example, a multiply-by-4 operation) to recover the original clock whose cycle hap been increased by a factor of n (for example, 4). Here, PLL circuits may be used instead of the DLL circuits 790 to 793.

Figure 46:
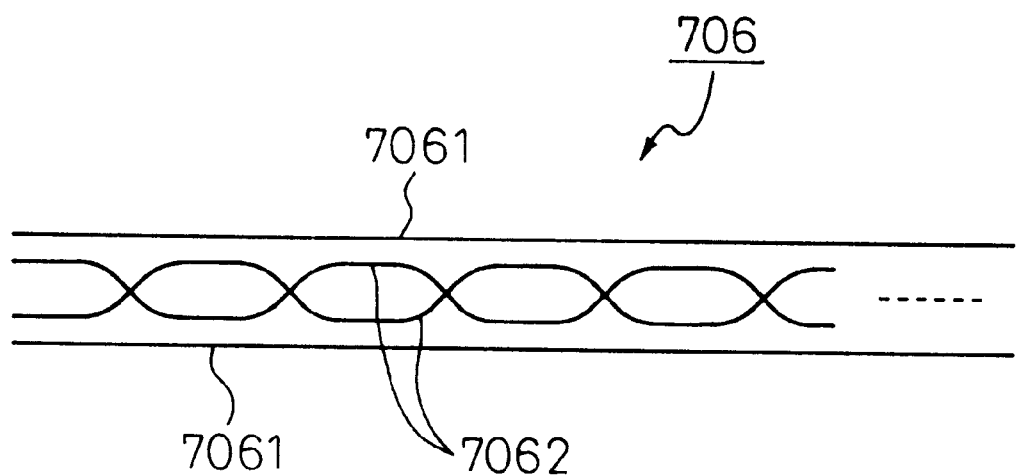
FIG. 46 is a diagram showing one example of a clock distributing transmission line in the signal transmission system according to the third mode of the present invention.

FIG. 46 is a diagram showing one example of the clock distribution transmission line used in the signal transmission system according to the third mode of the present invention. In FIG. 46, reference numeral 7061 is a shield, and 7062 is a clock pair (twisted pair).

As shown in FIG. 46, the transmission line (clock line 706) for distributing the clock CLK is constructed using a differential pair (twisted pair 7062) crossed at prescribed intervals and shielded (7061) from both sides by ground level guard patterns. Though the clock line 706 of this construction understandably has a different transmission characteristic than that of the signal line, this does not present any problem because this system allows different transmission characteristics between the signal line 703 and the clock line 706. This has the advantage of reducing the clock-induced noise by applying sufficient shielding to the clock line subjected to constant voltage variations. Since no problems occur if there is a large difference in transmission characteristics between the clock system and the signal system, it is, of course, possible to construct the clock system only by using a coaxial cable or optical fiber, for example.

In this way, according to the signal transmission system of the third mode of the present invention, a signal transmission system can be constructed that provides greater freedom in designing the clock system and signal system, can easily minimize the gap when device switching is made, and has low power consumption.

As described above, the signal transmission system of the present invention is not limited in application to a bus system interconnecting a plurality of semiconductor chips (LSI chips) but can also be applied to a signal line connecting various circuit blocks.

According to the signal transmission system of the third mode of the present invention, the timing signal can be generated without requiring symmetry between the clock line and the signal line (signal transmission line), and the gap when switching between transmitting devices can be minimized.

Next, a signal transmission system according to a fourth mode of the present invention will be described in detail. To start with, the basic functional configuration of the fourth mode of the invention will be described with reference to FIGS. 47 and 48. In the foregoing third mode, the forward and backward travelling clocks are supplied to the DRAM chips, etc. by using the folded clock line (706); in the fourth mode, on the other hand, the clocks are supplied using clock lines separately provided for the forward and backward travelling clocks (forward and backward clock lines 1001 and 1002) and clock generating circuits separately provided for the forward and backward clocks (forward and backward clock generating circuits 1100 and 1200).

Figure 47:
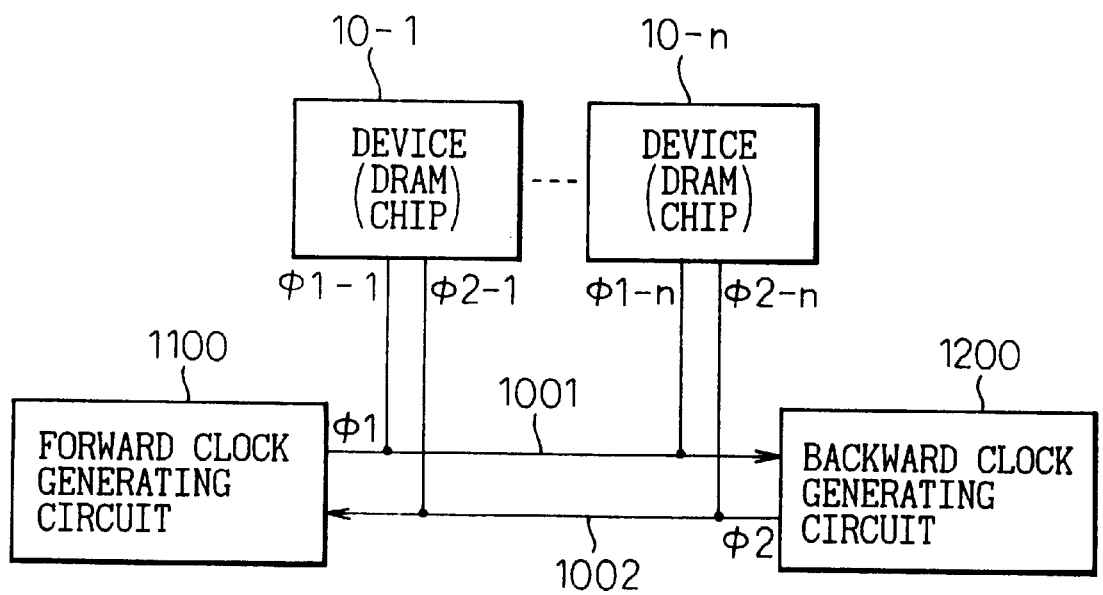
FIG. 47 is a block diagram showing the basic functional configuration of a signal transmission system according to a fourth mode of the present invention.
Figure 48:
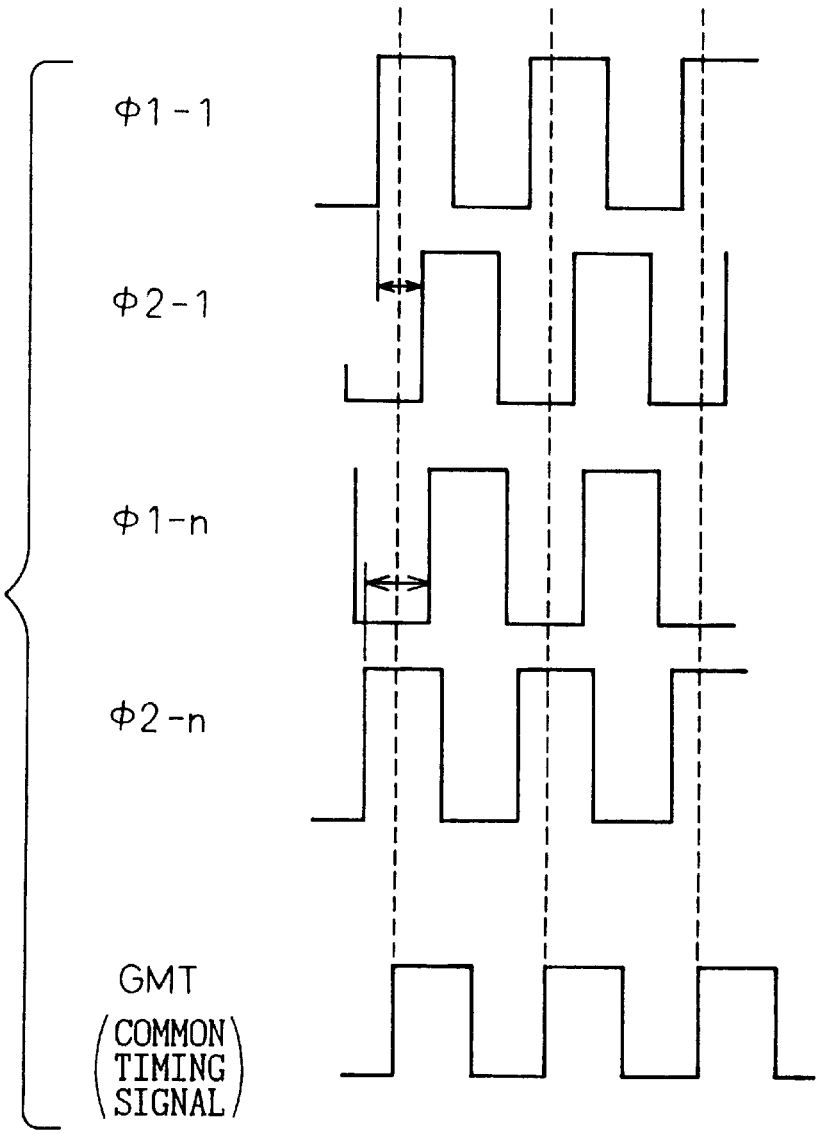
FIG. 48 is a timing diagram for explaining the operation of the signal transmission system of FIG. 47.

FIG. 47 is a block diagram showing the basic functional configuration of the signal transmission system according to the fourth mode of the present invention, and FIG. 48 is a timing diagram for explaining the operation of the signal transmission system of FIG. 47. In FIG. 47, reference numerals 10-1 to 10-n are devices such as DRAM chips (DRAM modules) or DRAM controllers, 1100 is the forward clock generating circuit, and 1200 is the backward clock generating circuit. FIG. 48 corresponds to FIG. 27 previously shown in connection with the foregoing third mode of the present invention.

In the signal transmission system of the present invention, as shown in FIG. 47, the forward clock generating circuit 1100 and backward clock generating circuit 1200 (one or more pairs of such circuits) for generating the forward and backward clocks are provided for one pair of signal lines (clock lines) 1001 and 1002. The devices 10-1 to 10-n which transmit and receive signals receive forward clock $\phi 1$ from the forward clock generating circuit 1100 and backward clock $\phi 2$ from the backward clock generating circuit 1200 and, by extracting an intermediate timing between these clocks φ1 and φ2 at their rising and falling edges, generate an intermediate-phase signal (common timing signal GMT—Global Mean Time).

More specifically, as shown in FIG. 48, the device 10-1 generates the common timing signal GMT as a signal having an intermediate phase between the forward clock φ1-1 supplied via the clock line 1001 and the backward clock φ2-1 supplied via the clock line 1002; likewise, the device 10-n generates the common timing signal GMT as a signal having an intermediate phase between the forward clock φ1-n supplied via the clock line 1001 and the backward clock φ2-n supplied via the clock line 1002.

Here, the backward clock generating circuit 1200 must generate a clock (φ2) such that the intermediate (intermediate-phase) timing between the forward clock φ1 and backward clock φ2 is uniquely extracted. More specifically, the phase difference between the forward and backward clocks on the signal lines (clock lines) 1001 and 1002 (more precisely, the phase difference between the edges of the forward and backward clocks φ1 and φ2 carrying timing information) is chosen to fall within prescribed limits (within ±180 degrees at the maximum). Further, it is desirable that the backward clock generating circuit 1200 be configured to generate the backward clock φ2 so that the intermediate timing extraction can be performed using as simple circuitry as possible, as will be described later.

According to the signal transmission system (signal transmission method) of the present invention, by eliminating intersymbol interference at each receiving ; circuit (each of the devices 10-1 to 10-n) it is made possible for all elements to share the common timing signal (GMT) with a predefined degree of accuracy. The predefined degree of accuracy here is derived from the convention that a timing error not so large as to render the elimination of intersymbol interference impossible is allowed, and in practice, an accuracy of time sufficiently shorter (for example, about 10 percent) than the time required for a signal to propagate through the signal line will suffice. Further, to generate the common timing signal GMT, it only requires clock signals (1001 and 1002) travelling in opposite directions along the clock line route, and since there is no need to make the clock line and data line (signal transmission line) identical both in routing and in electrical characteristics unlike the previously described prior art signal transmission system shown in FIG. 25, there are no specific constraints on the design and arrangement of the clock lines.

Embodiments of the signal transmission system according to the fourth mode of the present invention will now be described below with reference to the accompanying drawings.

Figure 49:
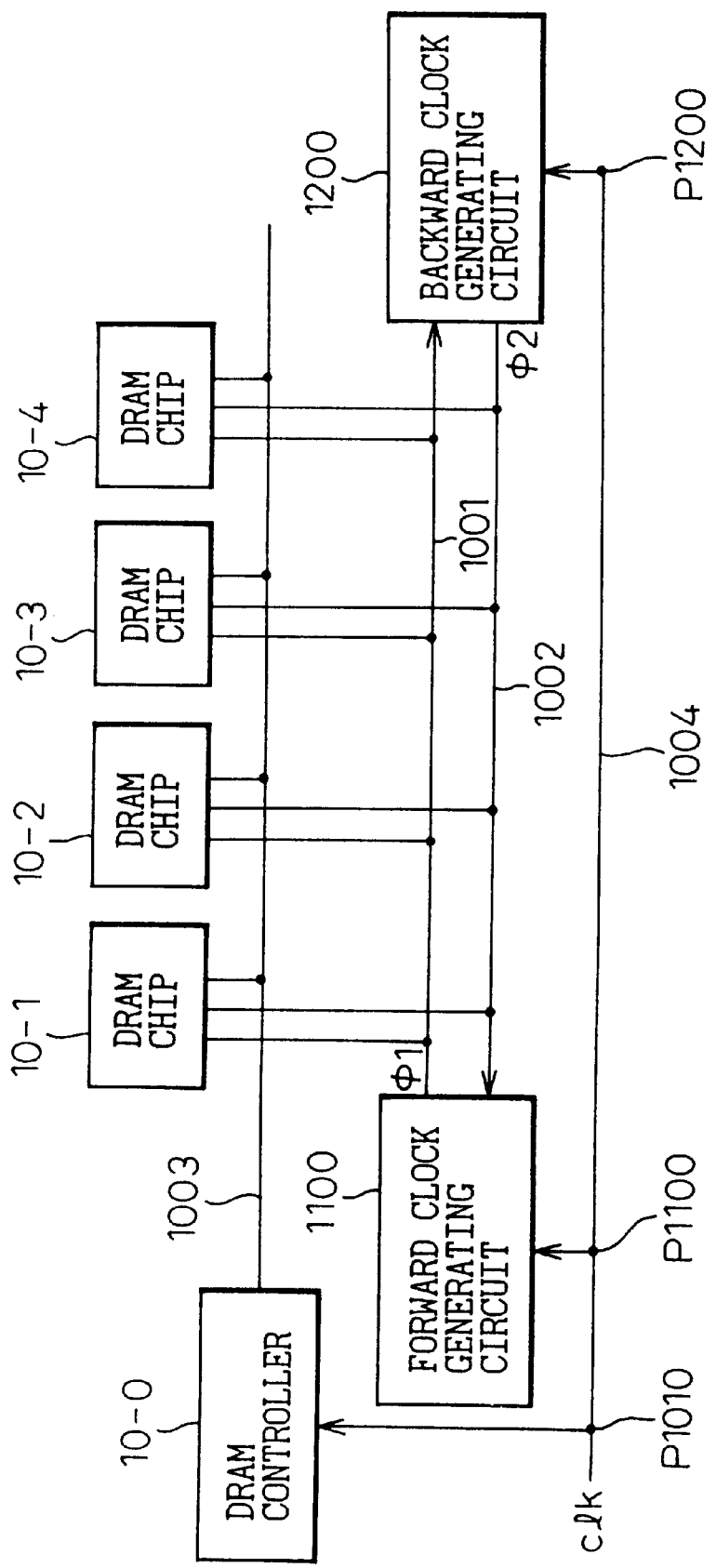
FIG. 49 is a block diagram showing a first embodiment of the signal transmission system according to the fourth mode of the present invention.

FIG. 49 is a block diagram showing a first embodiment of the signal transmission system of the present invention. In FIG. 49, reference numeral 10-0 is a chip such as a DRAM controller, 10-1 to 10-4 are chips such as DRAMs, 1100 is a forward clock generating circuit, and 1200 is a backward clock generating circuit. Further, reference numeral 1001 is a clock line for forward clock φ1, 1002 is a clock line for backward clock φ2, 1003 is a signal transmission path (consisting of a plurality of parallel signal lines, for example, 16 data lines), and 1004 is a clock line for reference clock clk.

As shown in FIG. 49, the DRAM controller 10-0, the forward clock generating circuit 1100, and the backward: clock generating circuit 1200 are configured to receive; the reference clock (free-running clock) clk via terminals P1010, P1100, and P1200, respectively, on the reference clock line 1004, while the DRAM chips 10-1 to 10-4 are each configured to receive the forward and backward clocks φ1 and φ2 via the forward and backward clock lines 1001 and 1002 and generate the intermediate-phase signal as the common timing signal GMT (Global Mean Time). In FIG. 49, it is shown that the DRAM controller 10-0 is supplied with the reference clock clk via the terminal P 1010 on the reference clock line 1004 ; alternatively, the DRAM controller 10-0 may be configured, like the DRAM chips 10-1 to 10-4, to generate the common timing signal GMT by receiving the forward clock φ1 and backward clock φ2 and generating the intermediate-phase signal.

Figure 50:
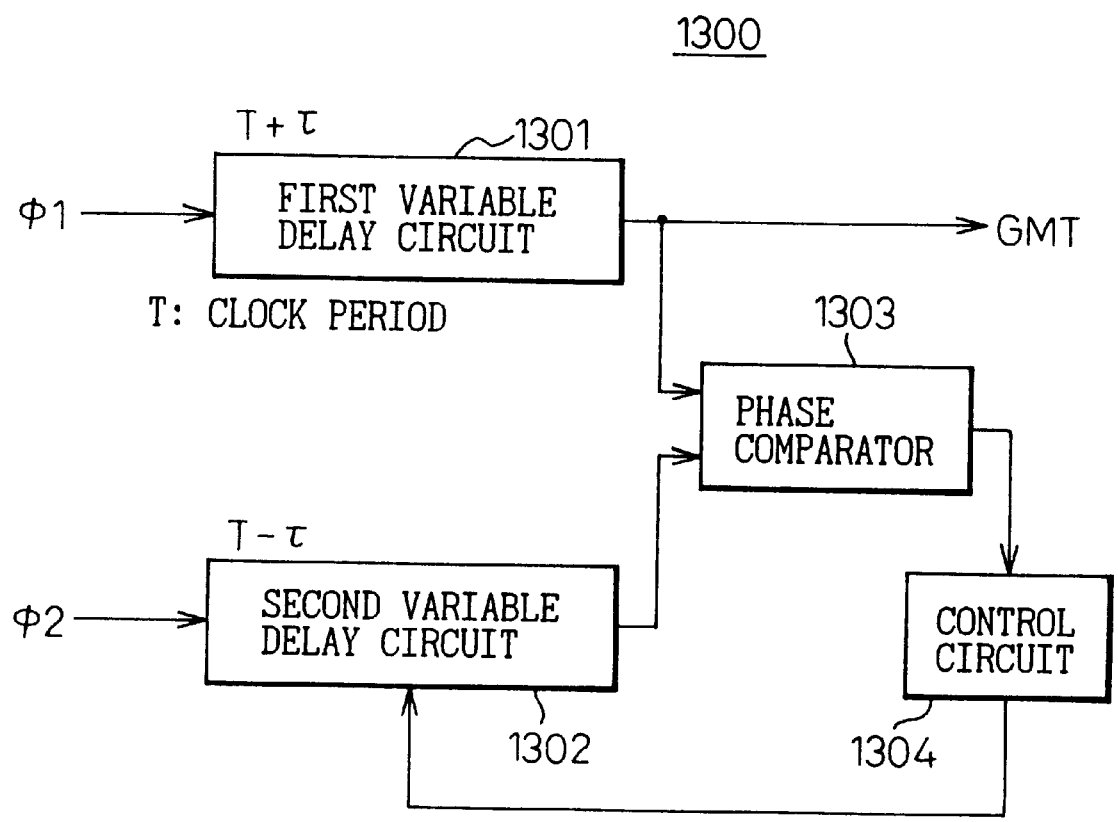
FIG. 50 is a block diagram showing one example of a common timing signal generating circuit applicable for use in the signal transmission system of FIG. 49.

FIG. 50 is a block diagram showing one example of a common, timing signal generating circuit 1300 applicable for use in the signal transmission system of FIG. 49. The common timing signal generating circuit 1300 is provided, for example, in each of the DRAM chips 10-1 to 10-4. Further, reference sign T designates clock cycle, and τ denotes delay time (delay amount).

As shown in FIG. 50, the common timing signal generating circuit 1300 comprises a first variable delay circuit 1301 which receives the forward clock φ1 and provides a delay of +τ, a second variable delay circuit 1302 which receives the backward clock φ2 and provides a delay of -τ, a phase comparator 1303 which compares the phases of the output signals of the first and second variable delay circuits 1301 and 1302, and a control circuit 1304 which controls the delay amounts (+τ and -τ) in the first and second variable delay circuits 1301 and 1302 (so that the phase difference between the output signals of the first and second variable delay circuits 1301 and 1302 becomes zero) in accordance with the result of the comparison from the phase comparator 1303. Here, the first and second variable delay circuits 1301 and 1302 are each constructed from a plurality of delay stages (delay units) in cascade, and configured to provide the delay amount up to the delay stage designated by the control circuit 1304, as will be described later. The delay amount τ controlled by the control circuit 1304 is added to the clock cycle T in the first variable delay circuit 1301 (T+τ), and is subtracted from the clock cycle T in the second variable delay circuit 1302 (T-τ). The output signal (T+τ) from the first variable delay circuit 1302 is used as the common timing signal GMT.

As described above, the control circuit 1304 controls the delay amount τ ($|\tau|<T/2$) so that the phase difference between the output signals of the first and second variable delay circuits 1301 and 1302 becomes zero. Here, denoting the output signal (GMT) of the first variable delay circuit 1301 as t1, and the output signal of the second variable delay circuit 1302 as t2, then $$t1+(T+\tau)=t2+(T-\tau)$$

from which we obtain $$\tau=(t2-t1)/2$$

Hence $$t1+(T+\tau)=(t2+t1)/2+T$$

The intermediate timing can thus be obtained.

Figure 51:
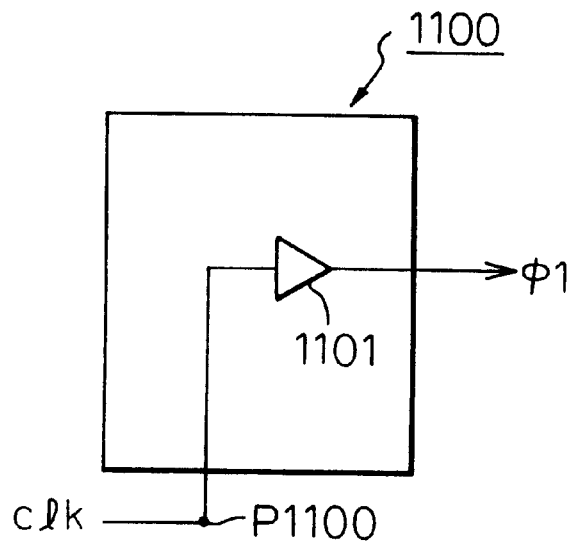
FIG. 51 is a block diagram showing one example of a forward clock generating circuit applicable for use in the signal transmission system of FIG. 49.

FIG. 51 is a block diagram showing one example of the forward clock generating circuit 1100 applicable for use in the signal transmission system of FIG. 49.

As shown in FIG. 51, the forward clock generating circuit 1100 for generating the forward clock φ1 can be constructed from a driver 1101 which accepts at its input the reference clock (free-running clock) clk supplied via the terminal P1100.

Figure 52:
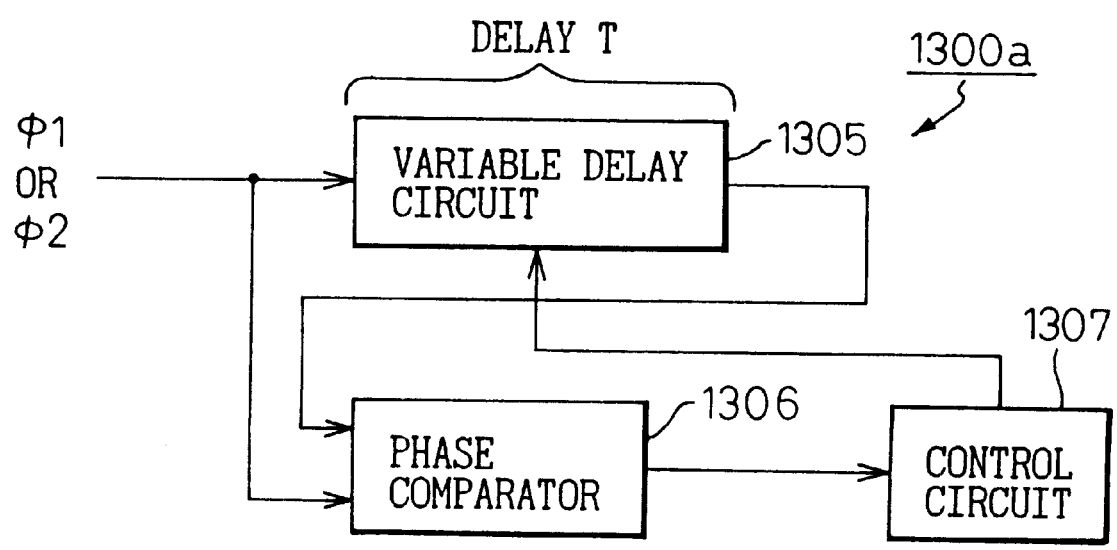
FIG. 52 is a block diagram (part 1) showing another example of the common timing signal generating circuit applicable for use in the signal transmission system of FIG. 49.
Figure 53:
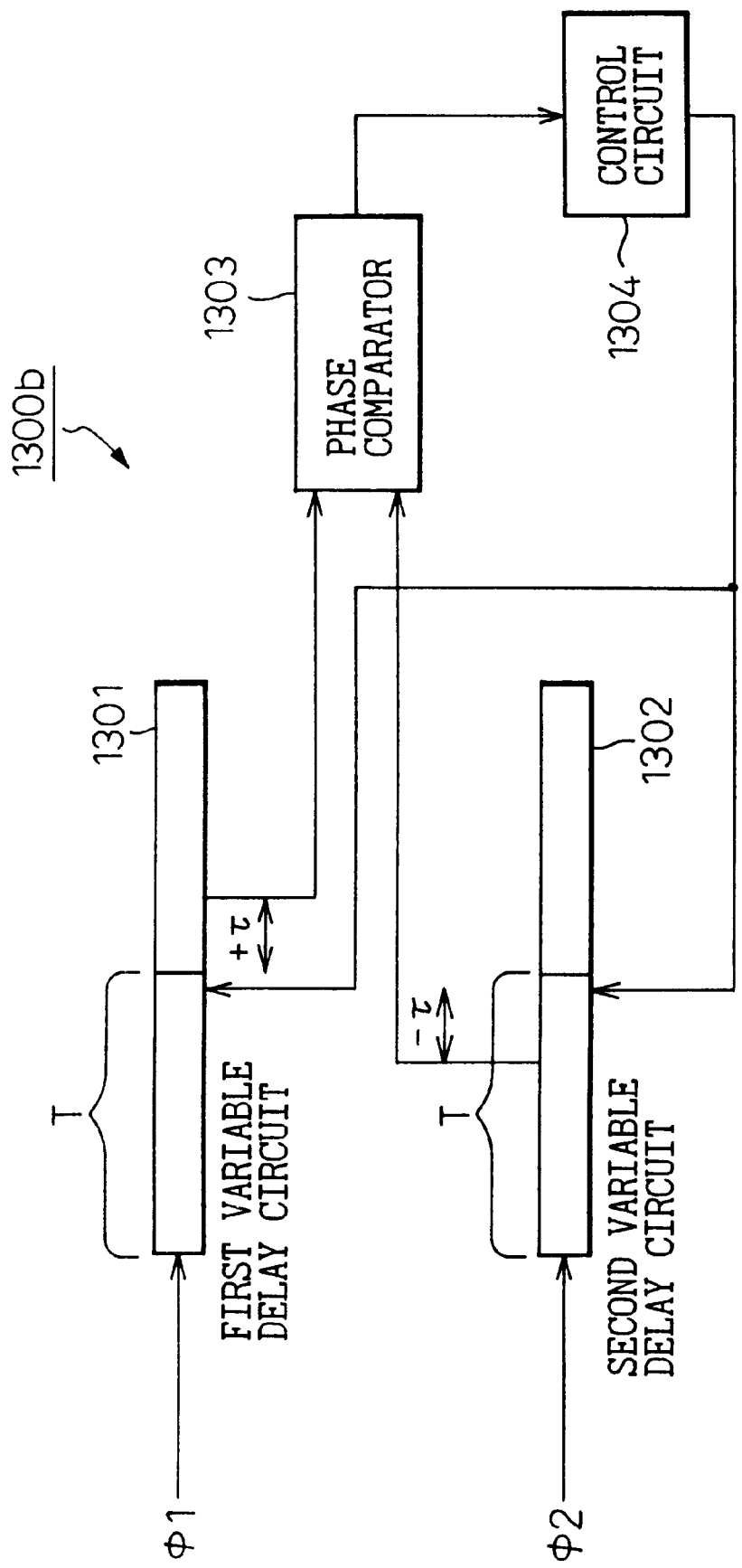
FIG. 53 is a block diagram (part 2) showing another example of the common timing signal generating circuit applicable for use in the signal transmission system of FIG. 49.

FIGS. 52 and 53 are block diagrams showing another example of the common timing signal generating circuit applicable for use in the signal transmission system of: FIG. 49: FIG. 52 shows the main DLL (Digital Locked, Loop) section 1300a of the common timing signal generating circuit 1300, and FIG. 53 shows the sub DLL section 1300b of the common timing signal generating circuit 1300.

First, as shown in FIG. 52, the main DLL section 1300a receives the forward clock φ1 (or the backward clock φ2), and the phases of the forward clock φ1 itself and its delayed version output from a variable delay circuit 1305 are compared in a phase comparator 1306; then, control is performed by a control circuit 1307 so that the phase difference between the two signals becomes zero (that is, a delay of one cycle T is introduced). In this way, a delay T equivalent to one cycle of clock ((φ1, φ2) is obtained.

Further, by using the delay T of one cycle (the number of delay stages equivalent to one cycle T) obtained by the main DLL section 1300a of FIG. 52, in the sub DLL section 1300b time τ is added or subtracted to bring the forward clock φ1 and backward clock φ2 substantially in phase.

More specifically, as shown in FIG. 53, for the forward clock φ1 the first variable delay circuit 1301 adds the delay τ to the delay T of one cycle (T+τ), and for the backward clock φ2 the second variable delay circuit 1302 subtracts the delay τ from the delay T of one cycle (T−τ). Then, as in the earlier described common timing signal generating circuit 1300 of FIG. 50, the phase comparator 1303 compares the phases of the output signal (T+τ) of the first variable delay circuit 1301 and the output signal (T−τ) of the second variable delay circuit 1302, and the control circuit 1304 selects the appropriate delay stage so that the phase difference between these signals (T+τ and T−τ) becomes zero.

Figure 54:
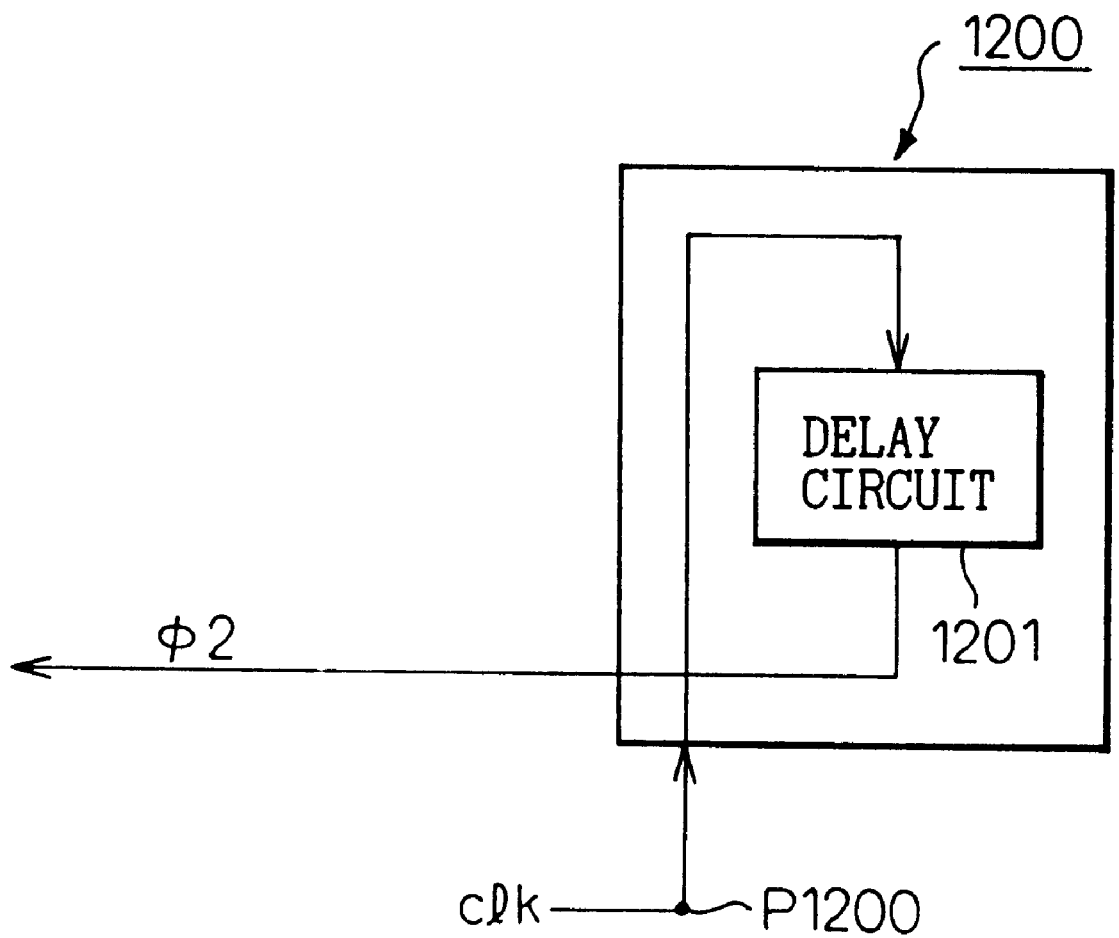
FIG. 54 is a block diagram showing one example of a backward clock generating circuit applicable for use in the signal transmission system of FIG. 49.

FIG. 54 is a block diagram showing one example of the backward clock generating circuit 1200 applicable for use in the signal transmission system of FIG. 49.

As shown in FIG. 54, the backward clock generating circuit 1200 for generating the backward clock φ2 can be constructed from a delay circuit 1201 which accepts at its input the reference clock (free-running clock) clk supplied via the terminal P1100 and provides a prescribed delay amount. Here, by setting the delay amount (delay time) to be provided by the delay circuit 1201 to an appropriate value, the phase difference between the forward and backward clocks (φ1 and φ2) on the clock lines (1001 and 1002) can be brought within ±90 degrees (and preferably within ±45 degrees).

Figure 55:
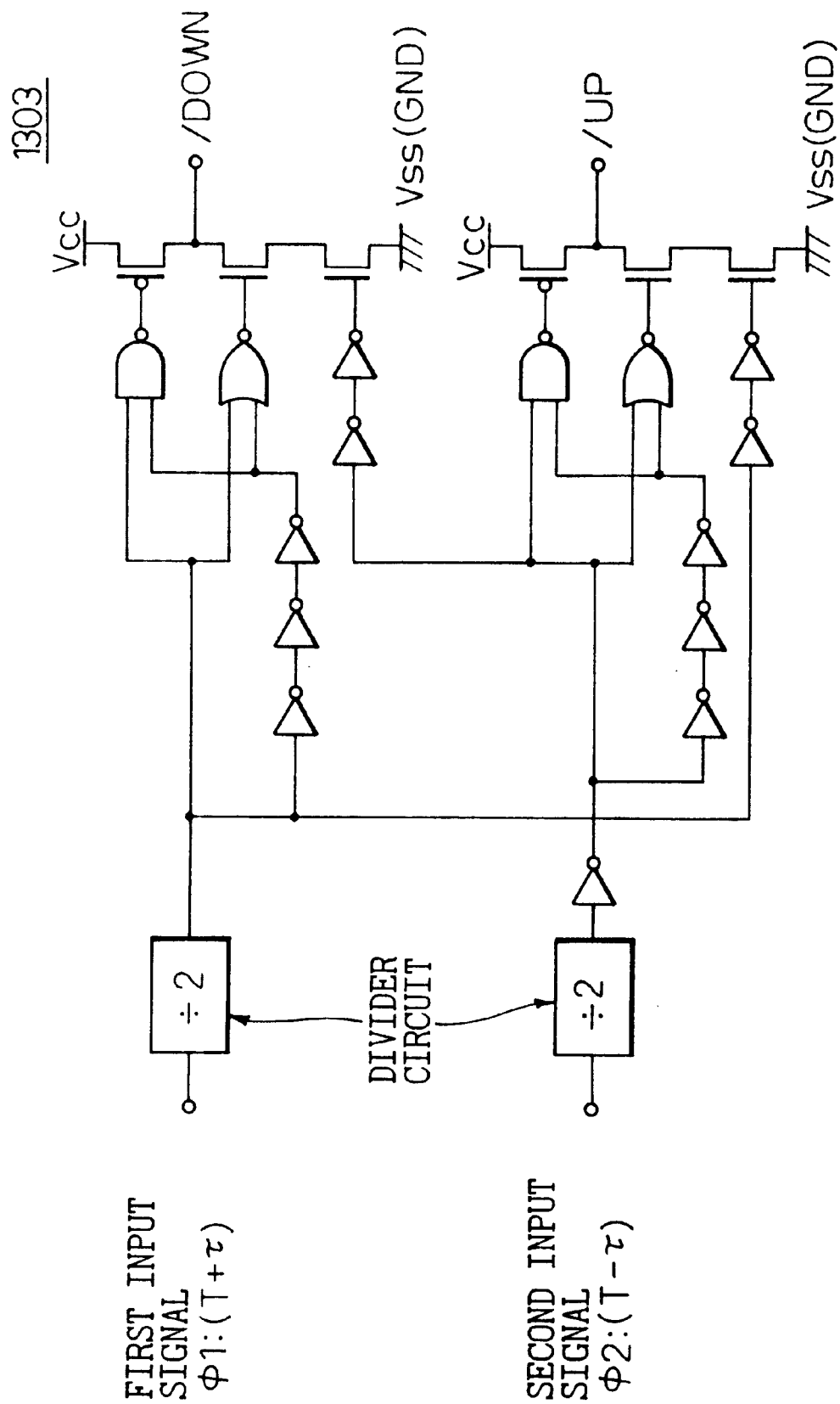
FIG. 55 is a circuit diagram showing one example of a phase comparator applicable for use in the common timing signal generating circuit in the signal transmission system of FIG. 49.

FIG. 55 is a circuit diagram showing one example of the phase comparator (the phase comparator 1303 of FIGS. 50 and 53 and the phase comparator 1306 of FIG. 52) applicable for use in the common timing signal generating circuit in the signal transmission system of FIG. 49.

As shown in FIG. 55, the phase comparator 1303 comprises, for example, two divide-by-2 frequency dividers for dividing the frequencies of the first and second input signals (T+τ and T−τ) respectively by 2, a plurality of P-channel MOS transistors, a plurality of N-channel MOS transistors, a plurality of inverters, a plurality of NAND gates, and a plurality of NOR gates. The configuration is such that an output signal (/DOWN or /UP) is produced according to the phase difference between the first input signal φ1 (T+τ) and the second input signal φ2 (T−τ), to control the delay time τ in the first and second variable delay circuits 1301 and 1302 via the control circuit 1304 so as to eliminate the phase difference between the first and second input signals.

Figure 56:
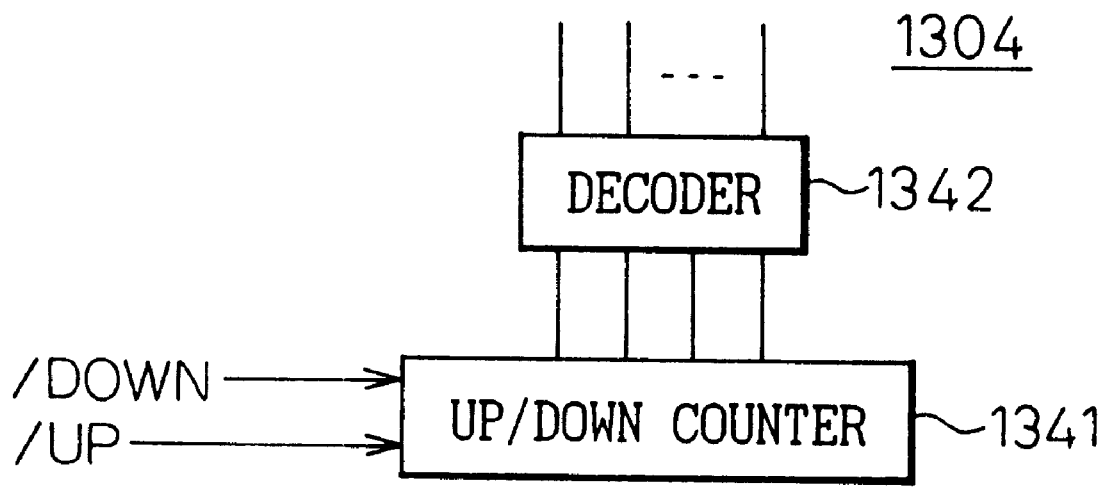
FIG. 56 is a block diagram showing one example of a control circuit applicable for use in the common timing signal generating circuit in the signal transmission system of FIG. 49.

FIG. 56 is a block diagram showing one example of the control circuit (the control circuit 1304 of FIGS. 50 and 53 and the control circuit 1307 of FIG. 52) applicable for use in the common timing signal generating circuit in the signal transmission system of FIG. 49.

As shown in FIG. 56, the control circuit 1304 comprises, for example, an UP/DOWN counter (U/D counter) 1341 which accepts the control signals (/DOWN and /UP) from the phase comparator 1303, and a decoder 1342 which accepts an output signal from the U/D counter 1341, wherein the decoder 1342 selects the designated delay stage in the variable delay circuit of FIG. 57 hereinafter described, in accordance with the control signals (/DOWN and /UP) from the phase comparator 1303.

Figure 57:
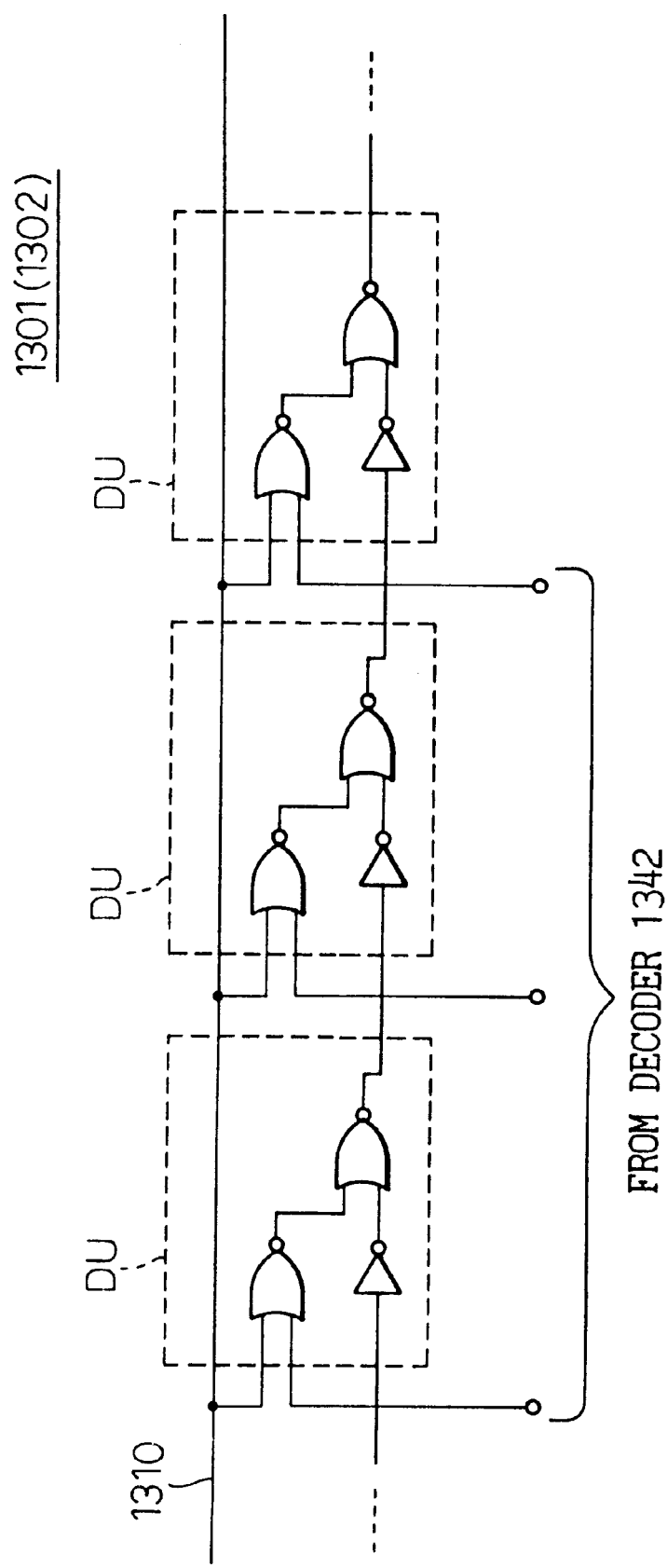
FIG. 57 is a circuit diagram showing one example, of a variable delay circuit applicable for use in the common timing signal generating circuit in the signal transmission system of FIG. 49.

FIG. 57 is a circuit diagram showing one example of the variable delay circuit (the first and second variable circuits 1301 and 1302 of FIGS. 50 and 53 and the variable delay circuit 1305 of FIG. 52) applicable for use in the common timing signal generating circuit in the signal transmission system of FIG. 49.

As shown in FIG. 57, the first variable delay circuit 1301 (the second variable delay circuit 1302) comprises a plurality of delay stages (delay units) DUs. Each delay unit DU consists of an inverter and two NAND gates, and is connected in common to a delay line. 1310. The configuration is such that the delay amount defined by any one delay unit DU selected by the decoder 1342 is given as the delay amount to be provided by the variable delay circuit. Here, it will be recognized that various known DLL circuit techniques can be applied for the above-described configurations.

Figure 58:
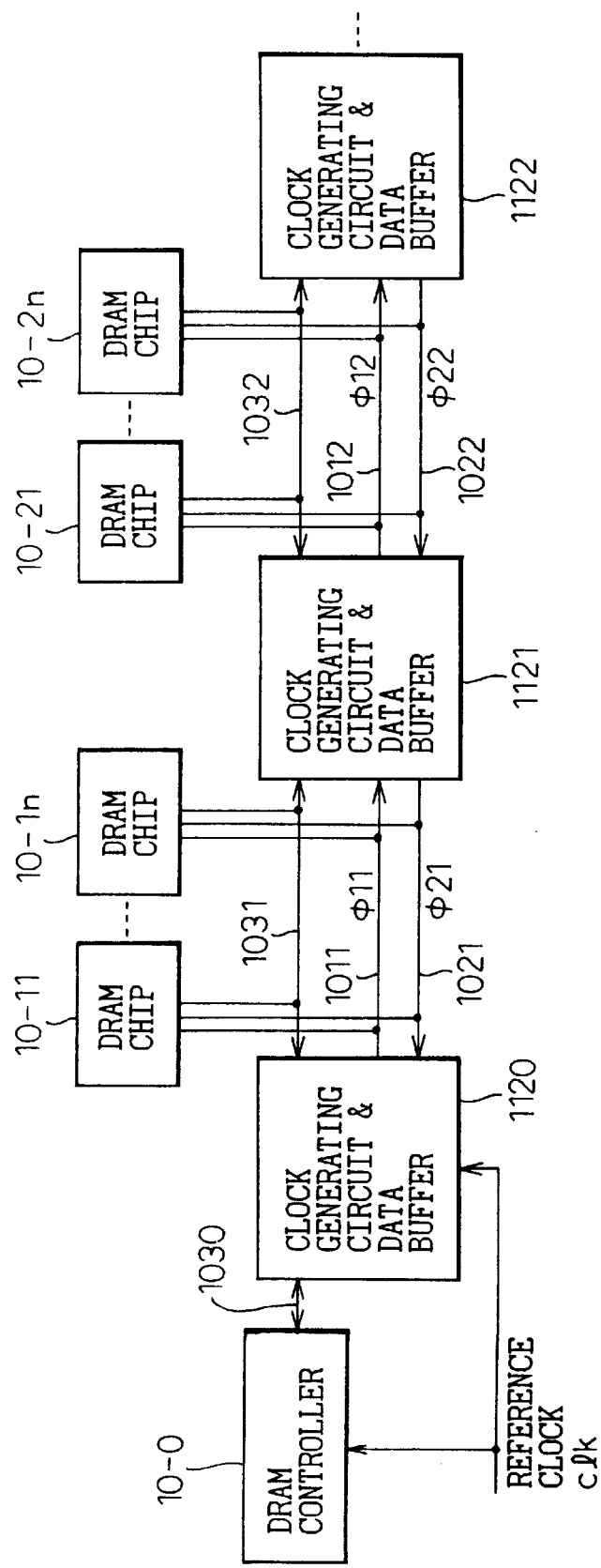
FIG. 58 is a block diagram showing a second embodiment of the signal transmission system according to the fourth mode of the present invention.

FIG. 58 is a block diagram showing a second embodiment of the signal transmission system according to the fourth mode of the present invention.

In the fourth mode of the present invention, the common timing signal GMT is generated by taking the intermediate timing between the forward and backward clock signals (φ1 and φ2); here, to uniquely generate the common timing signal GMT, the phase difference between the forward and backward clock signals must be brought within certain limits. However, when the clock lines (1001 and 1002) become long, it becomes difficult to bring the phase difference between the forward and backward clock signals within the certain limits along the entire length of the clock lines. To address this, in the second embodiment hereinafter described, the forward and backward clock lines are each divided into shorter segments (1011, 1021; 1012, 1022) of such a length that can ensure unique delivery of the common timing signal GMT so that the common timing signal GMT can be generated even when the total length of the signal line is long.

More specifically, in the second embodiment shown in FIG. 58 as contrasted to the first embodiment shown in FIG. 49, clock generating circuit/data buffer pairs, 1120, 1121, and 1122, are provided at equally distanced intervals to transmit forward clocks φ11, φ21 and backward clocks φ12, φ22 along the forward clock signal lines 1011, 1021 and backward clock signal lines 1012, 1022, respectively, and to transmit data of sufficient amplitude onto data lines 1031 and 1032.

Here, the clock generating circuit/data buffer pairs, 1120, 1121, and 1122, are each configured to generate the common timing signal GMT based on the clock received from the preceding block, and to generate the forward clock to the next block (and the backward clock to the preceding block) based on the generated common timing signal GMT.

Figure 59:
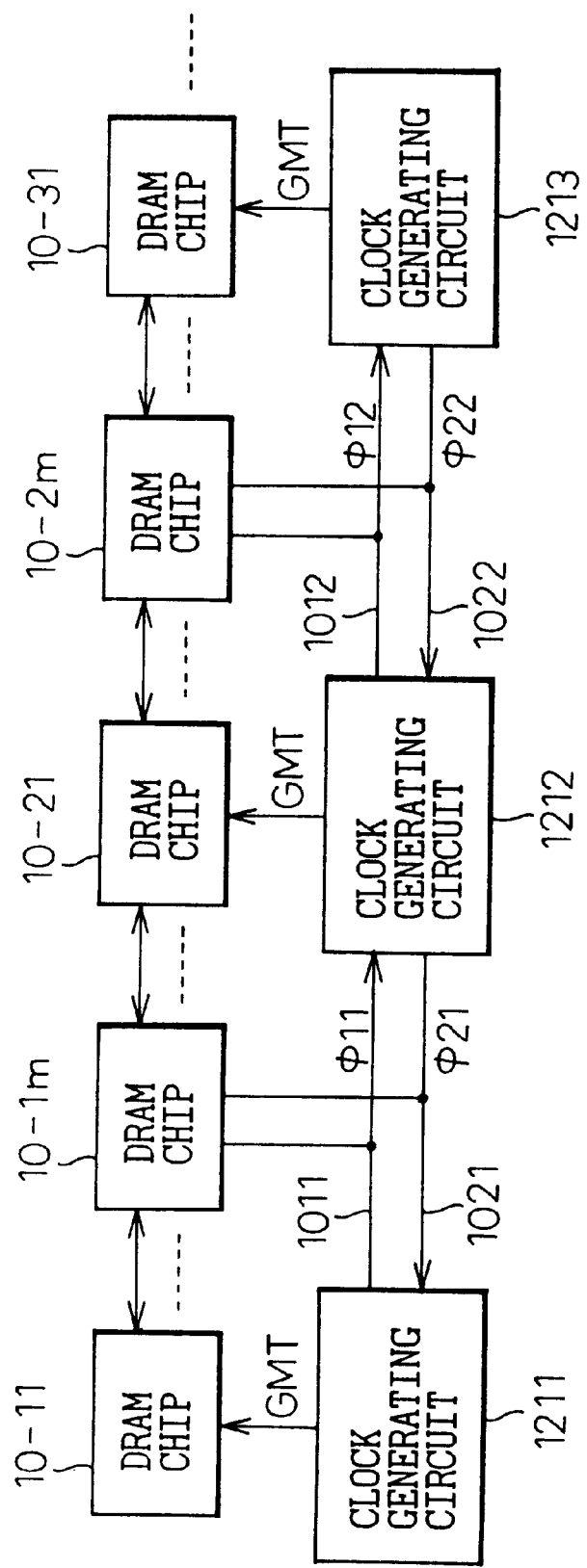
FIG. 59 is a block diagram showing a third embodiment of the signal transmission system according to the fourth mode of the present invention.

FIG. 59 is a block diagram showing a third embodiment of the signal transmission system according to the fourth mode of the present invention.

In the third embodiment shown in FIG. 59, the bus-connected data lines shown in FIG. 58 are all connected point-to-point. In that case, clock generating circuits 1211, 1212, and 1213 for generating the forward and backward clocks are provided for every multiple devices (for DRAM chips 10-11, 10-21, and 10-31), and the other devices (10-1m, 10-2m, etc.) are configured to transmit and receive signals by generating the common timing signal GMT from the forward clock φ11 or φ21 and the backward clock φ12 or φ22 supplied from the corresponding clock generating circuits. Since the signal transmission path is not a bus, the third embodiment is free from reflections due to signal branching, and is therefore suitable for high-speed signal transmission.

Figure 60:
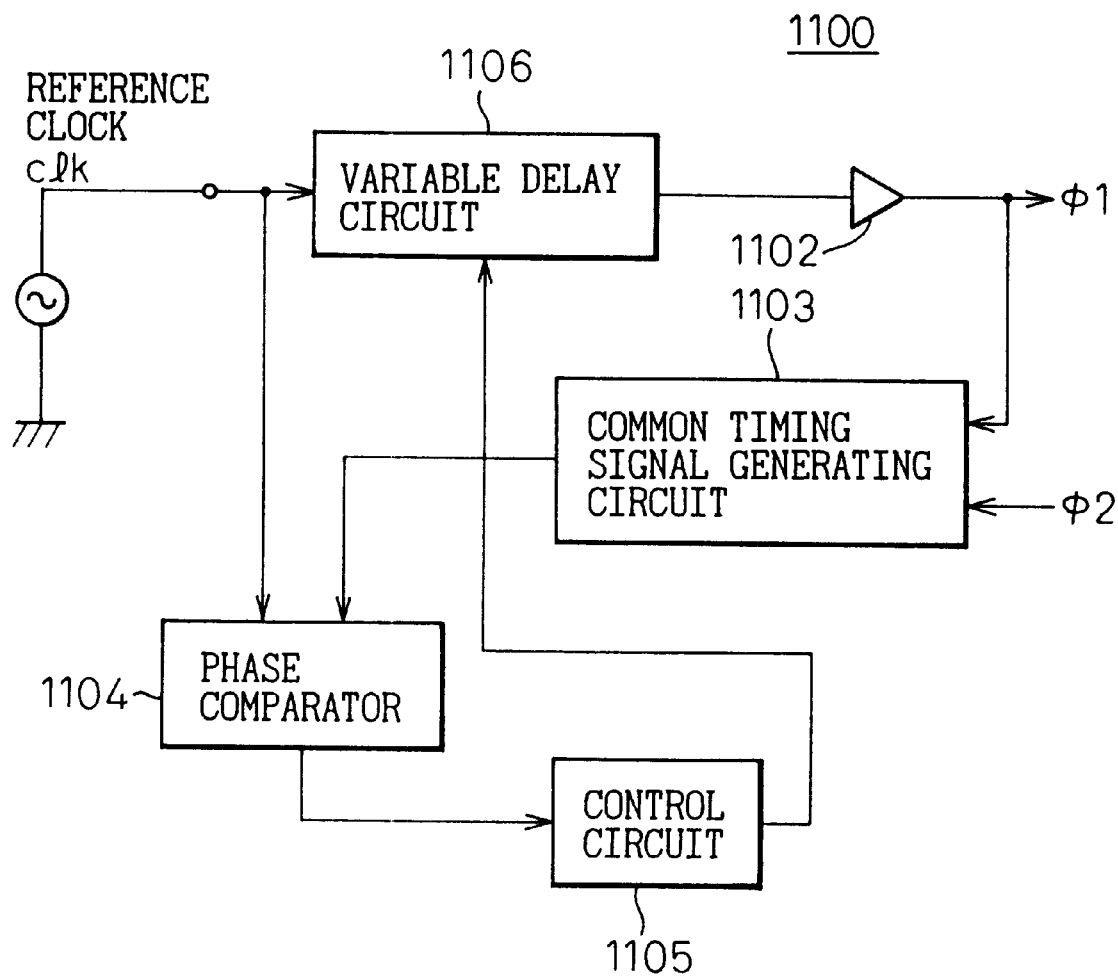
FIG. 60 is a block diagram showing one example of a forward clock generating circuit used in the signal transmission system as a fourth embodiment according to the fourth mode of the present invention.

FIG. 60 is a block diagram showing one example of the forward clock generating circuit used in the signal transmission system as a fourth embodiment according to the fourth mode of the present invention. In FIG. 60, reference numeral 1102 is a driver, 1103 is a common timing signal generating circuit, 1104 is a phase comparator, 1105 is a controller, and 1106 is a variable delay circuit.

As shown in FIG. 60, in the fourth embodiment, the forward clock generating circuit 1100 is not constructed from a single driver 1101, such as shown in FIG. 51, but is configured so that an output signal from the variable delay circuit 1106 which provides a prescribed delay by accepting the reference clock clk, is sent out as the forward clock φ1 via the driver 1102, and the common timing signal (intermediate-phase signal) GMT is generated by the common timing signal generating circuit 1103 from the output signal (φ1) of the driver 1102 and the backward clock φ2, the phases of the common timing signal and the reference clock clk then being compared in the phase comparator 1104 to control the delay amount (the number of delay stages) in the variable delay circuit 1106 via the control circuit 1105.

Thus, in the fourth embodiment, feedback is performed so that the common timing signal GMT is synchronized to the rising of the reference clock clk, thereby ensuring that a backward clock φ2 of stable phase can be obtained if the characteristic of the clock driver 1102 or the variable delay circuit 1106 varies because of manufacturing variations, ambient temperature changes, etc., and also that the common timing signal GMT generated by a device (for example, a DRAM chip) on the signal line has the same timing as the reference clock clk. The reference clock clk refers to the clock signal supplied to a particular chip (for example, the DRAM controller 10-0).

Figure 61:
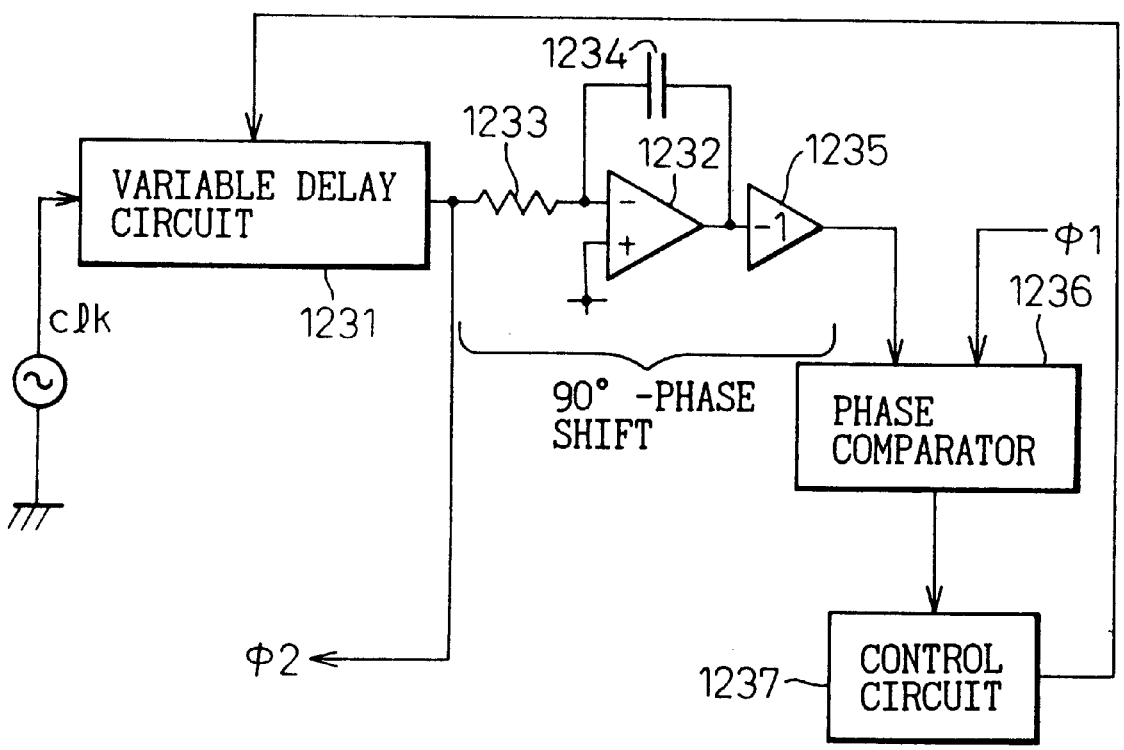
FIG. 61 is a block diagram showing one example of a backward clock generating circuit applicable for use in the signal transmission system as a fifth embodiment according to the fourth mode of the present invention.

FIG. 61 is a block diagram showing one example of the backward clock generating circuit applicable for use in the signal transmission system as a fifth embodiment according to the fourth mode of the present invention. In FIG. 61, reference numeral 1231 is a variable delay circuit, 1232 is an operational amplifier, 1233 and 1234 are a resistor and a capacitor, respectively, 1235 is an inverting driver for inverting an input signal for output, 1236 is a phase comparator, and 1237 is a control circuit.

As shown in FIG. 61, in the fifth embodiment, the backward clock generating circuit 1200 is not constructed from a single delay circuit 1201, such as shown in FIG. 54, but is configured so that the backward clock φ2 is derived as an output signal of the variable delay circuit 1231 which accepts the reference clock clk and provides a prescribed delay, and the phase of the output signal (φ2) of the variable delay circuit 1231, passed through the operational amplifier 1232 and the inverting driver 1235, is compared in the phase comparator 1236 with the phase of the forward clock φ1. Then, based on the result of the phase comparison, the delay amount (the number of delay stages) in the variable delay circuit 1231 is controlled via the control circuit 1237. In this way, the backward clock φ2 is output as a signal whose phase is 90 degrees shifted (advanced) with respect to the phase of the forward clock φ1.

Thus, according to the backward clock generating circuit 1200 of the fifth embodiment, feedback control performed so that the phase difference between the received forward clock φ1 and the backward clock φ2 is maintained at a constant value (that is, the backward clock φ2 is 90 degrees advanced in phase with respect to the forward clock φ1), as a result of which a backward clock φ2 of stable phase can be obtained even if the characteristic of the clock driver (the inverting driver 1235), the variable delay circuit (1231), etc. varies because of manufacturing variations, ambient temperature changes, etc. The backward clock generating circuit 1200 constructed from analog circuits, such as shown in FIG. 16, is preferable when the variable range of the clock (φ2) is narrow, since the amount of circuitry can be reduced.

Figure 62:
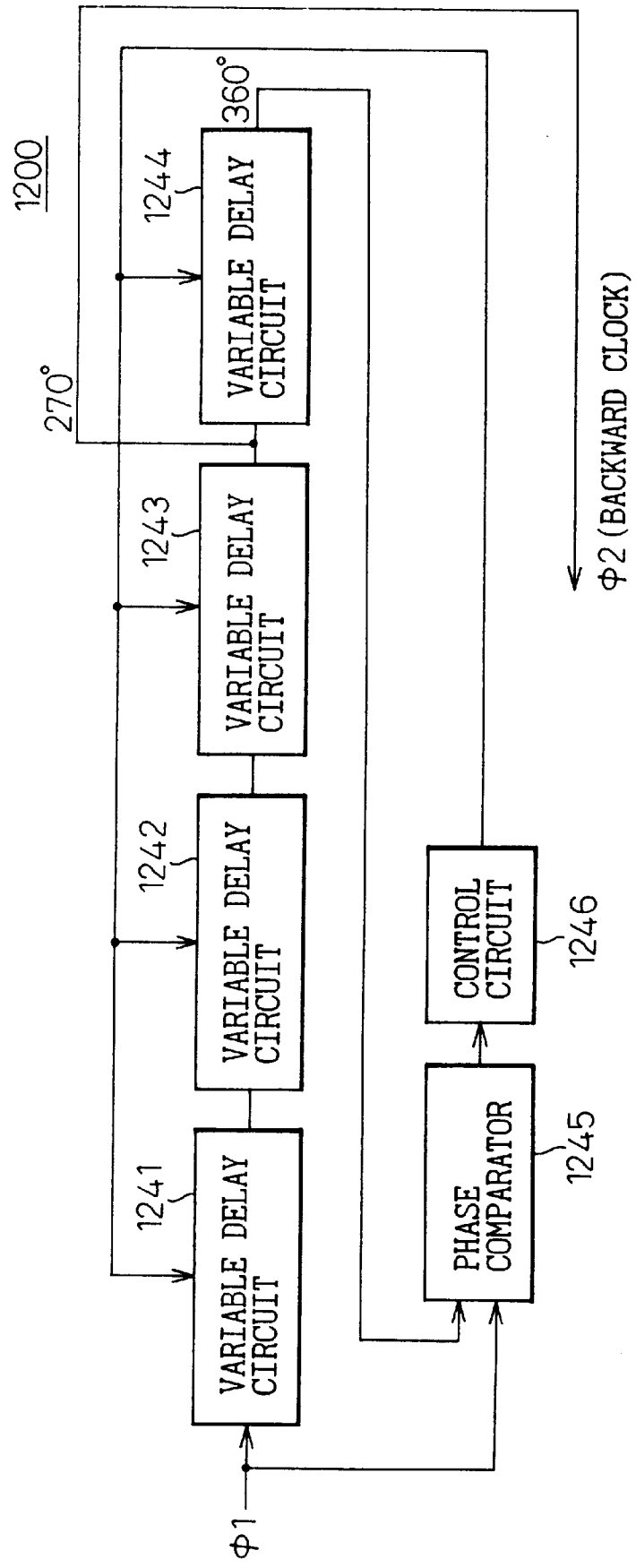
FIG. 62 is a block diagram showing another example of the backward clock generating circuit applicable for use in the signal transmission system as a sixth embodiment according to the fourth mode of the present invention.

FIG. 62 is a block diagram showing another example of the backward clock generating circuit applicable for use in the signal transmission system as a sixth embodiment according to the fourth mode of the present invention. In FIG. 62, reference numerals 1241 to 1244 are variable delay circuits, 1245 is a phase comparator, and 1246 is a control circuit. Here, the four variable delay circuits 1241 to 1244 are controlled by the control circuit 1246 so as to provide the same amount of delay.

As shown in FIG. 62, in the sixth embodiment, the phase comparator 1245 performs phase comparison between the forward clock φ1 and the signal obtained by delaying the forward clock φ1 through the four variable delay circuits 1241 to 1244; since the four variable delay circuits 1241 to 1244 are controlled by the control circuit 1246 so as to provide the same amount of delay, a backward clock φ2 which has a 270-degree (minus 90-degree) phase shift with respect to the forward clock φ1, that is, which is advanced in phase by 90 degrees with respect to the forward clock φ3, is generated by taking the output signal of the third-stage variable delay circuit 1243 as the backward clock φ2. In this way, the backward clock φ2 whose phase is unaffected by manufacturing variations, temperature changes, etc. can be obtained. The backward clock generating circuit 1200 constructed from the DLL circuit shown in FIG. 62 can also be used even when the variable range of the clock (φ2) is wide.

Figure 63:
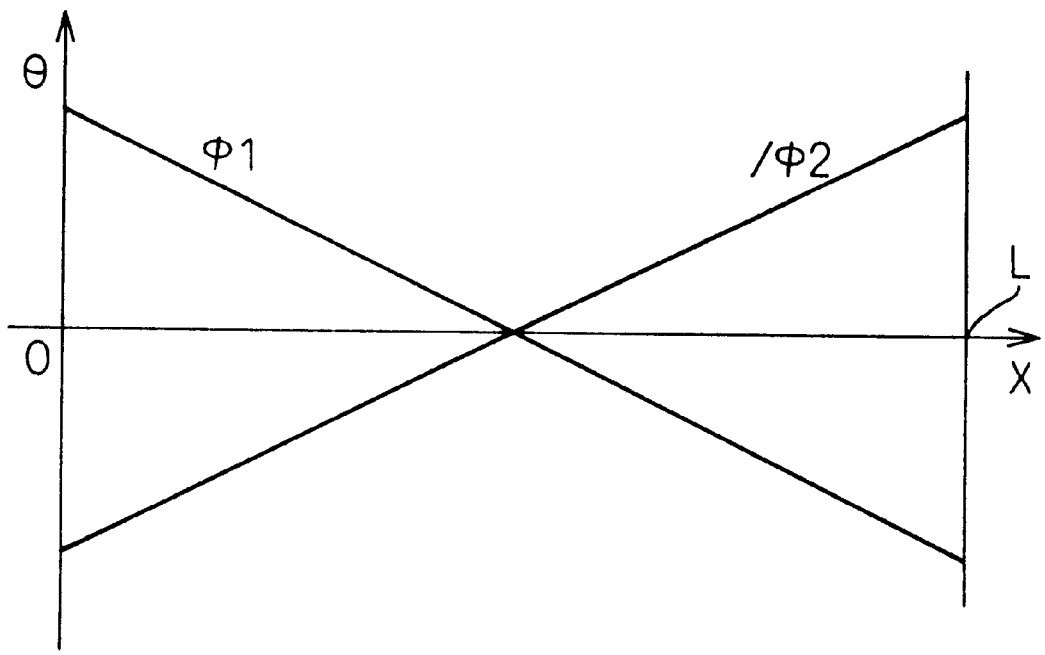
FIG. 63 is a diagram for explaining the operation of the backward clock generating circuit applicable for use in the signal transmission system as a seventh embodiment according to the fourth mode of the present invention.

FIG. 63 is a diagram for explaining the operation (function) of the backward clock generating circuit 1200 applicable for use in the signal transmission system as a seventh embodiment according to the fourth mode of the present invention. Here, the vertical axis θ represents the phase difference and the horizontal axis x the position on the clock line (1001, 1002). Reference sign L indicates the total length of the clock line.

As shown in FIG. 63, in the seventh embodiment, the phase difference between the forward clock φ1 and the backward clock/φ2 (inverted signal of clock φ2) is held within ±90 degrees in any of the devices (DRAM chips 10-1 to 10-n) that receive the clocks. More specifically, in the present embodiment, the backward clock φ2 is generated by inverting the received forward clock φ1 after giving it a phase advance just sufficient to compensate for the phase delay along the clock line (1002). This function can be implemented, for example, by inverting the feedback loop output in the backward clock generating circuit shown in FIG. 61.

In this way, according to the seventh embodiment, since it is guaranteed that the phase difference between the forward and backward clock signals φ1 and φ2 falls within predefined limits, the common timing signal GMT can be generated with high accuracy; furthermore, by receiving the forward and backward clock signals φ1 and φ2 by a differential receiving circuit, the influence of phase noise can be reduced.

Figure 64:
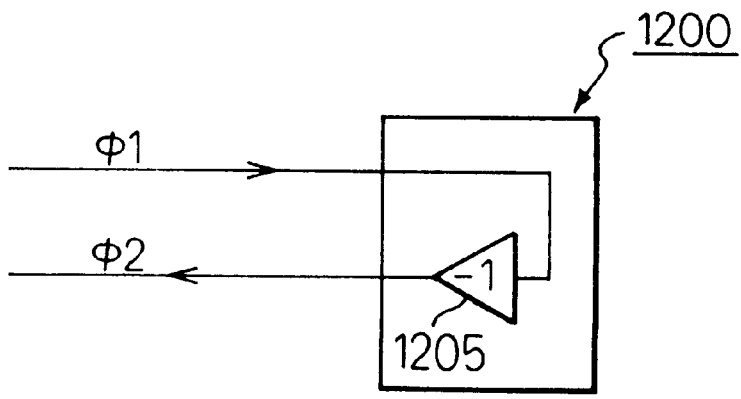
FIG. 64 is a block diagram showing still another example of the backward clock generating circuit applicable for use in the signal transmission system as an eighth embodiment according to the fourth mode of the present invention.

FIG. 64 is a block diagram showing still another example of the backward clock generating circuit applicable for use in the signal transmission system as an eighth embodiment according to the fourth mode of the present invention.

As shown in FIG. 64, in the eighth embodiment, the backward clock generating circuit 1200 is constructed from an inverting driver 1205 for inverting an input signal (forward clock φ1) for output.

That is, in the case of a short signal line where the phase delay of the clock signal (φ1, φ2) through the clock receiving circuit, driver, clock line, etc. does not present a problem, the backward clock generating circuit 1200 can be constructed from the inverting driver 1205. This simplifies the circuit configuration of the backward clock generating circuit 1200.

Figure 65:
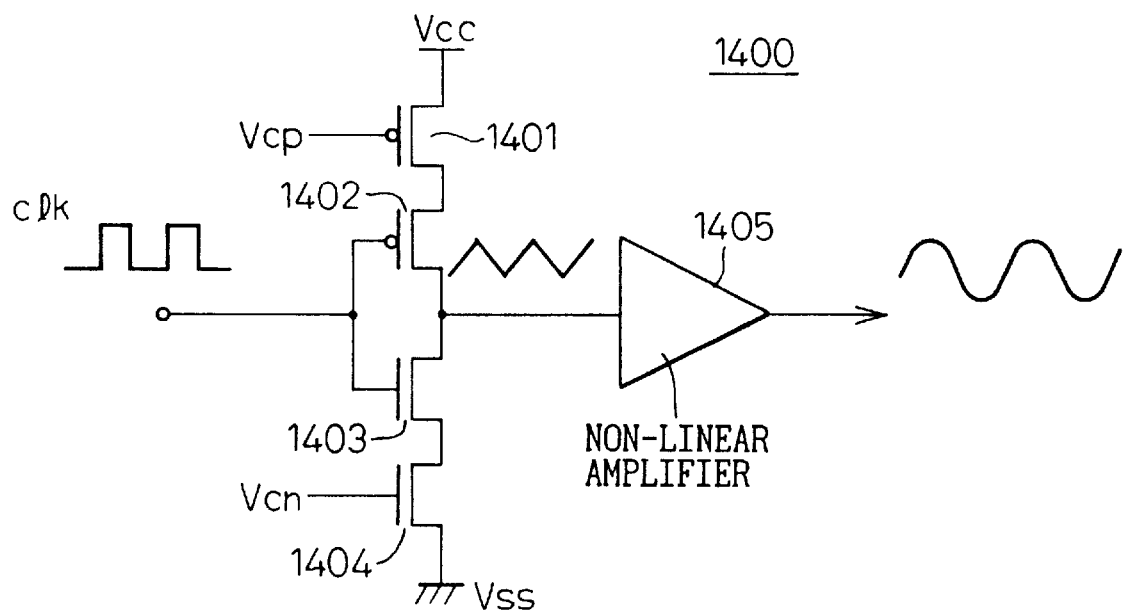
FIG. 65 is a block circuit diagram showing one example of a sine wave generating circuit applicable for use in the signal transmission system as a ninth embodiment according to the fourth mode of the present invention.

FIG. 65 is a block circuit diagram showing one example of a sine wave generating circuit applicable for use in the signal transmission system as a ninth embodiment according to the fourth mode of the present invention. The ninth embodiment uses a sine wave (pseudo-sine wave) as the clock; that is, the sine wave generating circuit 1400 generates a sinusoidal clock from a pulse-like (square-wave) clock (reference clock) clk.

As shown in FIG. 65, in the sine wave generating circuit 1400, a triangular-wave clock is generated from the square-wave clock clk by a full-amplitude CMOS circuit consisting of P-channel MOS transistors 1401, 1402 and N-channel MOS transistors 1403, 1404, and then the sinusoidal clock (pseudo-sinusoidal clock) is generated by a non-linear amplifier 1405.

Figure 66:
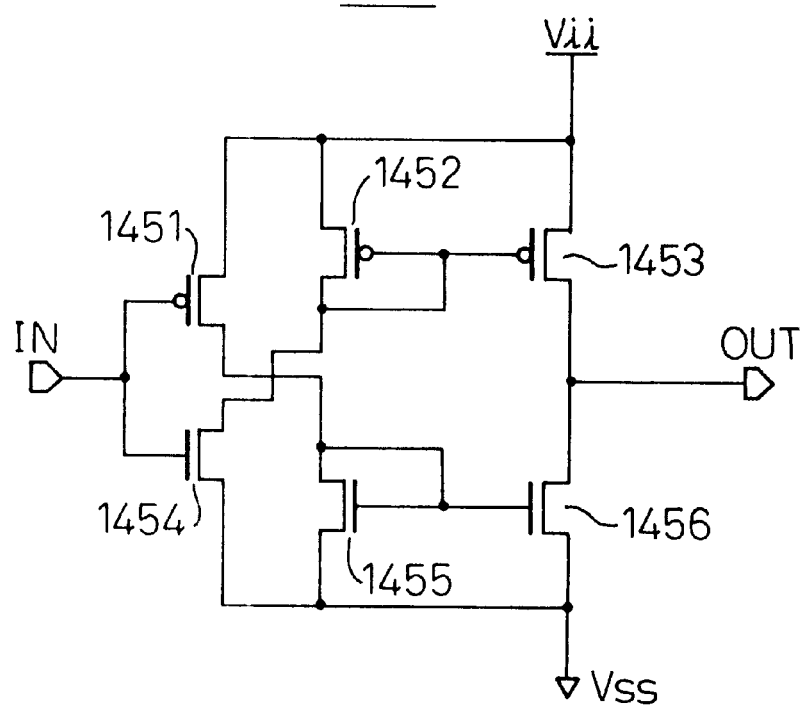
FIG. 66 is a circuit diagram showing one example of a non-linear amplifier in the sine wave generating circuit of FIG. 65.
Figure 67:
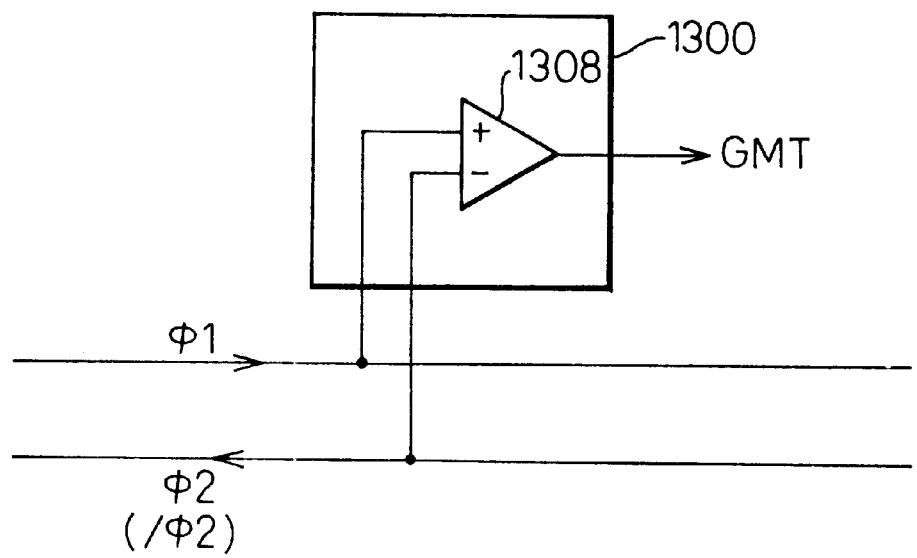
FIG. 67 is a block diagram showing one example of the common timing signal generating circuit applicable for use in the signal transmission system as a 10th embodiment according to the fourth embodiment of the present invention.

Instead of a sine wave, a clock of another waveform, such as a triangular wave or a trapezoidal wave, whose rise and fall times constitute a significant proportion of the clock cycle, may be used. Such a clock waveform (sinusoidal clock waveform) has the advantage of being able to reduce mutual interference with other signal lines since it contains less harmonic components than the waveform of a square-wave clock. A further advantage is that the common timing signal generating circuit 1300 in a each device (DRAM chip or the like) can be constructed from a differential comparator as shown in FIG. 67. FIG. 66 is a circuit diagram showing one example of the non-linear amplifier 1405 in the sine wave generating circuit of FIG. 65.

As shown in FIG. 66, the non-linear amplifier 1405 can be constructed with P-channel MOS transistors 1451 to 1453 and N-channel MOS transistors 1454 to 1456. Here, each transistor is formed in appropriate size; for example, it is preferable that the gate length of the transistors 1451 and 1452 is set about twice that of the transistors 1454 and 1455, respectively, and that the gate length of the transistors 1452 and 1455 is made greater than that of the transistors 1451 and 1454, respectively. Further, the transistors 1453 and 1456 are chosen according to the load to drive, and are usually constructed from large-size transistors.

FIG. 67 is a block diagram showing one example of the common timing signal generating circuit 1300 applicable for use in the signal transmission system as a 10th embodiment according to the fourth embodiment of the present invention.

As described above, when a sinusoidal or like waveform clock is used, for example, the common timing signal generating circuit 1300 provided in each device (DRAM chip or the like) 10 can be constructed from a differential comparator 1308 to which the forward and backward clocks φ1 and φ2 (/φ2) are supplied as inputs.

The reason that the common timing signal (intermediate timing) GMT can be generated by the differential comparator 1308 is as follows. When the forward clock φ1 and the inverted backward clock/φ2 are expressed as φ1=A·sinθ1 and /φ2=A·sinθ2, then φ1−/φ2=2A·cos((θ1−θ2)/2)·sin((θ1+θ2)/2)

From this, it can be seen that if the value of (θ1−θ2)/2 is within ±90 degrees, the common timing signal GMT (the signal corresponding to the intermediate phase (θ1+θ2)/2 ) can be derived by processing the above signals through the comparator.

Figure 68:
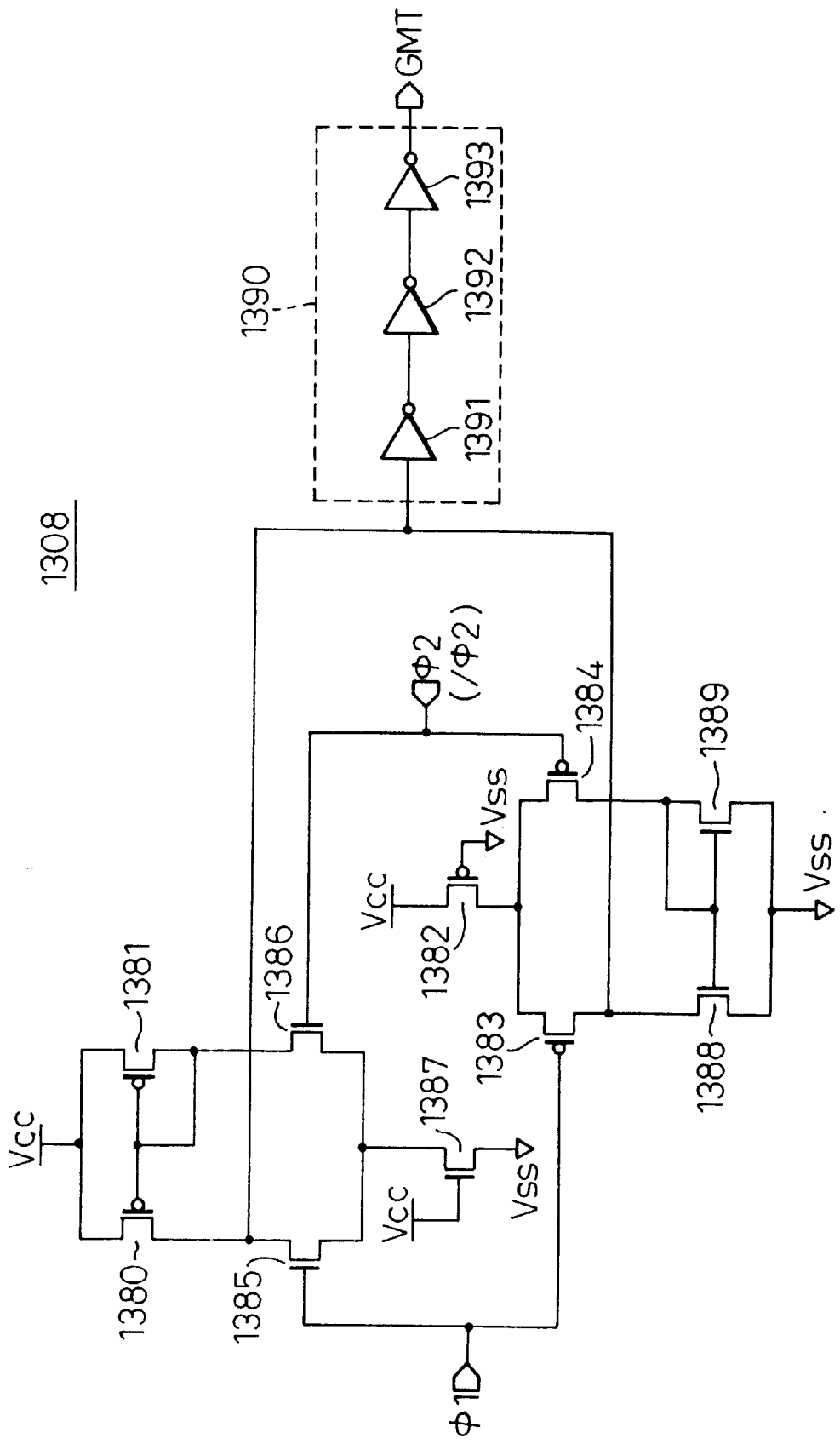
FIG. 68 is a circuit diagram showing one example of a differential comparator in the common timing signal generating circuit of FIG. 67.

FIG. 68 is a circuit diagram showing one example of the differential comparator 1308 in the common timing signal generating circuit of FIG. 67.

As shown in FIG. 68, the differential comparator 1308 comprises: a first differential-amplifier stage consisting of P-channel MOS transistors 1380 and 1381 and N-channel MOS transistors 1385 to 1387, with the N-channel transistors 1385 and 1386 acting as its inputs; a second differential-amplifier stage consisting of P-channel MOS transistors 1382 to 1384 and N-channel MOS transistors 1388 and 1389, with the P-channel transistors 1383 and 1384 acting as its inputs; and a buffering stage 1390. Here, the buffering stage consists of inverters 1391 to 1393 connected in cascade.

In this way, the common timing signal generating circuit 1300 can be constructed using the differential comparator 1308 with simple circuitry without using a DLL circuit or the like which requires a large amount of circuitry.

Figure 69:
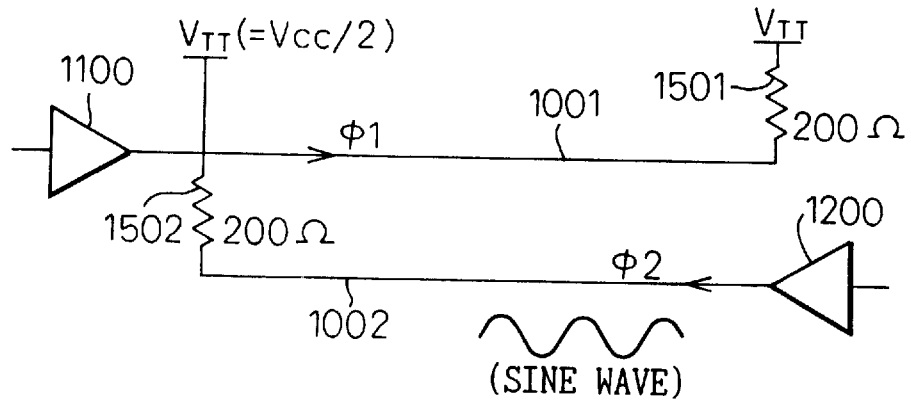
FIG. 69 is a block diagram showing one example of termination resistance in the signal transmission system as an 11th embodiment according to the fourth mode of the present invention.

FIG. 69 is a block diagram showing one example of termination resistance in the signal transmission system as an 11th embodiment according to the fourth mode of the present invention.

In the 11th embodiment, which uses the forward and backward clocks φ1 and φ2 of sinusoidal waveform, the terminating end of the clock line 1001 carrying the forward clock φ1 is terminated with a termination resistor 1501 having a resistance value (for example, 200 Ohms) larger than the characteristic impedance (for example, 50 or 70 Ohms) of that clock line, and likewise, the terminating end of the clock line 1002 carrying the backward clock φ2 is terminated with a termination resistor 1502 having a resistance value (for example, 200 Ohms) larger than the characteristic impedance (for example, 50 or 70 Ohms) of that clock line.

In the 11th embodiment, the resistance value of the termination resistors 1501 and 1502 is made larger than the characteristic impedance of the respective clock lines 1001 and 1002, but since the forward and backward clocks 41 and 42 are sinusoidal clocks, the clock waveform remains sinusoidal if the termination resistors 1501 and 1502 are substantially shifted from the characteristic impedance. Further, the propagation characteristic of the wave (forward and backward clocks φ1 and φ2) becomes different from that of the signal line (clock lines 1001 and 1002) as the result of reflections in the line, but this does not present a problem when extracting the intermediate timing (for the common timing signal GMT) between the forward and backward clocks. Furthermore, by setting the resistance value of the termination resistors 1501 and 1502 larger than the characteristic impedance of the clock lines 1001 and 1002, the power consumed by the termination resistors 1501 and 1502 (power consumption in the clock system) can be reduced.

Figure 70:
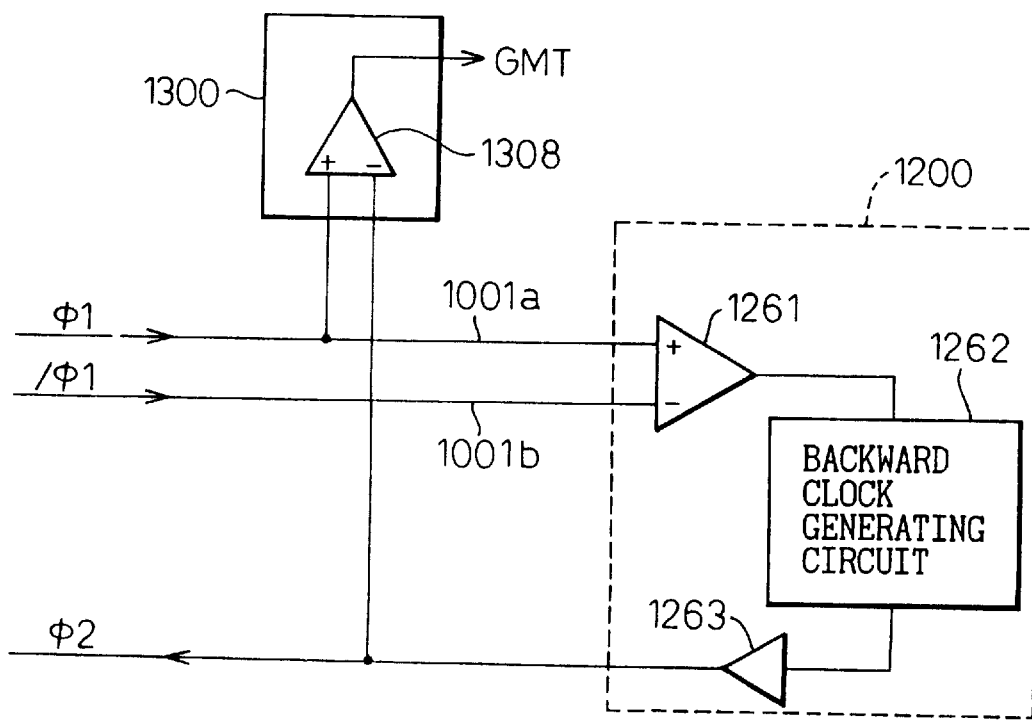
FIG. 70 is a block diagram for explaining a method of supplying a forward clock in the signal transmission system as a 12th embodiment according to the fourth mode of the present invention.

FIG. 70 is a block diagram for explaining a method of supplying the forward clock in the signal transmission system as a 12th embodiment according to the fourth mode of the present invention.

In the 12th embodiment, forward clock lines configured as differential transmission lines (10001a and 10001b) are used for transmission of complementary forward clocks φ1 and /φ1, so that the backward signal generating circuit 1200 can generate the backward clock φ2 by reducing the influence of the phase noise introduced in the forward clock. More specifically, the backward signal generating circuit 1200 is constructed from a differential comparator 1261, to which the complementary forward clocks φ1 and φ4 are input, and a backward clock generator 1262 (plus a buffer 1263).

Here, the common timing signal generating circuit 1300 provided in each device (DRAM chip or the like) can be constructed from the differential L comparator 1308, previously shown in FIG. 67, for generating the common timing signal GMT. In this case, the differential comparator 1308 is supplied at its inputs with one of the complementary forward clocks 41 and /φ1 (the true signal φ1) and the backward clock φ2; in this case also, the influence of the phase noise can be reduced.

Figure 71:
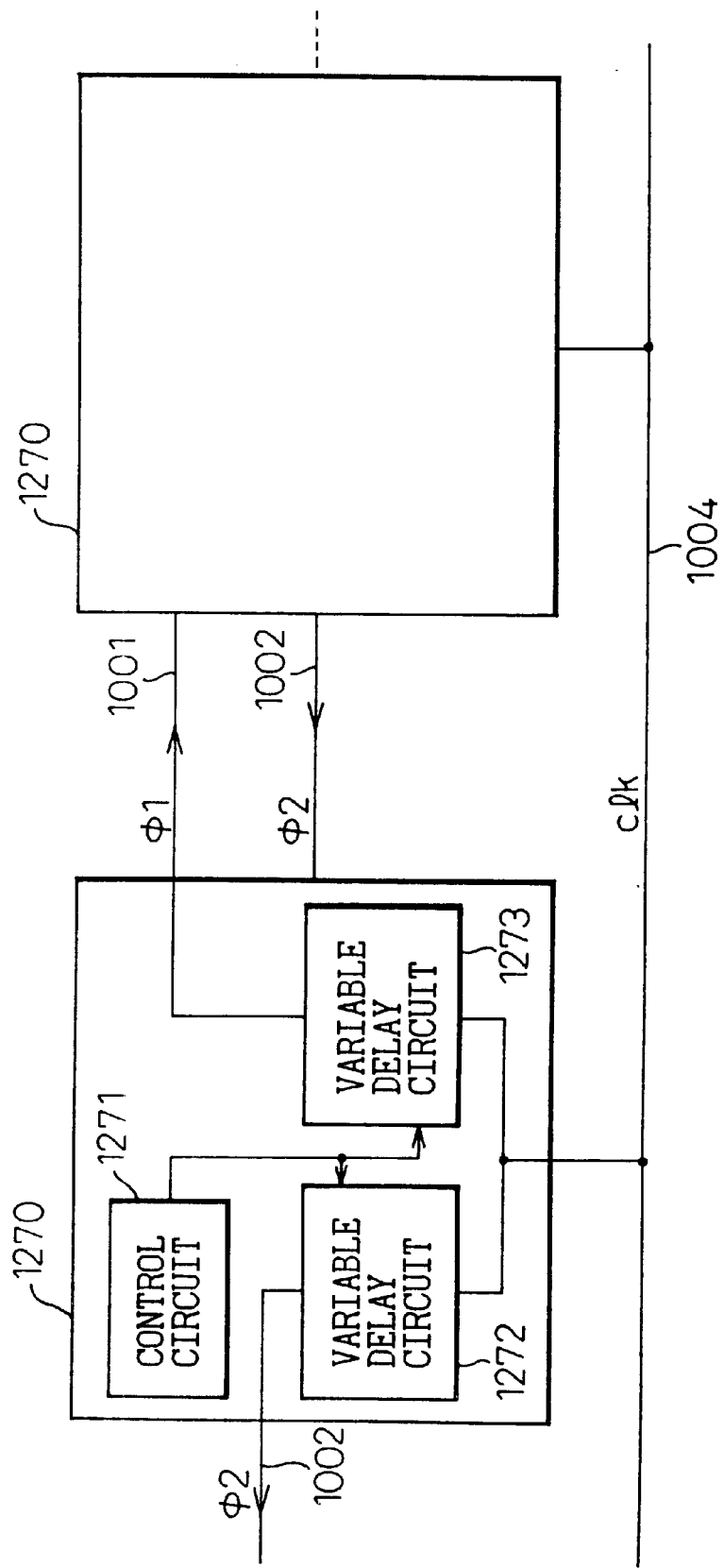
FIG. 71 is a block diagram showing an essential portion of a signal transmission system implemented on a printed circuit board as a 13th embodiment according to the fourth mode of the present invention.

FIG. 71 is a block diagram showing an essential portion of the signal transmission system implemented on a printed circuit board as a 13th embodiment according to the fourth mode of the present invention.

As shown in FIG. 71, in the 13th embodiment, a plurality of signal generating circuits (forward clock generating circuit 1100 and backward clock generating circuit 1200) 1270 are mounted on the printed circuit board, and these signal generating circuits 1270 generate the forward clock φ1 and backward clock φ2 by using the reference clock (free-running clock) clk propagating on the printed circuit board. More specifically, each signal generating circuit 1270 comprises a variable delay circuit 1273 for the forward clock, a variable delay circuit 1272 for the backward clock, and a control circuit 1270, wherein the forward clock φ1 and backward clock φ2 are generated by delaying the reference clock clk through the respective variable delay circuits 1273 and 1272 under control of the control circuit 1270.

When the clock (φ1, φ2) at the preceding stage is used to sequentially generate the clock for the next stage, as in the second embodiment previously shown in FIG. 58, jitter increases through the delay stages as the number of stages increases; on the other hand, for the many signal generating circuits 1270 mounted on the printed circuit board, jitter accumulation can be prevented by employing the configuration of the 13th embodiment shown in FIG. 71.

Figure 72:
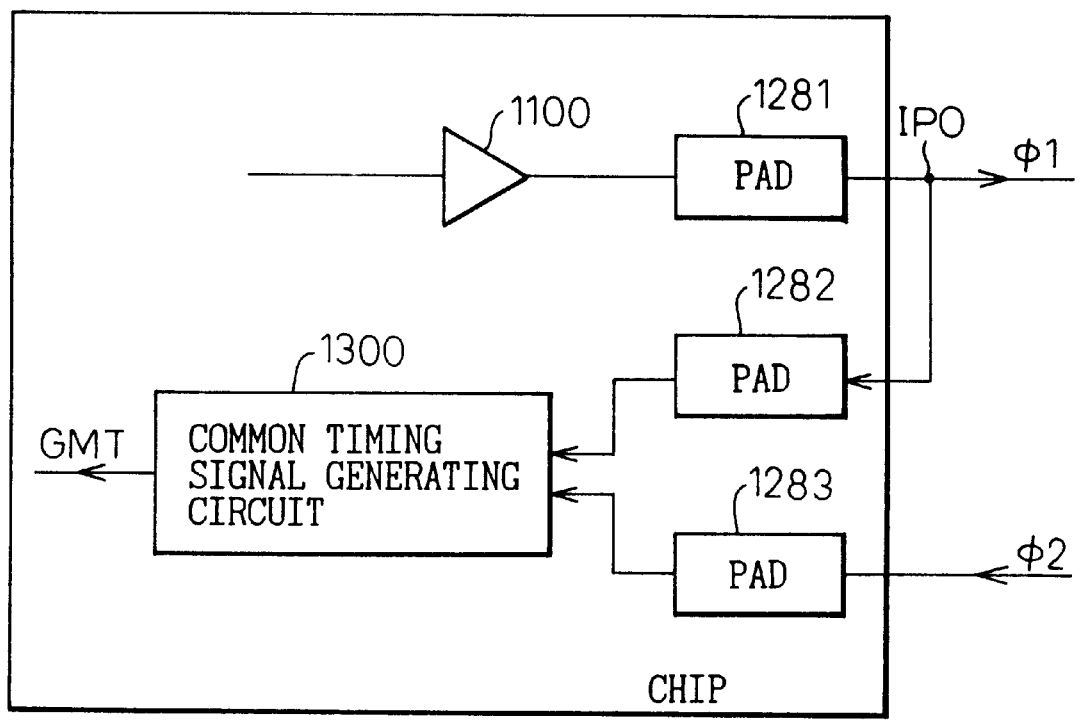
FIG. 72 is a block diagram showing an essential portion of a signal transmission system implemented in a semiconductor integrated circuit as a 14th embodiment according to the fourth mode of the present invention.

FIG. 72 is a block diagram showing an essential portion of the signal transmission system implemented in a semiconductor integrated circuit as a 14 th embodiments according to the fourth mode of the present invention.

As shown in FIG. 72, in the semiconductor integrated circuit (semiconductor chip) implementation of the 14th embodiment, the signals (forward clock φ1 and backward clock φ2) to be supplied to the common timing signal generating circuit 1300 for generating the common timing signal GMT are not captured directly from the output of the forward clock generating circuit (clock driver) 1100, but the forward clock φ1 output via a pad 1281 is captured via a pad 1282 into the common timing signal generating circuit 1300, which then compares it with the backward clock φ2 supplied via a pad 1283, compensates for the phase shift introduced into the clock (φ1) through the clock driver, pads, etc., and generates the common timing signal GMT. Here, as for the node (IPO) where the forward clock φ1 output via the pad 1281 is captured via the pad 1282, the clock signal (φ1) output on the clock line (1001) via the pad 1281 and via an external pin (package pin) may be captured into the chip (circuit) via another external pin and via the pad 1282, but this requires an extra external pin special for that purpose; to avoid this, the node may be formed by applying only wire bonding or the like so that the clock signal can be captured without increasing the number of external pins.

As described above, according to the signal transmission system of the fourth mode of the present invention, a signal transmission system can be constructed that provides greater freedom in designing the clock system and signal system, that can easily minimize the gap when device switching is made, and that has low power consumption.

Next, a fifth mode of the present invention will be described in detail, but before that, the prior art related to the fifth mode of the present invention and the problem associated with the prior art will be described with reference to drawings.

Figure 73:
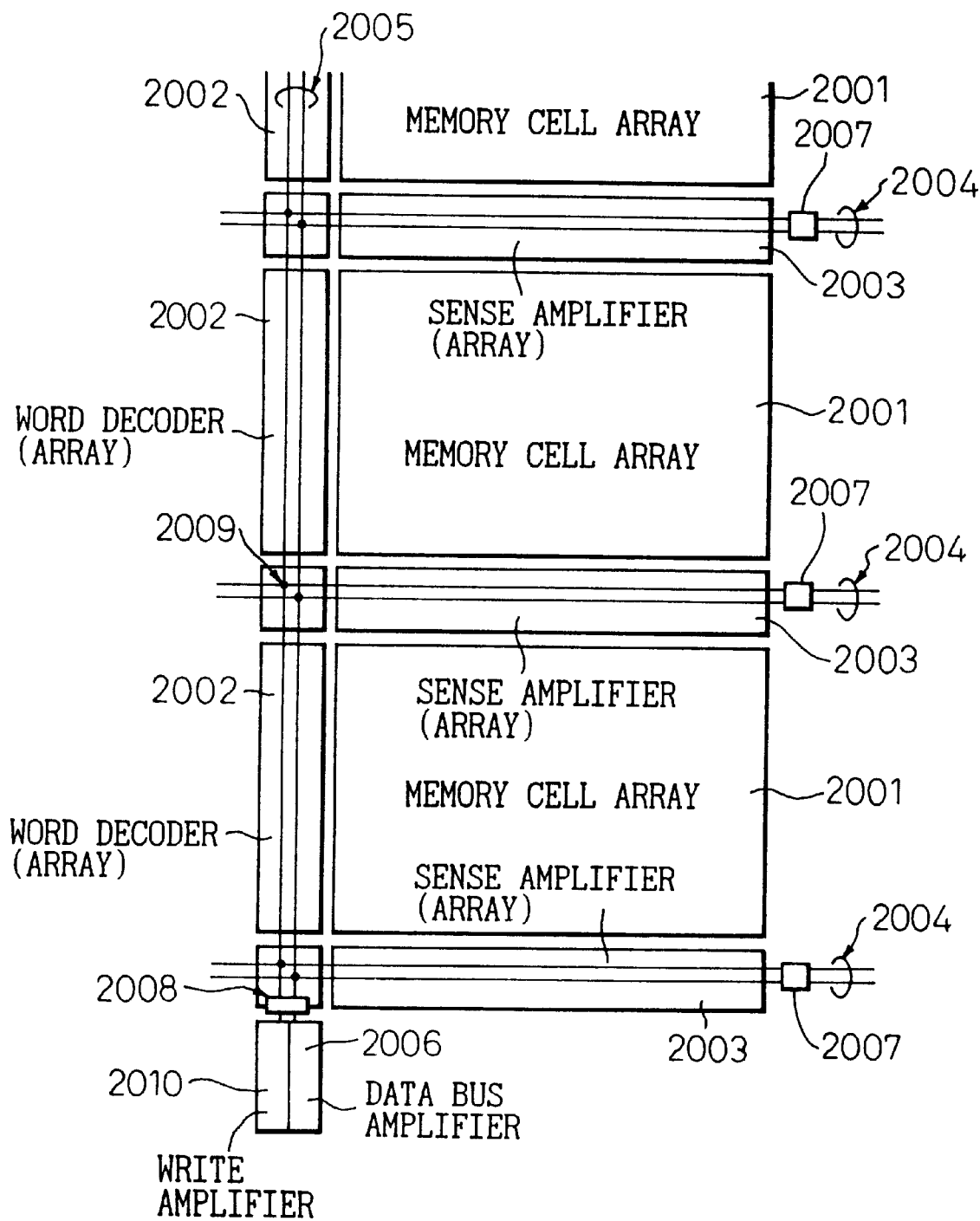
FIG. 73 is a block diagram showing in schematic form one example of a prior art semiconductor memory device related to a fifth mode of the present invention.

FIG. 73 is a block diagram showing in schematic form one example of the prior art semiconductor memory device related to the fifth mode of the present invention. In FIG. 73, reference numeral 2001 is a memory cell array, 2002 is a word decoder (word decoder array), 2003 is a sense amplifier (sense amplifier array), 2004 is a local data bus, 2005 is a global data bus, 2006 is a data bus amplifier, 2007 is a local data bus precharge circuit, 2008 is a global data bus precharge circuit, 2009 is a local bus switch, and 2010 is a write amplifier.

As shown in FIG. 73, the prior art semiconductor memory device (memory cell array section of a DRAM) comprises a plurality of memory arrays 2001, word decoders (word decoder arrays) 2002, sense amplifiers (sense amplifier arrays) 2003, local data buses 2004, and global data buses 2005. The prior art semiconductor memory further comprises data bus amplifiers 2006 for amplifying data on the global data buses 2005 when reading out data, local data bus precharge circuits 2007 for precharging the local data buses 2004, global data bus precharge circuits 2008 for precharging the global data buses 2005, local bus switches 2009 for controlling the connections between the global data buses 2005 and the local data buses 2004, and write amplifiers 2010 for writing data to the memory cells.

Figure 74:
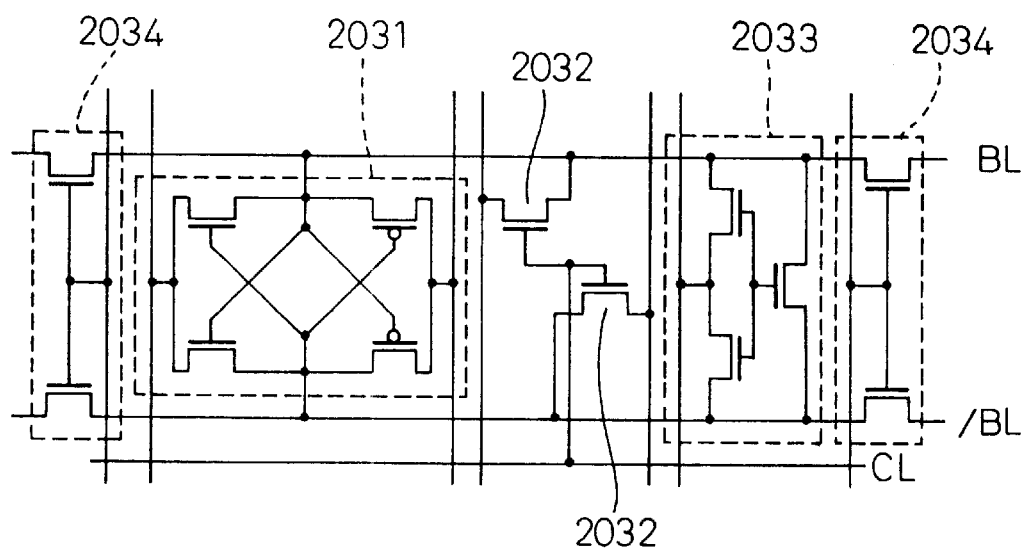
FIG. 74 is a circuit diagram showing one example of a sense amplifier in the semiconductor memory device of FIG. 73.

FIG. 74 is a circuit diagram showing one example of the sense amplifier 2003 in the semiconductor memory device of FIG. 73.

As shown in FIG. 74, the sense amplifier 2003 comprises a latch-type sense amplifier (latch-type sense amplifier stage) 2031, a column transfer gate 2032, a bit line short/precharge circuit 2033, and a bit line transfer gate 2034. Here, reference signs BL and /BL designate the bit lines, and CL denotes the column selection line.

Figure 75:
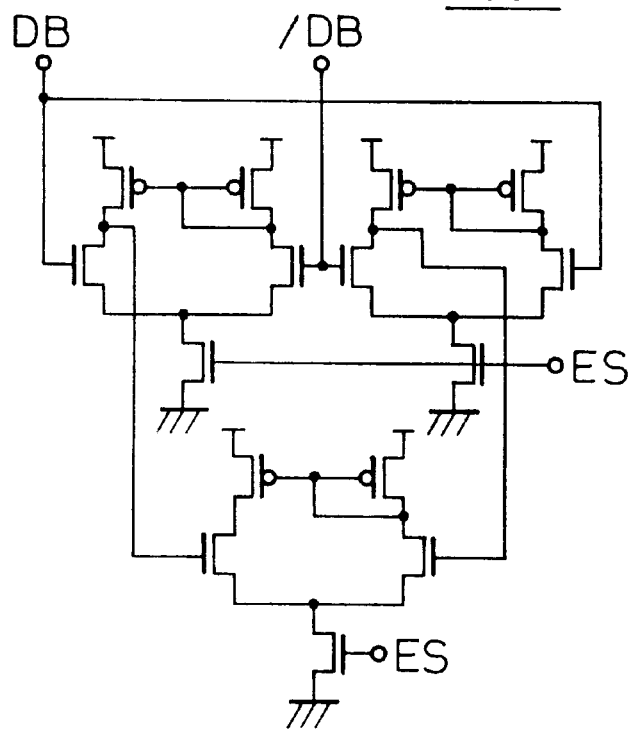
FIG. 75 is a circuit diagram showing one example of a data bus amplifier in the semiconductor memory device of FIG. 73.
Figure 76:
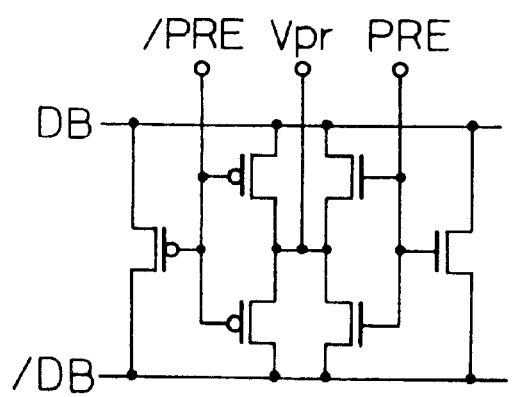
FIG. 76 is a circuit diagram showing one example of a data bus short/precharge circuit in the semiconductor memory device of FIG. 73.

FIG. 75 is a circuit diagram showing one example of the data bus amplifier 2006 in the semiconductor memory device of FIG. 73, and FIG. 76 is a circuit diagram showing one example of the data bus short/precharge circuit (global data bus precharge circuit 2008 and local data bus precharge circuit 2007) in the semiconductor memory device of FIG. 73.

As shown in FIGS. 75 and 76, the data bus amplifier 2006 and the global data bus precharge circuit 2008 (local data bus precharge circuit 2007) are each constructed with a plurality of P-channel MOS transistors and N-channel MOS transistors. Here, reference signs DB and /DB designate the data buses, PRE and /PRE the precharge control signals, Vpr the precharge reference voltage, and ES the enable signal.

Figure 77:
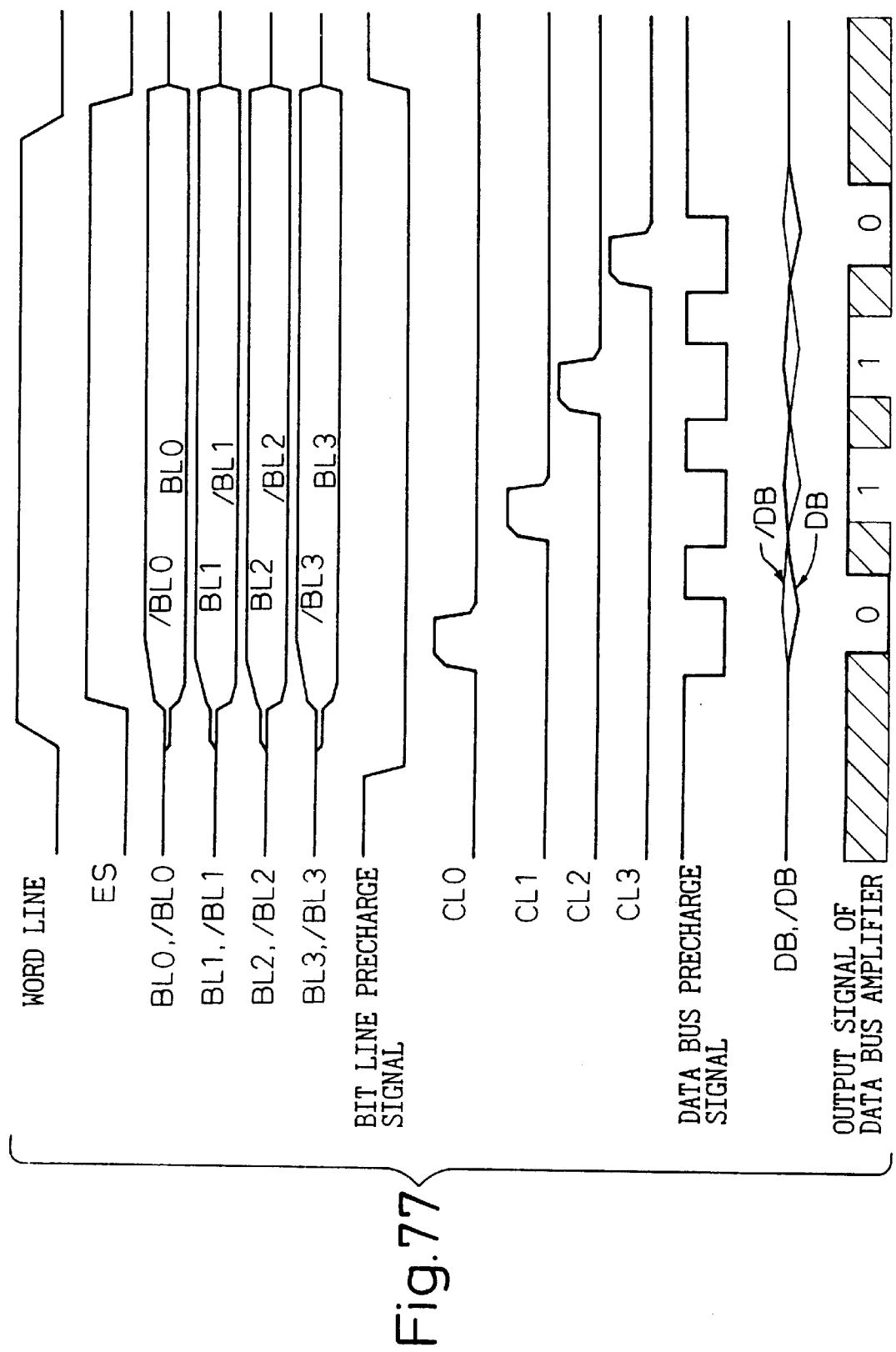
FIG. 77 is a waveform diagram for explaining one example of a data read sequence in the semiconductor memory device of FIG. 73.

FIG. 77 is a waveform diagram for explaining one example of a data read (burst read) sequence in the semiconductor memory device of FIG. 73. FIG. 77 shows the case where the output is set to a high level "H" when the data bus amplifier 2006 is disabled. The burst read here is a scheme employed, for example, for synchronous DRAM (SDRAM), in which data in the memory cells connected to the same word line are read out at one time without a break.

As shown in FIG. 77, when performing a burst read operation in the prior art semiconductor memory device, in the case of the complementary data buses DB, /DB and complementary bit lines BL, /BL (BL0, /BL0 to BL3, /BL3), for example, the bit lines BL, /BL and data buses DB, /DB are first precharged to a predetermined level (precharge reference voltage Vpr); in particular, each complementary bit line or complementary data bus is precharged to the same potential as that of the other of the complementary pair.

Further, as shown in FIGS. 74 and 77, in a data read operation, when data appears on the bit line pair BL, /BL (BL0, /BL0 to BL3, /BL3), differential potential occurs on the bit line pair BL, /BL initially precharge to the same potential, and after amplifying this differential potential to a certain level by the sense amplifier (latch-type sense amplifier stage 2031), the column transfer gate 2032 corresponding to the selected column address is opened. That is, by sequentially applying column select signals CL0 to CL3, the potential on each of the bit line pairs BL0, /BL0 to BL3, /BL3 is transferred to the local data bus pair DB, /DB initially precharged to the same potential. This differential potential is then transferred via the local data bus switch 2009 to the global data bus pair DB, /DB (2005) initially precharged to the same potential, is amplified by the global data bus amplifier (data bus amplifier 2006), and is output as readout data (read data) via a buffer, another amplifier, etc.

When reading the next data, with the sense amplifier 2003 remaining active the local data bus (pair) 2004 and the global data bus (pair) 2005 are precharged to initialize the system; then, the column transfer gate 2032 is opened, and the resulting differential potential is transferred to the local data bus 2004 and the global data bus 2005, is amplified by the global data bus amplifier 2006, and is output as read data in the same manner as described above.

Here, in the memory (semiconductor memory device) operation, the bus precharge operation, that is, the initialize operation, must be performed for each data read operation, as shown in FIG. 77. However, when outputting data in synchronism with the clock, the buses usually have large capacitance and take time to precharge; for example, the precharge period accounts for about half of the clock cycle.

The fifth mode of the present invention eliminates the precharge time and more than doubles the data transfer rate. If the data transfer speed is to be increased by relying only on the development of device process technology, it will take several years just to double the clock speed; by contrast, the fifth mode of the present invention aims at increasing the data transfer rate by eliminating the precharge time that was indispensable in the traditional system.

Thus the fifth mode of the present invention improves the signal transmission system (including the data bus drive method, global data bus amplifier system, etc.) in a semiconductor memory device, and thereby fundamentally changes the readout sequence of the semiconductor memory device and increases the data transfer rate by eliminating the bus precharge time from the read cycle. Furthermore, while the prior art strictly required that selection times of column transfer gates be completely separated from each other, the fifth mode of the present invention permits the overlapping of selection times of the column transfer gates. With these improvements, the precharge time is reduced to zero, which, coupled with overlapping selection of column transfer gates, achieves a drastic increase in memory data read speed.

For that purpose, the previously described PRD (Partial Response Detection) method is employed for data transfer on the data bus. For PRD, reference is made to H. Tamura, M. Saito, K. Gotoh, S. Wakayama, J. Ogawa, Y, Kato, M. Taguchi, "Partial Response Detection Technique for Driver Power Reduction in High-Speed Memory-to-Processor Communications," ISSCC 97, Digest of Technical Papers, pp. 342–343, which describes an interface system for high-speed data transmission between chips.

Here, if it is attempted to transmit on a band-limited transmission line a signal of bandwidth greater than that of the transmission line, the signal will be disrupted because of the intersymbol interference component of the signal. The PRD method is a technique for recovering the original signal from the disrupted signal by eliminating the intersymbol interference component. Since the PRD method not only eliminates the intersymbol interference component but also creates a reference level by itself during the process of intersymbol interference elimination, it becomes possible to transmit data without precharging the transmission line, which is the hidden characteristic of the PRD method. Therefore, the characteristic that enables data transmission without precharge is utilized to eliminate the data bus precharge time from the data read cycle.

Furthermore, when the PRD method is used, if data in the previous cycle remains on the transmission line, a certain degree of data overlap is allowed as long as the next data arrives at the receiving end after the previous data arrives. That is, when this characteristic is utilized for a memory bus, a certain degree of overlapping of column transfer gate selections is also allowed. Moreover, the PRD method reduces bus amplitude, and can theoretically eliminate the need for precharge (though the precharge need not necessarily be eliminated), as a result of which power consumption due to charging and discharging of the bus can also be reduced. Additionally, with the PRD method, it becomes possible to increase the data rate by appropriately designing the circuit, and no major modifications need not be made to the core elements (sense amplifiers, memory cell arrays, word decoders, etc.) of the traditional memory.

Figure 78:
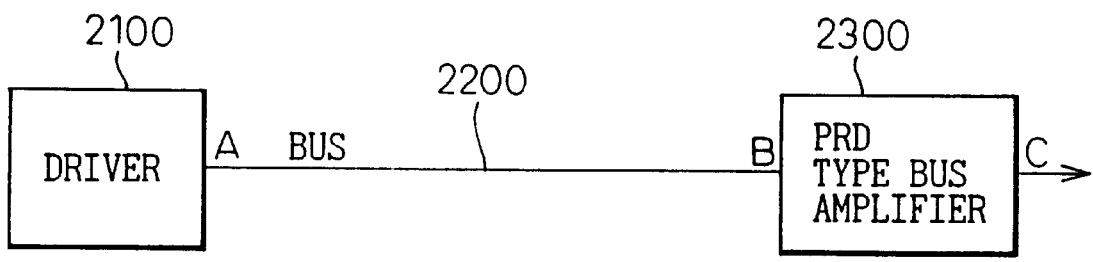
FIG. 78 is a block diagram showing the configuration of a first principle of the signal transmission system according to the fifth mode of the present invention.
Figure 79:
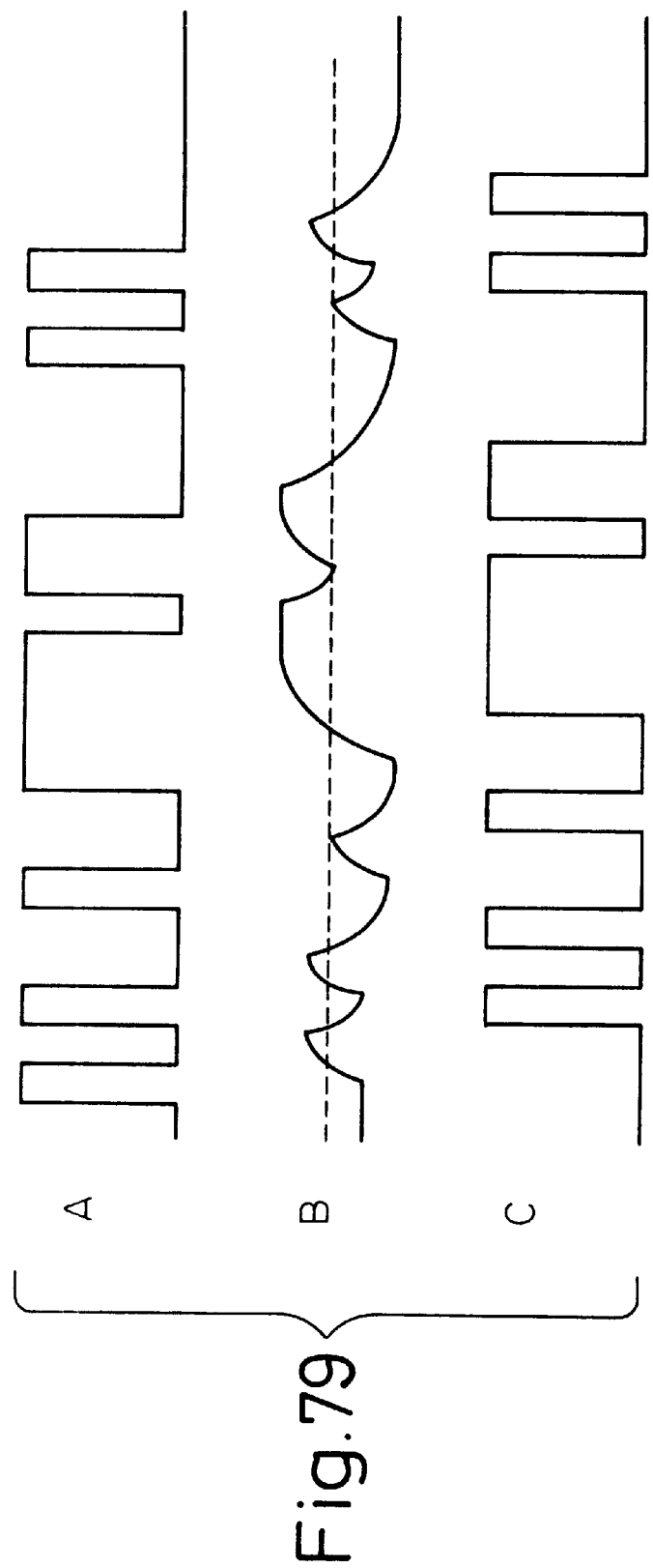
FIG. 79 is a waveform diagram for explaining the operation of the signal transmission system of FIG. 78.

FIG. 78 is a block diagram showing the configuration of a first principle of the signal transmission system according to the fifth mode of the present invention, and FIG. 79 is a waveform diagram for explaining the operation of the signal transmission system of FIG. 78. FIG. 78 here shows a signal transmission system that uses PRD and does not require precharge.

In FIG. 78, reference numeral 2100 is a driver, 2200 is a floating bus (signal transmission line), and 2300 is a PRD-type bus amplifier (PRD-type data bud amplifier). In the PRD method, since the bus 2200 does not need to be driven to its full amplitude, the drive capability of the driver 2100 can be made sufficiently small, and in the case of the first principle (the first principle of the fifth mode), signal waveforms are as shown in FIG. 79. In FIG. 79, reference sign A is the waveform of an output signal from the driver 2100, B is the waveform of an input signal to the PRD-type bus amplifier 2300, and C is the waveform of an output signal from the PRD-type bus amplifier 2300.

As shown in FIG. 79, the input waveform (B) to the PRD-type bus amplifier 2300 is disrupted because the drive capability of the driver 2100 is made small, but since the PRD-type bus amplifier 2300 employs the PRD method, the reproduced output waveform (C) correctly represents the output waveform (A) of the driver 2100.

Thus, according to the first principle, it is shown that without having to cause the data output from the driver 2100 to swing to its full amplitude the data can be correctly reproduced by the PRD-type bus amplifier 2300 even when the signal received at the receiving end (the PRD-type bus amplifier 2300) does not exhibit transitions to a high and a low level relative to a certain threshold level. In the first principle, since no precharge circuit is provided, the state at the end of the last data transmission is retained until the next data transmission (signal transmission) begins, and after the data transmission, the level of the bus 2200 is held at the state at the end of the data transmission.

Figure 80:
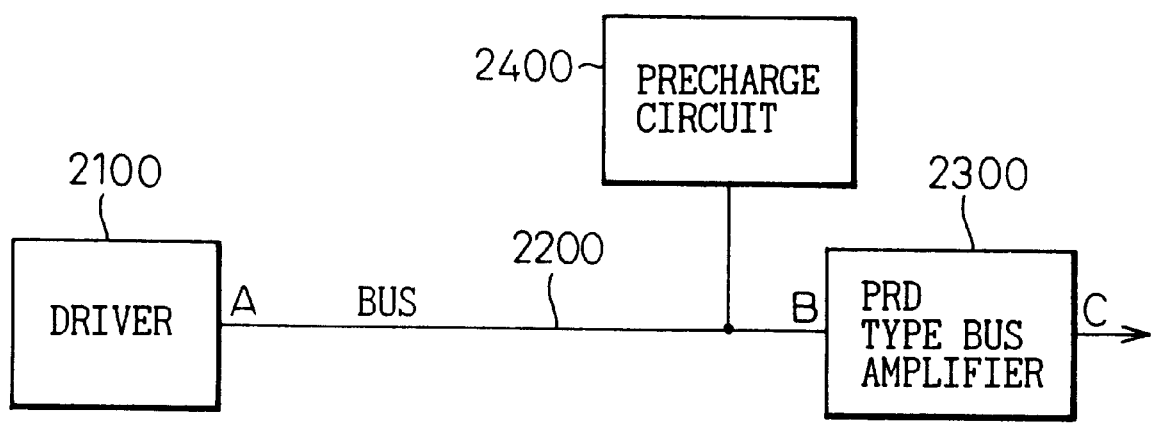
FIG. 80 is a block diagram showing the configuration of a second principle of the signal transmission system according to the fifth mode of the present invention.
Figure 81:
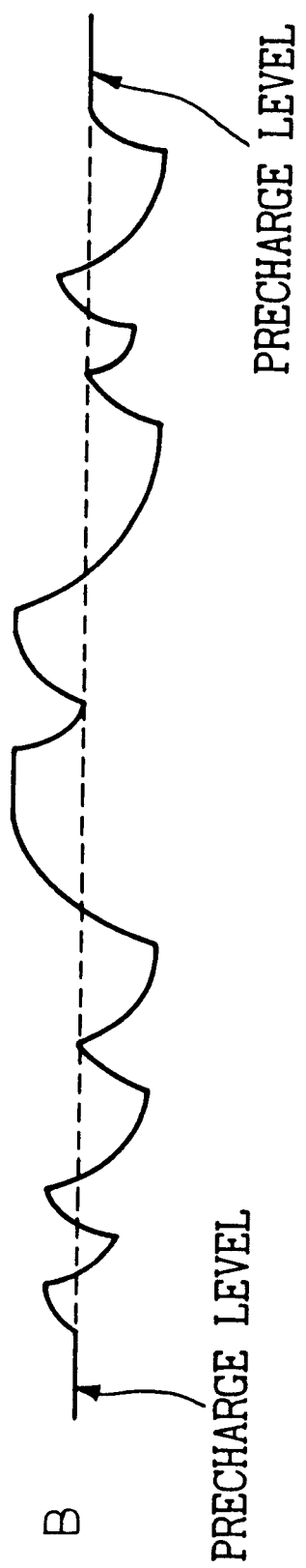
FIG. 81 is a waveform diagram for explaining the operation of the signal transmission system of FIG. 80.

FIG. 80 is a block diagram showing the configuration of a second principle of the signal transmission system according to the fifth mode of the present invention, and FIG. 81 is a waveform diagram for explaining the operation of the signal transmission system of FIG. 80. The second principle shown in FIG. 80 differs from the signal transmission system of the first principle shown in FIG. 78 by the inclusion of a precharge circuit 2400.

As earlier stated, precharge need not be performed in the PRD method, but there are cases where it is preferable to hold the bus 2200 fixed at a given level rather than leaving it at an uncertain level, for example, when the bus 2200 is not in operation. Accordingly, in the second principle, the precharge circuit 2400 is provided to set the bus 2200 to a given level (precharge level) when the bus 2200 is not in operation, before it begins its operation, or after its operation is complete as shown in FIG. 81.

Figure 82:
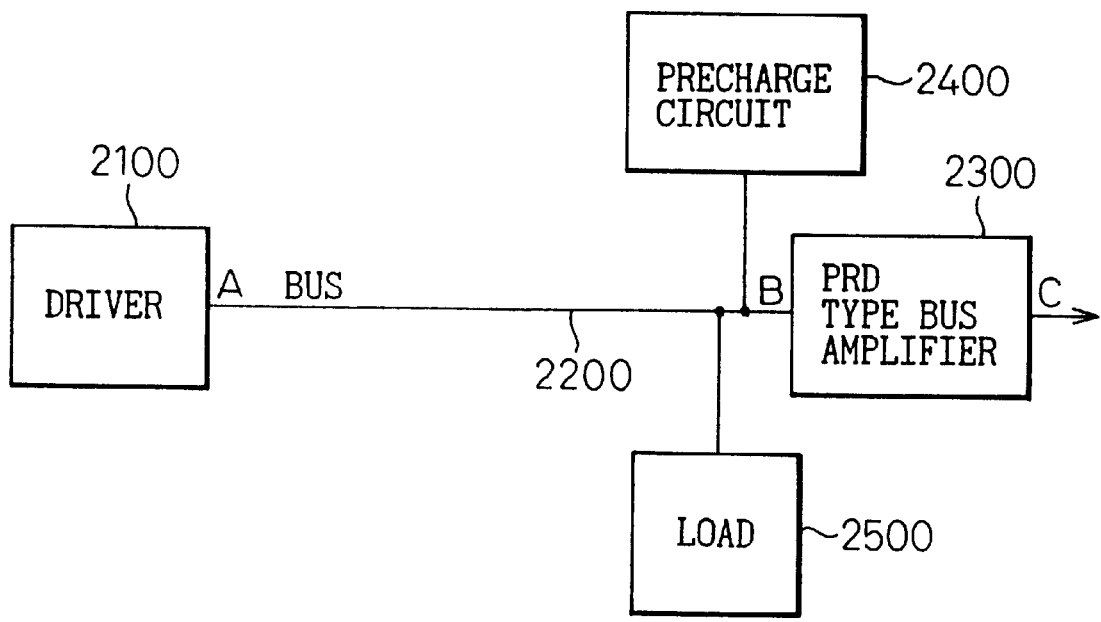
FIG. 82 is a block diagram showing the configuration of a third principle of the signal transmission system according to the fifth mode of the present invention.
Figure 83:
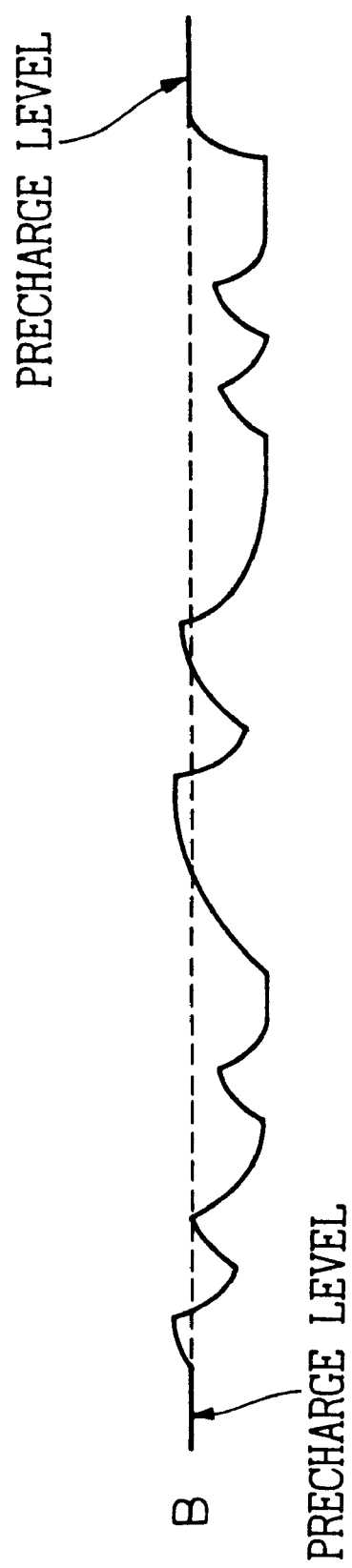
FIG. 83 is a waveform diagram (part 1) for explaining the operation of the signal transmission system of FIG. 82.
Figure 84:
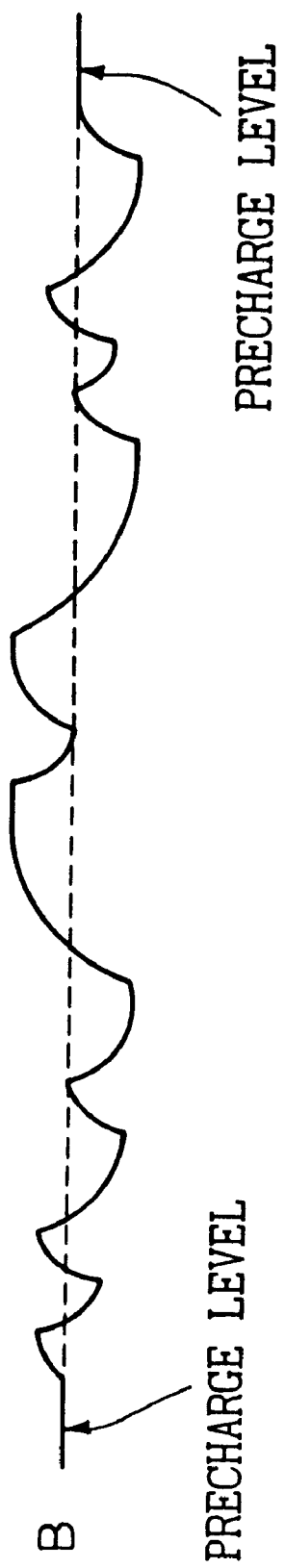
FIG. 84 is a waveform diagram (part 2) for explaining the operation of the signal transmission system of FIG. 82.

FIG. 82 is a block diagram showing the configuration of a third principle of the signal transmission system according to the fifth mode of the present invention, and FIGS. 83 and 84 are waveform diagrams for explaining the operation of the signal transmission system of FIG. 82. The third principle shown in FIG. 82 differs from the signal transmission system of the second principle shown in FIG. 80 by the inclusion of a load 2500.

In the third principle, the load 2500 is provided to prevent the level of the bus 2200 from gradually shifting toward the low level "L" side or the high level "H" side during operation, for example, when the output drive capability of the driver is not symmetric between the high level "H" and low level "L", or for some other reason.

FIG. 83 shows the waveform when the load 2500 is not provided and when the level of the bus 2200 (the level of the input signal B to the PRD-type bus amplifier 2300) has shifted toward the low level "L" side, and FIG. 84 shows the waveform when the shift is suppressed by the provision of the load 2500 according to the third principle.

When the PRD method is used, no practical problem occurs in data read even when the signal has shifted toward a certain level and remained fixed at that level, but by adding the load 2500, as in the third principle, it is made possible to increase the operating margin of the PRD-type bus amplifier 2300 when the bus 2200 has been fixed to a certain level.

Figure 85:
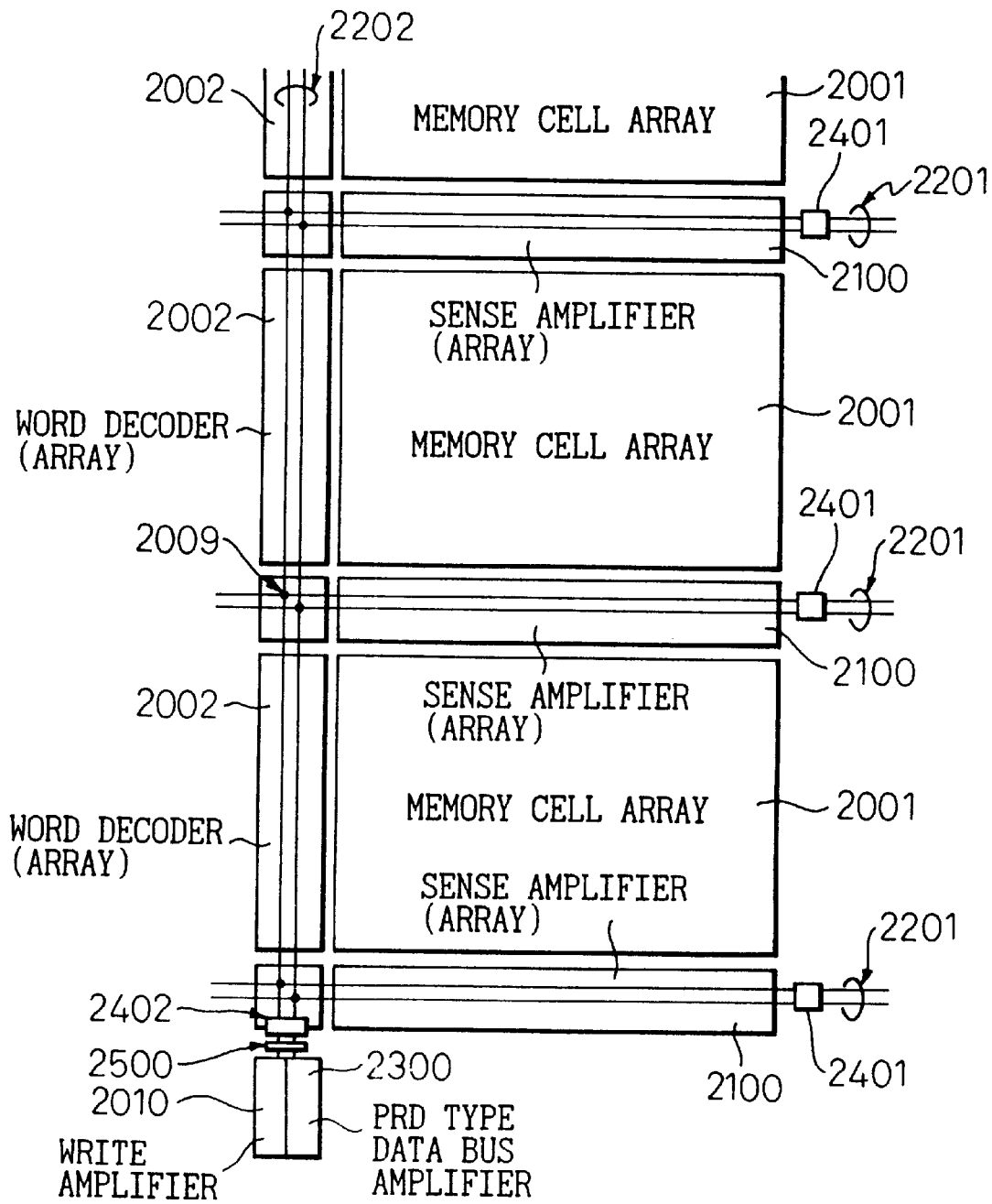
FIG. 85 is a block diagram showing in schematic form one example of a semiconductor memory device where the signal transmission system according to the fifth mode of the present invention is applied.

FIG. 85 is a block diagram showing in schematic form one example of a semiconductor memory device where the signal transmission system according to the fifth mode of the present invention is applied. In FIG. 85, reference numeral 2001 is a memory cell array, 2002 is a word decoder (word decoder array), 2100 is a sense amplifier (sense amplifier array), 2201 is a local data bus, 2202 is a global data bus, 2300 is a PRD-type data bus amplifier, 2401 is a local data bus precharge circuit, 2402 is a global data bus precharge circuit, 2009 is a local bus switch, 2010 is a write amplifier, and 2500 is a load.

As shown in FIG. 85, the semiconductor memory device (memory cell array section of a DRAM) where the fifth mode of the present invention is applied comprises a plurality of memory cell arrays 2001, word decoders (word decoder arrays) 2002, sense amplifiers (sense amplifier arrays) 2100, local data buses 2201, and global data buses 2202. The semiconductor memory device further comprises PRD-type data bus amplifiers 2300 for amplifying data on the global data buses 2202 when reading out data, local data bus precharge circuit 2401 for precharging the local data buses 2201, global data bus precharge circuit 2402 for precharging the global data buses 2202, local data bus switches 2009 for controlling the connections between the global data buses 2202 and the local data buses 2201, write amplifiers 2010 for writing data to the memory cells, and loads 2500. The local data bus 2201 and global data bus 2202 shown in FIG. 85 correspond to the local data bus 2004 and global data bus 2005 previously shown in FIG. 73, and the local data bus precharge circuit 2401 and global data bus precharge circuit 2402 shown in FIG. 85 correspond to the local data bus precharge circuit 2007 and global data bus precharge circuit 2008 previously shown in FIG. 73. Further, in the semiconductor memory device of FIG. 85, the data bus amplifier 2006 in FIG. 73 is configured as the PRD-type data bus amplifier 2300, and the load 2500 is added to the global data bus 2202.

In FIG. 85 in comparison with the earlier described principles of the fifth mode (FIGS. 78, 80, and 82), the sense amplifier 2100 acts as the driver, the local data bus 2201 and the global data bus 2202 each correspond to the bus, and the global data bus amplifier (PRD-type. data bus amplifier) 2300 corresponds to the PRD-type bus amplifier. In this specification (FIG. 85, etc.), the bus is classified into the local data bus and global data bus, but it should be noted that identifying the bus by different names does not constitute an essential characteristic of the invention. In FIG. 85, the precharge circuits (the local data bus precharge circuit 2401 and global data bus precharge circuit 2402) and the load 2500 are provided in accordance with the third principle shown in FIG. 82. With this configuration of the semiconductor memory device, the data read can be carried out that does not require precharge during the read cycle as previously described.

Figure 86:
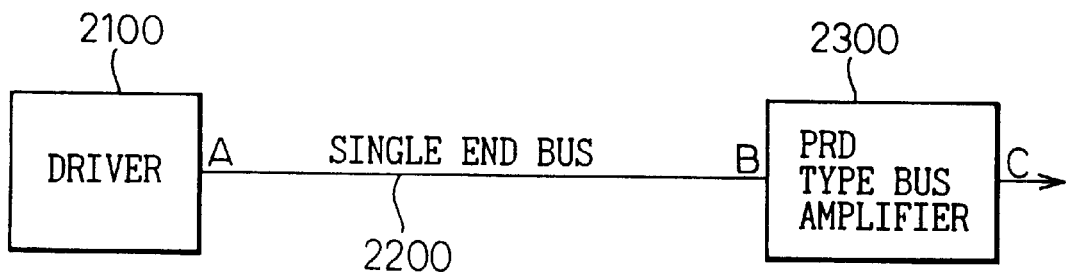
FIG. 86 is a block diagram showing in schematic form an essential portion of a first embodiment of the signal transmission system according to the fifth mode of the present invention.

FIG. 86 is a block diagram showing in schematic form an essential portion of a first embodiment of the signal transmission system according to the fifth mode of the present invention. This embodiment corresponds to the configuration of the first principle previously shown in FIG. 78 (in which neither the precharge circuit nor the load is provided).

In FIG. 86, reference numeral 2100 is a driver (which corresponds to the sense amplifier in FIG. 85), 2200 is a single-ended bus (signal transmission line), and 2300 is a PRD-type bus amplifier (which corresponds to the PRD-type data bus amplifier in FIG. 85). Further, in FIG. 86, reference sign A designates the waveform of an output signal from the driver 2100, B the waveform of an input signal to the PRD-type bus amplifier 2300, and C the waveform of an output signal from the PRD-type bus amplifier 2300.

Figure 87A:
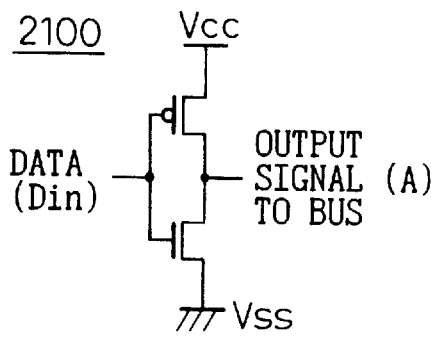
FIGS. 87A and 87B are circuit diagrams showing configurational examples of a driver in the signal transmission system of FIG. 86.
Figure 87B:
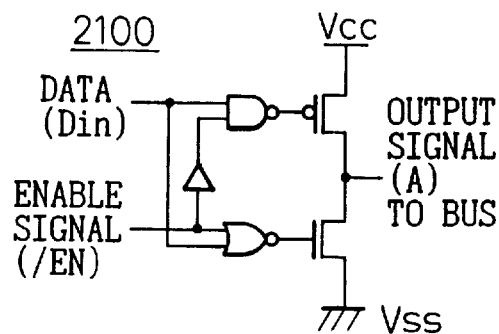
Figure 87C:
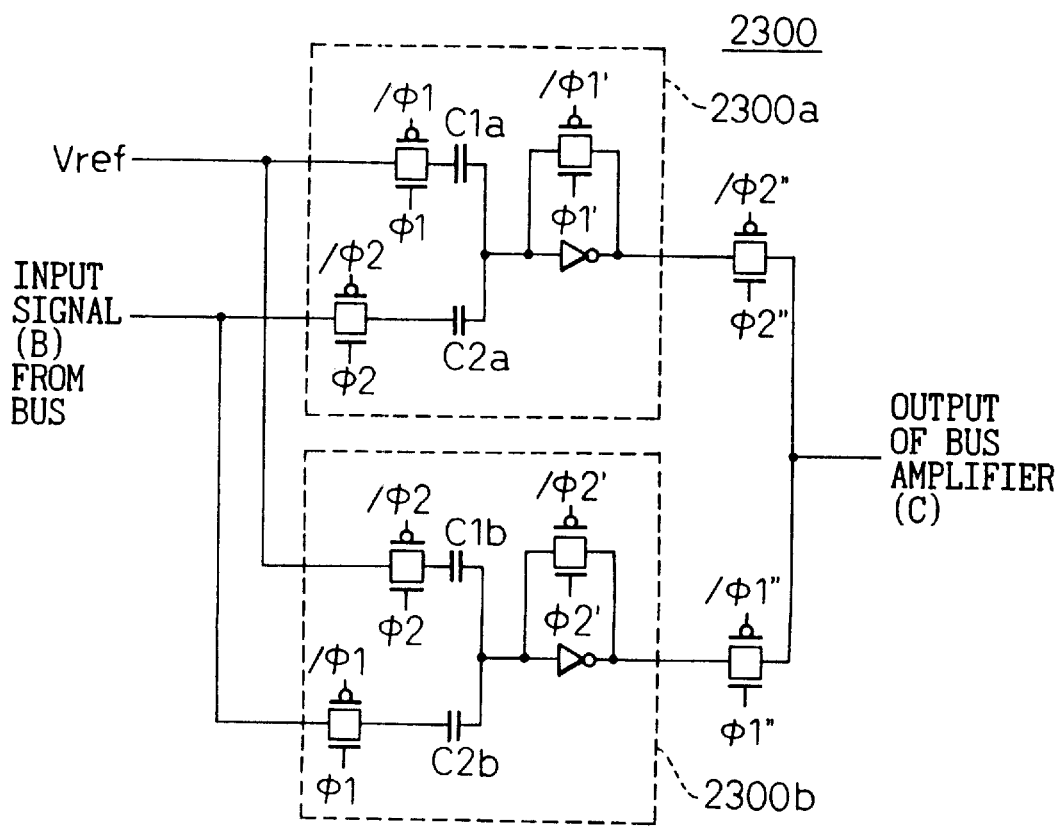
FIG. 87C is a diagram showing one example of a bus amplifier in the signal transmission system of FIG. 86.

FIGS. 87A and 87B are circuit diagrams showing configurational examples of the driver (2100) in the signal transmission system of FIG. 86, and FIG. 87C shows a circuit example of the bus amplifier (PRD-type bus amplifier 2300) in the signal transmission system of FIG. 86.

The driver 2100 can be constructed from a simple inverter for inverting and amplifying input data (Din), as shown in FIG. 87A, but it is also possible to configure it as a circuit presenting a high-impedance state (High-Z state) using an enable signal (/EN), as shown in FIG. 87B.

As shown in FIG. 87C, the PRD-type bus amplifier (pseudo-PRD-type bus amplifier) 2300 comprises a plurality of transfer gates the switching operations of which are controlled by control signals ($\phi1$, /$\phi1$; $\phi2$, $\phi2$; $\phi1'$, /$\phi1''$; $\phi1''$, /$\phi1''$; $\phi2'$, /$\phi2'$; $\phi2''$, /$\phi2''$), a plurality of inverters, and a plurality of capacitors (C1$a$, C2$a$; C1$b$, C2$b$). More specifically, the PRD-type bus amplifier 2300 of FIG. 87C is the type that operates in interleaving fashion using a pair of blocks, and comprises two PRD blocks 2300$a$ and 2300$b$.

Figure 89:
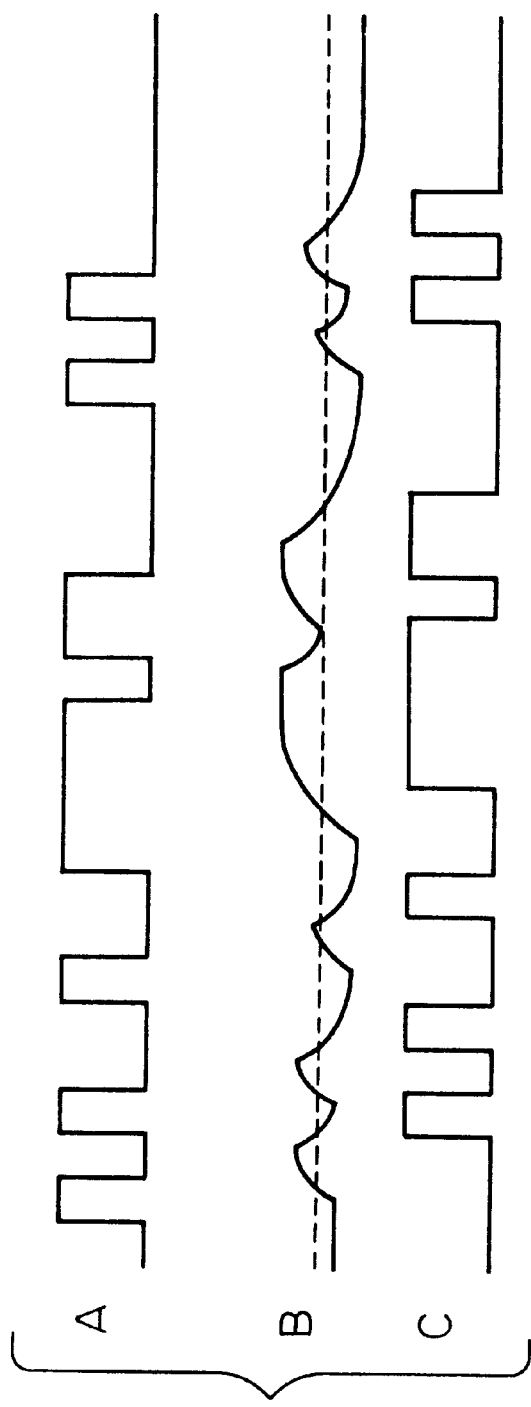
FIG. 89 is a diagram showing an example of the operating waveform of a bus in the signal transmission system of FIG. 86.

FIG. 88 is a diagram showing an example of the signal waveform for operating the bus amplifier of FIG. 87C, and FIG. 89 is a diagram showing an example of the operating waveform of the bus in the signal transmission system of FIG. 86.

The PRD-type bus amplifier 2300 of FIG. 87C is driven by signals such as those shown in FIG. 88. Here, the control signals $\phi1'$, $\phi1''$ and $\phi2'$, $\phi2''$ are substantially the same in waveform as the control signals $\phi1$ and $\phi2$, respectively, and are output at alternating timings synchronized to the clock (the rise and fall timings of the clock CLK) in order to drive the PRD blocks 2300$a$ and 2300$b$ in interleaving fashion. That is, the configuration is such that while one PRD block (for example, 2300$a$) is performing calculations to eliminate (estimate) an intersymbol interference component for the data in the next clock cycle, the other PRD block (for example, 2300$b$) receives data and delivers an output signal. This operation is alternately performed to reproduce data at high speed.

In the operating waveform diagram of the first embodiment (the first embodiment of the fifth mode) shown in FIG. 89, the output signal (A) from the driver 2100, the signal (B) received by the PRD-type bus amplifier 2300, and the signal (C) output by the PRD-type bus amplifier 2300 are shown. Specifically, the diagram shows an example of 500 Mbps data transmission. As can be seen, according to the first embodiment, the data can be accurately reproduced using the PRD-type bus amplifier 2300 without having to cause the data output from the driver 2100 to swing to its full amplitude. In the first embodiment, since the data bus (2200) is not precharged, the data bus is at a random level when not transmitting data; nevertheless, high-speed-data transmission is possible. Furthermore, since data can be transmitted by reducing the amount of bus level variation per data bit, the bus in effect behaves as a low-amplitude bus, so that the power consumption of the bus can be reduced.

Figure 90:
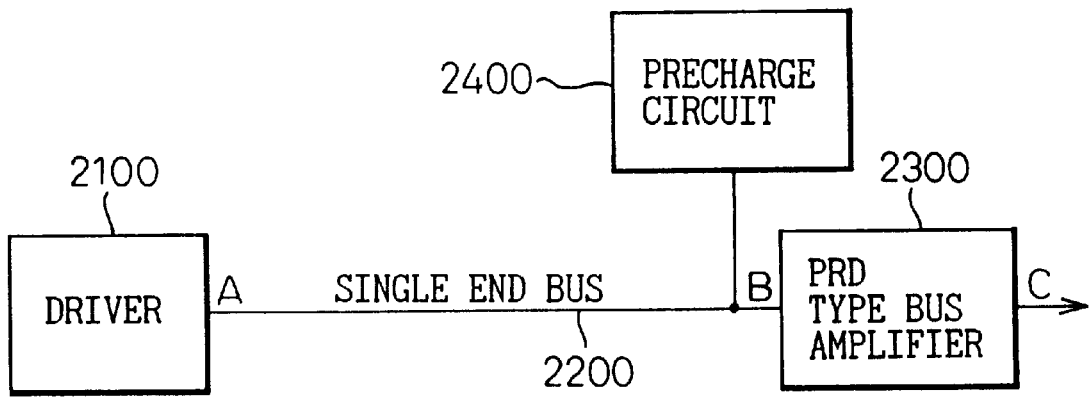
FIG. 90 is a block diagram showing in schematic form an essential portion of a second embodiment of the signal transmission system according to the fifth mode of the present invention.

FIG. 90 is a block diagram showing in schematic form an essential portion of a second embodiment of the signal transmission system according to the fifth mode of the present invention. This embodiment differs from the first embodiment shown in FIG. 86 by the inclusion of a precharge circuit 2400, and corresponds to the configuration of the second principle previously shown in FIG. 80 (in which the precharge circuit is provided).

In the second embodiment shown in FIG. 90, when data transmission is not being performed, precharge is performed by the precharge circuit 2400. In the second embodiment shown here, precharge is not performed during data transmission, but it can be configured to perform precharge by the precharge circuit 2400 by temporarily stopping the data transmission if there is enough time to perform the precharge. Precharging for every bit as in the prior art, however, is not preferable from the viewpoint of data transmission efficiency.

In the second embodiment, since a data transmission starts at the precharge level and ends at the precharge level, the initial level of the bus 2200 is known, so that if there is a design problem in some other portion of the system, the problem can be easily analyzed. Furthermore, in cases where the whole level of the bus 2200 gradually moves toward a certain level, since the level is reset to the precharge level at the end of the data transmission, the chance of the bus level being fixed to that certain level is reduced. The reduced chance here means that there is a possibility that the bus level may be fixed to that certain level if a data read operation continues for a very long time, and in a usual read operation, this seldom presents a problem. Further, if the bus 2200 is fixed to a certain level, data transmission can be performed as in the foregoing first embodiment.

Figure 91:
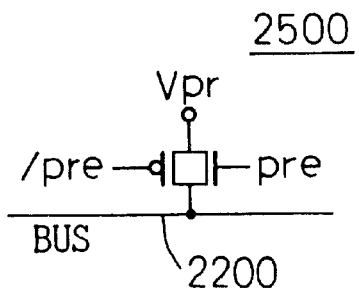
FIG. 91 is a circuit diagram showing one example of a precharge circuit in the signal transmission system of FIG. 90.

FIG. 91 is a circuit diagram showing one example of the precharge circuit in the signal transmission system of FIG. 90. The same driver 2100 and PRD-type bus amplifier 2300 as those used in the first embodiment can also be used here.

As shown in FIG. 91, the precharge circuit 2500 is constructed from a transfer gate, which precharges the bus 2200 by applying a precharge level (Vpr) in accordance with precharge control signals pre and /pre.

Figure 92:
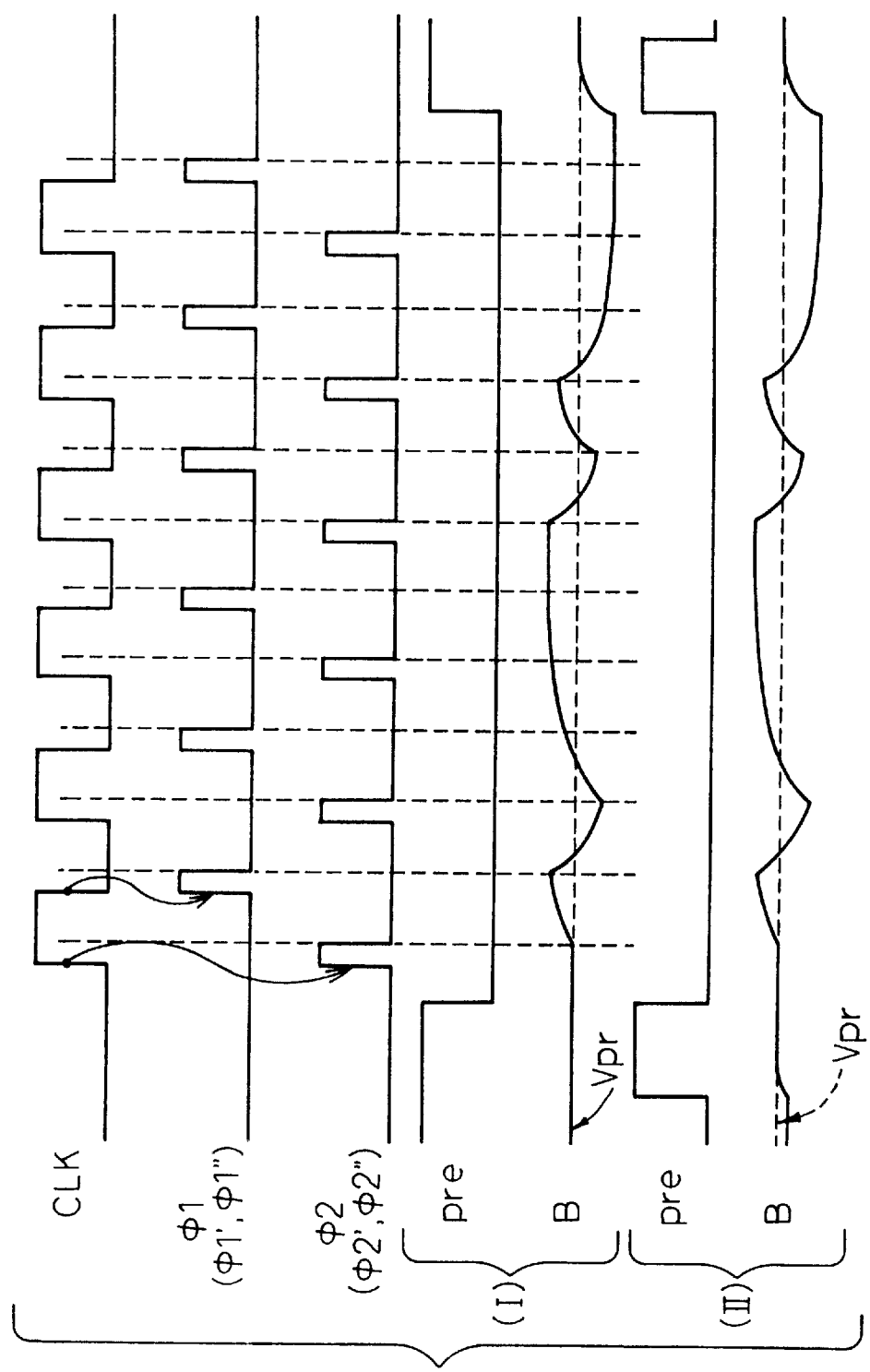
FIG. 92 is a diagram showing an example of a signal waveform for driving a bus and a bus amplifier in the signal transmission system of FIG. 90.

FIG. 92 is a diagram showing an example of the signal waveform for driving the bus and the bus amplifier in the signal transmission system of FIG. 90. Here, in the signal waveform diagram of FIG. 92, reference sign (I) shows a method in which the bus 2200 is precharged when not transmitting data, and (II) shows a method in which the bus 2200 is precharged only at the beginning and the end of a data transmission. That is, FIG. 92(I) shows the sequence whereby precharging is maintained when data transmission is not being performed, and FIG. 92(II) shows the sequence whereby precharge is performed only at the beginning and the end of a data transmission, and during other periods than the data transmission and the precharge period, the bus 2200 is put in a floating state.

Figure 93:
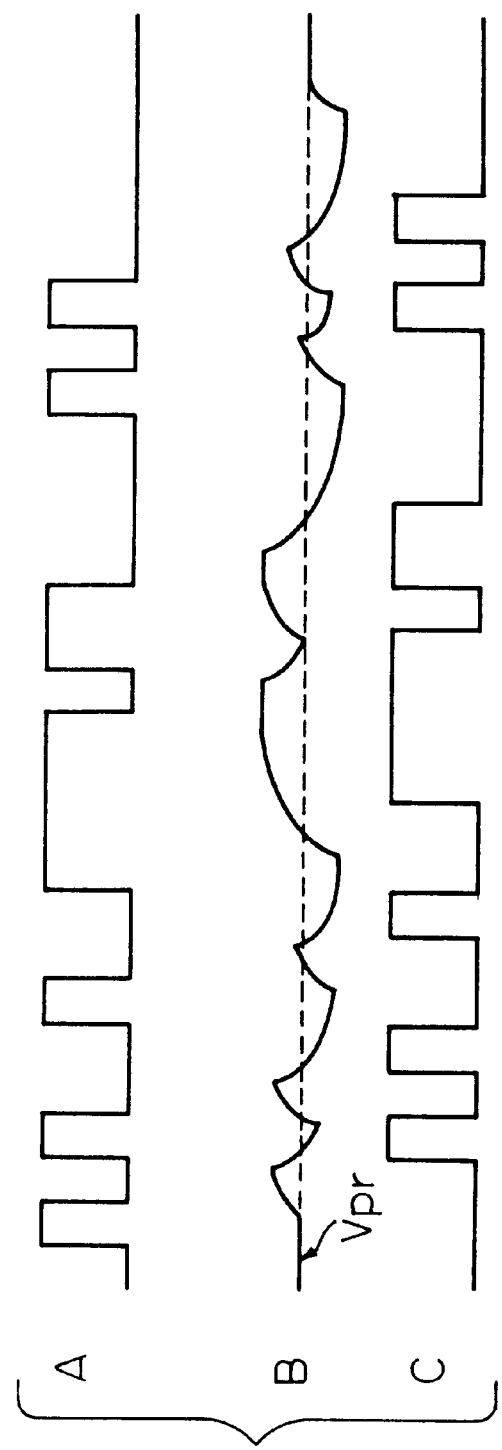
FIG. 93 is a diagram showing an example of the operating waveform of the bus in the signal transmission system of FIG. 90.

FIG. 93 is a diagram showing an example of the operating waveform of the bus in the signal transmission system of FIG. 90. As shown in FIG. 93, according to the second embodiment, the level of the bus 2200 is reset to the precharge level (Vpr), for example, at the start and the end of a data transmission.

Figure 94:
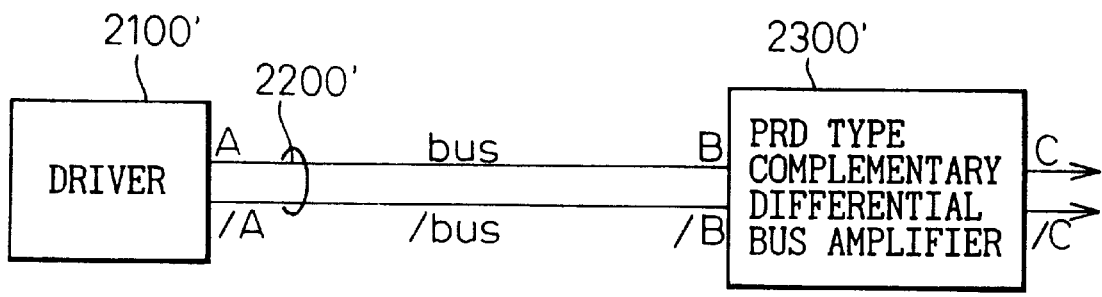
FIG. 94 is a block diagram showing in schematic form an essential portion of a third embodiment of the signal transmission system according to the fifth mode of the present invention.

FIG. 94 is a block diagram showing in schematic form an essential portion of a third embodiment of the signal transmission system according to the fifth mode of the present invention.

As is apparent from the comparison between FIGS. 94 and 86, in the third embodiment the single-ended bus 2200 in the first embodiment shown in FIG. 86 is configured as complementary buses 2200' (bus, /bus), and the signal transmission system is constructed using a driver 2100' and a PRD-type bus amplifier (PRD-type complementary differential bus amplifier) 2300' which are compatible with the complementary buses 2200'.

Figure 95A:
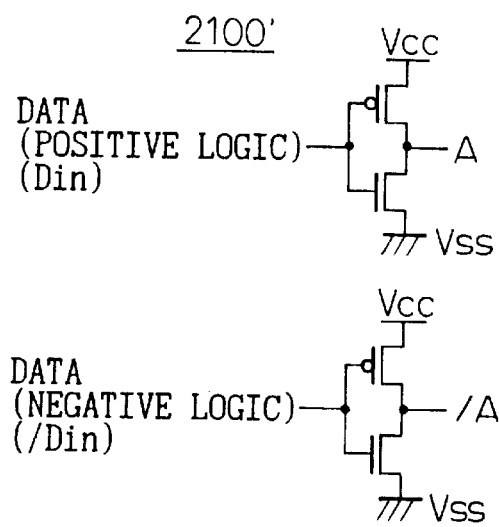
FIGS. 95A and 95B are circuit diagrams showing configurational examples of a driver in the signal transmission system of FIG. 94.
Figure 95B:
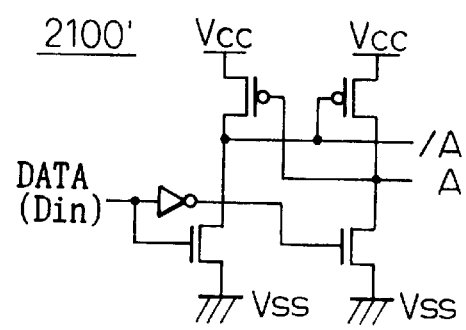
Figure 95C:
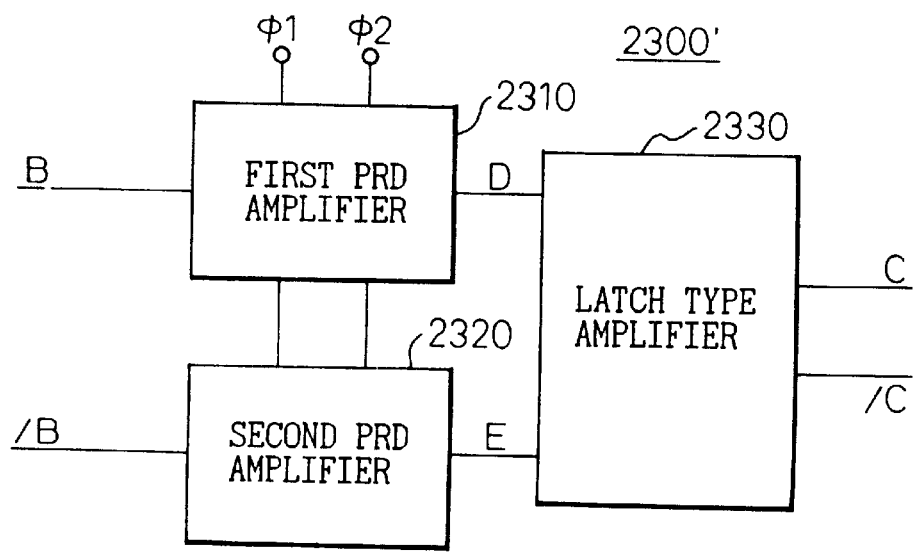
FIG. 95C is a diagram showing one example of a bus amplifier in the signal transmission system of FIG. 94.

FIGS. 95A and 95B show circuit examples of the driver (2100') in the signal transmission system of FIG. 94, and FIG. 95C shows a circuit example of the PRD-type bus amplifier (the PRD-type complementary differential bus amplifier 2300') in the signal transmission system of FIG. 94.

The driver 2100' can be constructed from a simple pair of inverters for inverting and amplifying complementary input data (Din, /Din), as shown in FIG. 95A, but it is also possible to configure it as a circuit that generates complementary output signals A and /A from the input signal (positive logic input signal), as shown in FIG. 95B.

As shown in FIG. 95C, the PRD-type complementary differential bus amplifier (pseudo-PRD-type complementary differential bus amplifier) 2300' comprises first and second PRD amplifiers 2310 and 2320 and a latch-type amplifier

2330. The first PRD amplifier 2310 receives a positive logic input signal B and supplies an output signal D to the latch-type amplifier 2330, and the second PRD amplifier 2320 receives a negative logic input signal /B and supplies an output signal E to the latch-type amplifier 2330.

Figure 96A:
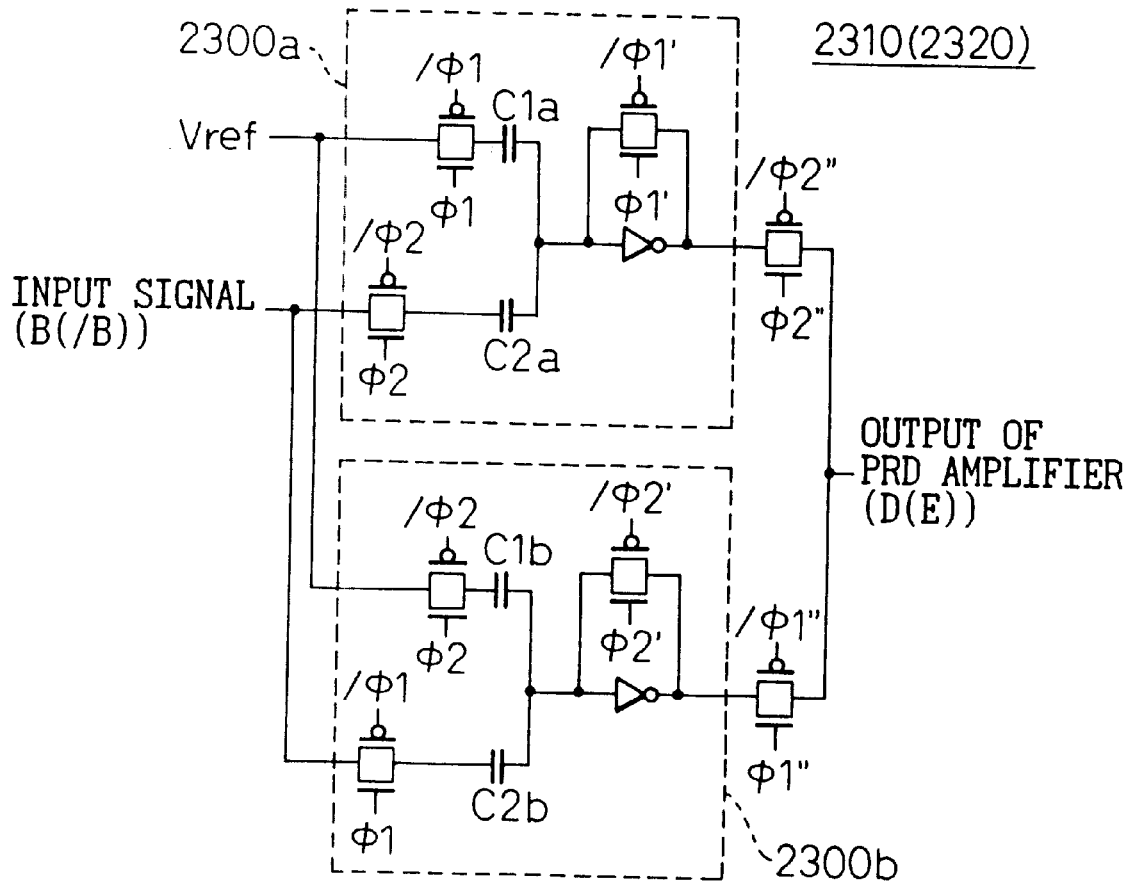
FIG. 96A is a circuit diagram showing one example of a PRD amplifier in the bus amplifier of FIG. 95C.
Figure 96B:
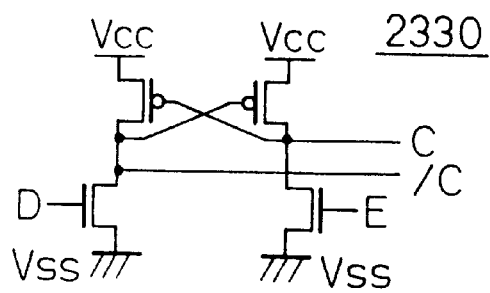
FIG. 96B is a circuit diagram showing one example of a latch-type amplifier in the bus amplifier of FIG. 95C.

FIG. 96A is a circuit diagram showing one example of the PRD amplifier (the first and second PRD amplifiers 2310 and 2320) in the bus amplifier (PRD-type complementary differential bus amplifier) of FIG. 95C, and FIG. 96B shows a circuit example of the latch-type amplifier (2330) in the bus amplifier of FIG. 95C.

As is apparent from the comparison between FIGS. 96A and 87C, the first PRD amplifier 2310 (the second PRD amplifier 2320) is made identical in configuration to the PRD-type bus amplifier 2300 of FIG. 87C for the single-ended bus. Further, as shown in FIG. 96B, the latch-type amplifier 2330 is configured to receive the output signals D and E from the first and second PRD amplifiers 2310 and 2320 and output complementary signals C and /C. By configuring the data transmission system as a complementary type, it becomes possible to detect even smaller signal variations by reducing the influence of phase noise. This configuration, however, increases the circuit size of the PRD-type complementary bus amplifier 2300', etc.

The above-described circuits of the driver 2100' and the PRD-type complementary differential bus amplifier 2300' are only examples, and it will be appreciated that other various circuits can also be employed as long as they are capable of producing complementary signals.

Figure 98:
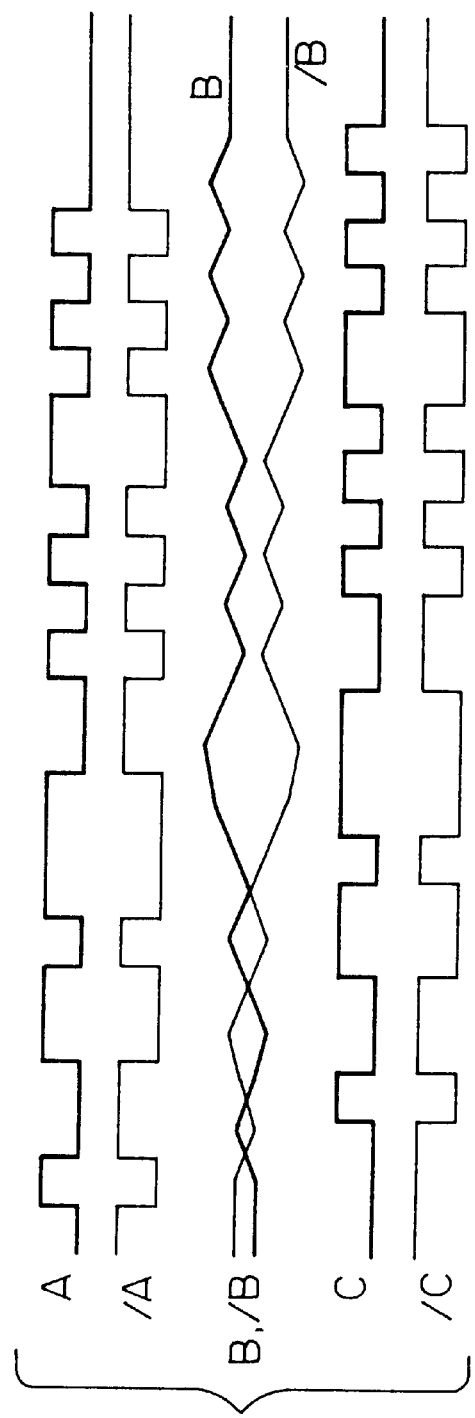
FIG. 98 is a diagram showing an example of the operating waveform of the bus and the bus amplifier in the signal transmission system of FIG. 94.

FIG. 97 is a diagram showing an example of the signal waveform for operating the bus amplifier of FIG. 95C, and FIG. 98 is a diagram showing an example of the operating waveform of the bus and the bus amplifier in the signal transmission system of FIG. 94.

As shown in FIG. 97, the control signals $\phi 1$ and $\phi 2$ ($\phi 1'$ and $\phi 2'$; $\phi 1$" and $\phi 2$") are output at alternating timings synchronized to the clock CLK, to drive the PRD blocks 2300a and 2300b in interleaving fashion, as in the previously shown FIG. 88.

Then, as shown in FIG. 98, in the third embodiment, the output signals (A, /A) of the driver 2100', the signals (B, /B) received by the PRD-type complementary differential bus amplifier 2300', and the signals (C, /C) output by the PRD-type complementary differential bus amplifier 2300' are obtained that are complementary equivalents of the signal waveforms of the first embodiment shown in FIG. 89. As can be seen, according to the third embodiment, the data can be accurately reproduced using the PRD-type complementary differential bus amplifier 2300' without having to cause the data output from the driver 2100' to swing to its full amplitude.

Figure 99:
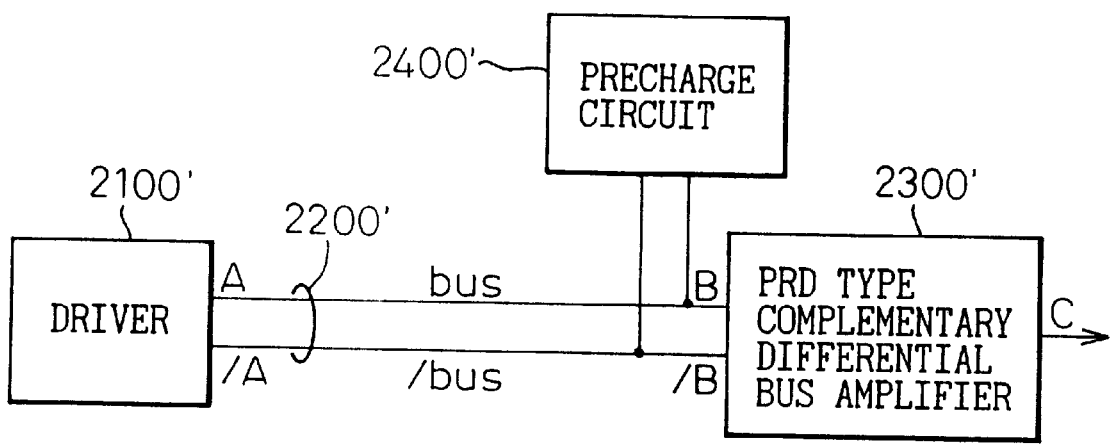
FIG. 99 is a block diagram showing in schematic form an essential portion of a fourth embodiment of the signal transmission system according to the fifth mode of the present invention.

FIG. 99 is a block diagram showing in schematic form an essential portion of a fourth embodiment of the signal transmission system according to the fifth mode of the present invention.

The fourth embodiment shown in FIG. 99 differs from the third embodiment shown in FIG. 94 in that a precharge circuit 2400' is added, and in that the PRD-type complementary differential bus amplifier 2300" is configured to output only the positive logic signal (C).

Figure 100A:
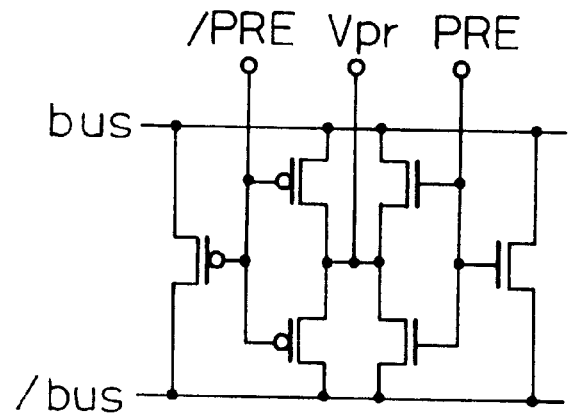
FIG. 100A is a circuit diagram showing one example of a precharge circuit in the signal transmission system of FIG. 99.
Figure 100B:
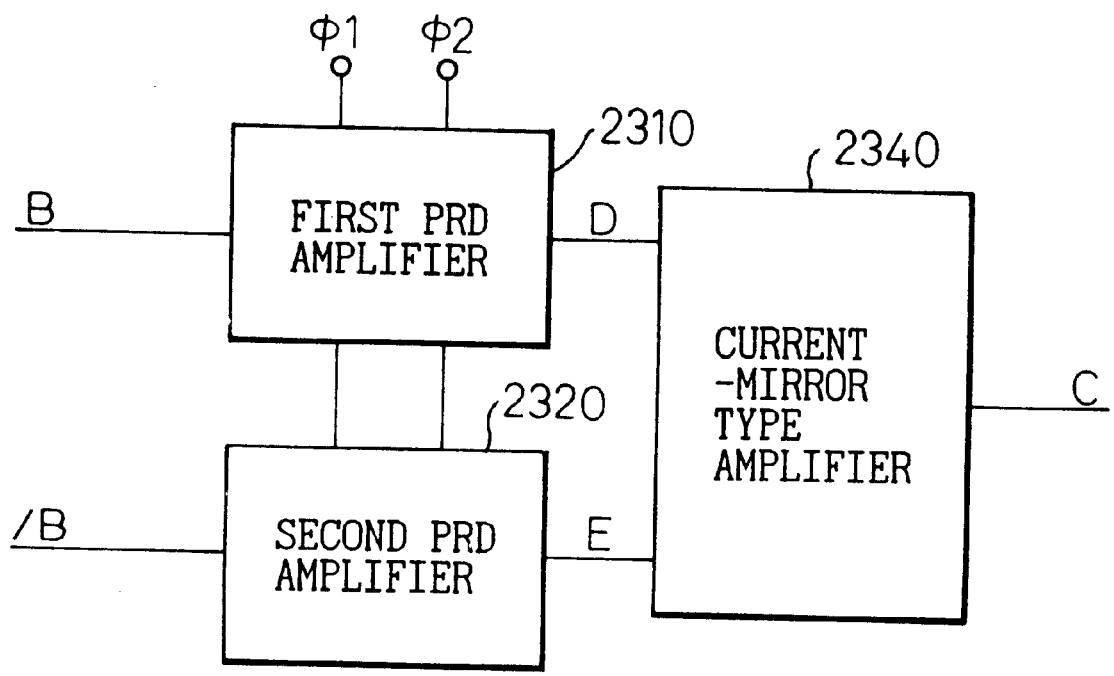
FIG. 100B is a diagram showing one example of a bus amplifier in the signal transmission system of FIG. 99.

FIG. 100A shows a circuit example of the precharge circuit (2400') in the signal transmission system of FIG. 99, and FIG. 100B shows a circuit example of the bus amplifier (the PRD-type complementary differential bus amplifier 2300") in the signal transmission system of FIG. 99.

As shown in FIG. 100A, the precharge circuit 2500' is constructed with a plurality of transistors, and is configured to short-circuit the complementary buses bus and /bus (2200') using precharge control signals PRE, /PRE and apply a precharge level (Vpr).

As shown in FIG. 100B, the PRD-type complementary differential bus amplifier (pseudo-PRD-type complementary differential bus amplifier) 2300 " comprises first and second PRD amplifiers 2310 and 2320 and a current-mirror type amplifier 2340. The first PRD amplifier 2310 receives a positive logic input signal B and supplies an output signal D to the current-mirror type amplifier 2340, and the second PRD amplifier 2320 receives a negative logic input signal /B and supplies an output signal E to the current-mirror type amplifier 2340.

Figure 101A:
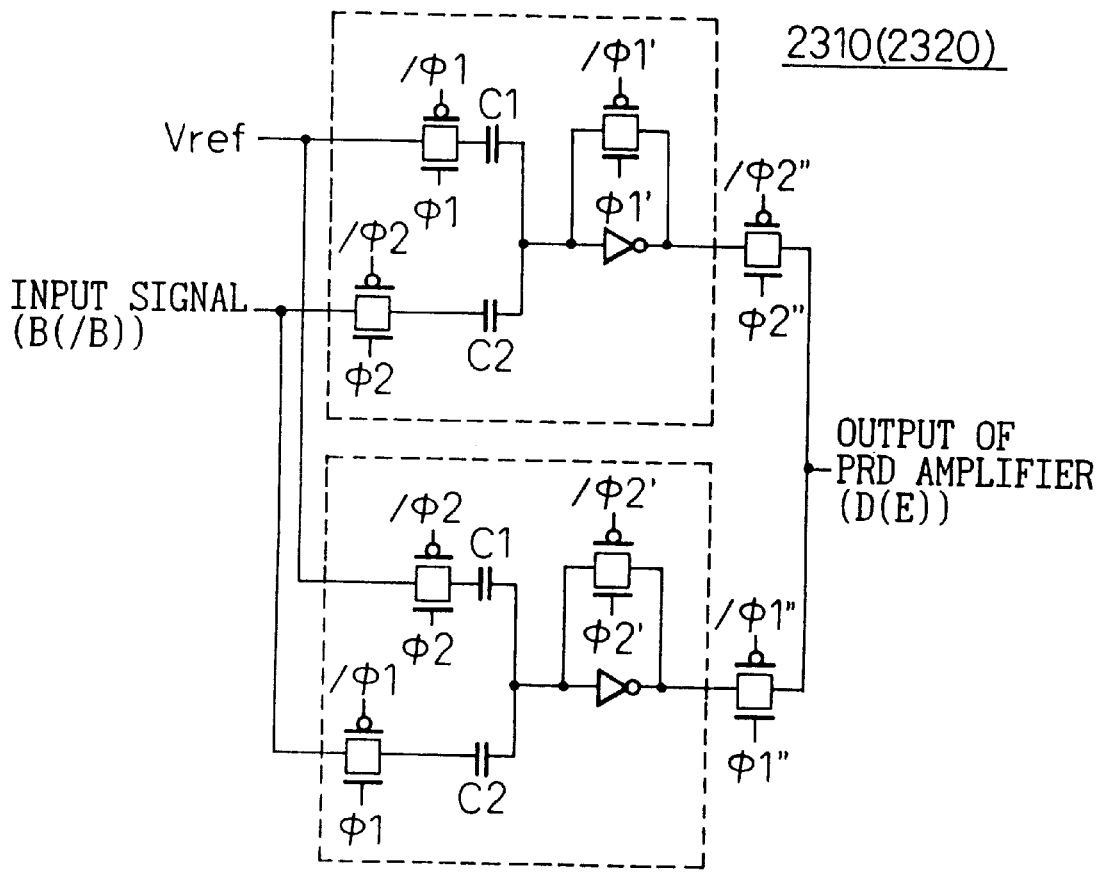
FIG. 101A is a circuit diagram showing one example of a PRD amplifier in the bus amplifier of FIG. 100B.
Figure 101B:
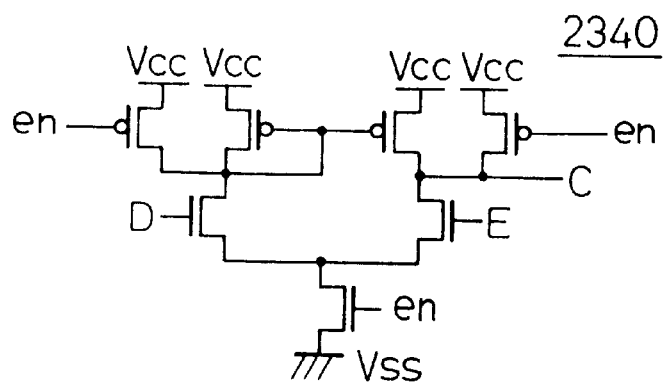
FIG. 101B is a circuit diagram showing one example of a current-mirror type amplifier in the bus amplifier of FIG. 100B.

FIG. 101A shows a circuit example of the PRD amplifier (the first and second PRD amplifiers 2310 and 2320) in the bus amplifier (PRD-type complementary differential bus amplifier) of FIG. 100B, and FIG. 101B shows a circuit example of the current-mirror type amplifier (2340) in the bus amplifier of FIG. 100B.

As is apparent from the comparison between FIGS. 101A and 87C, the first PRD amplifier 2310 (the second PRD amplifier 2320) is made identical in configuration to the PRD-type bus amplifier 2300 of FIG. 87C for the single-ended bus. Further, as shown in FIG. 101B, the current-mirror type amplifier 2340 is configured to receive the output signals D and E from the first and second PRD amplifiers 2310 and 2320 and output the signal (positive logic signal) C. Here, an enable signal (en) is applied to the control transistors in the current-mirror type amplifier 2340.

By using the complementary current-mirror type amplifier 2340, it becomes possible to detect even smaller signal variations by reducing the influence of phase noise. In this case, however, the circuit size of the current-mirror type amplifier 2340 increases.

Figure 102:
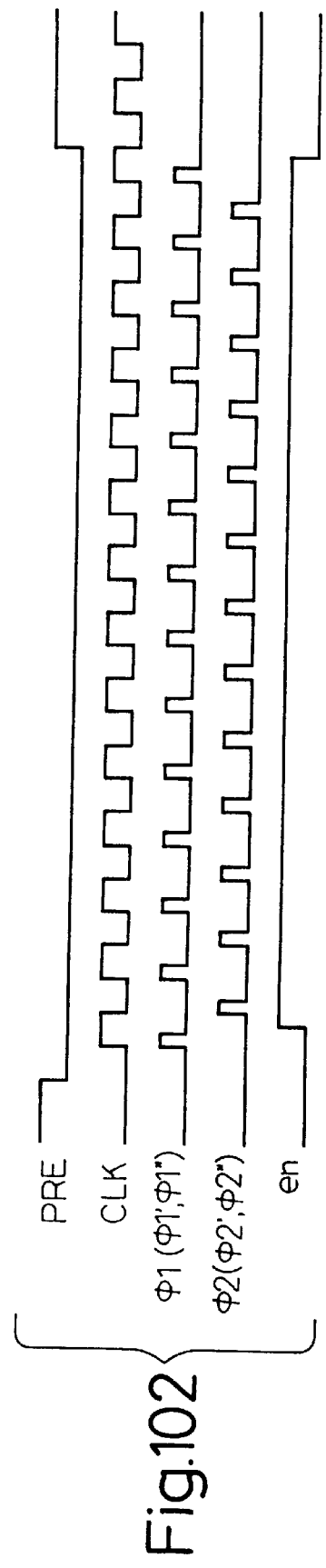
FIG. 102 is a diagram an example of a signal waveform for operating the bus amplifier of FIG. 100B.

FIG. 102 shows an example of the signal waveform for operating the bus amplifier of FIG. 100B.

As shown in FIG. 102, the control signals $\phi 1$ and $\phi 2$ ($\phi 1'$ and $\phi 2'$; $\phi 1$ " and $\phi 2$") are output at alternating timings synchronized to the clock CLK, to drive the PRD blocks 2300a and 2300b in interleaving fashion, as in the previously shown FIG. 88. During periods other than the period when the bus 2200' is in operation (data is being transmitted), the precharge control signal PRE is held at a high level "H" (/PRE is held at a low level "L") to precharge the bus 2200'. Further, during the data transmission period, the enable signal en supplied to the current-mirror type amplifier 2340 is held at a high level "H" (/en is held at a low level "L") to activate the current-mirror type amplifier 2340 which thus outputs data (C).

Figure 103:
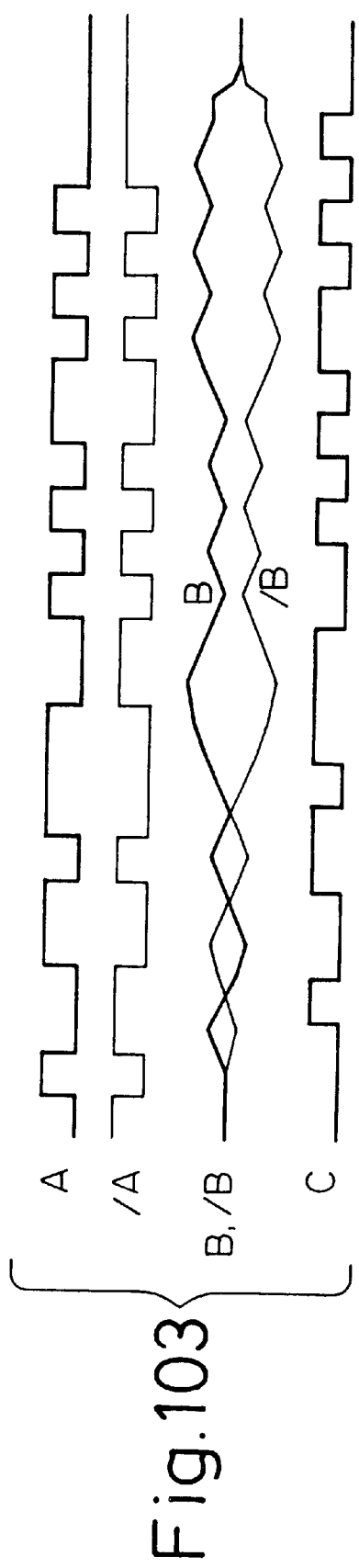
FIG. 103 is a diagram showing an example of the operating waveform of the bus and the bus amplifier in the signal transmission system of FIG. 99.

FIG. 103 is a diagram showing an example of the operating waveform of the bus and the bus amplifier in the signal transmission system of FIG. 99.

As shown in FIG. 103, according to the fourth embodiment, the complementary signals (A, /A) output from the driver 2100' are transmitted along the complementary buses 2200', and the PRD-type complementary differential bus amplifier 2300' receives the complementary signals (B, /B) and outputs the signal (positive logic signal) C. In the fourth embodiment, since the precharge circuit 2400' is provided, the input signals (B, /B) to the PRD-type complementary differential bus amplifier 2300' are held at a prescribed level (precharge level Vpr) before and after the data transmission.

The fourth embodiment (the fourth embodiment of the fifth mode) consumes more power than the foregoing third embodiment, but achieves higher-speed operation. Further, in the third and fourth embodiments, since the intersymbol interference component is eliminated by buffering in the single-ended type PRD amplifiers, and also a certain degree of amplification is performed, an input offset, which is a shortcoming of a complementary-type amplifier, will not become a problem. The complementary input differential current-mirror type amplifier is not limited to the configuration shown in FIG. 101B, but various other configurations may be used as long as they are capable of amplifying differential inputs.

Figure 104:
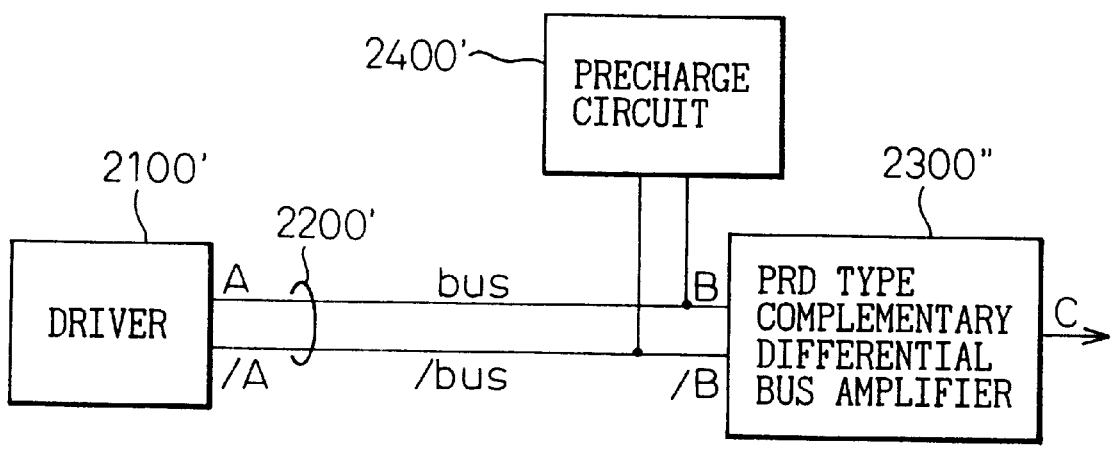
FIG. 104 is a block diagram showing in schematic form an essential portions of a fifth embodiment of the signal transmission system according to the fifth mode of the present invention.

FIG. 104 is a block diagram showing in schematic form an essential portions of a fifth embodiment of the signal transmission system according to the fifth mode of the present invention. The basic configuration is the same as that of the foregoing fourth embodiment, the only difference being in the configuration of the PRD-type complementary differential bus amplifier 2300", which characterizes the fifth embodiment.

Figure 105:
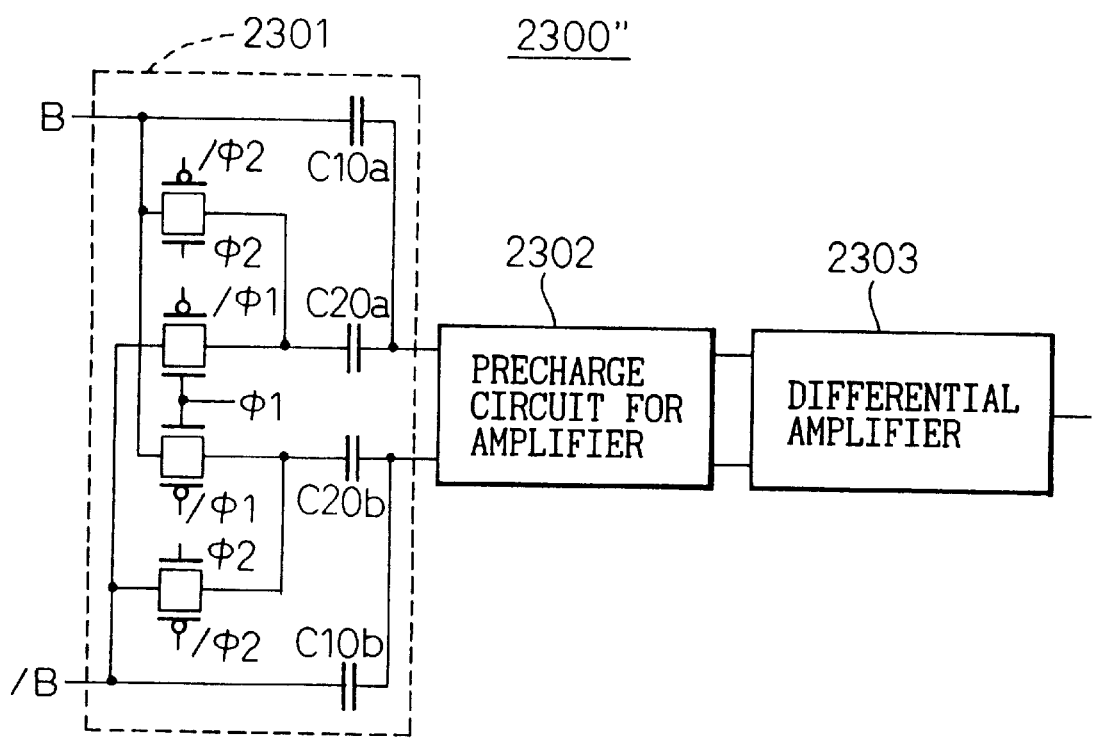
FIG. 105 is a block circuit diagram showing one example of a bus amplifier in the signal transmission system of FIG. 104.

FIG. 105 is a block circuit diagram showing an essential portion of one example of the bus amplifier in the signal transmission system of FIG. 104. A circuit example of the PRD-type complementary differential bus amplifier 2300" is shown here.

In the PRD-type complementary differential bus amplifier 2300' in the foregoing third and fourth embodiments, the inputs are first fed into the single-ended PRD-type bus amplifiers whose outputs are then supplied as inputs to the complementary-type amplifier; on the other hand, the PRD-type complementary differential bus amplifier 2300" of the fifth embodiment comprises a differential amplifier 2303 and an amplifier precharging circuit 2302 for precharging the input nodes of the differential amplifier 2303, which are preceded by a PRD functional block 2301 comprising capacitors (capacitors C10$a$, C20$a$; C10$b$, C20$b$). This PRD-type complementary differential bus amplifier 2300" also performs data reproduction and amplification at high speed by switching between two amplifier sections (this means there are two main amplifier sections).

Here, when the value of the capacitors C10$a$ and C10$b$ is denoted by C10, and the value of the capacitors C20$a$ and C20$b$ by C20, theoretically intersymbol interference can be eliminated completely if these capacitor values C10 and C20 are determined so as to satisfy the equation $C10/(C10+C20)=(1+\exp(-T/\tau))/2$. This is true in an ideal condition, but in practice, because of the presence of parasitic capacitances, etc. the capacitor values are chosen to provide a capacitance ratio close to the values that satisfy the above equation. In the equation, $\tau$ is the time constant of the bus 2200', and T is the cycle of one bit or the time one-bit data appears on the bus.

Figure 106A:
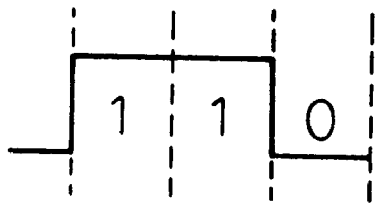
FIGS. 106A, 106B, and 106C are waveform diagrams showing the relationship between the time constant of the bus and a one-bit cycle.
Figure 106B:
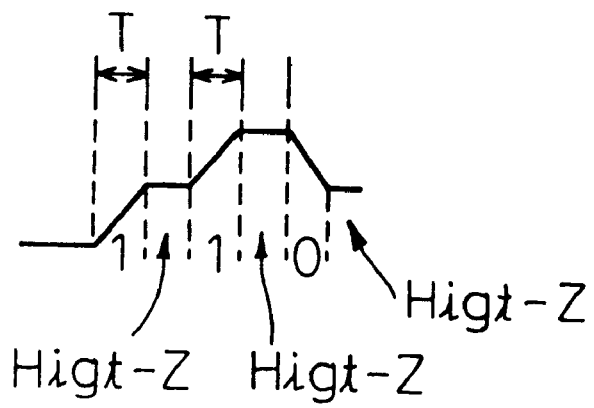
Figure 106C:
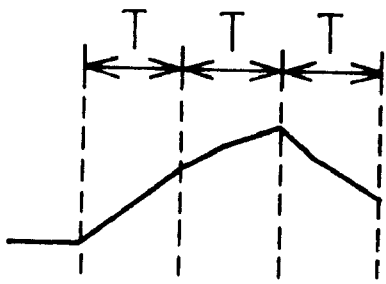

FIGS. 106A to 106C are waveform diagrams showing the relationship between the time constant of the bus and the one-bit cycle: FIG. 106A is a diagram showing the original waveform (data 1-1-0), FIG. 106B is a diagram for explaining the time T that one-bit data appears on the bus 2200', and FIG. 106C is a diagram showing the one-bit cycle (T).

When transmitting the original waveform (data 1-1-0) such as shown in FIG. 106A, the period of a high-impedance state (High-Z state) may be provided after one-bit data appears on the bus 2200', as shown in FIG. 106B, or the data may be transmitted over the entire one-bit cycle T, as shown in FIG. 106C. That is, with the waveform of either FIG. 106B or 106 C, the original data shown in FIG. 106A can be detected correctly by the PRD-type bus amplifier (the PRD-type complementary differential bus amplifier 2300").

Figure 107A:
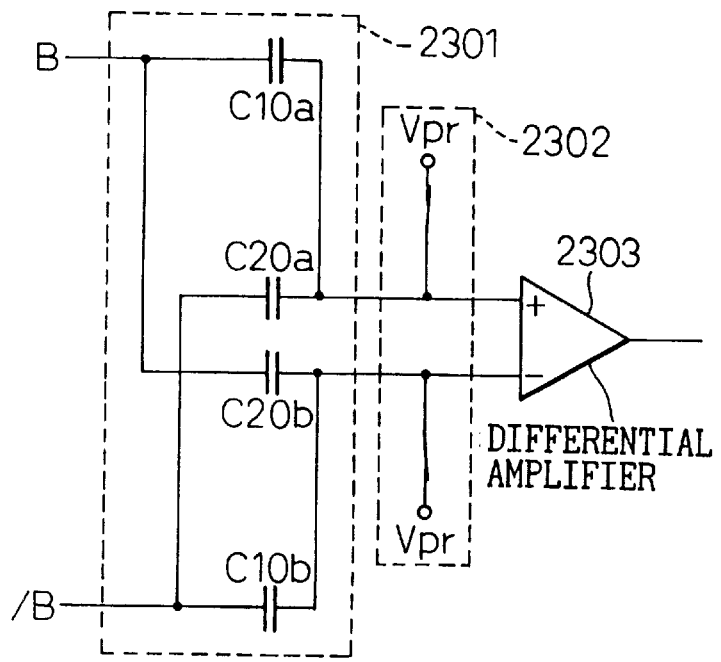
FIGS. 107A and 107B are diagrams for explaining the operation of the bus amplifier of FIG. 105.
Figure 107B:
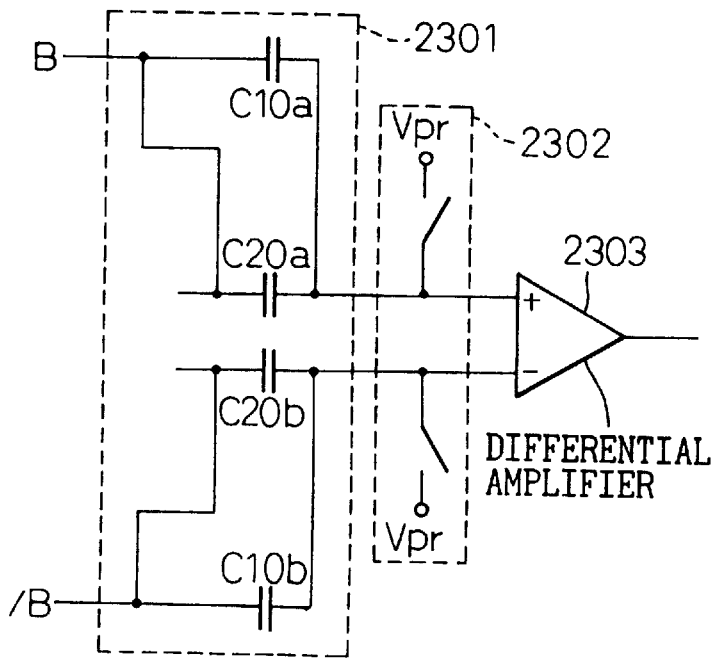

FIGS. 107A and 107B are diagrams for explaining the operation of the bus amplifier of FIG. 105.

By controlling the control signals $\phi 1$ and $\phi 2$, the PRD-type complementary differential bus amplifier 2300" performs the operations shown in FIGS. 107A and 107B alternately.

That is, when the control signal $\phi 1$ is at a high level "H" (/$\phi 1$ is at a low level "L"), and the control signal $\phi 2$ is at a low level "L" (/$\phi 2$ is at a high level "H"), an intersymbol interference component estimation operation is performed as shown in FIG. 107A, and when the control signal $\phi 1$ is at a low level "L", and the control signal $\phi 2$ is at a high level "H", a signal decision operation is performed as shown in FIG. 107B. Here, the amplifier precharging circuit 2302 precharges the input nodes of the differential amplifier 2303 during the period of the intersymbol interference component estimation.

In the foregoing third and fourth embodiments, the bus amplifier (the PRD-type complementary differential bus amplifier 2300') first accepts the signals from the complementary buses 2200' by the PRD method and then amplifies their difference voltage, rather than accepting the weak complementary signals in complementary form; this only means that the intersymbol interference components in the complementary signals are roughly eliminated, though the sensitivity is increased compared to a simple single-ended case. In this case, an erroneous operation may occur depending on the magnitude of the signal.

By contrast, the PRD-type complementary differential bus amplifier 2300" of the fifth embodiment is a PRD-type bus amplifier for complementary signals in the true sense of the word, and ideally, can completely eliminate intersymbol interference components from complementary signals. Thus, compared with the third and fourth embodiments (pseudo-PRD-type bus amplifier), the sensitivity can be greatly increased, in other words, the operating margin can be increased dramatically.

Figure 109:
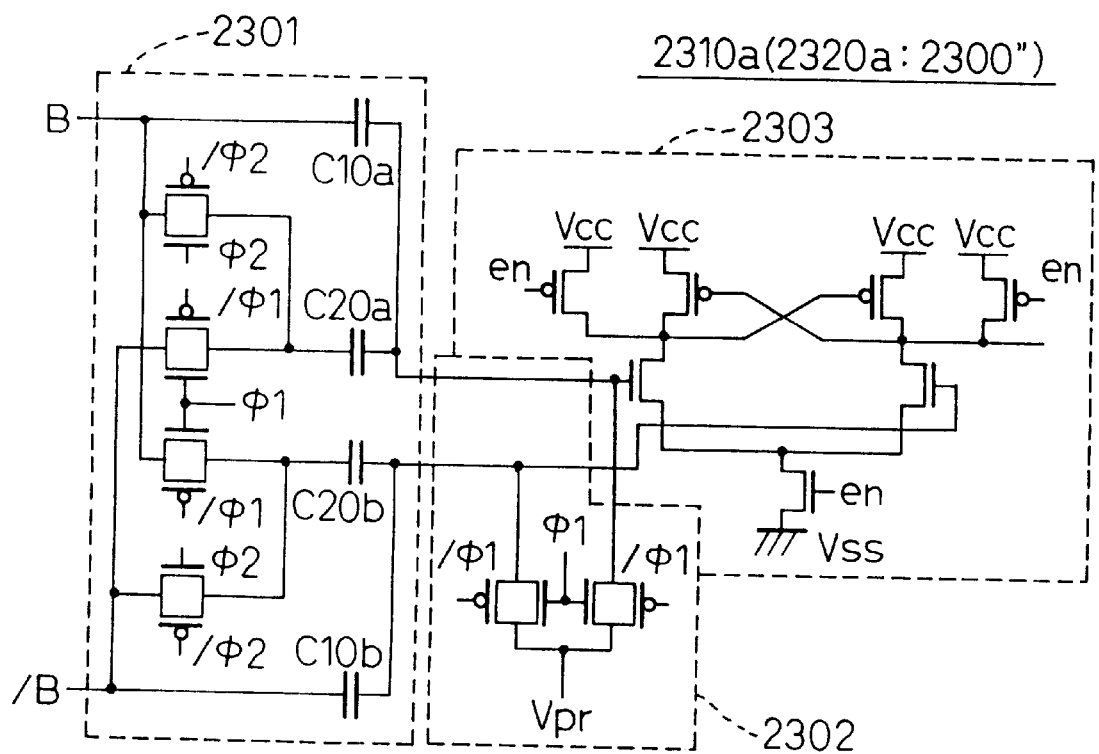
FIG. 109 is a circuit diagram showing one example of a PRD amplifier configuration in the bus amplifier of FIG. 108.
Figure 110:
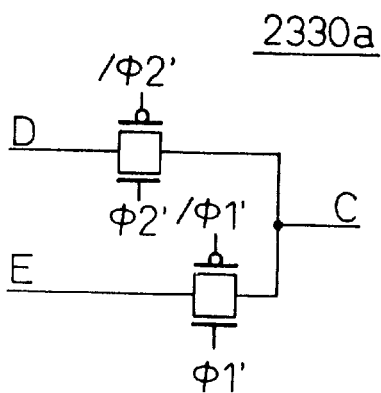
FIG. 110 is a circuit diagram showing one example of a multiplexer in the bus amplifier of FIG. 108.

FIG. 108 is a diagram showing another example of the bus amplifier in the signal transmission system of FIG. 104, FIG. 109 is a circuit diagram showing one example of the PRD amplifier configuration in the bus amplifier of FIG. 108, and FIG. 110 is a circuit diagram showing one example of a multiplexer in the bus amplifier of FIG. 108.

The bus amplifier (the PRD-type complementary differential bus amplifier 2300$a$) comprises first and second PRD amplifiers 2310$a$ and 2320$a$ similar in configuration to the bus amplifier (the PRD-type complementary differential bus amplifier 2300") of FIG. 105, and a multiplexer (MUX) 2330$a$. The bus amplifier shown in FIG. 108 achieves high-speed data transmission by performing interleaving operations such that one PRD amplifier (the first PRD amplifier 2310$a$) estimates (eliminates) intersymbol interference while the other PRD amplifier (the second PRD amplifier 2320$a$) is making a decision on data, and at the next timing, the one PRD amplifier (the first PRD amplifier 2310$a$) makes a decision on data while the other PRD amplifier (the second PRD amplifier 2320$a$) is estimating intersymbol interference.

Here, in the PRD amplifier that is performing the intersymbol interference estimation operation, precharging of the same PRD amplifier is also performed at the same time. Since this precharging is performed in the background during the interleaving data read period, the precharge time does not affect the data transfer cycle. Further, capacitors for PRD are inserted between the buses 2200' and the input nodes of the main section of the bus amplifier (the PRD-type complementary differential bus amplifier 2300$a$: Amplifier) so that the buses are isolated from the input nodes of the amplifier main section, and also since the potential difference between the buses and the input nodes of the amplifier is not specifically limited in the PRD method, the levels of the input nodes at the initiation of the amplifier operation can be set by precharging at such points that most enhance the sensitivity of the complementary-type amplifier. By so doing, the sensitivity can be increased greatly even when the same complementary-type amplifier is used in the main section.

In the above-described circuit, complementary transfer gates are used as the switches, but other devices having switching functions can also be used; for example, the switches may be constructed using only NMOS transistors (NMOS transfer gates) or only PMOS transfer gates. In the fifth embodiment, the differential amplifier 2303 is configured as an NMOS gate-receiving type, but whether it should be configured as an NMOS or PMOS gate-receiving type depends on technology, etc., and whichever is suitable can be chosen. Further, in the fifth embodiment, a gate-receiving latch is used for the differential amplifier 2303, but the differential amplifier is not limited to this particular type. The differential amplifier 2303 used in the fifth embodiment is configured so that using the enable signals en and /en, its operation can be stopped when data transmission is not being performed.

As shown in FIG. 109, the first PRD amplifier 2310a (the second PRD amplifier 2320a) is similar in configuration to the PRD-type complementary differential bus amplifier 2300" shown in FIG. 105, and comprises the PRD functional block 2301, amplifier precharging circuit 2302, and differential amplifier 2303. Here, the differential amplifier 2303 is configured as a gate-receiving latch-type differential amplifier. Further, the precharge operation of the amplifier precharging circuit 2302 is controlled by the; control signal φ1 (/φ1), while the operation of the differential amplifier 2303 is controlled by the enable signal en.

As shown in FIG. 110, the MUX (multiplexer) 2330a selects the output signal (D) of the first PRD amplifier 2310a or the output signal (E) of the second PRD amplifier 2320a in accordance with the control signals φ1' (/φ1') and φ2' (/φ2'), and outputs the selected signal as the output signal (C) of the bus amplifier (the PRD-type complementary differential bus amplifier 2300a).

Figure 111:
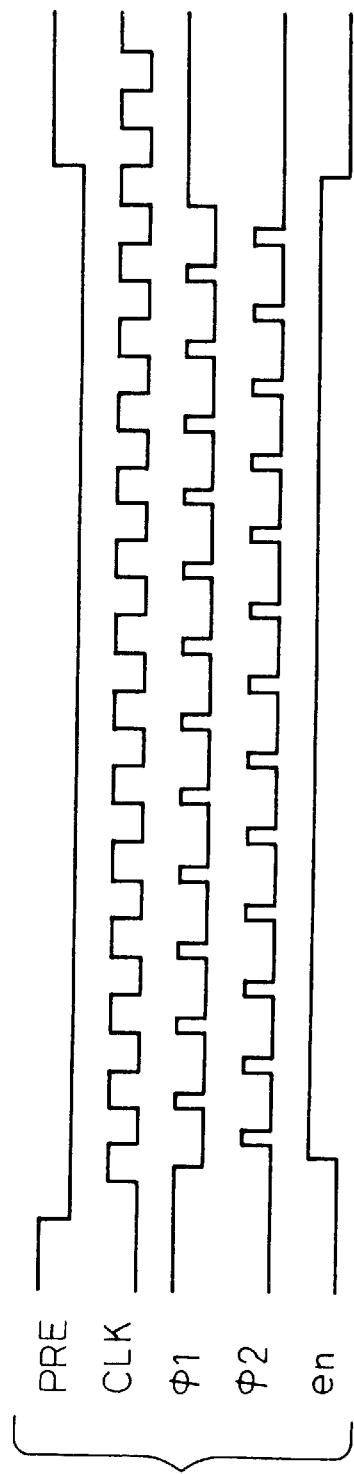
FIG. 111 is a diagram showing an example of a signal waveform for operating the bus amplifier of FIG. 108.
Figure 112:
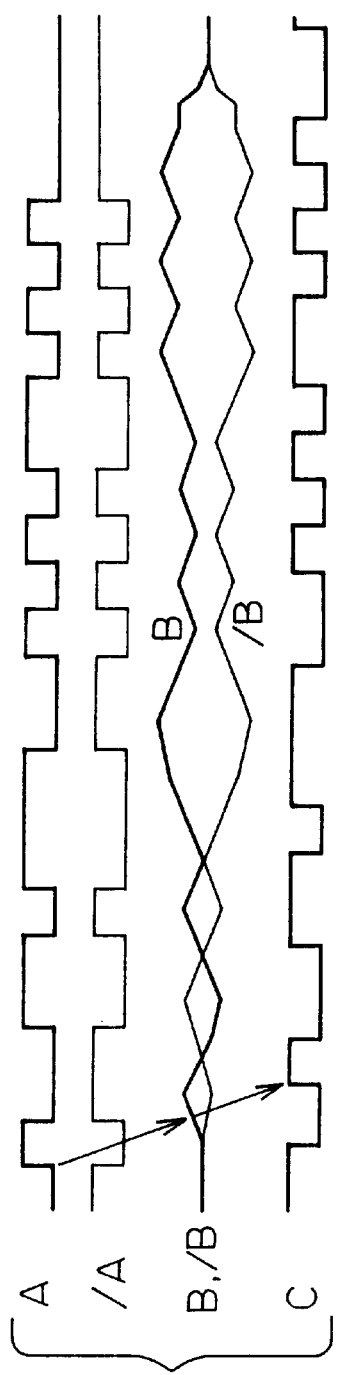
FIG. 112 is a diagram showing an example of the operating waveform of the bus and the bus amplifier in the signal transmission system of FIG. 104.

FIG. 111 is a diagram showing an example of the signal waveform for operating the bus amplifier of FIG. 108, and FIG. 112 is a diagram showing an example of the operating waveform of the bus and the bus amplifier in the signal transmission system of FIG. 104.

By using the control signals φ1 and φ2, as shown in FIG. 111, interleaving operations are performed such that one PRD amplifier (the first PRD amplifier 2310a) estimates intersymbol interference while the other PRD amplifier (the second PRD amplifier 2320a) is making a decision on data, and at the next timing, the one PRD amplifier makes a decision on data while the other PRD amplifier is estimating intersymbol interference. Here, in the PRD amplifier that is performing the intersymbol interference estimation operation, precharging is also performed at the same time.

As shown in FIG. 112, according to the fifth embodiment, the complementary signals (A, /A) output from the driver 2100' are transmitted along the complementary buses 2200', and the PRD-type complementary differential bus amplifier 2300" receives the complementary signals (B, /B) and outputs the signal (positive logic signal) C.

Figure 113:
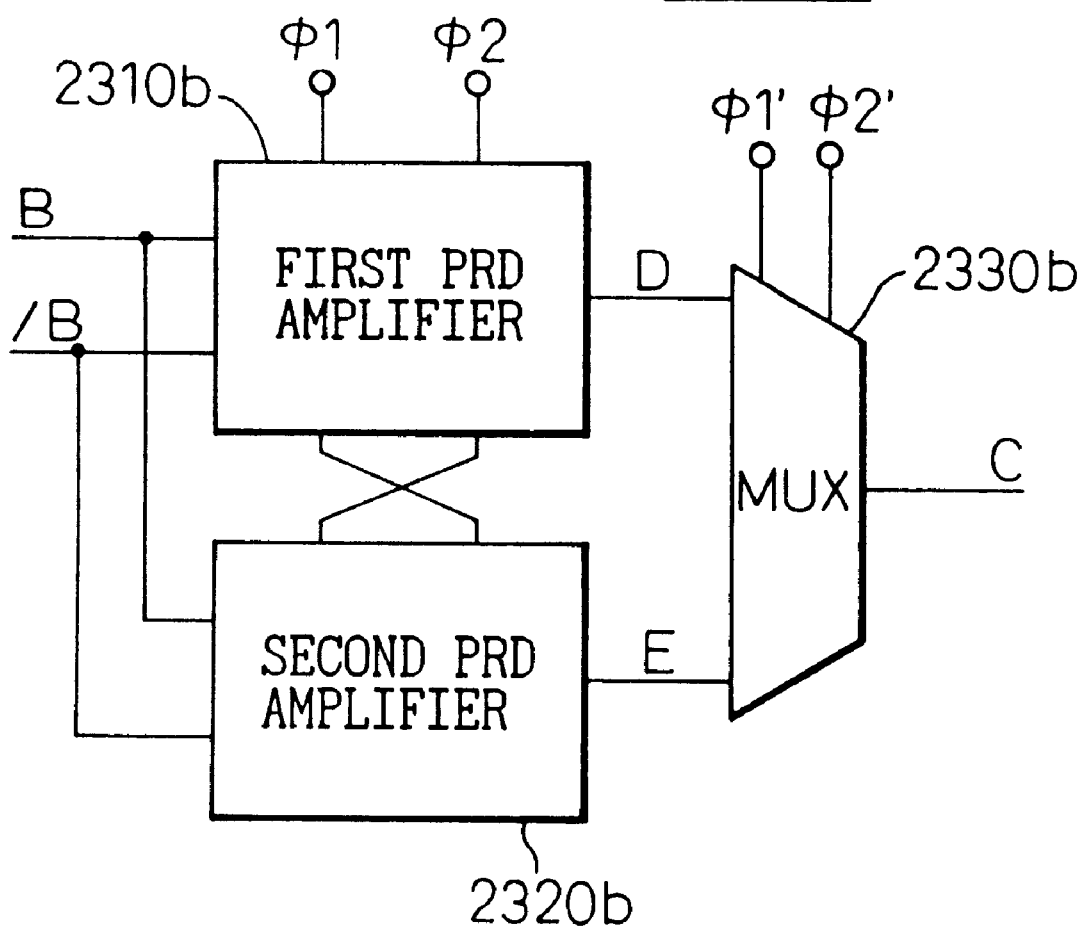

FIG. 113 is a diagram showing one example of a bus amplifier in the signal transmission system as a sixth embodiment of the signal transmission system according t6 the fifth mode of the present invention. The sixth embodiment also concerns the complementary bus example, and the block diagram itself is the same as that of the above-described FIG. 108.

More specifically, the bus amplifier (the PRD-type complementary differential bus amplifier 2300b) comprises first and second PRD amplifiers 2310b and 2320b and a multiplexer (MUX) 2330b, as shown in FIG. 113.

Figure 114:
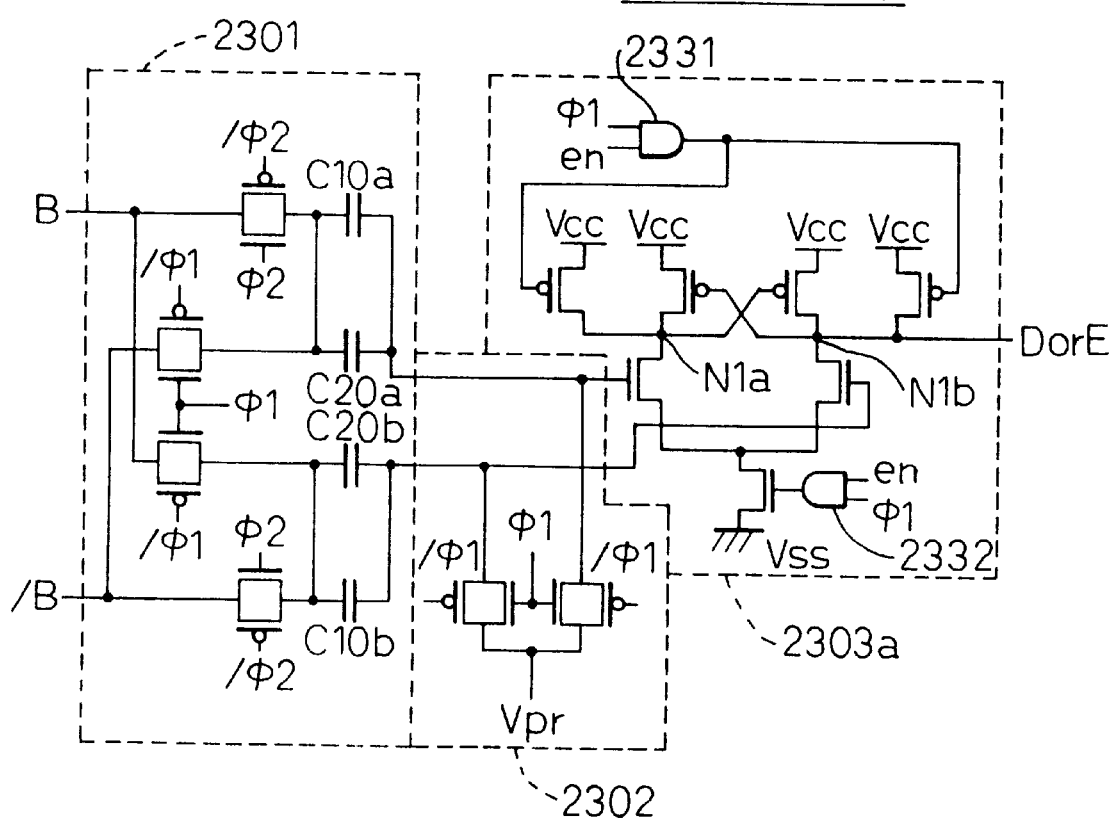

FIG. 114 is a circuit diagram showing one example of the PRD amplifier configuration (the first and second PRD amplifiers 2310b and 2320b) in the bus amplifier of FIG. 113.

As is apparent from the comparison between FIGS. 114 and 109, the PRD amplifier (2310b, 2320b) in the sixth embodiment differs from the PRD amplifier (2310a, 2320a) in the fifth embodiment shown in FIG. 109 in the configuration of the differential amplifier 2303a.

As shown in FIG. 114, the differential amplifier 2303a of the sixth embodiment differs from the differential amplifier 2303 of FIG. 109 by the inclusion of AND gates 2331 and 2332. More specifically, while, in the differential amplifier 2303 of FIG. 109, the enable signal (en) is applied directly to the gates of the control transistors, in the differential amplifier 2303a of the sixth embodiment shown in FIG. 114 the enable signal en and the control signal φ1 are input to the AND gates 2331 and 2332 for logic operations, and the output signals of these gates 2331 and 2332 are used to control the switching of the control transistors. In this way, the differential amplifier 2303a is switched on (activated) for a minimum required time, to reduce the power consumption.

In the sixth embodiment, as in the foregoing fifth embodiment, the differential amplifier 2303a is configured as a gate-receiving latch type. The differential amplifier 2303a in the sixth embodiment is configured as an NMOS gate-receiving type, but whether it should be configured as an NMOS or PMOS gate-receiving type depends on technology, etc., and whichever is suitable can be chosen. The operational sequence is the same as that for the fifth embodiment shown in FIG. 111.

In FIG. 114, when precharging the bus amplifier, the nodes N1a and N1b of the differential amplifier 2330a are precharged to the high level "H"; therefore, by adopting the NMOS gate-receiving configuration, as in the sixth embodiment, the operating speed of the amplifier can be increased. In the sixth embodiment, as in the configuration shown in FIG. 108, high-speed data transmission is achieved by performing interleaving operations using the control signals φ1 and φ2 such that one PRD amplifier (the first PRD amplifier 2310b) estimates intersymbol interference while the other PRD amplifier (the second PRD amplifier 2320b) is making a decision on data, and at the next timing, the one PRD amplifier makes a decision on data while the other PRD amplifier is eliminating intersymbol interference.

Figure 115:
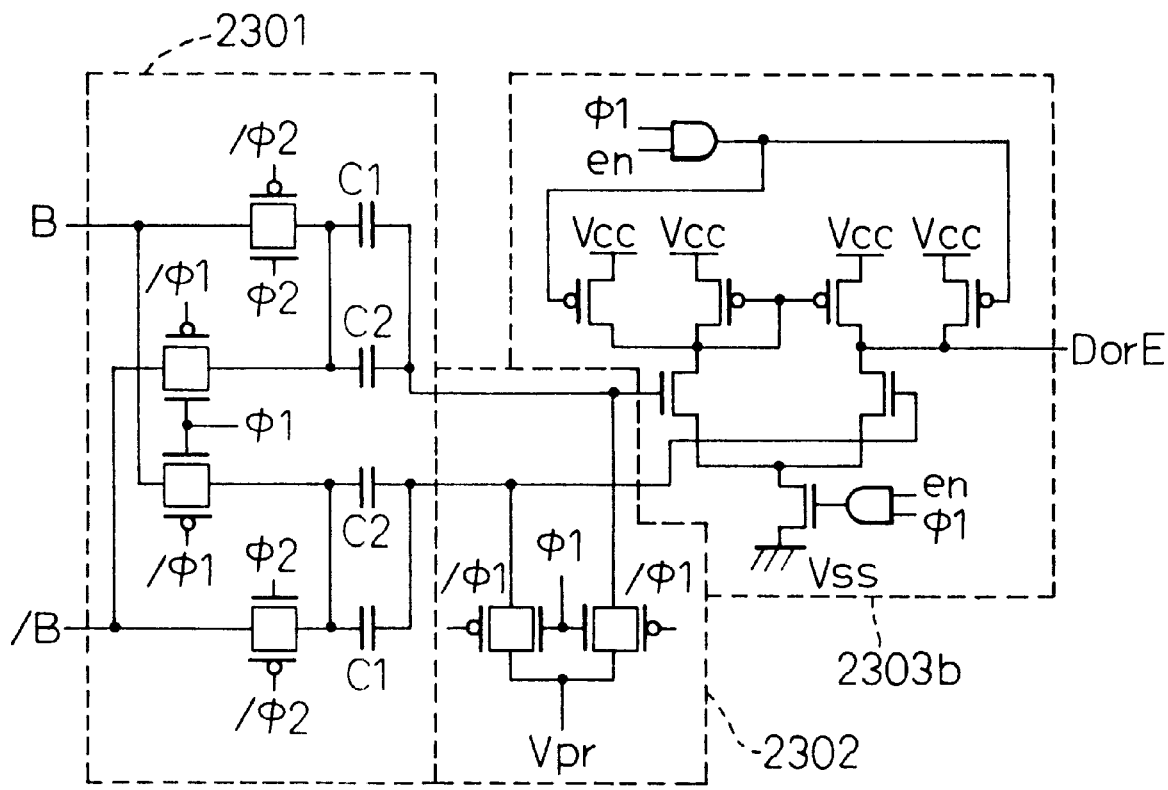

FIG. 115 is a circuit diagram showing another example of the PRD amplifier configuration in the bus amplifier of FIG. 113.

The differential amplifier 2303b shown in FIG. 115 is constructed by adding the AND gates 2331 and 2332 to the differential amplifier (2303c) shown in FIG. 119 hereinafter given. In the differential amplifier 2303b of FIG. 115, as in the differential amplifier 2303a of FIG. 114, the enable signal en and the control signal φ1 are input to the AND gates 2331 and 2332 for logic operations, and the output signals of these gates 2331 and 2332 are used to control the switching of the control transistors. In this way, the differential amplifier 2303b is activated for a minimum required time, to reduce the power consumption.

Figure 116:
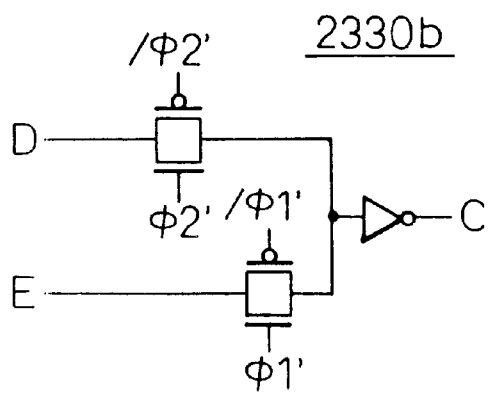

FIG. 116 is a circuit diagram showing one example of the multiplexer in the bus amplifier of FIG. 113.

As shown in FIG. 116, the MUX (multiplexer) 2330b selects either the output signal (D) of the first PRD amplifier 2310b or the output signal (E) of the second PRD amplifier 2320b in accordance with the control signals φ1' (/φ1') and φ2' (/φ2 '), and outputs the selected signal as the output signal (C) of the bus amplifier (the PRD-type complementary differential bus amplifier 2330b) after inverting it by an inverter to maintain logic integrity. The MUX 2330b shown in FIG. 116 is for use with the PRD amplifier (differential amplifier 2303a) shown in FIG. 114. When the PRD amplifier (differential amplifier 2303b) shown in FIG. 115 is used, the MUX 2330a shown in FIG. 110 should be used. Needless to say, the signal logic can be changed according to the need.

Figure 117:
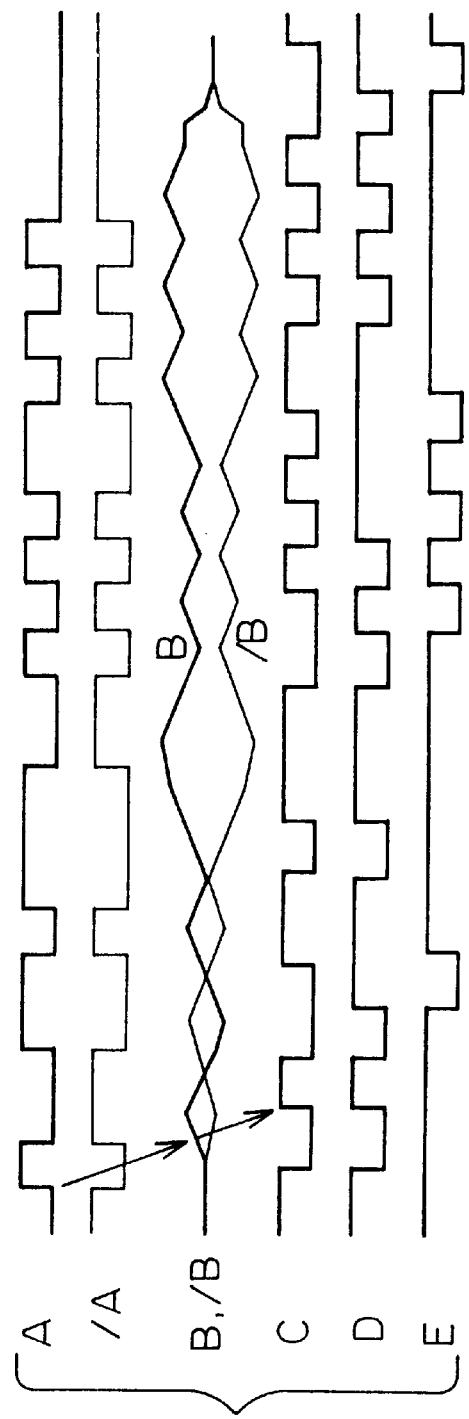

FIG. 117 is a diagram showing an example of the operating waveform of the bus and the bus amplifier in the sixth embodiment of the signal transmission system according to the fifth mode of the present invention.

As shown in FIG. 117, according to the sixth embodiment, the complementary signals (A, /A) output from the driver 2100' are transmitted along the complementary buses 2200', and the PRD-type complementary differential bus amplifier 2300b receives the complementary signals (B, /B) and outputs the signal (positive logic signal) C. In FIG. 117, the output signal D of the first PRD amplifier 2310b and the output signal E of the second PRD amplifier 2320b are also shown.

Figure 118:
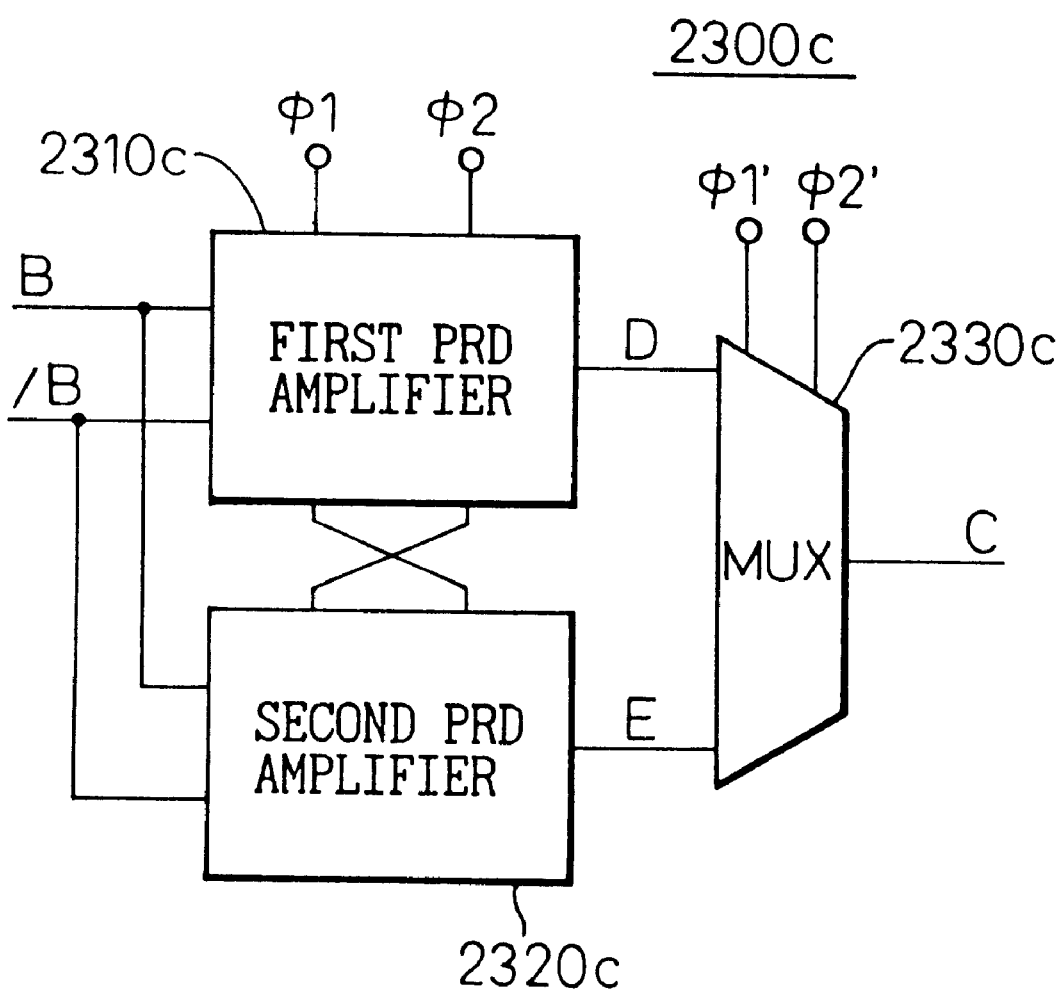

FIG. 118 is a diagram showing one example of the bus amplifier in the signal transmission system as a seventh embodiment of the signal' transmission system according to the fifth mode of the present invention. The seventh embodiment also concerns the complementary bus example, and the block diagram itself is the same as that of the above-described FIGS. 108 and 113.

More specifically, as shown in FIG. 118, the bus amplifier (the PRD-type complementary differential bus amplifier 2300c) comprises first and second PRD amplifiers 2310c and 2320c and a multiplexer (MUX) 2330c.

Figure 119:
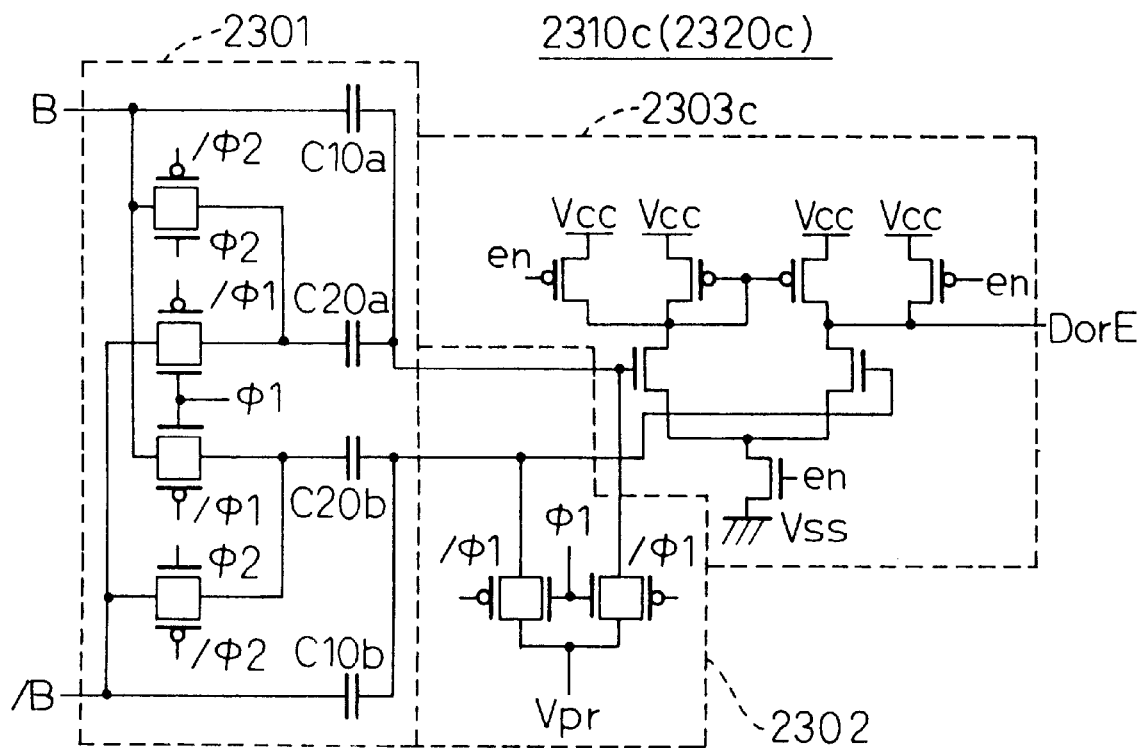

FIG. 119 is a circuit diagram showing one example of the PRD amplifier configuration in the bus amplifier of FIG. 118.

As earlier described, the differential amplifier 2303c in the PRD amplifier 2310c (2320c) of FIG. 119 differs from the differential amplifier 2303b shown in FIG. 115 by the omission of the AND gates 2331 and 2332.

As shown in FIG. 119, the differential amplifier 2303c of the seventh embodiment is configured as a current-mirror amplifier. This type of amplifier has a higher sensitivity and is capable of higher speed operation than, for example, a latch-type differential amplifier. However, since the dynamic range of a current-mirror type amplifier is generally small, it is preferable to optimize the input level so that maximum use can be made of the characteristic of the current-mirror type differential amplifier 2303c. Though this amplifier is a complementary-type amplifier, the sensitivity can thus be increased dramatically compared, for example, with the fifth embodiment. As in the foregoing embodiments, the seventh embodiment also achieves high-speed data transmission by interleaving operations.

Figure 120:
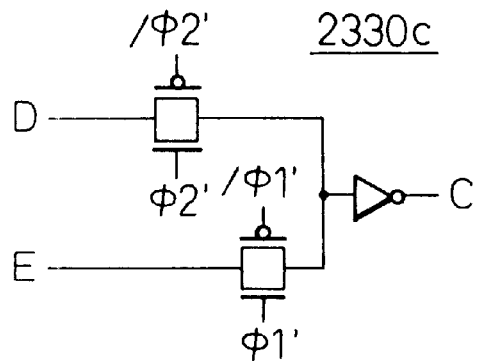

FIG. 120 is a circuit diagram showing one example of the multiplexer in the bus amplifier of FIG. 118.

As shown in FIG. 120, the MUX (multiplexer) 2330c is made identical in configuration to the MUX 2330b shown in FIG. 116. That is, the MUX 2330c selects either the output signal (D) of the first PRD amplifier 2310c or the output signal (E) of the second PRD amplifier 2320c in accordance with the control signals φ1' (/φ1') and φ2' (/φ2'), and outputs the selected signal as the output signal (C) of the bus amplifier (the PRD-type complementary differential bus amplifier 2330c) after inverting it by an inverter to maintain logic integrity.

Figure 121:
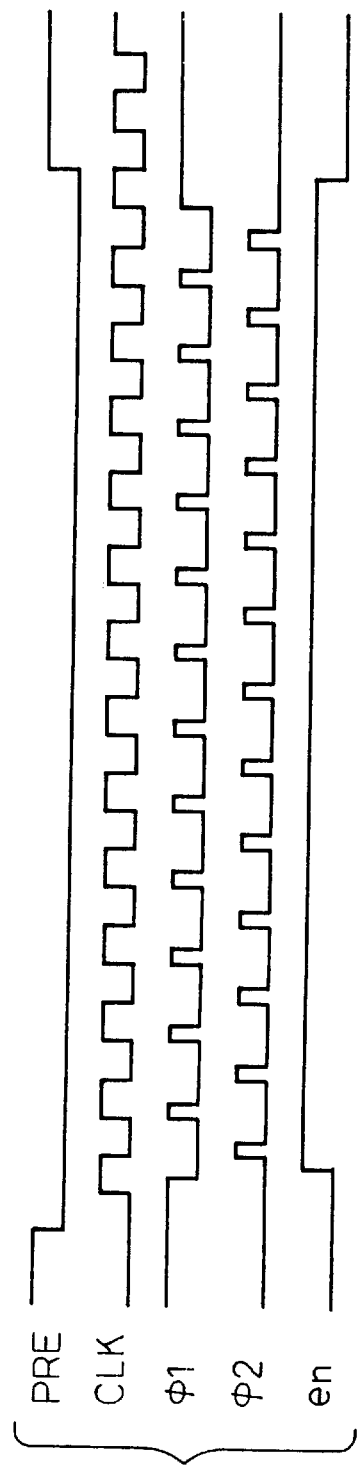
Figure 122:
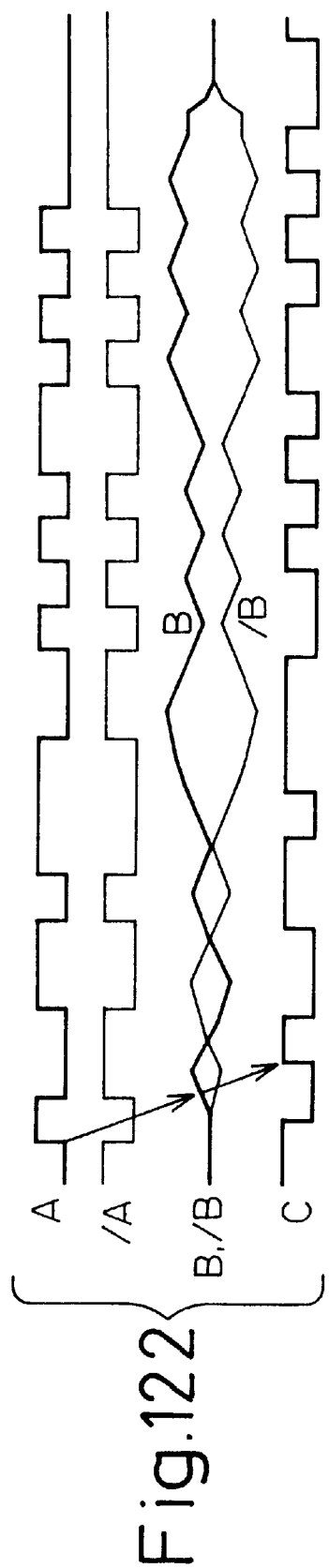

FIG. 121 is a diagram showing an example of the signal waveform for operating the bus amplifier of FIG. 118, and FIG. 122 is a diagram showing an example of the operating waveform of the bus and the bus amplifier in the seventh embodiment of the signal transmission system according to the fifth mode of the present invention.

As is apparent from the comparison between FIGS. 121 and 122 and FIGS. 111 and 112, the operation of the bus amplifier (the PRD-type complementary differential bus amplifier 2330c) and the signal transmission system in the seventh embodiment is the same as that described in the fifth embodiment.

FIG. 123 is a diagram showing one example of the bus amplifier in the signal transmission system as an eighth embodiment of the signal transmission system according to the fifth mode of the present invention. The eighth embodiment also concerns the complementary bus example, and the block diagram itself is the same as that of the above-described FIG. 108, etc.

The eighth embodiment concerns a configuration for compensating for the input offset of the differential amplifier stage which can become a problem, for example, in the fifth to seventh embodiments. That is, the eighth embodiment is intended to compensate for the input offset of the differential amplifier. More specifically, the differential amplifier 2303d of the eighth embodiment has a function to compensate for the input offset.

FIG. 124 is a circuit diagram showing one example of the PRD amplifier configuration in the bus amplifier of FIG. 123.

As is apparent from the comparison between FIGS. 124 and 119, in the eighth embodiment the precharge circuit 2302d is provided only for one input of the current-mirror type differential amplifier 2303d, an the other input is connected to the output via a transfer gate the switching of which is controlled by the control signal φ1 (/φ1).

FIGS. 125A and 125B are diagrams for explaining the operation of the bus amplifier of FIG. 124: FIG. 125A shows an intersymbol interference elimination preparation and auto-zero operation, and FIG. 125B shows a signal decision operation.

First, as shown in FIG. 125A, at timing 1 the intersymbol interference estimation operation is performed while, at the same time, performing the operation to eliminate the input offset of the differential amplifier itself by electrically short-circuiting one input and the output of the differential amplifier 2303d. At the same time, the other input of the differential amplifier 2303d is precharged by the precharge circuit 2302d to a level (Vpr) that enhances the sensitivity of the differential amplifier.

Next, as shown in FIG. 125B, at timing 2 the data decision operation is performed. At this time, the short circuit between the input and output of the differential amplifier 2303d is open, and the precharging by the precharge circuit 2302d is also stopped.

As described, in the eighth embodiment, a function (auto-zero function) to eliminate the input offset, which is a shortcoming of a complementary-type differential amplifier, is added. Further, the PRD functional block is made identical in configuration to that of the seventh embodiment, and unlike the third and fourth embodiments, ideally the intersymbol interference component can be completely eliminated. That is, the eighth embodiment can eliminate the input offset by the complementary amplifier auto-zero function, and by eliminating the input offset, it becomes possible to detect, reproduce, and amplify even weaker signals.

Usually, a complementary-type amplifier with an auto-zero function requires the provision of a capacitor, for input offset compensation, but in the eighth embodiment, since the offset is stored in the capacitor used for intersymbol interference component estimation, there is no need to provide a separate capacitor for offset compensation. As a result, the auto-zero function can be added without increasing the area.

In the eighth embodiment, the two PRD amplifiers (bus amplifier) 2310d and 2320d are operated in interleaving fashion and alternately perform signal reproduction and amplification, thereby achieving high-speed signal transmission.

FIG. 126 is a circuit diagram showing one example of the multiplexer (MUX) 2330d in the bus amplifier of FIG. 123. The configuration is the same as that of the MUX 2330c in the seventh embodiment shown in FIG. 120.

FIG. 127 is a diagram showing an example of the signal waveform for operating the bus amplifier of FIG. 123, and FIG. 128 is a diagram showing an example of the operating waveform of the bus and the bus amplifier in the eighth embodiment of the signal transmission system according to the fifth mode of the present invention.

As shown in FIG. 127, in the eighth embodiment also, high-speed data transmission is achieved by performing interleaving operations using the control signals φ1 and φ2 such that one PRD amplifier (the first PRD amplifier 2310d) eliminates intersymbol interference while the other PRD amplifier (the second PRD amplifier 2320d) is making a decision on data, and at the next timing, the one PRD amplifier makes a decision on data while the other PRD amplifier is eliminating intersymbol interference. In the amplifier that is performing the intersymbol interference estimation operation, input offset elimination (auto-zero operation) and amplifier precharging are performed at the same time, as previously described. (See positions indicated by arrows in FIG. 128) In this way, in the eighth embodiment, since the bus amplifier (the PRD-type complementary differential bus amplifier 2300d) is provided with an auto-zero function, even fainter variations in potential can be detected.

Here, since the auto-zero and precharge operations are performed in the background during the interleaving data read period, these operations do not affect the data transfer cycle (which therefore does not take an extra time). Further, as shown in FIG. 127, the enable signal en 2 (/en2) supplied to the second PRD amplifier 2320d is output at a timing delayed by one bit from the enable signal en1 (/en1) supplied to the first PRD amplifier 2310d, to prevent an unwanted signal from being output from the MUX 2330d.

In other respects, the configuration of the eighth embodiment is the same as that of the other embodiments described so far. That is, capacitors for PRD are inserted between the buses and the input nodes of the main section of bus amplifier (the PRD-type complementary differential bus amplifier 2300d) so that the buses are isolated from the input nodes of the amplifier main section, and also since the potential difference between the buses and the input nodes of the amplifier is not specifically limited in the PRD method, the levels of the input nodes at the initiation of the amplifier operation can be set by precharging at such points that most enhance the sensitivity of the complementary-type amplifier. By so doing, the sensitivity can be increased greatly even when the same complementary-type amplifier is used in the main section.

Further, in the above-described circuit, complementary transfer gates are used as the switches, but other devices having switching functions can also be used; for example, the switches may be constructed using only NMOS transistors (NMOS transfer gates) or only PMOS transfer gates. In the eighth embodiment, the differential amplifier 2303d is configured as an NMOS gate-receiving type, but whether it should be configured as an NMOS or PMOS gate-receiving type depends on technology, etc., and whichever is suitable can be chosen. The differential amplifier 2303d used in the eighth embodiment is constructed so that its operation can be stopped by the enable signals en1 and /en1 (en2 and /en2) when data transmission is not being performed.

FIG. 129 is a diagram showing one example of a bus amplifier 2300e in the signal transmission system as a ninth embodiment of the signal transmission system according to the fifth mode of the present invention, and FIG. 130 is a circuit diagram showing one-example of the configuration of a PRD amplifier 2310e in the bus amplifier of FIG. 129. The ninth embodiment also concerns the complementary bus example, but unlike the eighth embodiment shown in FIG. 123, for example, the PRD-type complementary differential bus amplifier 2300e is constructed using a single PRD amplifier 2310e and a latch 2340e. Here, the PRD amplifier 2310e shown in FIG. 130 is the same in configuration as the PRD amplifier 2310d (2320d) previously shown in FIG. 124.

That is, in the ninth embodiment, rather than using two PRD amplifiers in interleaving fashion, one PRD amplifier 2310e is used to reduce the area (by almost one half) that the bus amplifier occupies, at some sacrifice of data transfer rate (transfer speed) In this case also, since there is no need to precharge the bus, data can be transmitted at a higher speed than when bus precharging is performed for each bit. The reason is that since the CR of the portion to be charged to eliminate intersymbol interference in the amplifier is much smaller than the CR of the bus, the preparation time for intersymbol interference elimination is shorter than the bus precharge time.

FIG. 131 is a circuit diagram showing one example of the latch 2340e in the bus amplifier 2300e of FIG. 129.

As shown in FIG. 131, the latch 2340e comprises a first latch section, the data latching operation of which is controlled by the control signals φ1 and /φ1, and a second latch section, the data latching operation of which is controlled by the control signals φ2 and /φ2. Alternatively, the latch 2340e may be constructed only from one or the other of the latch sections.

FIG. 132 is a diagram showing an example of the signal waveform for operating the bus amplifier of FIG. 129, and FIG. 133 is a diagram showing an example of the operating waveform of the bus and the bus amplifier in the ninth embodiment of the signal transmission system according to the fifth mode of the present invention.

The ninth embodiment is suitable for applications where the high transfer rate as achieved by using two PRD amplifiers in interleaving fashion is not required but it is desirable to reduce the bus amplifier area. In the ninth embodiment also, higher-speed operation is possible than the prior art method that requires bus precharging for each bit, and furthermore, because of the provision of the complementary type auto-zero function, a much higher sensitivity is achieved than commonly used complementary bus amplifiers. Moreover, capacitors for PRD are inserted between the buses and the input nodes of the complementary amplifier main section so that the buses are isolated from the input nodes of the amplifier main section, and also since the potential difference between the buses and the input nodes of the amplifier is not specifically limited in the PRD method, the levels of the input nodes at the initiation of the amplifier operation can be set at such points that most enhance the sensitivity of the complementary amplifier. Accordingly, the sensitivity can be increased greatly even when the same complementary-type amplifier is used in the main section.

That is, the ninth embodiment reduces the area of the bus amplifier by not adopting the interleaving bus amplifier configuration of the eighth embodiment (by using only one PRD amplifier); this effect of reducing the bus amplifier area by using only one PRD amplifier can be extensively applied to various other bus amplifiers. Further, in the ninth embodiment also, complementary transfer gates are used as the switches, but other devices having switching functions can also be used; for example, the switches may be constructed using only NMOS transistors (NMOS transfer gates) or only PMOS transfer gates. In the ninth embodiment, the differential amplifier 2303e is configured as an NMOS gate-receiving type, but whether it should be configured as an NMOS or PMOS gate-receiving type depends on technology, etc., and whichever is suitable can be chosen. The differential amplifier 2303e used in the ninth embodiment is constructed so that its operation can be stopped by the enable signals en and /en when data transmission is not being performed.

FIG. 134 is a diagram showing one example of a bus amplifier in the signal transmission system as a 10th embodiment of the signal transmission system according to the fifth mode of the present invention. This embodiment concerns a pseudo-PRD-type bus amplifier. However, the block diagram of FIG. 134 is the same as that for the eighth embodiment shown in FIG. 123.

As shown in FIG. 134, the bus amplifier (the PRD-type complementary differential bus amplifier 2300f) comprises first and second PRD amplifiers 2310f and 2320f and a multiplexer (MUX) 2330f.

FIG. 135A is a circuit diagram showing one example of the PRD amplifier configuration in the bus amplifier of FIG. 134, FIG. 135B is a circuit diagram showing another example of the PRD amplifier configuration in the bus amplifier of FIG. 134, and FIG. 136 is a circuit diagram showing still another example of the PRD amplifier configuration in the bus amplifier of FIG. 134.

In the PRD amplifier 2310f (2320f) of the 10th embodiment, as can be seen from the configuration of the PRD functional block 2301f shown in FIG. 135A, the capacitors that are used to change the connection to the other bus when precharging the amplifier are omitted from the PRD functional block 2301 in the PRD amplifier 2310d of the eighth embodiment shown in FIG. 124. The precharge circuit 2302f and the differential amplifier 2303f are the same as those used in the eighth embodiment shown in FIG. 124.

In the PRD amplifier 2310f' (2320f') shown in FIG. 135B, the PRD function block 2301 f shown in FIG. 135A is modified to a PRD function block 2301f' where the switching operations of the capacitors C30a and C 30b are controlled by a logic circuit (OR and AND gates) which receives the control signals φ1, φ2, (/φ1, /φ2).

In the PRD amplifier 2310f" (2320f") shown in FIG. 136, as can be seen from the configuration of the PRD functional block 2301f" shown in FIG. 136, the transfer gates for controlling the connections between the buses (B, /B) and the capacitors (C30a, C30b) are omitted from the PRD amplifier shown in FIG. 135A. When the time constant of the bus is small, or when the time that data is output on the bus is shorter than the cycle time per bit, the bus level may change as previously shown in FIG. 106B; when the data bus has such a stable level, the transfer gates for controlling the connections between the buses (B, /B) and the capacitors (C30a, C30b) can be omitted as shown in FIG. 136.

The above PRD amplifier is constructed so that its operation can be stopped by the enable signal en when data is not being transmitted.

In the PRD method (pseudo-PRD method) employed in the 10th embodiment, unlike the real PRD method, a bit decision "0" or "1" is made on the current bit against the value one bit back. Therefore, the operating margin is small compared with the eighth embodiment. Instead, the area occupied by the bus amplifier (the PRD-type complementary differential bus amplifier 2300f) can be reduced. In the 10th embodiment also, complementary buses are used, as in the fifth embodiment, for example, and data transmission speed is increased by operating the two PRD amplifiers 2310f and 2320f in interleaving fashion.

FIG. 137 is a circuit diagram showing one example of the multiplexer 2330f in the bus amplifier shown in FIG. 134.

As shown in FIG. 137, the multiplexer (MUX) 2330f is made identical in configuration, for example, to the MUX 2330b of the sixth embodiment shown in FIG. 116, and is constructed to alternately select the outputs of the PRD amplifiers 2310f and 2320f for output, in accordance with the control signals φ1' and φ2' (/φ1' and /φ2').

Here, in the PRD method, to eliminate intersymbol interference the cycle for sampling an intersymbol interference component needs to be carried out alternately with the cycle for sampling the data proper; therefore, by operating a pair of PRD amplifiers in interleaving fashion, data transmission can be performed without interruption. Further, in the case of the first to fourth embodiments and the eighth and ninth embodiment according to the fifth mode of the present invention, the amplifier sensitivity is increased by also performing the amplifier auto-zero operation during the cycle for sampling (estimating.) an intersymbol interference component. In the 10th embodiment also, by using the two PRD amplifiers as a pair, a pseudo intersymbol interference component (corresponding to the data one bit back) is sampled, and the amplifier auto-zero cycle is carried out alternately with the cycle for sampling the: data proper.

FIG. 138 is a diagram showing an example of the signal waveform for operating the bus amplifier of FIG. 134, and FIG. 139 is a diagram showing an example of the operating waveform of the bus and the bus amplifier in the 10th embodiment of the signal transmission system according to the fifth mode of the present invention.

In the 10th embodiment also, by using the two PRD amplifiers 2310f and 2320f, the cycle for sampling a pseudo intersymbol interference component (corresponding to the data one bit back) and for precharging the amplifier is performed alternately with the cycle for sampling the data proper. Since the precharging is carried out in the background during the interleaving data read period, the precharge time does not affect the data transfer cycle. In the 10th embodiment, the two PRD amplifiers are paired and operated in interleaving fashion to achieve high-speed data transmission, but it may be configured so that only one PRD amplifier is used and interleaving is not performed, as in the configuration of the ninth embodiment. In that case, transfer rate decreases, but the area that the bus amplifier occupies can be further reduced.

Further, as shown in FIG. 138, the enable signal en2 (/en2) supplied to the second PRD amplifier 2320f is output at a timing delayed by one bit from the enable signal en1 (/en1) supplied to the first PRD amplifier 2310f, to prevent an unwanted signal from being output from the MUX 2330f.

FIG. 140 is a block diagram showing in schematic form one example of a semiconductor memory device as an 11th embodiment where the signal transmission system according to the fifth mode of the present invention is applied. In FIG. 140, reference numeral 2001 is a memory cell array, 2002 is a word decoder (word decoder array, 2100 is a sense amplifier (sense amplifier array), 2201 is a local data bus, 2202 is a global data bus, 2300g is a PRD-type data bus amplifier (PRD-type complementary global data bus amplifier), 2401 is a local data bus precharge circuit, 2402 is a global data bus precharge circuit, 2009 is a local data bus switch, 2010 is a write amplifier, 2011 is a sense amplifier driver, and 2012 is a column decoder (column decoder array).

As shown in FIG. 140, the semiconductor memory device (memory cell array section of a DRAM) of the 11th embodiment comprises a plurality of memory cell arrays 2001, word decoders 2002, sense amplifiers 2100, local data buses 2201, and global data buses 2202. The semiconductor memory device of the 11th embodiment further comprises PRD-type data bus amplifiers 2300 g for amplifying data on the global data buses 2202 when reading out data, local data bus precharge circuits 2401 for precharging the local data buses 2201, global data bus precharge circuits 2402 for precharging the global data buses 2202, local data bus switches 2009 for controlling the connections between the global data buses 2202 and the local data buses 2201, and write amplifiers 2010f or writing data to the memory cells. Furthermore, the semiconductor memory device of the 11th embodiment comprises column decoders 2012 for selecting column transfer gates, as will be described later, and sense amplifier drivers 2011 for driving the sense amplifiers 2100. Here, the local data bus switches 2009 are each constructed, for example, from an NMOS or PMOS complementary transfer gate.

FIG. 141 is a diagram showing one example of the bus amplifier in the semiconductor memory device of FIG. 140. Here, the local data bus 2201 and global data bus 2202 in FIG. 140 correspond to the complementary buses 2200' (B, /B) in FIG. 141.

As shown in FIG. 141, the bus amplifier (the PRD-type data bus amplifier 2300g)of the 11th embodiment is configured as a complementary-type differential bus amplifier, and comprises first and second PRD amplifiers 2310g and 2320g and a multiplexer (MUX) 2330g.

FIG. 142 is a circuit diagram showing one example of the PRD amplifier configuration in the bus amplifier of FIG. 141, and FIG. 143 is a circuit diagram showing one example of the multiplexer in the bus amplifier of FIG. 141.

As is apparent from the comparison between FIG. 142 and FIG. 124 concerning the eighth embodiment previously described, the PRD amplifiers (the first and second PRD amplifiers 2310g and 2320g)in the 11th embodiment are fundamentally the same in configuration as the PRD amplifiers in the eighth embodiment, except that the sources of the PMOS transistors (P-channel MOS transistors) controlled by the enable signal en are held at a prescribed potential Vpr', not a high-level supply voltage Vcc (Vii).

Also, as is apparent from the comparison between FIG. 143 and FIG. 126 concerning the eighth embodiment previously described, the MUX 2330g in the 11th embodiment is the same in configuration as the MUX 2330d in the eighth embodiment, and is constructed to select either the output signal D of the first PRD amplifier 2310g or the output signal E of the second PRD amplifier 2320g in accordance with the control signals φ1' (/φ1') and φ2' (/φ2') and to output the selected signal as the output signal C of the bus amplifier (the PRD-type complementary differential bus amplifier 2300 g). Here, the control signals φ1' (/φ1') and φ2' (/φ2') are substantially the same as the control signals φ1 (/φ1) and φ2 (/φ2), though the timing is slightly different.

FIG. 144 is a circuit diagram showing one example of the sense amplifier in the semiconductor memory device of FIG. 140.

The sense amplifier 2100 used in the semiconductor memory device of the 11th embodiment is, for example, the same as the sense amplifier 2003 used in the prior art semiconductor memory device shown in FIG. 74, and comprises a latch-type sense amplifier (complementary PMOS/NMOS latch-type sense amplifier stage) 2101, a column transfer gate 2101 constructed from an NMOS transistor for outputting the data amplified by the sense amplifier onto the local data bus, a bit line short/precharge circuit 2103 for shorting and precharging the bit lines, and a bit line transfer gate 2104 constructed from NMOS transistors to support a shared sense amplifier method. Here, reference signs BL and /BL designate the bit lines, and CL denotes the column selection line.

The column transfer gate 2102 is selected by the column decoder 2012 in FIG. 140, and data from the selected sense amplifier 2100 is output on the data buses (2001, 2202: 2200'). That is, the basic configuration, excluding the PRD-type data bus amplifier 2300g, is the same as that of an ordinary DRAM, and though not specifically shown here, it is apparent that this method can be applied to similar DRAMs. Examples include a DRAM where the data buses (2200') are not specifically separated between the local data bus 2201 and global data bus 2202.

FIG. 145 is a diagram showing an example of the operating waveform of the bus and the bus amplifier in the semiconductor memory device of FIG. 140. An example of a read operation with burst length 8 (in blocks of 8 bits: CL0 to CL7) is shown here.

As shown in FIG. 145, by sequentially outputting the column select signals CL0 to CL7, read data is obtained as an output of the MUX 2330g (the output C of the data bus amplifier) with the PRD amplifiers 2310g and 2320g being operated in interleaving fashion by the control signals φ1 and φ2 (φ1' and φ2').

In the 11th embodiment, when there are no data on the data buses bus and /bus, the data buses are precharged, but it will be appreciated that a configuration where bus precharging is not performed under any circumstances is also possible, as in the first embodiment; in that case the local data bus short/precharge switch (2009), global data bus short/precharge switch, etc. can be eliminated. It is also possible to perform precharge selectively, for example, when the next read operation is expected to begin immediately, precharge is not performed, or precharge is performed by supplying a bus precharge command from the outside, or precharge is performed only before a write operation to ensure smooth operation of the write amplifier 2100.

Furthermore, since the bus amplifier 2300g (the PRD amplifiers 2310g and 2320g) of the 11th embodiment has an auto-zero function, data can be detected and amplified even when the voltage change appearing on the data line is extremely small. Moreover, since capacitors are inserted between the buses and the inputs of the current-mirror amplifier (2303g) in the bus amplifier, the inputs of the amplifier can be set at such levels that most enhance the sensitivity of the current-mirror amplifier. This makes it possible to amplify even smaller voltage changes. Here, if the buses were directly connected to the inputs, the inputs would always be held at the bus potential, and the amplifier could not always be operated in a range where the current-mirror amplifier has a high sensitivity. In the 11th embodiment, substantially the same bus amplifier as used in the eighth embodiment is used as the data bus amplifier (2300g), but instead, the bus and the bus amplifier configuration described in any of the previously described embodiments (including the single-ended bus case) may be used for the 11th embodiment.

FIG. 146 is a block diagram showing in schematic form one example of a semiconductor memory device as a 12th embodiment where the signal transmission system according to the fifth mode of the present invention is applied.

The semiconductor memory device of the 12th embodiment shown in FIG. 146 is fundamentally the same as the semiconductor memory device of the 11th embodiment shown in FIG. 140, the only difference being in the configuration of the column decoder (column decoder array) 2120. The column decoder 2012 in the earlier described semiconductor memory device, just as in ordinary DRAMs, is configured not to select column transfer gates in overlapping fashion.

More specifically, on one bus, one column transfer gate is selected and turned on, and data from the sense amplifier 2100 is output on the local data bus 2201 and global data bus 2202 and amplified by the data bus amplifier 2300g. After that, bus precharge is performed, but before that time, all the column transfer gates must be closed. The reason is that since precharging the bus (2202) requires a finite time, the data in the sense amplifier 2100 will be destroyed if the column transfer gates are not closed during the precharge period.

However, when the PRD method is employed, there is no need to provide the time during which all the column transfer gates are closed, since the precharge period itself is eliminated. Furthermore, the PRD method by its nature allows the overlapping of the previous data into the next data; therefore, before the transfer gate in the previous cycle is closed, the next transfer gate can be opened to output the next data on the data bus, not requiring that the column transfer gate for one bit back be closed. In the 12th embodiment, the above advantage is fully utilized to construct the column decoder 2120.

FIG. 147 is a block diagram showing a configurational example of the column decoder system in the semiconductor memory device of FIG. 146, and FIG. 148 is a diagram showing an example of the operating waveform of the bus and the bus amplifier in the semiconductor memory device of FIG. 146.

In FIG. 147, reference numerals 2120a and 2120b are column decoders (A and B) for two groups of columns (even-numbered and odd-numbered columns), 2121a and 2121b are column precoders (A and B) for the two groups of columns, and 2122a and 2122b are column selection line control pulse generators (CL pulse generators A and B) for the two groups of columns. Reference numeral 2123 indicates a clock generator (shaper).

As shown in FIG. 147, the column decoder system (the column decoder array 2120) of the 12th embodiment is driven by two clock signals (CLK and /CLK), and the first plurality of column decoders A (2120a) driven by the positive logic clock CLK and the second plurality of column decoders B (2120b) driven by the inverted logic clock /CLK, for example, are operated in interleaving fashion by the column precoders 2121a and 2121b to drive the column transfer gates at high speed while allowing a certain degree of overlapping from one transfer gate to the next. Here, the column precoder 2121a is supplied with a column address signal and clock CLK for the even-numbered columns, while the column precoder 2121b is supplied with a column address signal and clock /CLK for the odd-numbered columns. In the example shown in FIG. 147, the complementary clocks CLK and /CLK are supplied directly from the outside; however, if the clock generator 2123 using a PLL or the like is provided as shown by dotted lines, for example, higher-speed operation can be achieved by internally generating much more rigid clocks CLK and /CLK from clock CLK'.

By allowing the selection of column transfer gates in overlapping fashion as described above, it becomes possible to switch from one column transfer gate to the next at shorter intervals of time, as a result of which much higher-speed data transmission can be realized than when the precharge time is simply eliminated. Furthermore, if the system is not specifically designed to allow overlapping selection of column transfer gates, since the PRD method by its nature allows overlapping without any problem, the system can be designed with a larger timing margin for the column transfer select signal (CL).

As shown in FIG. 148, by sequentially outputting the column select signals CL0 to CL7, read data is obtained as an output of the MUX 2330g (the output C of the data bus amplifier) with the PRD amplifiers 2310g and 2320g being driven in interleaving fashion by the control signals $\phi 1$ and $\phi 2$ ($\phi 1'$ and $\phi 2'$).

Here, in the 12th embodiment, if the time that each column transfer gate is opened is set longer, the potential appearing on the data buses (2201 and 2202) can be increased to increase the operating margin. If the time that the column transfer gate is opened is set approximately equal to that in the foregoing 11th embodiment, higher-speed data transmission can be further increased.

FIG. 149 is a block diagram showing in schematic form one example of a semiconductor memory device as a 13th embodiment where the signal transmission system according to the fifth mode of the present invention is applied.

The semiconductor memory device of the 13th embodiment shown in FIG. 149 is substantially the same in configuration to the semiconductor memory device of the 12th embodiment shown in FIG. 146, except that, in the 13th embodiment, a PMOS (P-channel MOS transistor) load 2413 is provided for the global data bus (2202). More specifically, a PMOS transistor pulled to the high voltage supply (Vcc) side is provided for each of the complementary buses bus and /bus (the global data bus 2202). Here, a prescribed load control signal V1L is applied to the gate of each PMOS transistor so that the load is turned on, for example, only when the data bus is being used.

The 13th embodiment deals with the case where if nothing is done, the entire bus potential (for both of the complementary buses) falls toward the low level side, for example, because of the characteristic of the NMOS transistor of the column transfer gate, or because the drive capability of the sense amplifier 2100 into the high level side is low. That is, in the case of a conventional bus system, since precharge is performed for every bit, if the entire bus potential falls toward the low level side, the potential is immediately returned to the precharge level (intermediate level); in the PRD method, on the other hand, since bus precharge is not performed for every bit, the entire bus potential tends to drop, for example, into the low level side. In the PRD method, it is true that data can be reconstructed even if the bus is held fixed to the low level, for example, but the operating margin is reduced though slightly.

FIG. 150 is a diagram for explaining how the data bus waveform changes depending on the presence or absence of the load in the semiconductor memory device of FIG. 149. The uppermost part of the figure shows the waveform of the data bus (2202) when the load is not provided, and the other part shows the waveform of the data bus when the load 2413 is provided.

As can be seen from FIG. 150, when the load is not provided, the entire potential of the bus (the global data bus 2202) falls toward the low level side, but when the load 2413 is provided, the entire level of the bus (the global data bus 2202) is maintained at the intermediate level.

Here, the load 2413 is, for example, about the same size as the PMOS transistor (P-channel MOS transistor) used in the latch (2101) in the sense amplifier 2100 (see FIG. 144), and therefore involves a negligible increase in area. In this way, the provision of the load 2413 serves to increase the operating margin of the bus amplifier 2300g (2300).

FIGS. 151A to 151I are diagram showing various examples of the load in the semiconductor memory device of FIG. 149. As can be seen, not only the PMOS type but various other configurations such as shown in FIG. 151A to 151I can be employed for the load 2413.

Figure 151A:
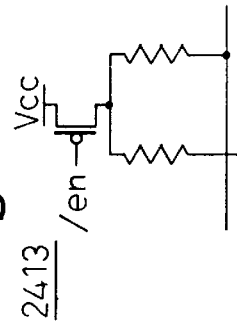
Figure 151B:
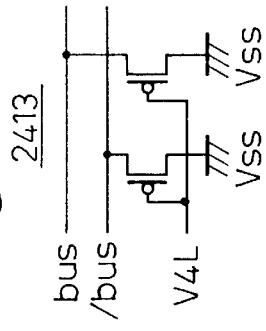
Figure 151C:
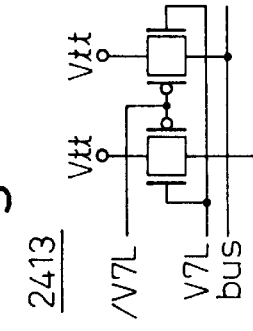

FIG. 151A concerns a configuration in which as the load 2413, NMOS transistors pulled to the high-level voltage supply (Vcc) side are provided for the complementary buses bus and /bus (the global data bus 2202), and a prescribed load voltage (high-level voltage) V2L is applied to the gate of each NMOS transistor. FIG. 151B shows a configuration in which as the load 2413, resistors connected to the high-level voltage supply are provided for the buses bus and /bus, while FIG. 151C illustrates a configuration in which a PMOS transistor whose gate is supplied with the enable signal /en is inserted between the resistors shown in FIG. 151B and the high-level voltage supply.

More specifically, in the configuration of FIG. 151A, the NMOS transistors pulled to the high-level voltage supply (Vcc) side are provided as the load 2413 for the complementary buses bus and /bus (the global data bus 2202), and the prescribed load control signal (enable signal) V2L is applied to the gate of each NMOS transistor so that the load is turned on (connected) only when the data bus is being used. In -the configuration shown in FIG. 151B, the resistors connected to the high-level voltage supply are provided as the load 2413 for the buses bus and /bus, while in the configuration of FIG. 151C, the PMOS transistor whose gate is supplied with the enable signal /en is inserted between the resistors shown in FIG. 151B and the high-level voltage supply. That is, when PMOS or NMOS transistors are used as the load 2413, the load can be configured so that it is turned on only when the data bus is being used; on the other hand, when resistors are used, a transistor (PMOS in the illustrated example) whose switching operation is controlled by a control signal should be provided as shown in FIG. 151C.

Figure 151D:
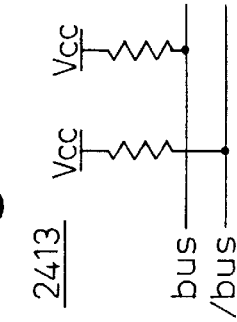
Figure 151E:
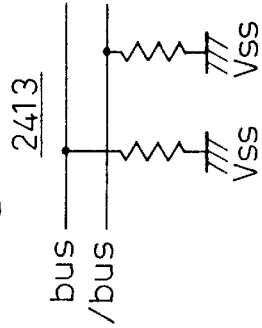
Figure 151F:
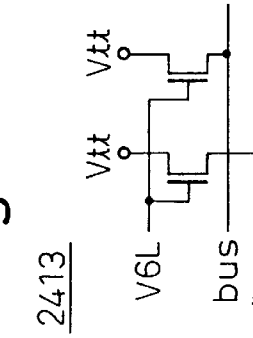

FIGS. 151D to 151F each deal with the case where the entire bus potential (for both of the complementary buses) rises toward the high level side if nothing is done. In FIG. 151D, NMOS transistors pulled to the low-level voltage supply (Vss) side are provided as the load 2413 for the complementary buses bus and /bus, and a prescribed load control signal (enable signal) V3L is applied to the gate of each NMOS transistor so that the load is turned on (connected) only when the data bus is used. In FIG. 151E, resistors connected to the low-level voltage supply are provided as the load 2413 for the buses bus and /bus, while in FIG. 151F, the NMOS transistors in FIG. 151D are replaced by PMOS transistors. Here, a prescribed load control signal (enable signal) V4L is applied to the gate of each PMOS gate.

Figure 151G:
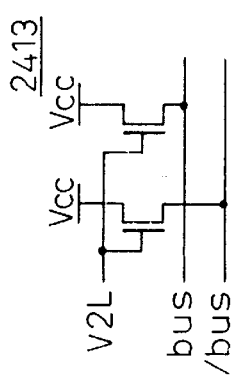
Figure 151H:
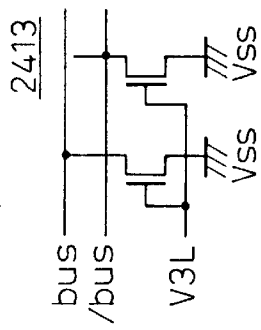
Figure 151I:
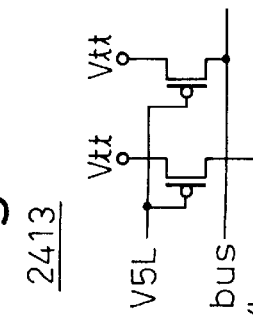

FIGS. 151G to 151I show examples in which the load is pulled to a potential (Vtt) other than the high-level voltage supply and low-level voltage supply. In FIG. 151G, PMOS transistors pulled to the prescribed potential (Vtt) are provided as the load 2413 for the complementary buses bus and /bus; in FIG. 151H, NMOS transistors are provided; and in FIG. 151I, transfer gates constructed from PMOS and NMOS transistors are provided. Here, V5L to V7L (/V7L) designate control signals (enable signals) by which the load is turned on (connected) only when the data bus is being used.

FIGS. 152 to 154 show examples of the mounting positions of the load in the semiconductor memory device of the 13th embodiment where the signal transmission system according to the fifth mode of the present invention is applied.

Besides the configuration shown in FIG. 149 where the load (2413) is provided only one for each global data bus 2202, various other configurations are possible; that is, a plurality of such loads may be provided spaced apart along the global data bus 2202 (see FIG. 152), or may be provided on the local data bus 2201 side (see FIG. 153), or the loads may be provided for both the global data bus 2202 and the local data bus 2201 (see FIG. 154).

FIG. 155 is a block diagram showing in schematic form one example of a semiconductor memory device as a 14th embodiment where the signal transmission system according to the fifth mode of the present invention is applied. The 14th embodiment is fundamentally the same as the foregoing 13th embodiment, except that the load 2413 is formed from a pair of PMOS transistors cross-coupled with respect to the buses.

When the load 2413 is formed from a PMOS transistor pair cross-coupled with respect to the complementary buses bus and /bus, as shown in FIG. 155, in the complementary buses the amount of movement in the direction of high level becomes greater than when a simple load is used as in the 13th embodiment. Further, in the case of the 13th embodiment (FIG. 149), the bus potential, whether a high level or a low level, increases in the direction of high potential (high level) at equal speed, but in the case of the 14th embodiment, the amount of movement in the direction of high level is reduced for the data bus moving in the direction of low potential (low level). More specifically, the 14th embodiment not only prevents the data bus (2202) from being held fixed to a certain potential, but also provides an amplification effect to supplement the bus drive capability of the sense amplifier (2100). Accordingly, the operating margin can be further increased.

FIG. 156 is a diagram showing a comparison of the data bus waveforms when the load is provided according to the 13th and 14th embodiments where the signal transmission system according to the fifth mode of the present invention is applied.

As is apparent from the comparison between the waveform of the 13th embodiment shown in the uppermost part of FIG. 156 and the waveform of the 14th embodiment shown in the other part, the 14th embodiment can achieve a further increase in the operating margin of the bus amplifier (the PRD-type data bus amplifier 2300).

In the example shown in FIG. 155, it should be noted that an additional PMOS transistor whose gate is supplied with an enable signal /en is provided to turn off the load 2413 when the data bus is not being used.

FIG. 157 is a diagram showing a modified example of the load applicable for use in the semiconductor memory device of FIG. 155.

If, in the 14th embodiment, the data bus tends to shift toward the high potential (high level) side, the PMOS cross-coupled pair forming the load in FIG. 155 should be replaced by an NMOS cross-coupled pair, and the NMOS cross-coupled pair should be pulled to the low potential (low level) side, as shown in FIG. 157. It should also be noted in the modified example of FIG. 157 that an additional NMOS transistor whose gate is supplied with the enable signal en is provided so that the load 2413 is turned off (shut off) when the data bus is not being used.

As for the mounting position of the load 2413, in the 14th embodiment also, only one such load may be provided for the global data bus 2202, or a plurality of such loads may be provided spaced apart along the global data bus 2202; alternatively, the load or loads may be provided only on the local data bus 2201 side or for both the global data bus 2202 and the local data bus 2201, as previously described with reference to FIGS. 152 to 154.

FIG. 158 is a block diagram showing in schematic form one example of a semiconductor memory device as a 15th embodiment where the signal transmission system according to the fifth mode of the present invention is applied. The semiconductor memory device of the 15th embodiment is fundamentally the same as the 13th embodiment shown in FIG. 149 or the 14th embodiment shown in FIG. 153, the only difference being in the configuration of the sense amplifier 2100. More specifically, in the 15th embodiment, the sense amplifier 2100 is configured as a direct sense amplifier (gate-receiving sense amplifier) which directly amplifies the levels of the bit lines and outputs them on the read data buses (RDB, /RDB).

FIG. 159 is a circuit diagram showing one example of the sense amplifier applicable for use in the semiconductor memory device of FIG. 158. In FIG. 159, reference numeral 2103 is a bit line precharge circuit, 2104 is a bit line transfer gate, 2105 is a read control circuit (sense amplifier stage), 2106 is a write control circuit, and 2107 is a latch circuit. Further, reference sign BTE is a bit line transfer enable signal, RDB and /RDB are read data buses, WDB and /WDB are write data buses, WE is a write enable signal, PLE and NLE are PMOS and NMOS latch enable signals, respectively, Vpr is a bit line precharge level, and PRE is a bit line precharge signal.

In the sense amplifier shown in FIG. 159, unlike the conventional latch type (for example, the one shown in FIG. 144), the read control circuit 2105 receives read data by the gates and outputs the data directly on the read data buses RDB and /RDB. With this arrangement, data access time can be further reduced. In the sense that data access time is reduced, there is no difference from the conventional gate-receiving sense type, but what should be noted here is that a further reduction in access time can be achieved by using the gate-receiving sense type sense amplifier stage (the read control circuit 2105), not the conventional latch-type sense amplifier (for example, the one shown in FIG. 144), in combination with the PRD-type bus.

In a bus system employing the PRD method, when the potentials of the complementary buses are completely at a high level "H" and a low level "L", if the data in the sense amplifier and the data on the buses are opposite, in the worst case there occurs a danger that the data in the sense amplifier may be inverted (destroyed) if the time that the column transfer gate is opened is longer than a certain time. This places a limit on the time that the column transfer gate can be opened when the conventional latch-type sense amplifier is used. It is of course possible to avoid this problem in the latch type by optimizing the design, but if the gate-receiving sense type sense amplifier (direct sense amplifier) is used, as in the 15th embodiment, since the data in the sense amplifier is relatively unaffected by the potentials of the data buses (RDB, /RDB), not only higher speed can be achieved, but the operating and design margins can dramatically be increased. For an example of the direct sense amplifier, reference is made, for example, to G. Kitsukawa et al., "A 23-ns 1-Mb BiCMOS DRAM," IEEE Journal of Solid-State Circuits, Vol. 25, No. 5, October 1990.

FIG. 160 is a waveform diagram for explaining one example of the operation of the semiconductor memory device of FIG. 158.

The waveform diagram of FIG. 160 concerns a read operation with burst length 8 (in blocks of 8 bits: CL0 to CL7), showing the case where the precharge level (Vpr) of the bus (RDB, /RDB) is set to a high level "H" (Vcc). By raising the bus precharge level as shown, the bus driving capability of the NMOS gate-receiving sense amplifier can be increased. In this case, it is preferable to use a smaller load.

FIG. 161 is a waveform diagram for explaining another example of the operation of the semiconductor memory device of FIG. 158.

The waveform diagram of FIG. 161 concerns a read operation with burst length 16 (in blocks of 16 bits: CL6 to CL7), showing the case where the bus precharge level is set at an intermediate level between the high level "H" and low level "H" but closer to the high level. In this case, the load capability is raised compared to the case of FIG. 160.

In the 15th embodiment, an NMOS gate-receiving sense amplifier is used, but instead, a PMOS gate-receiving sense amplifier may be used.

FIG. 162 is a circuit diagram showing the configuration of an essential portion of a semiconductor memory device as a 16th embodiment where the signal transmission system according to the fifth mode of the present invention is applied.

As shown in FIG. 162, in the 16th embodiment the NMOS gate-receiving sense amplifier stage (the read control circuit 2105) of the 15th embodiment shown in FIG. 159 is replaced by a CMOS gate-receiving sense amplifier stage (read control circuit 2105'). Otherwise, the configuration is the same as that of the 15th embodiment. When using the direct sense amplifier in combination with the PRD method, the CMOS configuration is preferable for the read control circuit 2105' from the viewpoint of operation, though the required circuit area increased.

FIG. 163 is a block diagram showing in schematic form one example of a semiconductor memory device as a 17th embodiment where the signal transmission system according to the fifth mode of the present invention is applied.

The 17th embodiment is fundamentally the same in configuration as the previously described 14th embodiment of FIG. 155, except that, unlike the 14th embodiment, the buses are not separated between the local data bus 2201 and global data bus 2202, and the write amplifier 2010 and bus amplifier (PRD-type data bus amplifier) 2300 are provided for each data bus 2200. Further, the load 2413 and data bus precharge circuit 2402 also are provided for each data bus 2200.

More specifically, each PRD-type data bus amplifier 2300 directly receives and amplifies data transferred from column transfer gates. The PRD-type data bus amplifier 2300 used here is the same as that used in the 14th embodiment.

FIG. 164 is a diagram showing an example of the operating waveform of the bus and the bus amplifier in the semiconductor memory device of FIG. 163, and FIG. 165 is a diagram showing another example of the operating waveform of the bus and the bus amplifier in the semiconductor memory device of FIG. 163.

As shown in FIG. 164, in the 17th embodiment, since the data bus 2200 is not formed as a long bus such as the local and global data buses (2201 and 2202), that is, since the length of the data bus 2200 is made short, the bus amplitude can be set larger and the operating margin can thus be increased. This means that if the column selection cycle time is reduced, and the bus amplitude level is set approximately equal to that in the 14th embodiment, as shown in FIG. 165, an even higher transfer rate can be achieved.

This effect of the 17th embodiment is not obtained because the buses which were separated between the local data bus (2201) and global data bus (2202) are combined into one data bus 2200. Rather, it will be easily recognized that even in the case of data buses organized in a hierarchical manner, for example, a similar effect can be obtained if the total bus length is reduced to reduce the time constant of the bus.

Generally, in a semiconductor memory device, whether it is a PRD type or other type, data from sense amplifiers are output on the local data bus and global data bus (in some configurations, there are no local data buses) and are fed into the data bus amplifier located at the end of the memory array (memory cell array) for amplification. If the unit size of the memory array is large, the difference in the sense amplifier to bus amplifier distance becomes pronounced depending on the sense amplifier location. As a result, a difference occurs in the time that elapses from the moment when the column transfer gate is opened until the data arrives at the bus amplifier. In particular, in high-speed operation where the difference in the time required for data to arrive at the data bus amplifier is large relative to the data transfer rate, in the case of the PRD method there is a danger that an erroneous operation may occur since the bus amplifier is operated by the clock. Therefore, if the data skew displacement due to the sense amplifier location can be eliminated, the high operation frequency achieved by the PRD method can be further increased. In view of this, the 18th embodiment described hereinafter concerns the configuration and operation of a memory array (semiconductor memory device) that compensates for the data skew displacement.

FIG. 166 is a block diagram showing in schematic form the configuration of an essential portion of a semiconductor memory device as the 18th embodiment where the signal transmission system according to the fifth mode of the present invention is applied. In FIG. 166, reference numeral 2002a is a main word decoder, 2002b is a sub word decoder, 2100 is a sense amplifier array, 2201 is a local data bus pair, 2202 is a global data bus pair, and 2300 is a data bus amplifier (PRD-type data bus amplifier).

The semiconductor memory device shown in FIG. 166 is a portion of a 32-Mbit memory cell array (a 16-Mbit (16M) block which forms one half of the memory cell array is shown). The 16M block is divided into eight smaller blocks (2M block each) in the row direction (X direction: Vertical direction). Here, each 2M block includes memory cell arrays 2001, sub word decoder arrays 2002b, sense amplifier arrays 2100, local data buses 2201, global data buses 2202, etc., and a bus amplifier 2300 is provided for each global data bus 2202. Each data bus (2201, 2202) is a PRD-type bus, and the data bus amplifier 2300 also is a PRD-type bus amplifier.

FIG. 167 is a diagram showing one example of the bus amplifier in the semiconductor memory device of FIG. 166, FIG. 168 is a circuit diagram showing one example of the PRD amplifier configuration in the bus amplifier of FIG. 167, and FIG. 169 is a circuit diagram showing one example of a multiplexer in the bus amplifier of FIG. 167. Here, FIGS. 167 to 169 correspond to FIGS. 141 to 143 previously shown in connection with the 11th embodiment.

FIG. 170 is a block diagram showing one configurational example of a column decoder system in the semiconductor memory device of the 18th embodiment where the signal transmission system according to the fifth mode of the present invention is applied.

In FIG. 170, reference numerals 2120a and 2120b are column decoders (A and B) for two groups of columns (even-numbered and odd-numbered columns), 2121a and 2121b are column precoders (A and B) for the two groups of columns, and 2122a, and 2122b' are column selection line control pulse generating circuits with a delay adjusting function (CL pulse generating circuits A and B with a delay adjusting function) for the two groups of columns. Reference numeral 2123 indicates a clock generator (shaper).

As shown in FIG. 170, the column decoder system (the column decoder array 2120) of the 18th embodiment is driven by two clock signals (CLK and /CLK), and the first plurality of column decoders A (2120a) driven by the positive logic clock CLK and the second plurality of column decoders B (2120b) driven by the inverted logic clock /CLK, for example, are operated in interleaving fashion by the column precoders 2121a and 2121b to drive the column transfer gates at high speed while allowing a: certain degree of overlapping from one column transfer gate to the next. Here, the column precoder 2121a is supplied with a column address signal and clock CLK for the even-numbered columns, while the column precoder 2121b is supplied with a column address signal and clock /CLK for the odd-numbered columns.

More specifically, a column address decoded signal and a column pulse signal are supplied to the column decoders 2102a and 2120b, and after an address is established, a column pulse (column selection line control pulse CL) is supplied, in synchronism with which the column transfer gate operates. On the other hand, the clock (CLK) and a RAS-type row address (predecoded address signal) are input to the CL pulse generating circuits with a delay adjusting function, 2122a' and 2122b'. The predecoded address signal is a row address signal (3 bits) for specifying one of the eight blocks. In the illustrated example, a 3-bit predecoded signal is input as the row address signal, but the row address signal is not limited to this particular type; the only requirement is to input a RAS-type address signal that can select a block.

In the example shown in FIG. 170, the complementary clocks CLK and /CLK are supplied directly from the outside; however, if the clock generator 2123 using a PLL or the like is provided as shown by dotted lines, for example, higher-speed operation can be achieved by internally generating much more rigid clocks CLK and /CLK from clock CLK'.

FIG. 171 is a diagram showing one example of the CL pulse generating circuit (CL pulse generating circuits with a delay adjusting function, 2122a' and 2122b') in FIG. 170.

As shown in FIG. 171, the CL pulse generating circuit with a delay adjusting function, 2122a' (2122b'), of the 18th embodiment is constructed so that the capacitance of the capacitor provided at the source side of each NMOS is varied according to the RAS predecoded address (C0>C1> . . . >C7), to generate a column pulse (column selection line control pulse CL) such that the pulse rises earlier as the distance from the data bus amplifier (2300) increases. That is, the CL pulse generating circuit 2122a' generates the column pulse CL so that a column transfer gate located farther away from the data bus amplifier is activated earlier, in other words, so that the timing for transferring data from the sense amplifier 2100 onto the data bus (2201, 2202) is advanced as the distance from the array 2001 to the data bus amplifier 2300 increases.

Here, when the CL pulse generating circuit is constituted to generate the CL pulse at the same timing regardless the distance from the CL pulse generating circuit and the data bus amplifier, the control signals ($\phi 1$, $\phi 2$) used in the data bus amplifier may be generated at earlier timing for sense amplifiers located nearer to the column-selection signal generating circuit and the data bus amplifier and at later timing for sense amplifiers located farther from the column-selection signal generating circuit and the data bus amplifier, and the control signals may be determined at an appropriate timing where the arrived data are effective (for example, later portion of the bit time).

FIG. 172 is a diagram for explaining the operation of the CL pulse generating circuit (CL pulse generating circuit with a delay adjusting function) shown in FIG. 171.

Data (read data) travels along the local data bus 2201 and global data bus 2202 and arrives at the data bus amplifier 2300 (2300g). The time required for the data read from an array (memory cell array 2001) to arrive at the data bus amplifier 2300 increases as the distance from the array to the data bus amplifier increases.

Therefore, the CL pulse generating circuit 2122a' (2122b') generates such a column pulse CL that rises earlier for memory arrays located farther away from the data bus amplifier 2300, as shown in FIG. 172, thereby ensuring that data read from any array arrives at the same time at the data bus amplifier 2300. More specifically, in the CL pulse generating circuits with a delay adjusting function, 2122a' and 2122b', the pulse rise timing is controlled in such a manner as to offset the sum of the delay through the data bus and the delay through the signal line driving the column transfer gate. By so doing, data can be made to always arrive at the same timing at the data bus amplifier 2300 and thus a constant data decision period can always be maintained. Since the PRD-type bus amplifier is operated by the clock, an erroneous operation of the amplifier in high-speed operation can be prevented by ensuring that data always arrive at the same timing. With this method, the PRD-type memory bus can be made to operate at high speed at a higher level.

In the above example, the 32M block is divided into eight blocks in the row direction, but of course, the number of blocks need not necessarily be restricted to this particular number, nor is the memory capacity limited to any particular capacity. Furthermore, as an alternative method, the rise timing of the column pulse signal (CL) may be moved up according to the distance of the row block from the data bus amplifier, or may be delayed as the block to data bus amplifier distance decreases. In the above example, each local data bus is set to such a length that does not cause a skew displacement on the local data bus.

FIG. 173 is a diagram showing another example of the bus amplifier in the semiconductor memory device of FIG. 166, FIG. 174 is a circuit diagram showing one example of the PRD amplifier configuration in the bus amplifier of FIG. 173, and FIG. 175 is a circuit diagram showing one example of the latch in the bus amplifier of FIG. 173. Here, FIGS. 173 to 1757 correspond to FIGS. 129 to 131 previously shown in connection with the ninth embodiment.

When the configuration of the previously described ninth embodiment is applied, higher-speed data transmission than the prior art semiconductor memory device can also be achieved, though the transfer rate is lower than the case of the bus amplifier shown in FIGS. 167 to 169 above. On the other hand, when the configuration of the bus amplifier (the PRD-type data bus amplifier 2300e) shown in FIGS. 173 to 175 is applied, the advantage is that the circuit area can be reduced compared with the bus amplifier (2300g) shown in FIGS. 167 to 169.

FIG. 176 is a block diagram showing another configurational example of the column decoder system in the semiconductor memory device of the 18th embodiment where the signal transmission system according to the fifth mode of the present invention is applied.

As is apparent from the comparison between FIGS. 176 and 170, the column decoder system shown in FIG. 176 does not involve interleaving, but the column decoder 2120 is operated by the clock (the positive logic clock CLK). As already mentioned in the explanation of FIG. 170, the clock generator using a PLL or the like, as indicated by dotted lines in FIG. 176, may be provided, in which case an even more rigid clock CLK can be internally generated from clock CLK'.

FIG. 177 is a block diagram showing in schematic form the configuration of an essential portion of a semiconductor memory device as a 19th embodiment where the signal transmission system according to the fifth mode of the present invention is applied, and FIG. 178 is a diagram showing one example of the CL pulse generating circuit applicable for use in the semiconductor memory device of FIG. 177. Here, FIGS. 177 and 178 correspond to FIGS. 166 and 171 illustrating the 18th embodiment described above.

As shown in FIG. 177, in the 19th embodiment the 16M memory cell array (memory array) block is divided into four smaller blocks in the row direction (X direction: Vertical direction). Otherwise, the configuration is the same as that of the 18th embodiment.

However, as shown in FIG. 178, the delay values in the CL pulse generating circuit (CL pulse generating circuits with a delay adjusting function, 2122a' and 2122b') are controlled, not by varying the capacitance of the capacitor provided at the source side of each NMOS transistor, but by the number of cascaded delay Ataqes (NAND gate/inverter delay units) which are arranged to generate a column pulse (column selection line control pulse CL) such that the pulse rises earlier for memory arrays located farther away from the data bus amplifier (2300). Needless to say, the delay stage configuration can be modified in various ways.

Though each embodiment of the fifth mode of the present invention has been described as applied to a semiconductor memory device (DRAM), it will be appreciated that the application of the signal transmission system of the present invention is not limited to a DRAM.

Many different embodiments of the present invention may be constructed without departing from the spirit and scope of the present invention, and it should be understood that the present invention is not limited to the specific embodiments described in this specification, except as defined in the appended claims.

What is claimed is:

1. A receiver circuit, for use in a signal transmission system, for receiving a signal transmitted on a signal transmission line, said receiver circuit comprising a partial-response detection unit for detecting a partial response that said signal shows; and a signal logic decision unit for making a logic decision on said signal on the basis of said partial response.

2. A receiver circuit as claimed in claim 1, wherein said partial-response detection unit comprises an intersymbol interference estimation unit for estimating intersymbol interference based on a previously received signal and a subtracting unit for subtracting said estimated intersymbol interference from a signal in effect currently received.

3. A receiver circuit as claimed in claim 2, wherein said intersymbol interference estimation unit is constructed to obtain a sum of linear weights of previous decision values.

4. A receiver circuit as claimed in claim 3, wherein said intersymbol interference estimation unit comprises a shift register for holding previous bit information and a weighting unit for weighting data held in said shift register.

5. A receiver circuit as claimed in claim 4, wherein said weighting unit is constructed from a plurality of resistors.

6. A receiver circuit as claimed in claim 4, wherein said weighting unit is constructed from a plurality of capacitors and switches.

7. A receiver circuit as claimed in claim 2, wherein said intersymbol interference estimation unit is constructed to obtain nonlinear weights of previous decision values.

8. A receiver circuit as claimed in claim 7, wherein said intersymbol interference estimation unit comprises a shift register for holding previous bit information and a memory unit for storing estimates corresponding to data held in said shift register.

9. A receiver circuit as claimed in claim 6, wherein said intersymbol interference estimation unit comprises an accumulating unit for accumulating an analog value of said previously received signal and an intersymbol interference generating unit for generating intersymbol interference from said analog value.

10. A receiver circuit as claimed in claim 9, wherein said intersymbol interference estimation unit is constructed to take a linear weighted sum of an analog value of a signal received one clock back and a fixed reference analog value.

11. A receiver circuit as claimed in claim 10, wherein said intersymbol interference estimation unit is provided with a plurality of switch units and capacitor units.

12. A receiver circuit for use in a signal transmission system that transmits data via complementary buses, and that detects said data by eliminating an intersymbol interference component introduced by preceding data, comprising:

a differential amplifier having first and second gate-receiving complementary inputs;

an amplifier precharging circuit, provided at each of the first and second inputs of said differential amplifier, for precharging in a manner that enhances the sensitivity of said differential amplifier; and two sets of first and second capacitors provided at the first and second inputs of said differential amplifier, wherein the first and second inputs of said differential amplifier are coupled to said complementary buses via said first and second capacitors, and in each set of capacitors said first capacitor is coupled at all times to one of said complementary buses, whereas said second capacitor is selectively coupled by a switch unit to one or the other of said complementary buses.

13. A receiver circuit as claimed in claim 12, wherein in each set of capacitors, said second capacitor is coupled, during an intersymbol interference estimation operation, to the bus opposite to the bus coupled to said first capacitor connected to the same differential input, and is coupled, during a data decision operation, to the same bus that is coupled to said first capacitor connected to the same differential input, thereby achieving elimination of complementary intersymbol interference components.

14. A receiver circuit as claimed in claim 12, wherein when the value of said first capacitor is denoted by C10, and the value of said second capacitor by C20, the values of said first and second capacitors are chosen to substantially satisfy the equation $C10/(C10+C20)=(1+\exp(-T/\tau))/2$, where $\tau$ is the time constant of said bus, and T is the cycle of one bit or the time one-bit data appears on said bus.

15. A receiver circuit as claimed in claim 12, wherein said differential amplifier is configured as a latch-type differential amplifier.

16. A receiver circuit as claimed in claim 15, wherein except during a data read period, said differential amplifier sets an output node thereof at a high level when a data receiving transistor is an N-channel type, or at a low level when said data receiving transistor is a P-channel type, thereby increasing operating speed.

17. A receiver circuit as claimed in claim 15, wherein during a differential amplifier input node precharge operation and an intersymbol interference component estimation operation within a data read period, and except during a data transfer period, said differential amplifier sets an output node thereof at a high level when a data receiving transistor is an N-channel type, or at a low level when said data receiving transistor is a P-channel type, thereby increasing operating speed.

18. A receiver circuit is claimed in claim 12, wherein said differential amplifier is configured as a current-mirror type differential amplifier.

19. A receiver circuit as claimed in claim 12, wherein said differential amplifier is configured so as not to operate except during a data transfer period.

* * * * *